US012796699B2

(12) United States Patent
Hernandez et al.

(10) Patent No.: US 12,796,699 B2
(45) Date of Patent: Nov. 17, 2026

(54) COMPOUNDS AND FORMULATIONS FOR PROTECTIVE COATINGS

(71) Applicant: Apeel Technology, Inc., Goleta, CA (US)

(72) Inventors: Carlos Hernandez, Goleta, CA (US); Chance Holland, Goleta, CA (US); Stephen Kaun, Goleta, CA (US); Louis Perez, Goleta, CA (US); Charles Frazier, Goleta, CA (US); Changrui Gao, Goleta, CA (US); Justin Ryan, Goleta, CA (US)

(73) Assignee: APEEL TECHNOLOGY, INC., Goleta, CA (US)

( * ) Notice: Subject to any disclaimer, the term of this patent is extended or adjusted under 35 U.S.C. 154(b) by 615 days.

(21) Appl. No.: 18/131,102

(22) Filed: Apr. 5, 2023

(65) Prior Publication Data

US 2023/0232872 A1 Jul. 27, 2023

Related U.S. Application Data

(62) Division of application No. 17/191,352, filed on Mar. 3, 2021, now Pat. No. 11,641,865.

(60) Provisional application No. 62/985,305, filed on Mar. 4, 2020.

(51) Int. Cl.

| | |
|---|---|
| ***A23B 2/758*** | (2025.01) |
| ***A23B 2/75*** | (2025.01) |
| ***A23B 2/754*** | (2025.01) |
| ***A23B 7/154*** | (2006.01) |
| ***A23B 7/16*** | (2006.01) |
| ***A23L 19/00*** | (2016.01) |

(Continued)

(52) U.S. Cl.
CPC ................ *A23B 2/758* (2025.01); *A23B 2/75* (2025.01); *A23B 2/754* (2025.01); *A23B 7/154* (2013.01); *A23B 7/16* (2013.01); *A23L 19/05* (2016.08); *A23P 20/11* (2016.08); *C09D 165/00* (2013.01); *A23V 2002/00* (2013.01)

(58) Field of Classification Search
CPC ........... A23B 2/758; A23B 2/75; A23B 2/754; A23B 7/154; A23B 7/16; A23L 19/05; A23P 20/11; C09D 165/00; A01N 25/26
See application file for complete search history.

(56) References Cited

U.S. PATENT DOCUMENTS

| | | | |
|---|---|---|---|
| 1,016,761 | A | 2/1912 | Moore |
| 1,943,468 | A | 1/1934 | Bridgeman |
| 2,213,557 | A | 9/1940 | Tisdale et al. |

(Continued)

FOREIGN PATENT DOCUMENTS

| | | |
|---|---|---|
| CN | 86104531 | 2/1988 |
| CN | 1103548 | 6/1995 |

(Continued)

OTHER PUBLICATIONS

Cassin et al., "Investigation of the Gel to Coagel Phase Transition in Monoglyceride-Water Systems," Langmuir, Sep. 1998, 14(20):5757-5763.

(Continued)

*Primary Examiner* — Katherine D Leblanc
(74) *Attorney, Agent, or Firm* — David R. Conklin; Kirton McConkie

(57) ABSTRACT

Compositions for forming protective coatings on, e.g., agricultural products, can form a lamellar structure on the surface of the agricultural product that forms a barrier to, e.g., water and gas.

22 Claims, 62 Drawing Sheets

(51) Int. Cl.
*A23P 20/10* (2016.01)
*C09D 165/00* (2006.01)

(56) References Cited

U.S. PATENT DOCUMENTS

| | | | |
|---|---|---|---|
| 2,222,000 | A | 11/1940 | Schmidt |
| 2,223,168 | A | 11/1940 | Dombrow et al. |
| 2,275,659 | A | 3/1942 | Steinle et al. |
| 2,324,448 | A | 7/1943 | Gottlieb |
| 2,333,887 | A | 11/1943 | Redlinger |
| 2,342,063 | A | 2/1944 | Sells |
| 2,363,232 | A | 11/1944 | De Witt |
| 2,424,952 | A | 7/1947 | Handy |
| 2,472,794 | A | 6/1949 | Cothran |
| 2,657,282 | A | 10/1953 | Winkel |
| 2,697,793 | A | 12/1954 | Trump et al. |
| 2,857,282 | A | 10/1958 | Jansen |
| 3,189,467 | A | 6/1965 | Kalmar |
| 3,208,951 | A | 9/1965 | Berger et al. |
| 3,232,765 | A | 2/1966 | Rosenthal et al. |
| 3,420,790 | A | 1/1969 | Gassner et al. |
| 3,437,621 | A | 4/1969 | Aron et al. |
| 3,445,275 | A | 5/1969 | Bogart et al. |
| 3,449,108 | A | 6/1969 | McConnell et al. |
| 3,471,303 | A | 10/1969 | Hamdy et al. |
| 3,715,024 | A | 2/1973 | Mumma |
| 3,997,674 | A | 12/1976 | Ukai et al. |
| 4,002,775 | A | 1/1977 | Kabara |
| 4,002,777 | A | 1/1977 | Juvinall et al. |
| 4,115,313 | A | 9/1978 | Lyon et al. |
| 4,421,775 | A | 12/1983 | Chan, Jr. |
| 4,423,071 | A | 12/1983 | Chignac et al. |
| 4,649,057 | A | 3/1987 | Thomson |
| 4,654,370 | A | 3/1987 | Marriot et al. |
| 4,661,359 | A | 4/1987 | Seaborne et al. |
| 4,710,228 | A | 12/1987 | Seaborne et al. |
| 4,726,898 | A | 2/1988 | Mills et al. |
| 4,732,708 | A | 3/1988 | Ekman et al. |
| 4,820,533 | A | 4/1989 | Seaborne |
| 4,857,345 | A | 8/1989 | Sardo |
| 4,874,618 | A | 10/1989 | Seaborn |
| 4,960,600 | A | 10/1990 | Kester et al. |
| 4,962,885 | A | 10/1990 | Coffee |
| 5,019,403 | A | 5/1991 | Krochta |
| 5,051,448 | A | 9/1991 | Shashoua |
| 5,110,509 | A | 5/1992 | Peter et al. |
| 5,126,153 | A | 6/1992 | Beck |
| 5,209,410 | A | 5/1993 | Wichmann et al. |
| 5,354,573 | A | 10/1994 | Gross et al. |
| 5,366,995 | A | 11/1994 | Savage |
| 5,376,391 | A | 12/1994 | Nisperos-Carriedo et al. |
| 5,389,389 | A | 2/1995 | Beck |
| 5,451,266 | A | 9/1995 | Kirk et al. |
| 5,498,295 | A | 3/1996 | Murch et al. |
| 5,543,164 | A | 8/1996 | Krochta et al. |
| 5,607,970 | A | 3/1997 | Ishihara |
| 5,658,768 | A | 8/1997 | Quinlan |
| 5,741,505 | A | 4/1998 | Beyer et al. |
| 5,827,553 | A | 10/1998 | Dimitroglou |
| 5,832,527 | A | 11/1998 | Kawaguchi |
| 5,906,831 | A | 5/1999 | Larsson et al. |
| 5,925,395 | A | 7/1999 | Chen |
| 5,939,117 | A | 8/1999 | Chen et al. |
| 6,010,726 | A | 1/2000 | Evans et al. |
| 6,033,705 | A | 3/2000 | Isaacs |
| 6,136,856 | A | 10/2000 | Savage et al. |
| 6,162,475 | A | 12/2000 | Hagenmaier et al. |
| 6,165,529 | A | 12/2000 | Yang et al. |
| 6,241,971 | B1 | 6/2001 | Fox et al. |
| 6,254,645 | B1 | 7/2001 | Kellis et al. |
| 6,255,451 | B1 | 7/2001 | Koch et al. |
| 6,294,186 | B1 | 9/2001 | Beerse et al. |
| 6,348,217 | B1 | 2/2002 | Santos et al. |
| 6,503,492 | B2 | 1/2003 | McGlone et al. |
| 6,685,916 | B1 | 2/2004 | Holme et al. |
| 6,723,364 | B1 | 4/2004 | Bompeix et al. |
| 6,783,768 | B1 | 8/2004 | Brown et al. |
| 6,822,105 | B1 | 11/2004 | Luxem |
| 7,373,135 | B2 | 5/2008 | Najib-Fruchart et al. |
| 7,375,135 | B2 | 5/2008 | Naiib-Fruchart et al. |
| 7,550,617 | B2 | 6/2009 | Imig et al. |
| 7,708,822 | B2 | 5/2010 | Lahav et al. |
| 7,732,470 | B2 | 6/2010 | Imig et al. |
| 7,754,766 | B2 | 7/2010 | Awad |
| 7,785,897 | B2 | 8/2010 | Agnes et al. |
| 7,851,002 | B2 | 12/2010 | Hekal et al. |
| 7,931,926 | B2 | 4/2011 | Lidster et al. |
| 7,943,336 | B2 | 5/2011 | Viksoe-Nielsen et al. |
| 8,101,221 | B2 | 1/2012 | Chen et al. |
| 8,119,178 | B2 | 2/2012 | Lidster et al. |
| 8,197,870 | B2 | 6/2012 | Krasutsky et al. |
| 8,247,609 | B2 | 8/2012 | Roques et al. |
| 8,263,751 | B2 | 9/2012 | Peterson |
| 8,424,243 | B1 | 4/2013 | Narciso et al. |
| 8,501,445 | B2 | 8/2013 | Yoshikawa et al. |
| 8,546,115 | B2 | 10/2013 | Buchert et al. |
| 8,586,807 | B2 | 11/2013 | Hatcher |
| 8,609,169 | B2 | 12/2013 | Chen et al. |
| 8,752,328 | B2 | 6/2014 | Kaiser et al. |
| 8,846,355 | B2 | 9/2014 | Yoshikawa et al. |
| 8,921,351 | B2 | 12/2014 | Perlman |
| 9,095,152 | B2 | 8/2015 | Munger |
| 9,102,125 | B2 | 8/2015 | Battersby et al. |
| 9,283,173 | B2 | 3/2016 | Lederman |
| 9,284,432 | B2 | 3/2016 | Yoshikawa et al. |
| 9,475,643 | B1 | 10/2016 | Odman et al. |
| 9,714,399 | B2 | 7/2017 | Verkuiil |
| 9,743,670 | B2 | 8/2017 | Grund et al. |
| 9,743,679 | B2 | 8/2017 | Perez et al. |
| 9,770,041 | B2 | 9/2017 | Dong et al. |
| 10,150,132 | B2 | 12/2018 | Hamamoto et al. |
| 11,641,865 | B2 | 5/2023 | Hernandez et al. |
| 11,723,377 | B2 | 8/2023 | Holland et al. |
| 2001/0042341 | A1 | 11/2001 | Hamersky et al. |
| 2002/0043577 | A1 | 4/2002 | Krasutsky et al. |
| 2002/0123546 | A1 | 9/2002 | Bigg et al. |
| 2003/0044488 | A1 | 3/2003 | Roskam |
| 2003/0124228 | A1 | 7/2003 | Goto |
| 2003/0194445 | A1 | 10/2003 | Kuhner et al. |
| 2004/0022906 | A1 | 2/2004 | Petacvich |
| 2004/0120919 | A1 | 6/2004 | Nguyen et al. |
| 2004/0220283 | A1 | 11/2004 | Zhang et al. |
| 2005/0053593 | A1 | 3/2005 | Wang et al. |
| 2005/0233039 | A1 | 10/2005 | Wolfe et al. |
| 2005/0249856 | A1 | 11/2005 | Marangoni |
| 2006/0037892 | A1 | 2/2006 | Blanc |
| 2006/0057187 | A1 | 3/2006 | Eskuchen et al. |
| 2006/0057259 | A1 | 3/2006 | Ripoll et al. |
| 2006/0153912 | A1 | 7/2006 | Habich et al. |
| 2006/0198924 | A1 | 9/2006 | Song et al. |
| 2006/0292281 | A1 | 12/2006 | Kragh et al. |
| 2007/0278103 | A1 | 12/2007 | Hoerr et al. |
| 2008/0026120 | A1 | 1/2008 | Petcavich |
| 2008/0038471 | A1 | 2/2008 | Boger et al. |
| 2008/0119772 | A1 | 5/2008 | Coffee |
| 2008/0254987 | A1 | 10/2008 | Liu et al. |
| 2008/0262190 | A1 | 10/2008 | Koskimies et al. |
| 2008/0310991 | A1 | 12/2008 | Webster et al. |
| 2009/0035414 | A1 | 2/2009 | Cheng et al. |
| 2009/0042985 | A1 | 2/2009 | Bhaggan et al. |
| 2009/0104446 | A1 | 4/2009 | Guillet et al. |
| 2009/0123632 | A1 | 5/2009 | Klemann et al. |
| 2009/0142453 | A1 | 6/2009 | Lobisser et al. |
| 2009/0163729 | A1 | 6/2009 | Li et al. |
| 2009/0224437 | A1 | 9/2009 | Fukuoka et al. |
| 2009/0325240 | A1 | 12/2009 | Daniell |
| 2010/0029778 | A1 | 2/2010 | Bailey et al. |
| 2010/0092631 | A1 | 4/2010 | Sardo |
| 2010/0210745 | A1 | 8/2010 | McDaniel |
| 2010/0278784 | A1 | 11/2010 | Pojasek et al. |
| 2010/0292426 | A1 | 11/2010 | Hossainv |
| 2011/0000975 | A1 | 1/2011 | Gartstein et al. |
| 2011/0003014 | A1 | 1/2011 | Kulikowski |
| 2011/0240064 | A1 | 10/2011 | Wales |

(56) References Cited

U.S. PATENT DOCUMENTS

| | | | |
|---|---|---|---|
| 2011/0244095 | A1 | 10/2011 | Sardo |
| 2011/0280942 | A1 | 11/2011 | Schad et al. |
| 2012/0003356 | A1 | 1/2012 | Ekanayake et al. |
| 2012/0103790 | A1 | 5/2012 | Krull et al. |
| 2012/0251675 | A1 | 10/2012 | Sowa et al. |
| 2013/0045246 | A1 | 2/2013 | Edwards et al. |
| 2013/0095141 | A1 | 4/2013 | Schad et al. |
| 2013/0156970 | A1 | 6/2013 | Crawford |
| 2013/0209617 | A1 | 8/2013 | Lobisser et al. |
| 2013/0216488 | A1 | 8/2013 | Hernandez-Brenes et al. |
| 2013/0323378 | A1 | 12/2013 | Stark et al. |
| 2014/0033926 | A1 | 2/2014 | Passel et al. |
| 2014/0199449 | A1 | 7/2014 | Hernandez et al. |
| 2014/0205722 | A1 | 7/2014 | Quintanar Guerrero et al. |
| 2014/0221308 | A1 | 8/2014 | Baker et al. |
| 2014/0234921 | A1 | 8/2014 | Nyyssola et al. |
| 2014/0348945 | A1 | 11/2014 | Dong et al. |
| 2015/0021802 | A1 | 1/2015 | Wakita |
| 2015/0030780 | A1 | 1/2015 | Rogers |
| 2015/0079248 | A1 | 3/2015 | Nussinovitch et al. |
| 2015/0210855 | A1 | 7/2015 | Firth |
| 2015/0359217 | A1 | 12/2015 | Narita et al. |
| 2015/0366230 | A1 | 12/2015 | Malefyt et al. |
| 2016/0002483 | A1 | 1/2016 | Zhao et al. |
| 2016/0100597 | A1 | 4/2016 | Immaraju et al. |
| 2016/0213030 | A1 | 7/2016 | Schad |
| 2016/0256429 | A1 | 9/2016 | Spanova et al. |
| 2016/0304410 | A1 | 10/2016 | Schultz et al. |
| 2016/0324172 | A1 | 11/2016 | Williams et al. |
| 2017/0049119 | A1 | 2/2017 | Perez et al. |
| 2017/0073532 | A1 | 3/2017 | Perez et al. |
| 2017/0251673 | A1 | 9/2017 | Cifuentes et al. |
| 2017/0320077 | A1 | 11/2017 | Rogers |
| 2018/0092811 | A1 | 4/2018 | Klee |
| 2018/0303732 | A1 | 10/2018 | Wehner et al. |
| 2018/0317509 | A1 | 11/2018 | Van Velzen et al. |
| 2018/0368427 | A1 | 12/2018 | Rogers et al. |
| 2019/0104748 | A1 | 4/2019 | Kaun et al. |
| 2019/0269145 | A1 | 9/2019 | Bakus, II et al. |
| 2020/0068912 | A1 | 3/2020 | Hernandez |
| 2020/0352184 | A1 | 11/2020 | Frazier et al. |
| 2020/0383343 | A1 | 12/2020 | Rodriguez et al. |
| 2021/0337817 | A1 | 11/2021 | Lee et al. |
| 2022/0039416 | A1 | 2/2022 | Kaun et al. |
| 2022/0064859 | A1 | 3/2022 | Hernandez et al. |
| 2022/0135510 | A1 | 5/2022 | Bakus, II et al. |
| 2022/0202029 | A1 | 6/2022 | Monster et al. |
| 2022/0312784 | A1 | 10/2022 | Chari et al. |
| 2023/0380435 | A1 | 11/2023 | Holland et al. |
| 2024/0008501 | A1 | 1/2024 | Fisher et al. |
| 2024/0090389 | A1 | 3/2024 | Fisher et al. |
| 2024/0130383 | A1 | 4/2024 | Lin et al. |
| 2024/0156117 | A1 | 5/2024 | Crisci et al. |
| 2024/0180180 | A1 | 6/2024 | Essert et al. |
| 2024/0180181 | A1 | 6/2024 | Essert |
| 2025/0024847 | A1 | 1/2025 | Essert et al. |

FOREIGN PATENT DOCUMENTS

| | | | |
|---|---|---|---|
| CN | 1215420 | | 4/1999 |
| CN | 1616561 | | 5/2005 |
| CN | 1817147 | | 8/2006 |
| CN | 1856261 | | 11/2006 |
| CN | 101035926 | | 9/2007 |
| CN | 101356012 | | 1/2009 |
| CN | 101454406 | | 6/2009 |
| CN | 101708013 | | 5/2010 |
| CN | 101755899 | | 6/2010 |
| CN | 102119719 | | 7/2011 |
| CN | 102291986 | | 12/2011 |
| CN | 102335142 | | 2/2012 |
| CN | 102349555 | | 2/2012 |
| CN | 103283830 | | 9/2013 |
| CN | 103478233 | | 1/2014 |
| CN | 103609670 | | 3/2014 |
| CN | 103719261 | | 4/2014 |
| CN | 103734280 | | 4/2014 |
| CN | 104606076 | | 5/2015 |
| CN | 104642528 | | 5/2015 |
| CN | 105341619 | | 2/2016 |
| CN | 105494615 | | 4/2016 |
| CN | 106280909 | | 1/2017 |
| CN | 106973982 | A | 7/2017 |
| CN | 107828560 | | 3/2018 |
| CN | 110255947 | | 9/2019 |
| CN | 112898630 | | 6/2021 |
| DE | 2505428 | | 8/1976 |
| DE | 3622191 | | 1/1988 |
| EP | 0104043 | | 3/1984 |
| EP | 0655201 | | 5/1995 |
| EP | 1020124 | | 7/2000 |
| EP | 1681281 | | 7/2006 |
| EP | 2389814 | | 11/2011 |
| EP | 2644185 | | 10/2013 |
| EP | 2684879 | | 1/2014 |
| EP | 3354264 | | 8/2018 |
| ES | 1041955 | | 8/1999 |
| GB | 421649 | | 12/1934 |
| IN | 192832 | | 5/2004 |
| IN | 1870912 | | 11/2006 |
| JP | S53-62855 | | 6/1978 |
| JP | S54-139645 | | 10/1979 |
| JP | S58-034034 | | 2/1983 |
| JP | S58-89140 | | 5/1983 |
| JP | S62-126931 | | 6/1987 |
| JP | S63-062574 | | 3/1988 |
| JP | H04-016173 | | 1/1992 |
| JP | H04-507192 | | 12/1992 |
| JP | H06-506166 | | 7/1994 |
| JP | H07-075519 | | 3/1995 |
| JP | H08-056564 | | 3/1996 |
| JP | 2519455 | | 7/1996 |
| JP | H10-298003 | | 11/1998 |
| JP | 2002-531075 | | 9/2002 |
| JP | 2003-522130 | | 7/2003 |
| JP | 2004-210704 | A | 7/2004 |
| JP | 2004-526830 | | 9/2004 |
| JP | 3835956 | | 10/2006 |
| JP | 2007-502271 | | 2/2007 |
| JP | 2007-510014 | | 4/2007 |
| JP | 2008-504442 | | 2/2008 |
| JP | 2009-527357 | | 7/2009 |
| JP | 2010-530795 | | 9/2010 |
| JP | 2012-087072 | | 5/2012 |
| JP | 2012-515561 | | 7/2012 |
| JP | 2013-139433 | | 7/2013 |
| JP | 2014-231481 | | 12/2014 |
| KR | 10-1419385 | | 7/2014 |
| WO | WO 93/06735 | | 4/1993 |
| WO | WO 2000/009138 | A1 | 2/2000 |
| WO | WO 2001/001980 | | 1/2001 |
| WO | WO 2004/030455 | | 4/2004 |
| WO | WO 2007/100654 | | 9/2007 |
| WO | WO 2008/142393 | | 11/2008 |
| WO | WO 2009/119730 | | 10/2009 |
| WO | WO 2010/031929 | | 3/2010 |
| WO | WO 2011/014831 | | 2/2011 |
| WO | WO 2012/042404 | | 4/2012 |
| WO | 2012/129722 | A1 | 10/2012 |
| WO | WO 2012/164561 | | 12/2012 |
| WO | WO 2012/173262 | | 12/2012 |
| WO | 2014/162238 | | 10/2014 |
| WO | 2014/206911 | | 12/2014 |
| WO | 2015/017450 | | 2/2015 |
| WO | 2015/028299 | | 3/2015 |
| WO | 2015/052433 | | 4/2015 |
| WO | 2015/074144 | | 5/2015 |
| WO | 2015/176020 | | 11/2015 |
| WO | 2016/168319 | | 10/2016 |
| WO | 2016/187581 | | 11/2016 |
| WO | 2017/043972 | | 3/2017 |
| WO | 2017/048951 | | 3/2017 |
| WO | WO 2017/100636 | | 6/2017 |
| WO | WO 2017/132281 | | 8/2017 |

(56) References Cited

FOREIGN PATENT DOCUMENTS

| | | |
|---|---|---|
| WO | WO 2017/172951 | 10/2017 |
| WO | WO 2018/009846 | 1/2018 |
| WO | WO 2018/042435 | 3/2018 |
| WO | WO 2018/094269 | 5/2018 |
| WO | WO 2018/144482 | 8/2018 |
| WO | WO 2019/096844 | 5/2019 |
| WO | WO 2020/051238 | 3/2020 |
| WO | WO 2020/226495 | 11/2020 |

OTHER PUBLICATIONS

Qin et al., "Water-solubility of chitosan and its antimicrobial activity," Carbohydrate Polymers, Mar. 2006, 63(3):367-374.
Shearman et al., "Factors Controlling the Stability of a Kinetically Hindered Lamellar-Lamellar Transition," Phys. Chem. B, Jan. 2009, 113(7):1948-1953.
Jenkin et al., "Isolation and Compositional Analysis of Plant Cuticle Lipid Polyester Monomers," Journal of Visualized Experiments, Nov. 2015, 105:e53386, 10 pages, URL: https://www.jove.com/video/53386.
PCT International Search Report and Written Opinion, PCT Application No. PCT/US2018/46994, Dec. 20, 2018, 28 pages.
PCT Invitation to Pay additional Fees and, Where Applicable, Protest Fee in International Appln. No. PCT/US2018/046994, mailed Oct. 23, 2018, 2 pages.
Perkins et al., "Ultrasonic fog application of organic acids delays postharvest decay in red bayberry," Postharvest Biology and Technology, Nov. 2017, 13:41-47.
postharvest.ucdavis.edu [online], "Fact Sheets," available on or before Aug. 9, 2016, via Internet Archive: Wayback Machine URL <https://web.archive.org/web/20160809075048/http://postharvest.ucdavis.edu/Commodity_Resources/Fact_Sheets/>, retrieved on Aug. 16, 2021, URL <http://postharvest.ucdavis.edu/Commodity_Resources/Fact_Sheets/>, 3 pages.
Quiros-Sauceda et al., "Edible coatings as encapsulating matrices for bioactive compounds: a review," Journal of Food Science and Technology, Jan. 2014, 51(9), pp. 1674-1685, 12 pages.
Rahman et al., "The Effect of a New Coating on the Drying Performance of Fruit and Vegetables Products: Experimental Investigation and Artificial Neural Network Modeling," Foods, Mar. 2020, 9(3), 308, 1-13.
Roy, S. et al., "Modified atmosphere and modified humidity packaging of fresh mushrooms," J Food Sci., 1996, vol. 61, p. 391-397.
Rujun et al., "Surface Modification and Physical properties of Inorganic Nanomaterials," University of Technology Press, 1st Edition, Oct. 2009, 43-45, 11 pages (with English translation).
Rutala, W. et al., "Guideline for Disinfection and Sterilization in Healthcare Facilities, 2008," CDC, 2008, 158 Pages.
Sasaki, M. et al., "Cellulose hydrolysis in subcritical and supercritical water," Journal of Supercritical Fluids, 1998, vol. 13, pp. 261-268.
Sasaki, M et al., "Dissolution and Hydrolysis of Cellulose in Subcritical and Supercritical Water," Ind. Eng. Chem. Res., 2000, vol. 39, pp. 2883-2890.
Savage, P., "Organic Chemical Reactions in Supercritical Water," Chem. Rev., 1999, vol. 99, pp. 603-621.
Schreiber et al., "Transport barriers made of cutin, suberin and associated waxes," Trends in Plant Science, 2010, vol. 15, No. 10, p. 546-553.
Schweizer, P. et al., "Perception of free cutin monomers by plant cells," The Plant Journal, vol. 10, No. 2, 1996, p. 331-341.
Schweizer, P. et al., "Plant Protection by Free Cutin Monomers in Two Cereal Pathosystems," Advances in Molecular Genetics of Plant-Microbe Interactions, 1994, p. 371-374.
Shirazi A, et al., "Controlling relative humidity in modified atmosphere packages of tomato fruit," HortScience, 1992, vol. 27, p. 336-339.
Siekmann et al., "Preparation and structural investigations of colloidal dispersions prepared from cubic monoglyceride-water phases," Int. J. Pharm., Sep. 2002, 244(1-2):33-43.
Spicer et al., "Novel Process for Producing Cubic Liquid Crystalline Nanoparticles (Cubosomes)," Langmuir, Aug. 2001, 17(19):5748-5756.
Steuter et al., "Water Potential of Aqueous Polyethylene Glycol," Plant Physiol., 1981, vol. 67, p. 64-67.
Takats, Z., et al., "Special Feature: Perspective—Ambient Mass Spectrometry Using Desorption Electrospray Ionization (DESI): Instrumentation, Mechanisms and Applications in Forensics, Chemistry, and Biology," J. Mass Spectrom, 2005, vol. 40, pp. 1261-1275.
Tanaka, M., et al., "Quantitative determination of isomeric glycerides, free fatty acids and triglycerides by thin layer chromatography-flame ionization detector system." Lipids, 1980, vol. 15, No. 10, pp. 872-875.
Technical Evaluation Report, "Glycerides (mono and di) Handling/Processing," Compiled by OMRI for the USDA National Organic Program, Jan. 27, 2015, 1-14.
Tegelaar, E.W. et al., "Some mechanisms of flash pyrolysis of naturally occurring higher plant polyesters," Journal of Analytical and Applied Pyrosis, 1989, vol. 15, 2 pages (abstract only).
The Fountainhead Group, Inc., "Burgess Electric Professional Fogger," Manual No. 161128, Revision D, Feb. 25, 2015, retrieved on Jan. 12, 2021, retrieved from URL <https://www.jondon.com/media/pdf/manuals/FG-EGF-EA_manual.pdf>, 8 pages.
TW Search Report in Taiwan Appln. No. 105130215, dated Aug. 6, 2020, 12 pages (with English translation).
United States Environmental Protection Agency, "Containers and Packaging: Product-Specific Data," Nov. 6, 2019, last updated Jan. 28, 2021, retrieved on Oct. 6, 2021, retrieved from URL <https://www.epa.gov/facts-and-figures-about-materials-waste-and-recycling/containers-and-packaging-product-specific-data>, 12 pages.
US Statutory Invention Registration No. H1591, Preparation of Flavor-Enhanced Reduced Calorie Fried Foods, Sep. 3, 1996, 5 pages.
Van Doorn et al., "Alkylethoxylate surfactants for rehydration of roses and Bouvardia flowers," Postharvest Biology and Technology, 2002, vol. 24, p. 327-333.
Van Doorn et al., "Effects of surfactants on the longevity of dry-stored cut flowering stems of rose, Bouvardia, and Astilbe," Postharvest Biology and Technology, 1993, vol. 3, pp. 69-76.
Van Meeteren, "Water Relations and Keeping-Quality of Cut Gerbera Flowers. I. The Cause of Stem Break," Scientia Horticulturae, 1978, vol. 8, p. 65-74.
Vardar et al., "The application of various disinfectants by fogging for decreasing postharvest diseases of strawberry," Postharvest Biology and Technology, Apr. 2012, 66:30-34.
Vargas et al., "Development of Edible Coatings for Fresh Fruits and Vegetables: Possibilities and Limitations," Fresh Produce, Jan. 2008, 2(2):32-40.
Wang, R. et al., "Evolution of the Solvent Polarity in an Electrospray Plume," J. Am Soc Mass Spectrom, 2010, vol. 21, pp. 378-385.
Watkins, "The Use of 1-Methylcyclopropene (1-MCP) on Fruits and Vegetables," Biotech. Adv., Jul.-Aug. 2006, 24 (4):389-409.
Weingartner, H. et al., "Supercritical water as a solvent," Angewandte Chemie, 2005, vol. 44, Issue 18, pp. 2672-2692.
Wikipedia, Anonymous, "Paint-Wikipedia," retrieved from URL <https://en.wikipedia.org/w/index.php?title=Paint&oldid=563291624>, retrieved Jul. 2013, 7 Pages.
Xizhong et al., "Spray drying," the 2nd edition, Chemical Industry Press, Feb. 28, 2003, 147-151, 9 pages.
Yang et al., "Progress on Graft Polymerization of Cellulose," Journal of Cellulose Science and Technology, Sep. 2009, 17(3), 6 pages (with English abstract).
Yeats, T. et al., "The identification of cutin synthase: formation of the plant polyester cutin," Nat Chem Biol., Jul. 2012, vol. 8, No. 7, pp. 609-611, 10 pages.
Zhu, J. et al., "Focus: Electrospray-Formation and Decompositions of Chloride Adduct Ions, [M+Cl] , in Negative Ion Electrospray Ionization Mass Spectrometry," J. Am Soc Mass Spectrom, 2000, vol. 11, pp. 932-941.

(56) References Cited

OTHER PUBLICATIONS

Zhu, J. et al., "Ranking of a Gas-phase Acidities and Chloride Affinities of Monosaccharides and Linkage Specificity in Collision-induced Decompositions of Negative Ion Electrospray-generated Chloride Adducts of Oligosaccharides," J. Am Soc Mass Spectrom, 2001, vol. 12, pp. 1193-1204.
Adkins et al., "Manipulating Avocado Fruit Ripening with 1-Methylcyclopropene," Postharvest Biol. Technol., Jan. 2005, 35(1):33-42.
Alvaro, J. et al., "Effects of peracetic acid disinfectant on the postharvest of some fresh vegetables," Journal of Food Engineering, 2009, vol. 95, pp. 11-15.
Alvira et al., "Pretreatment Technologies for an Efficient Bioethanol Production Process Based on Enzymatic Hydrolysis: A Review," Bio resource Technology, 2010, 101(13):4851-4861.
Andrade, Ricardo D. et al., "Atomizing spray systems for application of edible coatings," Comprehensive Reviews in Food Science and Food Safety, vol. 11, No. 3, 2012, p. 323-337.
Ayala-Zavala, J.F. et al., "High Relative Humidity In-Package of Fresh-Cut Fruits and Vegetables: Advantage or Disadvantage Considering Microbiological Problems and Antimicrobial Delivering Systems?," J Food Science, 2008, vol. 73, p. R41-R47.
Baker et al., "Cutin Degradation by Plant Pathogenic Fungi," The American Phytopathological Society, May 15, 1978, 68:1577-1584.
Baldwin et al., "Edible Coatings for Lightly Processed Fruits and Vegetables," HortScience, Feb. 1995, 30(1):35-38.
Banerjee, S. et al., "Review Article: Electrospray Ionization Mass Spectrometry: A Technique to Access the Information Beyond the Molecular Weight of the Analyte," International Journal of Analytical Chemistry, Nov. 2011, vol. 2012, Article ID 282574, 40 pages.
Bateman, A. et al., "The Effect of Solvent on the Analysis of Secondary Organic Aerosol Using Electrospray Ionization Mass Spectrometry," Environ. Sci. Technol., 2008, vol. 42, No. 19, pp. 7341-7346.
Bateman, A., et al., "Supporting Information for Manuscript es-2008-01226w—The Effect of Solvent on the Analysis of Secondary Organic Aerosol Using Electrospray Ionization Mass Spectrometry," [online] 2008; available from the Internet URL: http://aerosol.chem.uci.edu/publications/Irvine/2008.sub.—Bateman.sub.—EST.sub.--SOA.sub.—solvent.sub.—effects.sub.--supporting.sub.—info.pdf, 6 pages.
Bell et al., "The activity of (S)-hydroprene space spray against three stored products pests in a simulated food production environment," Journal of Stored Products Research, Apr. 1999,35(2):117-126.
Ben-Yehoshua, S. et al., "Modified-atmosphere packaging of fruits and vegetables: reducing condensation of water in bell peppers and mangoes," Acta Hort (ISHS), 1998, vol. 464, 387-392.
Berge et al., "Pharmaceutical Salts," J. Pharm. Sci., Jan. 1977, 66(1):1-19.
Bewick, T. et al., "Evaluation of Epicuticular Wax Removal from Whole Leaves with Chloroform," Weed Technology, Jul. 1993, vol. 7, No. 3, pp. 706-716.
Bourtoom, T., "Edible films and coatings: characteristics and properties," International Food Research Journal, 2008, vol. 15, No. 3, pp. 237-248, 13 pages.
Cantwell, M., "Properties and recommended conditions for long-term storage of fresh fruits and vegetables," Nov. 2001, 8 Pages.
Cech, N., et al., "Practical Implications of Some Recent Studies in Electrospray lonization Fundamentals," Mass Spectrometry Reviews, 2001, vol. 20, pp. 362-387.
Chen, D-R., et al., "Electrospraying of Conducting Liquids for Monodisperse Aerosol Generation in the 4 nm to 1.8 . mu.m Diameter Range," J. Aerosol Sci., 1995, vol. 26, No. 6, pp. 963-977.
Cochran, H.D., "Solvation in supercritical water," Fluid Phase Equilibria, 1992, vol. 71, pp. 1-16.
Dao et al., "Control of Food Spoilage Fungi by Ethanol," Food Control, Mar. 2011, 22(3-4):360-368.
Deell JR et al., "Addition of sorbitol with KMnO4 improves broccoli quality retention in modified atmosphere packages," J Food Oual, 2006, vol. 29, p. 65-75.
Dhall, "Advances in edible coatings for fresh fruits and vegetables: a review," Crit. Rev. Food Sci. Nutr., 2013, 53(5), pp. 435-450.
Dinani et al., "Optimization of Carboxymethyl Cellulose and Calcium Chloride Dip-Coating on Mushroom Slices Prior to Hot Air Drying Using Response Surface Methodology," Journal of Food Processing and Prevention, Jun. 2014, 38(3):1269-1278.
Duoren et al., "Green Plasticizers," Scientific and Technological Literature Publishing House, the 1st Edition, Oct. 2011, 339-340, 7 pages (with English translation).
Elgimabi and Ahmed, "Effects of Bactericides and Sucrose-Pulsing on Vase Life of Rose Cut Flowers (*Rosa hybirida*)," Botany Research International, 2009, 2(3) p. 164-168.
Enke, C., "A Predictive Model for Matrix and Analyte Effects in Electrospray Ionization of Singly-charged Ionic Analytes," Analytical Chemistry, 1997, vol. 69, No. 23, pp. 4885-4893.
Extended European Search Report for European Patent Application No. EP 14831592.2, Mar. 2, 2017, 9 Pages.
Extended European Search Report in European Patent Appln. No. EP 19857630.8, dated May 20, 2022, 9 pages.
Gabler, M., et al., "Impact of Postharvest Hot Water or Ethanol Treatment of Table Grapes on Gray Mold Incidence, Quality, and Ethanol Content," Plant Disease, Mar. 2005, vol. 89, No. 3, pp. 309-316.
Gaskell, S., "Special Feature: Tutorial—Electrospray: Principles and Practice," J. Mass Spectrom, 1997, vol. 32, pp. 677-688.
Gil, M. et al., "Fresh-cut product sanitation and wash water disinfection: Problems and solutions," International Journal of Food Microbiology, 2009, vol. 134, pp. 37-45.
Graca, "Suberin: the biopolyester at the frontier of plants," Frontiers in Chemistry, Oct. 2015, 3(62):1-11.
Graca, J. et al., "Glycerol and glyceryl esters of o-hydroxyacids in cutins," Phytochemistry, 2002, vol. 61, pp. 205-215.
Graca, J. et al., "Linear and branched poly (omega-hydroxyacid) esters in plant cutins," J. Agric. Food Chem., 2010, vol. 58, No. 17, pp. 9666-9674.
Hardenburg, R., et al., "The Commercial Storage of Fruits, Vegetables, and Florist and Nursery Stocks," United States Department of Agriculture, Agriculture Handbook No. 66, Sep. 1986, pp. 6-7, 30, 50-51.
Hauff, S. et al., "Determination of hydroxylated fatty acids from the biopolymer of tomato cutin and their fate during Incubation in soil," Phytochemical Analysis, Aug. 26, 2010, vol. 21, No. 6, pp. 582-589.
He et al., "Stem end blockage in cut Grevillea 'Crimson Yul-lo' inflorescences," Postharvest Biology and Technology, 2006, vol. 41, p. 78-84.
Herrero et al., "Compressed fluids for the extraction of bioactive compounds," TrAC Trends in Analytical Chemistry, 2013, 43(1):67-83.
Hojjati et al., "Chemical Treatments of Eustoma Cut Flower Cultivars for Enhanced Vase Life," Journal of Agriculture and Social Sciences, 2007, vol. 3, No. 3, p. 75-78.
Holcroft, D., "Water Relations in Harvested Fresh Produce," PEF White Paper No. 15-01, The Postharvest Education Foundation (PEF), May 2015, 16 Pages.
Hongyou, "Homemade Fruit and Vegetable Coating Preservative," Vegetables, Nov. 30, 2005, p. 39, 2 pages (with English translation).
Huang et al., "Automation of a Fourier transform ion cyclotron resonance mass spectrometer for acquisition, analysis, and e-mailing of high-resolution exact-mass electrospray ionization mass spectral data," Journal of the American Society for Mass Spectrometry, Nov. 1, 1999, 10(11):1166-1173.
Huang, T-Y., et al., "Electron Transfer Reagent Anion Formation via Electrospray Ionization and Collision-induced Dissociation," Anal Chem., 2006, vol. 78, No. 21, pp. 7387-7391, 9 pages.
Hudson, B., "Fatty Acids," Encyclopedia of Food Sciences and Nutrition (Second Edition), 2003, pp. 2297-2300.
International Search Report and Written Opinion in International Appln. No. PCT/US2021/057448, mailed Feb. 18, 2022, 17 pages.
Javad et al., "Effect of Cultivar on Water Relations and Postharvest Quality ofGerbera (*Gerbera jamesonii* Bolus ex. Hook f.) Cut Flower," World Applied Sciences Journal, 2012, vol. 18, No. 5, p. 698-703.

(56) References Cited

OTHER PUBLICATIONS

Javad et al., "Postharvest evaluation of vase life, stem bending and screening of cultivars ofcut gerbera (*Gerberajamesonii* Bolux ex. Hook f.) flowers," African Journal of Biotechnology 2011, 10(4), p. 560-566.
Jaworek, A., "Electrospray Droplet Sources for Thin Film Deposition," J. Mater Sci, 2007, vol. 42, pp. 266-297.
Jellinek et al., "α-monostearin and sodium stearate as emulsifying agents," Journal of the Society of Chemical Industry, Apr. 1949, 68(4):108-114.
Jenkins, S. et al., "Isolation and Compositional Analysis of Plant Cuticle Lipid Polyester Monomers," Journal of Visualized Experiments, 105 e53386, 10 pages, URL: https://www.jove.com/video/53386.
Shchipunov, "Nomenclature, Structure, Sources, Composition, and Processing," Encyclopedia of Surface and Colloid Science, 2002, pp. 2997-3017.
Jensen et al., "Estimation of the Monoglyceride Content of Milk," Journal of Dairy Science, 1959, 42(2):232-239.
Jerome, F., et al., ""One pot" and selective synthesis of monoglycerides over homogeneous and heterogeneous guanidine catalysts," Green Chem., 2004, vol. 6, pp. 72-74.
Jiabin, "Rubberized fabrics and products thereof," World Rubber Industry, Dec. 2000, 6:27-32, 24 pages (with English translation).
Jingmei et al., "Preparation of modified starch/polylactic acid bleeds," New Chemical Materials, Jun. 2011, 39(6):125-126 and 129 (with English abstract).
Jones et al., "Pulsing with Triton X-100 Improves Hydration and Vase Life of Cut Sunflowers (*Helianthus annuus* L.)," HortScience, 1993, vol. 28, No. 12, p. 1178-1179.
Karabulut, O. et al., "Postharvest ethanol and hot water treatments of table grapes to control gray mold," Postharvest Biology and Technology, 2004, vol. 34, pp. 169-177.
Kebarle, P., "Special Feature: Commentary—A Brief Overview of the Present Status of the Mechanisms Involved in Electrospray Mass Spectrometry," J. Mass Spectrom, 2000, vol. 35, pp. 804-817.
Keller, B., et al., "Review Article: Interferences and Contaminants Encountered in Modern Mass Spectrometry," Analytica Chimica Acta, 2008, vol. 627, pp. 71-81.
Khan et al., "Application of Edible Coating for Improving Meat Quality: A Review," Pakistan Journal of Food Sciences, 2013, 23(2):71-79.
Kolattukudy, P.E., "BiopolyesterMembranes of Plants: Cutin and Suberin," Science, 1980, vol. 208, No. 4447, pp. 990-1000.
Kolattukudy, P.E., "Cutin from plants," Biopolymers Online, 3a, 2005, 40 pages.
Krammer, P., et al., "Hydrolysis of esters in subcritical and supercritical water," Journal of Supercritical Fluids, 2000, vol. 16, pp. 189-206.
Kroll, B., et al., "Review: Chemistry of Secondary Organic Aerosol: Formation and Evolution of Low-volatility Organics in the Atmosphere," Atmospheric Environment, 2008, vol. 42, pp. 3593-3624.
Kubo et al., "Modes of antifungal action of alkanols against *Saccharomyces cerevisiae*," Bioorganic & Medicinal Chemistry, Mar. 2003, 11(6):1117-1122.
Kubo et al., "Structural functions of antimicrobial long-chain alcohols and phenols," Bioorganic & Medicinal Chemistry, Jul. 1995, 3(7):873-880.
Kulkarni et al., "Natural Polymers—A comprehensive review," International Journal of Research in Pharmaceutical and Biomedical Sciences, Dec. 2012, 3(4):1597-1613.
kumitasu.com [online], "About fruit wax and chenpi," Jul. 26, 2015, retrieved on Aug. 16, 2021, retrieved from URL <https://web.archive.org/web/20160409110129/https://www.kumitasu.com/contents/hyoji/806>, 5 pages (with machine translation).
Li, M.,et al., "Direct Quantification of Organic Acids in Aerosols by Desorption Electrospray Ionization Mass Spectrometry," Atmospheric Environment, 2009, vol. 43, pp. 2717-2720.
Lin et al., "Innovations in the Development and Application of Edible Coatings for Fresh and Minimally Processed Fruits and Vegetables," Compr. Rev. Food Sci. Food Saf., Jun. 2007, 6(3):60-75.
Loppinet-Serani, A. et al., "Supercritical water for environmental technologies," J Chem Technol Biotechnol, Jan. 12, 2010, vol. 85, pp. 583-589.
Martin, "Preparation of Saturated and Unsaturated Symmetrical Monoglycerides," Journal of American Chemical Society, Jun. 1953, 75(20):5482-5483.
Matic, M., "The chemistry of Plant Cuticles: a study of cutin form *Agave americana* L.," Biochemical Journal, 1956, vol. 63, No. 1, pp. 168-176.
Mattson, F.H., et al., "Synthesis and properties of glycerides," J Lipid Research, Jul. 1962, vol. 3, No. 3, pp. 281-296.
Meihu et al., "Research on Coating of Preserved Egg for Quality-keeping and Fresh-keeping," Wan Fang, Aug. 2007, 17 pages (with English translation).
Morton, H., "The Relationship of Concentration and Germicidal Efficiency of Ethyl Alcohol," Annals New York Academy of Sciences, 53(1), 1950, pp. 191-196.
Mukherjee et al., "Antibacterial activity of long-chain fatty alcohols against mycobacteria," FEMS Microbiol. Lett., Jan. 2013, 338(2):177-183.
Nemoto et al., "Polyols of a cascade type as a water-solubilizing element of carborane derivatives for boron neutron capture therapy," The Journal of Organic Chemistry, Jan. 1992, 57(2):435.
Nizkorodov, S. et al., "Molecular Chemistry of Organic Aerosols through the Application of High Resolution Mass Spectrometry," Phys. Chem. Chem. Phys, 2011, vol. 13, pp. 3612-3629.
Oh, D. et al., "Antimicrobial activity of ethanol, glycerol monolaurate or lactic acid against Listeria monocytogenes," International Journal of Food Microbiology, 1993, vol. 20, pp. 239-246.
Olmez, H. et al., "Potential alternative disinfection methods for organic fresh-cut industry for minimizing water consumption and environmental impact," LWT—Food Science and Technology, 2009, vol. 42, pp. 686-693.
Orts et al., "Edible Films and Coatings: Why, What, and How?," Edible Films and Coatings for Food Applications, 2009, Chapter 1:1-23.
Osman, S. F. et al., "Preparation, Isolation, and Characterization of Cutin Monomers and oligomers from Tomato Peels," J. Agric, Food Chem, 1999, vol. 47, No. 2, pp. 799-802.
PCT International Preliminary Report on Patentability in International Appln. No. PCT/US2016/051936, mailed Mar. 29, 2018, 12 pages.
PCT International Preliminary Report on Patentability in International Appln. No. PCT/US2020/036174, mailed Dec. 16, 2021, 9 pages.
PCT International Search Report and Written Opinion for PCT/US2016/051936, Jan. 31, 2017, 18 Pages.
PCT International Search Report and Written Opinion for PCT/US2016/065917, Mar. 9, 2017, 10 Pages.
PCT International Search Report and Written Opinion for PCT/US2017/014978, Apr. 10, 2017, 13 Pages.
PCT International Search Report and Written Opinion in International Appln. No. PCT/US2019/042693, dated Oct. 2, 2019, 8 pages.
PCT International Search Report and Written Opinion in International Appln. No. PCT/US2019/045784, mailed Oct. 22, 2019, 14 pages.
PCT International Search Report and Written Opinion in International Appln. No. PCT/US2019/049585, mailed Jan. 13, 2020, 14 pages.
PCT International Search Report and Written Opinion in International Appln. No. PCT/US2020/036174, dated Sep. 7, 2020, 32 pages.
PCT International Search Report and Written Opinion in International Appln. No. PCT/US2021/020692, mailed Jun. 1, 2021, 13 pages.
PCT International Search Report and Written Opinion in International Appln. No. PCT/US2021/044535, mailed Nov. 17, 2021, 16 pages.

(56) References Cited

OTHER PUBLICATIONS

PCT International Search Report and Written Opinion in International Appln. No. PCT/US2021/048301, mailed Dec. 7, 2021, 12 pages.
PCT International Search Report and Written Opinion in PCT/US18/46998, Dec. 27, 2018, 31 pages.
PCT International Search Report and Written Opinion in PCT/US2014/048707, Nov. 13, 2014, 14 pages.
PCT International Search Report and Written Opinion in PCT/US2017/024799, Jun. 8, 2017, 13 pages.
PCT International Search Report and Written Opinion in PCT/US2017/041167, Oct. 9, 2017, 16 pages.
PCT International Search Report and Written Opinion, PCT Application No. PCT/US16/33617, Aug. 26, 2016, 20 Pages.
PCT International Search Report and Written Opinion, PCT Application No. PCT/US17/62399, Feb. 16, 2018, 16 Pages.
Baldwin et al., "Use of Lipids in Coatings for Food Products," Food Technology, Jun. 1997, 51(6): 56-61, 8 pages.
Wikipedia.org [online], "Coffee ring effect," retrieved from URL <https://en.wikipedia.org/wiki/Coffee_ring_effect>, retrieved Dec. 29, 2023, 6 pages.

500

502

Untreated avocado

Coating on avocado

94:6 monoglyceride:FA salt on Avocado

Conventional Wax on Lemon

94:6 monoglyceride:FA salt on Avocado

Conventional Wax on Lemon

Interlayer spacing $d = 2n\pi/q_{peak}$

| | SA-1G spacing (nm) | PA-1G spacing (nm) |
|---|---|---|
| Previous at RT | 5.43 | 5.20 |
| 25 °C | 5.40 | 5.21 |
| 40 °C | 5.40 | 5.22 |
| 60 °C | 5.40 | 5.22 |

| | Major peak position($Å^{-1}$) | a (nm) |
|---|---|---|
| 25 °C | 1.538 | 0.472 |
| 40 °C | 1.529 | 0.475 |
| 60 °C | 1.510 | 0.480 |

| | Peak FWHM (Å$^{-1}$) | Grain size(nm) |
|---|---|---|
| 25 °C | 0.0624 | 9.1 |
| 40 °C | 0.0367 | 16.3 |
| 60 °C | 0.0276 | 21.6 |

| | Peak FWHM ($Å^{-1}$) | Grain size(nm) |
|---|---|---|
| 25 °C | 0.0624 | 9.1 |
| Heat to 60 °C | 0.0295 | 19.1 |
| Cool to 25 °C | 0.0417 | 13.6 |

| Drying temperature | Peak FWHM (A-1) | Grain size(nm) |
|---|---|---|
| 25 °C | 0.0682 | 8.8 |
| 60 °C | 0.0533 | 11.2 |

COMPOUNDS AND FORMULATIONS FOR PROTECTIVE COATINGS

CROSS-REFERENCE TO RELATED APPLICATION

This application is a divisional of U.S. application Ser. No. 17/191,352, filed on Mar. 3, 2021, which claims priority to U.S. Provisional Application No. 62/985,305, filed on Mar. 4, 2020, which are incorporated by reference herein in their entireties.

TECHNICAL FIELD

This disclosure provides, e.g., coatings that are applied to agricultural products and methods of application and use thereof.

BACKGROUND

Common agricultural products are susceptible to degradation and decomposition (i.e., spoilage) when exposed to the environment. Such agricultural products can include, for example, eggs, fruits, vegetables, produce, seeds, nuts, flowers, and/or whole plants (including their processed and semi-processed forms). Edible non-agricultural products (e.g., vitamins, candy, etc.) can also be vulnerable to degradation when exposed to the ambient environment.

The degradation of agricultural and other edible products can occur via abiotic means as a result of evaporative moisture loss from an external surface of the products to the atmosphere, oxidation by oxygen that diffuses into the products from the environment, mechanical damage to the surface, and/or light-induced degradation (i.e., photodegradation). Biotic stressors such as bacteria, fungi, viruses, and/or pests can also infest and decompose the products.

The cells that form the aerial surface of most plants (such as higher plants) include an outer envelope or cuticle, which provides varying degrees of protection against water loss, oxidation, mechanical damage, photodegradation, and/or biotic stressors, depending upon the plant species and the plant organ (e.g., fruit, seeds, bark, flowers, leaves, stems, etc.). Cutin, which is a biopolyester derived from cellular lipids, forms the major structural component of the cuticle and serves to provide protection to the plant against environmental stressors (both abiotic and biotic). The thickness, density, as well as the composition of the cutin (i.e., the different types of monomers that form the cutin and their relative proportions) can vary by plant species, by plant organ within the same or different plant species, and by stage of plant maturity. The cutin-containing portion of the plant can also contain additional compounds (e.g., epicuticular waxes, phenolics, antioxidants, colored compounds, proteins, polysaccharides, etc.). This variation in the cutin composition as well as the thickness and density of the cutin layer between plant species, plant organs and/or a given plant at different stages of maturation can lead to varying degrees of resistance between plant species or plant organs to attack by environmental stressors (i.e., water loss, oxidation, mechanical injury, and light) and/or biotic stressors (e.g., fungi, bacteria, viruses, insects, etc.).

Conventional approaches to preventing degradation, maintaining quality, and increasing the life of agricultural products include special packaging and/or refrigeration. Refrigeration requires capital-intensive equipment, demands constant energy expenditure, can cause damage or quality loss to the product if not carefully controlled, must be actively managed, and its benefits are lost upon interruption of a temperature-controlled supply chain. Produce mass loss (e.g. water loss) during storage increases humidity, which necessitates careful maintenance of relative humidity levels (e.g. using condensers) to avoid negative impacts (e.g. condensation, microbial proliferation, etc.) during storage. Moreover, respiration of agricultural products is an exothermic process which releases heat into the surrounding atmosphere. During transit and storage in shipping containers, heat generated by the respiration of the agricultural product, as well as external environmental conditions and heat generated from mechanical processes (e.g., motors) necessitates active cooling of the storage container in order to maintain the appropriate temperature for storage, which is a major cost driver for shipping companies. By reducing the rate of degradation, reducing the heat generation in storage and transit, and increasing the shelf life of agricultural products, there is a direct value to the key stakeholders throughout the supply chain.

There exists a need for new, more cost-effective approaches to prevent degradation, reduce the generation of heat and humidity, maintain quality, and increase the life of agricultural products. Such approaches may require less or no refrigeration, special packaging, etc.

SUMMARY

Compositions and formulations for forming protective coatings and methods of making and using the coatings thereof are described herein. The components of the coatings form lamellar structures comprising one or more lamellae on the surface of the substrate (e.g., agricultural product) the coatings are disposed on, thus forming a protective barrier. In some embodiments, the protective barrier exhibits a low water and gas permeability. For example, the lattice formation that the molecules of the lamella adopt and the intermolecular forces between the lamellae can reduce loss of water or gas from the substrate. In some embodiments, the water and gas permeability of the coatings described herein can be modified by, e.g., (1) changing the components or amounts of the components in the composition (e.g., coating agent) applied to the substrate, as well as (2) modifying the method used to form the coating (e.g., the temperature or speed at which the mixture comprising the coating agent on the substrate is dried and/or the concentration of the coating agent in the mixture applied to the substrate). In some embodiments, the coating agents and/or coatings formed comprise lipid derivatives, such as fatty acids, fatty acid esters, or a combination thereof, and/or fatty acid salts. In some embodiments, the coatings described herein are a more effective barrier to water and gas than, e.g., conventional wax coatings. In some such embodiments, the thickness of the coating is less than the thickness of conventional wax coatings.

In one aspect, described herein is a coated agricultural product comprising a coating that forms a lamellar structure on the agricultural product, wherein the coating has a thickness of less than 20 microns.

In another aspect, described herein is a coated agricultural product comprising a coating that forms a lamellar structure on the agricultural product, wherein the coating comprises a plurality of grains.

In some embodiments, the coating comprises one or more fatty acids, fatty acid esters, or a combination thereof, and one or more fatty acid salts. In some embodiments, the coating comprises two or more fatty acids, fatty acid esters, or a combination thereof. In some embodiments, the coating comprises two or more fatty acid salts. In some embodiments, the coating comprises one to two fatty acids, fatty acid esters, or a combination thereof; and one to two fatty acid salts.

In some embodiments, the lamellar structure comprises a plurality of lamellae. In some embodiments, the interlayer spacing of the lamellae is from about 2 to about 13 nm. In some embodiments, the interlayer spacing of the lamellae is from about 3.0 to about 10 nm. In some embodiments, the interlayer spacing of the lamellae is from about 3.0 to about 6 nm. For example, the interlayer spacing of the lamellae is from about 5.0 to about 5.8 nm.

In some embodiments, the fatty acids, fatty acid esters, or a combination thereof are collectively 65% to 99% by weight of the coating. For example, the fatty acids, fatty acid esters, or a combination thereof are collectively 65% to 75% by weight of the coating. For example, the fatty acids, fatty acid esters, or a combination thereof are collectively 92% to 96% by weight of the coating. For example, the fatty acids, fatty acid esters, or a combination thereof are collectively 94% by weight of the coating.

In some embodiments, the fatty acid salts are collectively 1% to 35% by weight of the coating. For example, the fatty acid salts are collectively 25% to 35% by weight of the coating.

For example, the fatty acid salts are collectively 4% to 8% by weight of the coating. For example, the fatty acid salts are collectively 6% by weight of the coating.

In some embodiments, the coating comprises a plurality of grains.

In some embodiments, the grain size is from about 6 nm to about 100 nm. For example, the grain size is from about 9 nm to about 22 nm. For example, the grain size is from about 13 nm to about 25 nm.

In some embodiments, the coating has a thickness of 100 nm to 20 microns. In some embodiments, the coating has a thickness of less than 2 microns. For example, the coating has a thickness of about 100 nm to about 2 microns. For example, the coating has a thickness of about 700 nm to about 1.5 microns. For example, the coating has a thickness of about 700 nm to about 1 micron.

In some embodiments, each fatty acid and/or ester thereof is an independently selected compound of Formula I, wherein Formula I is:

wherein:

(Formula I)

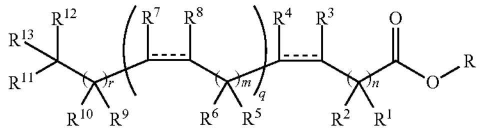

R is selected from —H, -glyceryl, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl or heteroaryl is optionally substituted with one or more groups selected from halogen (e.g., Cl, Br, or I), hydroxyl, nitro, —CN, —$NH_2$, —SH, —$SR^{15}$, —$OR^{14}$, —$NR^{14}R^{15}$, $C_1$-$C_6$ alkyl, $C_2$-$C_6$ alkenyl, or $C_2$-$C_6$ alkynyl;

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)$OR^{14}$, —(C═O)—O—(C═O)$R^{14}$, —O(C═O)$R^{14}$, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —$OR^{14}$, —$NR^{14}R^{15}$, —$SR^{14}$, or halogen;

$R^3$, $R^4$, $R^7$, and $R^8$ are each independently, at each occurrence, —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —$OR^{14}$, —$NR^{14}R^{15}$, —$SR^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ------ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, R is -glyceryl.

In some embodiments, $R^1$, $R^2$, $R^5$, $R^6$, $R^9$, $R^{10}$, $R^{11}$, $R^{12}$ and $R^{13}$ are each independently selected from —H, —$C_1$-$C_6$ alkyl, and —OH.

In some embodiments, $R^3$, $R^4$, $R^7$, and $R^8$ are each independently selected from —H, —$C_1$-$C_6$ alkyl, and —OH. In some embodiments, $R^3$ and $R^4$ combine with the carbon atoms to which they are attached to form a 3- to 6-membered ring heterocycle. In some embodiments, $R^7$ and $R^8$ combine with the carbon atoms to which they are attached to form a 3- to 6-membered ring heterocycle.

In some embodiments, q is 1 and the sum of n, m, and r is from 10 to 12.

In some embodiments, each fatty acid salt is an independently selected compound of Formula II or Formula III, wherein Formula II and Formula III are:

(Formula II)

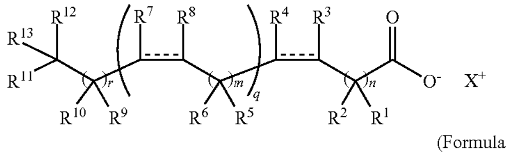

(Formula III)

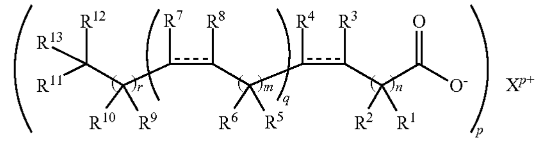

wherein for each formula:

X is a cationic moiety;

$X^{p+}$ is a cationic counter ion having a charge state p, and p is 1, 2, or 3;

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)$OR^{14}$, —(C═O)—O—(C═O)$R^{14}$, —O(C═O)$R^{14}$, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —$OR^{14}$, —$NR^{14}R^{15}$, —$SR^{14}$, or halogen;

$R^3$, $R^4$, $R^7$, and $R^8$ are each independently, at each occurrence, —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —$OR^{14}$, —$NR^{14}R^{15}$, —$SR^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ══ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, the fatty acid salt is a compound of Formula II. In some embodiments, the fatty acid salt is a compound of Formula III.

In some embodiments, X is sodium.

In some embodiments, $R^1$, $R^2$, $R^5$, $R^6$, $R^9$, $R^{10}$, $R^{11}$, $R^{12}$ and $R^{13}$ are each independently selected from —H, —$C_1$-$C_6$ alkyl, and —OH.

In some embodiments, $R^3$, $R^4$, $R^7$, and $R^8$ are each independently selected from —H, —$C_1$-$C_6$ alkyl, and —OH. In some embodiments, $R^3$ and $R^4$ combine with the carbon atoms to which they are attached to form a 3- to 6-membered ring heterocycle. In some embodiments, $R^7$ and $R^8$ combine with the carbon atoms to which they are attached to form a 3- to 6-membered ring heterocycle.

In some embodiments, q is 1 and the sum of n, m, and r is from 10 to 12.

In some embodiments, each fatty acid and/or ester thereof is an independently selected compound of Formula IA, wherein Formula IA is:

(Formula IA)

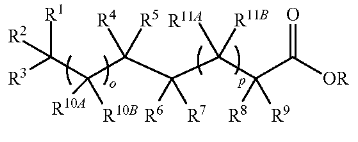

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and o is an integer from 0 to 17;

p is an integer from 0 to 17;

wherein the sum of o and p is from 0 to 17;

or a salt thereof when R is $C_1$-$C_6$ alkyl optionally substituted with one or more of OH and $C_1$-$C_6$ alkoxy.

In some embodiments, R is $C_1$-$C_6$ alkyl optionally substituted with one or more OH.

In some embodiments, the compound of Formula IA is a compound of Formula IA-A-i:

(Formula IA-A-i)

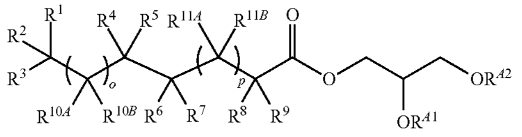

or a salt thereof, wherein:

$R^{A1}$ and $R^{A2}$ are independently selected from H and $C_1$-$C_6$ alkyl;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17; and wherein the sum of o and p is from 0 to 17.

In some embodiments, $R^{A1}$ and $R^{A2}$ are H.

In some embodiments, $R^1$, $R^2$, $R^3$, $R^4$, $R^5$, $R^6$, $R^7$, $R^8$, and $R^9$ are independently selected from the group consisting of: H, OH, and $C_1$-$C_6$ alkyl. In some embodiments, $R^1$, $R^2$, $R^3$, $R^4$, $R^5$, $R^6$, $R^7$, $R^8$, and $R^9$ are H.

In some embodiments, $R^{10A}$, $R^{10B}$, $R^{11A}$, and $R^{11B}$ are independently selected from the group consisting of: H, OH, and $C_1$-$C_6$ alkyl. In some embodiments, $R^{10A}$, $R^{10B}$, $R^{11A}$, and $R^{11B}$ are H.

In some embodiments, $R^4$ is taken together with $R^6$ and the carbon atoms to which they are attached to form a $C_3$-$C_6$ heterocyclyl. In some embodiments, $R^4$ is taken together with $R^6$ and the carbon atoms to which they are attached to form a double bond.

In some embodiments, the sum of o and p is from 11 to 13.

In some embodiments, each fatty acid salt is an independently selected compound of Formula IIA, wherein Formula IIA is:

(Formula IIA)

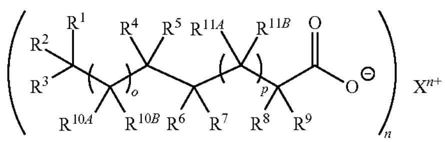

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

In some embodiments, $R^1$, $R^2$, $R^3$, $R^4$, $R^5$, $R^6$, $R^7$, $R^8$, and $R^9$ are independently selected from the group consisting of: H, OH, and $C_1$-$C_6$ alkyl. In some embodiments, $R^1$, $R^2$, $R^3$, $R^4$, $R^5$, $R^6$, $R^7$, $R^8$, and $R^9$ are H.

In some embodiments, $R^{10A}$, $R^{10B}$, $R^{11A}$, and $R^{11B}$ are independently selected from the group consisting of: H, OH, and $C_1$-$C_6$ alkyl. In some embodiments, $R^{10A}$, $R^{10B}$, $R^{11A}$, and $R^{11B}$ are H.

In some embodiments, $R^4$ is taken together with $R^6$ and the carbon atoms to which they are attached to form a $C_3$-$C_6$ heterocyclyl. In some embodiments, $R^4$ is taken together with $R^6$ and the carbon atoms to which they are attached to form a double bond.

In some embodiments, the sum of o and p is from 11 to 13.

In another aspect, described herein is a method of coating an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating has a thickness of less than 20 microns.

In another aspect, described herein is a method of coating an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating comprises a plurality of grains.

In another aspect, described herein is a method of coating an agricultural product, comprising:

(i) applying a mixture comprising a coating agent and a solvent to the agricultural product;

(ii) removing the solvent to form a coating on the agricultural product;

(iii) heating the coated agricultural product from a first temperature to a second temperature, wherein the second temperature is greater than the first temperature and less than the melting point of the coating; and (iv) cooling the coated agricultural product from the second temperature to a third temperature, wherein the third temperature is less than the second temperature;

wherein:

the coating forms a lamellar structure on the agricultural product; and the coating comprises a plurality of grains.

In some embodiments, the first temperature is from about 20° C. to about 30° C. For example, the first temperature is from about 23° C. to about 27° C. For example, the first temperature is about 25° C.

In some embodiments, the second temperature is from about 50° C. to about 65° C. For example, the second temperature is from about 57° C. to about 63° C. For example, the second temperature is about 60° C.

In some embodiments, the third temperature is from about 20° C. to about 30° C. or example, the third temperature is from about 23° C. to about 27° C. For example, the third temperature is about 25° C.

In some embodiments, the second temperature is maintained for about 5 minutes to about 60 minutes. For example, the second temperature is maintained for about 25 minutes to about 35 minutes.

In some embodiments, the grain size after cooling the coated agricultural product from the second temperature to the third temperature is larger than the grain size before heating the coated agricultural product from the first temperature to the second temperature. In some embodiments, the grain size of the coating before heating the coated agricultural product from the first temperature to the second temperature is from about 8 nm to about 10 nm. In some embodiments, the grain size of the coating after cooling the coated agricultural product from the second temperature to the third temperature is from about 11 nm to about 17 nm.

In another aspect, described herein is a method of reducing the mass loss rate of an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating has a thickness of less than 20 microns.

In another aspect, described herein is a method of reducing the respiration rate of an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating has a thickness of less than 20 microns.

In some embodiments, the coating agent comprises one or more fatty acids, fatty acid esters, or a combination thereof, and one or more fatty acid salts. In some embodiments, the coating agent comprises two or more fatty acids, fatty acid esters, or a combination thereof. In some embodiments, the coating agent comprises two or more fatty acid salts. In some embodiments, the coating agent comprises one to two fatty acids, fatty acid esters, or a combination thereof, and one to two fatty acid salts.

In some embodiments, the solvent comprises water. For example, the solvent is water.

In some embodiments, the concentration of the coating agent in the mixture is from about 25 g/L to about 60 g/L. For example, the concentration of the coating agent in the mixture is from about 30 g/L to about 50 g/L For example, the concentration of the coating agent in the mixture is about 30 g/L. For example, the concentration of the coating agent in the mixture is about 40 g/L. For example, the concentration of the coating agent in the mixture is about 50 g/L.

In some embodiments, the mixture is dried at a temperature of from about 55° C. to about 65° C. For example, the mixture is dried at a temperature of from about 60° C. to about 65° C. For example, the mixture is dried at a temperature of about 65° C.

In some embodiments, the lamellar structure comprises a plurality of lamellae. In some embodiments, the interlayer spacing of the lamellae is from about 2 to about 13 nm. In some embodiments, the interlayer spacing of the lamellae is from about 3.0 to about 10 nm. In some embodiments, the interlayer spacing of the lamellae is from about 3.0 to about 6 nm. For example, the interlayer spacing of the lamellae is from about 5.0 to about 5.8 nm.

In some embodiments, the fatty acids, fatty acid esters, or a combination thereof are collectively 65% to 99% by weight of the coating agent. For example, the fatty acids, fatty acid esters, or a combination thereof are collectively 65% to 75% by weight of the coating agent. For example, the fatty acids, fatty acid esters, or a combination thereof are collectively 92% to 96% by weight of the coating agent. For example, the fatty acids, fatty acid esters, or a combination thereof are collectively 94% by weight of the coating agent.

In some embodiments, the fatty acid salts are collectively 1% to 35% by weight of the coating agent. For example, the fatty acid salts are collectively 25% to 35% by weight of the coating agent. For example, the fatty acid salts are collectively 4% to 8% by weight of the coating agent. For example, the fatty acid salts are collectively 6% by weight of the coating agent.

In some embodiments, the coating comprises a plurality of grains.

In some embodiments, the grain size is from about 6 nm to about 100 nm. For example, the grain size is from about 9 nm to about 22 nm. For example, the grain size is from about 13 nm to about 25 nm.

In another aspect, described herein is a method of reducing the mass loss rate of an agricultural product having a coating disposed thereon, comprising:

(i) heating the coated agricultural product from a first temperature to a second temperature; and (ii) cooling the coated agricultural product from the second temperature to a third temperature, wherein the third temperature is less than the second temperature;

wherein:

the coating forms a lamellar structure on the agricultural product; and the coating comprises a plurality of grains.

In another aspect, described herein is a method of reducing the respiration rate of an agricultural product having a coating disposed thereon, comprising:

(i) heating the coated agricultural product from a first temperature to a second temperature; and (ii) cooling the coated agricultural product from the second temperature to a third temperature, wherein the third temperature is less than the second temperature;

wherein:

the coating forms a lamellar structure on the agricultural product; and the coating comprises a plurality of grains.

In some embodiments, the first temperature is from about 20° C. to about 30° C. For example, the first temperature is from about 23° C. to about 27° C. For example, the first temperature is about 25° C.

In some embodiments, the second temperature is from about 50° C. to about 65° C. For example, the second temperature is from about 57° C. to about 63° C. For example, the second temperature is about 60° C.

In some embodiments, the third temperature is from about 20° C. to about 30° C. or example, the third temperature is from about 23° C. to about 27° C. For example, the third temperature is about 25° C.

In some embodiments, the second temperature is maintained for about 5 minutes to about 60 minutes. For example, the second temperature is maintained for about 25 minutes to about 35 minutes.

In some embodiments, the grain size after cooling the coated agricultural product from the second temperature to the third temperature is larger than the grain size before heating the coated agricultural product from the first temperature to the second temperature. In some embodiments, the grain size of the coating before heating the coated agricultural product from the first temperature to the second temperature is from about 8 nm to about 10 nm. For example, the grain size of the coating after cooling the coated agricultural product from the second temperature to the third temperature is from about 11 nm to about 17 nm.

In some embodiments, the coating comprises one or more fatty acids, fatty acid esters, or a combination thereof, and one or more fatty acid salts. In some embodiments, the coating comprises two or more fatty acids, fatty acid esters, or a combination thereof. In some embodiments, the coating comprises two or more fatty acid salts. In some embodiments, the coating comprises one to two fatty acids, fatty acid esters, or a combination thereof; and one to two fatty acid salts.

In some embodiments, the lamellar structure comprises a plurality of lamellae. In some embodiments, the interlayer spacing of the lamellae is from about 2 to about 13 nm. In some embodiments, the interlayer spacing of the lamellae is from about 3.0 to about 10 nm. In some embodiments, the interlayer spacing of the lamellae is from about 3.0 to about 6 nm. For example, the interlayer spacing of the lamellae is from about 5.0 to about 5.8 nm.

In some embodiments, the fatty acids, fatty acid esters, or a combination thereof are collectively 65% to 99% by weight of the coating. For example, the fatty acids, fatty acid esters, or a combination thereof are collectively 65% to 75% by weight of the coating. For example, the fatty acids, fatty acid esters, or a combination thereof are collectively 92% to 96% by weight of the coating. For example, the fatty acids, fatty acid esters, or a combination thereof are collectively 94% by weight of the coating.

In some embodiments, the fatty acid salts are collectively 1% to 35% by weight of the coating. For example, the fatty acid salts are collectively 25% to 35% by weight of the coating. For example, the fatty acid salts are collectively 4% to 8% by weight of the coating. For example, the fatty acid salts are collectively 6% by weight of the coating.

In some embodiments, the coating has a thickness of 100 nm to 20 microns. In some embodiments, the coating has a thickness of less than 2 microns. For example, the coating has a thickness of about 100 nm to about 2 microns. For example, the coating has a thickness of about 700 nm to about 1.5 microns. For example, the coating has a thickness of about 700 nm to about 1 micron.

In some embodiments, each fatty acid and/or ester thereof is an independently selected compound of Formula I, wherein Formula I is:

(Formula I)

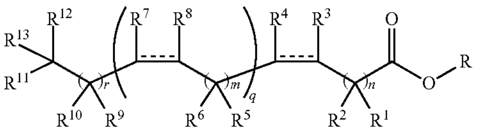

wherein:

R is selected from —H, -glyceryl, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl or heteroaryl is optionally substituted with one or more groups selected from halogen (e.g., Cl, Br, or I), hydroxyl, nitro, —CN, —$NH_2$,—SH, —$SR^{15}$, —$OR^{14}$, —$NR^{14}R^{15}$, $C_1$-$C_6$ alkyl, $C_2$-$C_6$ alkenyl, or $C_2$-$C_6$ alkynyl;

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)$OR^{14}$, —(C═O)—O—(C═O)$R^{14}$, —O(C═O)$R^{14}$, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —$OR^{14}$, —$NR^{14}R^{15}$, —$SR^{14}$, or halogen;

$R^3$, $R^4$, $R^7$, and $R^8$ are each independently, at each occurrence, —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —$OR^{14}$, —$NR^{14}R^{15}$, —$SR^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ------ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, R is -glyceryl. In some embodiments, $R^1$, $R^2$, $R^5$, $R^6$, $R^9$, $R^{10}$, $R^{11}$, $R^{12}$ and $R^{13}$ are each independently selected from —H, —$C_1$-$C_6$ alkyl, and —OH. In some embodiments, $R^3$, $R^4$, $R^7$, and $R^8$ are each independently selected from —H, —$C_1$-$C_6$ alkyl, and —OH. In some embodiments, $R^3$ and $R^4$ combine with the carbon atoms to which they are attached to form a 3- to 6-membered ring heterocycle. In some embodiments, $R^7$ and $R^8$ combine with the carbon atoms to which they are attached to form a 3- to 6-membered ring heterocycle. In some embodiments, q is 1 and the sum of n, m, and r is from 10 to 12.

In some embodiments, each fatty acid salt is an independently selected compound of Formula II or Formula III, wherein Formula II and Formula III are:

(Formula II)

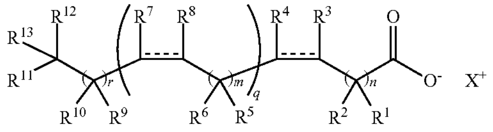

(Formula III)

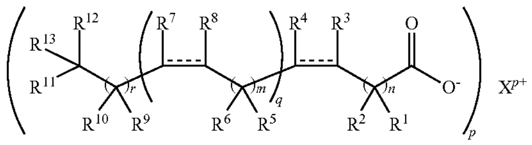

wherein for each formula:

X is a cationic moiety;

$X^{p+}$ is a cationic counter ion having a charge state p, and p is 1, 2, or 3;

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)$OR^{14}$, —(C═O)—O—(C═O)$R^{14}$, —O(C═O)$R^{14}$, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —$OR^{14}$, —$NR^{14}R^{15}$, —$SR^{14}$, or halogen;

$R^3$, $R^4$, $R^7$, and $R^8$ are each independently, at each occurrence, —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —$OR^{14}$, —$NR^{14}R^{15}$, —$SR^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ------ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, the fatty acid salt is a compound of Formula II. In some embodiments, the fatty acid salt is a compound of Formula III.

In some embodiments, X is sodium.

In some embodiments, $R^1$, $R^2$, $R^5$, $R^6$, $R^9$, $R^{10}$, $R^{11}$, $R^{12}$ and $R^{13}$ are each independently selected from —H, —$C_1$-$C_6$ alkyl, and —OH. In some embodiments, $R^3$, $R^4$, $R^7$, and $R^8$ are each independently selected from —H, —$C_1$-$C_6$ alkyl, and —OH.

In some embodiments, $R^3$ and $R^4$ combine with the carbon atoms to which they are attached to form a 3- to 6-membered ring heterocycle. In some embodiments, $R^7$ and $R^8$ combine with the carbon atoms to which they are attached to form a 3- to 6-membered ring heterocycle.

In some embodiments, q is 1 and the sum of n, m, and r is from 10 to 12.

In some embodiments, each fatty acid and/or ester thereof is an independently selected compound of Formula IA, wherein Formula IA is:

(Formula IA)

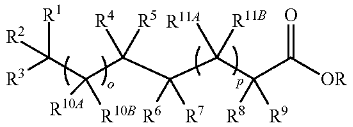

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and o is an integer from 0 to 17;

p is an integer from 0 to 17;

wherein the sum of o and p is from 0 to 17;

or a salt thereof when R is $C_1$-$C_6$ alkyl optionally substituted with one or more of OH and $C_1$-$C_6$ alkoxy.

In some embodiments, R is $C_1$-$C_6$ alkyl optionally substituted with one or more OH.

In some embodiments, the compound of Formula IA is a compound of Formula IA-A-i:

(Formula IA-A-i)

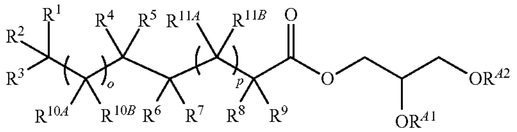

or a salt thereof, wherein:

$R^{A1}$ and $R^{A2}$ are independently selected from H and $C_1$-$C_6$ alkyl;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17; and wherein the sum of o and p is from 0 to 17.

In some embodiments, $R^{A1}$ and $R^{A2}$ are H.

In some embodiments, $R^1$, $R^2$, $R^3$, $R^4$, $R^5$, $R^6$, $R^7$, $R^8$, and $R^9$ are independently selected from the group consisting of: H, OH, and $C_1$-$C_6$ alkyl. In some embodiments, $R^1$, $R^2$, $R^3$, $R^4$, $R^5$, $R^6$, $R^7$, $R^8$, and $R^9$ are H.

In some embodiments, $R^{10A}$, $R^{10B}$, $R^{11A}$, and $R^{11B}$ are independently selected from the group consisting of: H, OH, and $C_1$-$C_6$ alkyl. In some embodiments, $R^{10A}$, $R^{10B}$, $R^{11A}$, and $R^{11B}$ are H.

In some embodiments, $R^4$ is taken together with $R^6$ and the carbon atoms to which they are attached to form a $C_3$-$C_6$ heterocyclyl. In some embodiments, $R^4$ is taken together with $R^6$ and the carbon atoms to which they are attached to form a double bond.

In some embodiments, the sum of o and p is from 11 to 13.

In some embodiments, each fatty acid salt is an independently selected compound of Formula IIA, wherein Formula IIA is:

(Formula IIA)

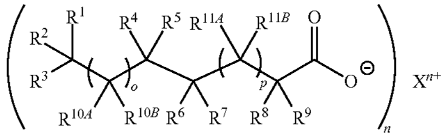

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

In some embodiments, $R^1$, $R^2$, $R^3$, $R^4$, $R^5$, $R^6$, $R^7$, $R^8$, and $R^9$ are independently selected from the group consisting of: H, OH, and $C_1$-$C_6$ alkyl. In some embodiments, $R^1$, $R^2$, $R^3$, $R^4$, $R^5$, $R^6$, $R^7$, $R^8$, and $R^9$ are H.

In some embodiments, $R^{10A}$, $R^{10B}$, $R^{11A}$, and $R^{11B}$ are independently selected from the group consisting of: H, OH, and $C_1$-$C_6$ alkyl. In some embodiments, $R^{10A}$, $R^{10B}$, $R^{11A}$, and $R^{11B}$ are H.

In some embodiments, $R^4$ is taken together with $R^6$ and the carbon atoms to which they are attached to form a $C_3$-$C_6$ heterocyclyl. In some embodiments, $R^4$ is taken together with $R^6$ and the carbon atoms to which they are attached to form a double bond.

In some embodiments, the sum of o and p is from 11 to 13.

In some embodiments, the compositions can include a first group of compounds, where each compound of the first group is selected from fatty acids, fatty acid esters, and fatty acid salts, and each compound of the first group has a carbon chain length of at least 14 carbons. The compositions can also include a second group of compounds selected from fatty acids, fatty acid esters, fatty acid salts, and combinations thereof, wherein each compound of the second group has a carbon chain length from 7 to 13 carbons. At least some of the compounds of the first group (e.g., fatty acid salts) can function as emulsifiers, allowing the composition to be dissolved, suspended, or dispersed in a solvent. At least some of the compounds of the second group can function as wetting agents or surfactants in order to improve the surface wetting of items to be coated when solutions, suspensions, or colloids that include the compositions are applied to the items. The fatty acid salts having a carbon chain length of less than 14 (e.g., from 7 to 13 carbons) can also (or alternatively) function as emulsifiers, allowing the composition to be dissolved, suspended, or dispersed in a solvent.

Accordingly, in a first aspect, a composition can include from about 50% to about 99.9% by mass of one or more first compounds selected from the group consisting of fatty acids, fatty acid esters, fatty acid salts, and combinations thereof, wherein each of the one or more first compounds has a carbon chain length of at least 14. The composition can further include from about 0.1% to about 35% by mass of one or more second compounds selected from the group consisting of fatty acids, fatty acid esters, fatty acid salts, and combinations thereof, wherein each of the one or more second compounds has a carbon chain length in a range of 7 to 13.

Any of the compositions or mixtures described herein can include one or more of the following features, either alone or in combination. The second compounds or wetting agents can have a carbon chain length of 8, 10, 11, or 12. Any of the compounds of the composition can be compounds of Formula I. The cationic moiety can be an organic or an inorganic ion. The cationic moiety can include sodium. Each of the one or more second compounds can be a wetting agent. The one or more first compounds can include monoacylglycerides and/or fatty acid salts. The fatty acid esters can include monacylglycerides. A mass ratio of the fatty acid esters (e.g., monoacylglycerides) to the fatty acid salts can be in a range of about 2 to 100 or about 2 to 99. Accordingly, a mass ratio of the first group of compounds to the second group of compounds can be in a range of 2 to 99 or 2 to 100. The composition can comprise less than 10% by mass of diglycerides. The composition can comprise less than 10% by mass of triglycerides. Each compound of the first and/or second group of compounds can have a carbon chain length of at least 14. In Formula I, R can -glyceryl. The second group of compounds can comprise SA-Na, PA-Na, MA-Na, SA-K, PA-K, or MA-K. The composition can comprise from 70% to 99% by mass of the first group of compounds and from 1% to 30% by mass of the second group of compounds. The solvent can be water, or can be at least 50% or at least 70% water by volume. A concentration of the composition in the mixture can be in a range of 0.5 to 200 mg/mL.

In another aspect, a mixture (e.g., a solution, suspension, or colloid) can include any of the compositions described herein in a solvent (e.g., dissolved, suspended, or dispersed in a solvent). Any of the mixtures described herein can include one or more of the following features. The solvent can be characterized as having a contact angle of at least about 70 degrees on carnauba wax. The solvent can be water or can be at least 70% water by volume. The solvent can include ethanol. The solvent can include water and ethanol. The mixture can include an antimicrobial agent, which can for example be citric acid. A concentration of the composition in the mixture can be in a range of 0.5 to 200 mg/mL. A concentration of the wetting agents in the mixture can be at least about 0.1 mg/mL.

In another aspect, a method of forming a mixture can include providing a solvent that is characterized as exhibiting a contact angle of at least about 700 (e.g., at least about 75°, at least about 80°, at least about 85°, or at least about 90°) when disposed on the surface of carnauba wax. The method can further include adding a composition to the solvent to form the mixture. The composition can include one or more fatty acids or salts or esters thereof, and/or can include compounds of Formula I, Formula II, and/or Formula III. The resulting mixture is characterized as exhibiting a contact angle less than about 850 (e.g., less than about 80°, less than about 75°, less than about 70°, or less than about 65°) when disposed on carnauba wax. The contact angle of the resulting mixture on carnauba wax can be less than the contact angle of the solvent (prior to the addition of the composition) on carnauba wax. Optionally, at least one of the fatty acids or salts or esters thereof of the composition can have a carbon chain length of 13 or less. Optionally, at least one of the fatty acids or salts or esters thereof of the composition can have a carbon chain length of 14 or greater. Optionally, the solvent can be water or can be at least 70% water by volume.

In another aspect, a method of forming a protective coating over a substrate (e.g., an agricultural product) can include applying a mixture (e.g., a solution, a suspension, or a colloid) to a surface of the substrate, the mixture comprising a composition in a solvent. The method can further include removing the solvent from the surface of the substrate, thereby causing the protective coating to be formed from the composition over the surface of the substrate.

DETAILED DESCRIPTION

Definitions

Figure 1:
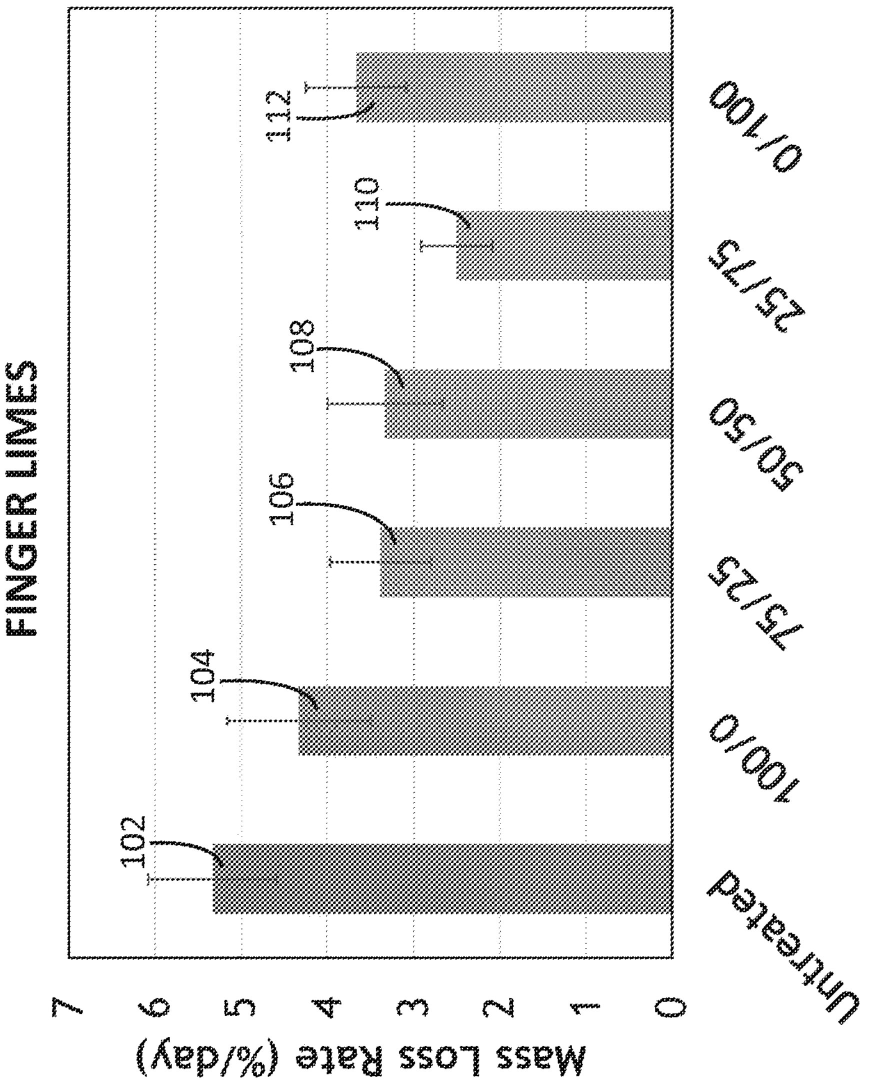
FIG. 1 shows a plot of mass loss rates per day for finger limes coated with 1-glyceryl and 2-glyceryl esters of palmitic acid.

As used herein, the term "alkyl" refers to saturated linear or branched-chain monovalent hydrocarbon radicals, containing the indicated number of carbon atoms. For example, "C1-6 alkyl" refers to saturated linear or branched-chain monovalent hydrocarbon radicals of one to six carbon atoms. Non-limiting examples of alkyl include methyl, ethyl, 1-propyl, isopropyl, 1-butyl, isobutyl, sec-butyl, tert-butyl, 2-methyl-2-propyl, pentyl, neopentyl, and hexyl.

As used herein, "fatty acid derivative" is a hydrocarbon chain comprising an ester, acid, or carboxylate group, collectively referred to as "oxycarbonyl moieties", bonded to one terminus of the hydrocarbon chain, understood to be the "hydrophilic" end; while the opposite terminus is understood to be the "hydrophobic" end. Fatty acid derivatives include fatty acids, fatty acid esters (such as monoglycerides), and fatty acid salts. In some embodiments, the fatty acid derivatives have a chain length of from $C_5$ to $C_{22}$ (e.g., from $C_8$ to $C_{20}$. Fatty acid derivatives include compounds of Formula I, Formula II, Formula III, Formula IA, Formula IA-A, Formula IA-A-i, Formula IA-A-ii, Formula IA-B, and Formula IIA.

As used herein, the term "alkenyl" refers to a linear or branched mono-unsaturated hydrocarbon chain, containing the indicated number of carbon atoms. For example, "$C_{2-6}$ alkenyl" refers a linear or branched mono unsaturated hydrocarbon chain of two to six carbon atoms. Non-limiting examples of alkenyl include ethenyl, propenyl, butenyl, or pentenyl.

As used herein, the term "alkynyl" refers to a linear or branched hydrocarbon chain containing a triple bond, and containing the indicated number of carbon atoms. For example, "$C_{2-6}$ alkynyl" refers to a linear or branched hydrocarbon chain having a triple bond and two to six carbon atoms. Non-limiting examples of alkynyl include ethynyl, propynyl, butynyl, or pentynyl.

As used herein, the term "alkoxy" refers to an —O-alkyl radical, wherein the radical is on the oxygen atom. For example, "C1-6 alkoxy" refers to an —O—(C1-6 alkyl) radical, wherein the radical is on the oxygen atom. Examples of alkoxy include methoxy, ethoxy, propoxy, isopropoxy, butoxy and tert-butoxy.

As used herein, the term "cycloalkyl" refers to a saturated or partially saturated cyclic hydrocarbon, containing the indicated number of carbon atoms. For example, "C3-C6 cycloalkyl" refers to a saturated or partially saturated cyclic hydrocarbon having three to six ring carbon atoms. Non-limiting examples of cycloalkyl include cyclopropyl, cyclobutyl, cyclopentyl, and cyclohexyl.

As used herein, the term "heterocycle" refers to a monocyclic nonaromatic ring system containing indicated number of ring atoms (e.g., 3-6 membered heterocycle) having 1-3 heteroatoms, said heteroatoms selected from O, N, or S. Examples of heterocyclyl groups include oxiranyl, piperazinyl, pyrrolidinyl, dioxanyl, morpholinyl, and tetrahydrofuranyl.

As used herein, the term "aryl" refers to a mono-, bi-, tri- or polycyclic hydrocarbon group containing the indicated numbers of carbon atoms, wherein at least one ring in the system is aromatic (e.g., $C_6$ monocyclic, $C_{10}$ bicyclic, or $C_{14}$ tricyclic aromatic ring system). Examples of aryl groups include phenyl, naphthyl, tetrahydronaphthyl, and the like.

As used herein, the term "heteroaryl" refers to a mono-, bi-, tri- or polycyclic group having indicated numbers of ring atoms (e.g., 5-6 ring atoms; e.g., 5, 6, 9, 10, or 14 ring atoms); wherein at least one ring in the system is aromatic (but does not have to be a ring which contains a heteroatom, e.g. tetrahydroisoquinolinyl, e.g., tetrahydroquinolinyl), and at least one ring in the system contains one or more heteroatoms independently selected from the group consisting of N, O, and S. Heteroaryl groups can either be unsubstituted or substituted with one or more substituents. Examples of heteroaryl include thienyl, pyridinyl, furyl, oxazolyl, oxadiazolyl, pyrrolyl, imidazolyl, triazolyl, thiodiazolyl, pyrazolyl, isoxazolyl, thiadiazolyl, pyranyl, pyrazinyl, pyrimidinyl, pyridazinyl, triazinyl, thiazolyl benzothienyl, benzoxadiazolyl, benzofuranyl, benzimidazolyl, benzotriazolyl, cinnolinyl, indazolyl, indolyl, isoquinolinyl, isothiazolyl, naphthyridinyl, purinyl, thienopyridinyl, pyrido[2,3-d]pyrimidinyl, pyrrolo[2,3-b]pyridinyl, quinazolinyl, quinolinyl, thieno[2,3-c]pyridinyl, pyrazolo[3,4-b]pyridinyl, pyrazolo[3,4-c]pyridinyl, pyrazolo[4,3-c]pyridine, pyrazolo[4,3-b]pyridinyl, tetrazolyl, chromane, 2,3-dihydrobenzo[b][1,4]dioxine, benzo[d][1,3]dioxole, 2,3-dihydrobenzofuran, tetrahydroquinoline, 2,3-dihydrobenzo[b][1,4]oxathiine, isoindoline, and others.

As used herein, the term "cycloalkenyl" means a monocyclic nonaromatic ring containing 3-6 carbon ring members and at least one double bond. Examples of cycloalkenyl groups include cyclohexenyl and cyclopentenyl.

As used herein, the term "halo" or "halogen" means fluoro, chloro, bromo, or iodo.

As used herein, the term "plant matter" refers to any portion of a plant, including, for example, fruits (in the botanical sense, including fruit peels and juice sacs), vegetables, leaves, stems, barks, seeds, flowers, peels, or roots. Plant matter includes pre-harvest plants or portions thereof as well as post-harvest plants or portions thereof, including, e.g., harvested fruits and vegetables, harvested roots and berries, and picked flowers.

As used herein, a "coating agent" refers to a composition including a compound or group of compounds from which a protective coating can be formed.

As used herein, "glyceryl" refers to a propyl radical substituted with a hydroxyl at each of the two carbon atoms that the radical is not centered on. In some embodiments, a glyceryl is 1-glyceryl (i.e., $—CH_2CH(OH)CH_2OH$). In some embodiments, a glyceryl is 2-glyceryl (i.e., $—CH(CH_2OH)CH_2OH$).

As used herein, the "mass loss rate" refers to the rate at which the product loses mass (e.g. by releasing water and other volatile compounds). The mass loss rate is typically expressed as a percentage of the original mass per unit time (e.g. percent per day).

As used herein, the term "mass loss factor" is defined as the ratio of the average mass loss rate of uncoated produce (measured for a control group) to the average mass loss rate of the corresponding tested produce (e.g., coated produce) over a given time. Hence a larger mass loss factor for a coated produce corresponds to a greater reduction in average mass loss rate for the coated produce.

As used herein, the term "respiration rate" refers to the rate at which the product releases gas, such as $CO_2$. This rate can be determined from the volume of gas (e.g., $CO_2$) (at standard temperature and pressure) released per unit time per unit mass of the product. The respiration rate can be expressed as ml gas/kg hour. The respiration rate of the product can be measured by placing the product in a closed container of known volume that is equipped with a sensor, such as a $CO_2$ sensor, recording the gas concentration within the container as a function of time, and then calculating the rate of gas release required to obtain the measured concentration values.

As used herein, the term "respiration factor" is defined as the ratio of the average gas diffusion (e.g., $CO_2$ release) of uncoated produce (measured for a control group) to the average gas diffusion of the corresponding tested produce (e.g., coated produce) over a given time.

Hence a larger respiration factor for a coated produce corresponds to a greater reduction in gas diffusion/respiration for the coated produce.

Figure 17:
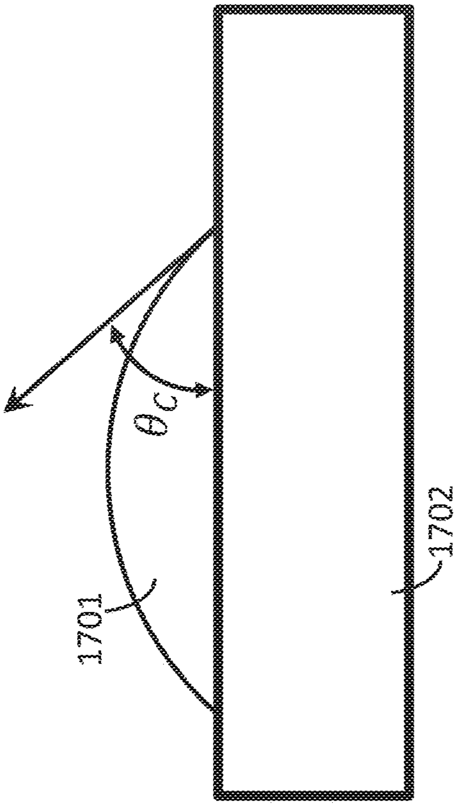
FIG. 17 shows the contact angle of a droplet on a solid surface.

As used herein, the term "contact angle" of a liquid on a solid surface refers to an angle of the outer surface of a droplet of the liquid measured where the liquid-vapor interface meets the liquid-solid interface. For example, as shown in FIG. 17, the angle $\theta_c$ defines the contact angle of the droplet 1701 on the surface of solid 1702. The contact angle quantifies the wettability of the solid surface by the liquid.

As used herein, the terms "wetting agent" or "surfactant" each refer to a compound that, when added to a solvent, suspension, colloid, or solution, reduces the difference in surface energy between the solvent/suspension/colloid/solution and a solid surface on which the solvent/suspension/colloid/solution is disposed.

As used herein, the "carbon chain length" of a fatty acid or salt or ester thereof refers to the number of carbon atoms in the chain including the carbonyl carbon.

As used herein, a "long chain fatty acid", a "long chain fatty acid ester", or a "long chain fatty acid salt" refers to a fatty acid or ester or salt thereof, respectively, for which the carbon chain length is greater than 13 (i.e., is at least 14).

As used herein, a "medium chain fatty acid", a "medium chain fatty acid ester", or a "medium chain fatty acid salt" refers to a fatty acid or ester or salt thereof, respectively, for which the carbon chain length is in a range of 7 to 13 (inclusive of 7 and 13).

As used herein, a "cationic counter ion" is any organic or inorganic positively charged ion associated with a negatively charged ion. Examples of a cationic counter ion include, for example, sodium, potassium, calcium, and magnesium.

As used herein, a "cationic moiety" is any organic or inorganic positively charged ion.

The following abbreviations are used throughout. Hexadecanoic acid (i.e., palmitic acid) is abbreviated to "PA". Octadecanoic acid (i.e., stearic acid) is abbreviated to "SA".

Tetradecanoic acid (i.e., myristic acid) is abbreviated to "MA". (9Z)-Octadecenoic acid (i.e., oleic acid) is abbreviated to "OA". Dodecanoic acid (e.g., lauric acid) is abbreviated to "LA". Undecanoic acid (e.g., undecylic acid) is abbreviated to "UA". Decanoic acid (e.g., capric acid) is abbreviated to "CA". 1,3-dihydroxypropan-2-yl palmitate (i.e., 2-glyceryl palmitate) is abbreviated to "PA-2G". 1,3-dihydroxypropan-2-yl octadecanoate (i.e., 2-glyceryl stearate) is abbreviated to "SA-2G". 1,3-dihydroxypropan-2-yl tetradecanoic acid (i.e., 2-glyceryl myristate) is abbreviated to "MA-2G". 1,3-dihydroxypropan-2-yl (9Z)-octadecenoate (i.e., 2-glyceryl oleate) is abbreviated to "OA-2G". 2,3-dihydroxypropyl icosanoate is abbreviated to "IA-1G". 2,3-dihydroxypropan-1-yl palmitate (i.e., 1-glyceryl palmitate) is abbreviated to "PA-1G". 2,3-dihydroxypropan-1-yl octadecanoate (i.e., 1-glyceryl stearate) is abbreviated to "SA-1G". 2,3-dihydroxypropan-1-yl tetradecanoate (i.e., 1-glyceryl myristate) is abbreviated to "MA-1G". 2,3-dihydroxypropan-1-yl (9Z)-octadecenoate (i.e., 1-glyceryl oleate) is abbreviated to "OA-1G". 2,3-dihydroxypropan-1-yl dodecanoate (i.e., 1-glyceryl laurate) is abbreviated to "LA-1G". 2,3-dihydroxypropan-1-yl undecanoate (i.e., 1-glyceryl undecanoate) is abbreviated to "UA-1G". 2,3-dihydroxypropan-1-yl decanoate (i.e., 1-glyceryl caprate) is abbreviated to "CA-1G". Sodium salt of stearic acid is abbreviated to "SA-Na". Sodium salt of myristic acid is abbreviated to "MA-Na". Sodium salt of palmitic acid is abbreviated to "PA-Na". Sodium salt of myristic acid is abbreviated to "MA-Na". Sodium salt of lauric acid is abbreviated to "LA-Na". Sodium salt of capric acid is abbreviated to "CA-Na". Potassium salt of stearic acid is abbreviated to "SA-K". Potassium salt of myristic acid is abbreviated to "MA-K". Potassium salt of palmitic acid is abbreviated to "PA-K". Calcium salt of stearic acid is abbreviated to "$(SA)_2$-Ca". Calcium salt of myristic acid is abbreviated to "$(MA)_2$-Ca". Calcium salt of palmitic acid is abbreviated to "$(PA)_2$-Ca". Magnesium salt of stearic acid is abbreviated to "$(SA)_2$-Mg". Magnesium salt of myristic acid is abbreviated to "$(MA)_2$-Mg". Magnesium salt of palmitic acid is abbreviated to "$(PA)_2$-Mg".

"Substituted" or "substituent", as used herein, means an atom or group of atoms is replaced with another atom or group of atoms. Exemplary substituents include, but are not limited to, halogen, hydroxyl, nitro, cyano, alkyl, alkenyl, alkynyl, cycloalkyl, cycloalkenyl, formyl, acyl, ether, ester, keto, aryl, heteroaryl, etc.

As used herein, "lamellar structure" refers to a structure comprising one or more lamellae vertically stacked adjacent to each other and held together by intermolecular forces. As used herein, "lamella" or "lamellae" refer to a discrete layer of molecules arranged in a lattice formation. The distance between a surface of a lamella and the surface of an adjacent lamella that is facing the same direction is referred to herein as "interlayer spacing" or "periodic spacing". FIG. 38B illustrates the interlayer spacing of adjacent lamellae in three lamellar structures. Interlayer spacing between two lamellae is determined by (1) obtaining an out-of-plane X-ray scattering image of a coating, (2) determining the scattering vector (q) of the peak corresponding to the lamellar structure, and (3) using Bragg's equation below, determine the interlayer spacing (d).

$$d=2\pi/q_{peak}$$

Figure 49:
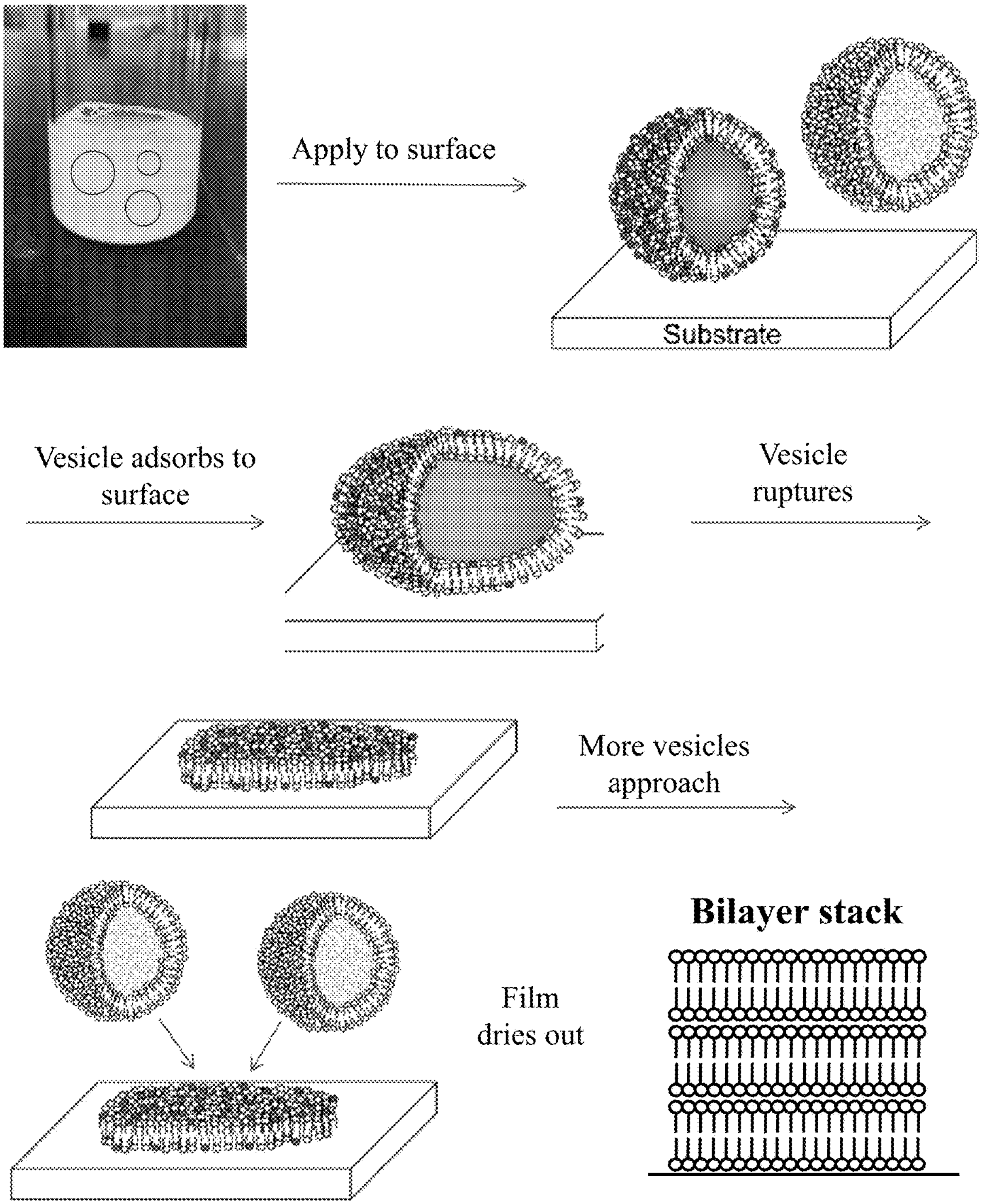
FIG. 49 illustrates the process by which vesicles adsorb to the surface of a substrate to form lipid bilayers disposed on the substrate.

In some embodiments, a lamella is a "lipid bilayer", which includes two contiguous sublayers, wherein each sublayer comprises molecules of fatty acid derivatives aligned adjacent to each other lengthwise such that the hydrophilic ends form a hydrophilic surface and the hydrophobic ends form a hydrophobic surface; and the molecular arrangement defines a repeating lattice structure. The hydrophobic surfaces of each sublayer in the lipid bilayer face each other, and the hydrophilic surfaces of each layer face away from each other. For purposes of illustration, FIG. 49 depicts a lipid bilayer on a surface and a stack of lipid bilayers on a surface.

Figure 56A:
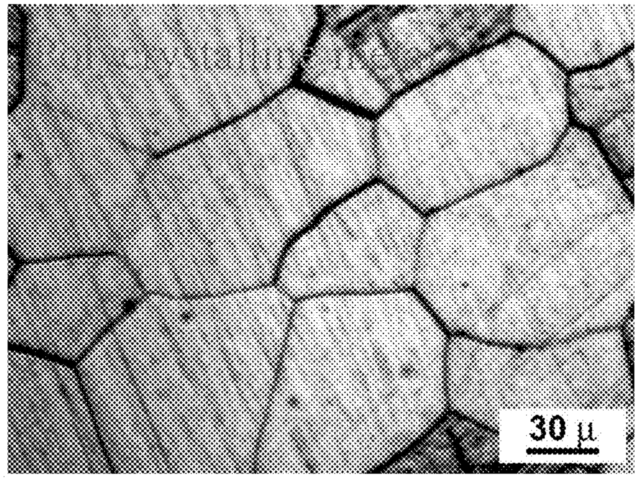
FIG. 56A is a scanning electron microscope image of multiple adjacent grains in a metal that collectively form a polycrystal.

As used herein, "grain" refers to a domain within a lamellar structure wherein the lattice formation is continuous and has one orientation. The boundaries between the grains in a lamellar structure are defects in the lattice formation wherein the continuity of the lattice formation and/or orientation of the molecules forming the lattice formation are interrupted. For purposes of illustration, FIG. 56A is a scanning electron microscope image of a plurality of grains in a polycrystalline material. The "grain size" of the grains that form a coating is determined by (1) obtaining an in-plane X-ray scattering image of the coating; (2) determining the full width at half maximum (FWHM) of the peak corresponding to the molecules in the coating; and (3) using the Scherrer equation below to calculate the grain size (D).

$$D=2\pi b/FWHM$$

wherein b=about 0.95 for a 2-dimensional crystal.

Without being bound by any theory, grain size inversely correlates with grain boundaries. As such, the larger the grain size, the fewer the grain boundaries; and the smaller the grain size, the more grain boundaries there are. It is further understood that the fewer the grain boundaries in a coating, the lower the mass loss rate and/or respiration rate of the coated agricultural product since there are fewer pathways for water and/or gas to pass through the coating.

As used herein, "mosaicity" refers to the probabilities that the orientation of lamellae in a coating deviate from a plane that is substantially parallel with the plane of the substrate (e.g., agricultural product) surface. Deviation of a lamella from a plane that is substantially parallel with the plane of the substrate surface is understood to be a type of crystal defect that increases the permeability of a coating to air and water, thus increasing the mass loss rate and respiration rate when the coating is disposed over an agricultural product.

As used herein, "substrate" refers to an article that a coating is applied to. In some embodiments, the substrate is an agricultural product (e.g., produce), a silicon substrate, or a substrate comprising a polysaccharide (e.g., cellulose).

Protective Coatings

Described herein are solutions, suspensions, or colloids containing a composition (e.g., a coating agent) in a solvent that can be used to form protective coatings over substrates such as plant matter, agricultural products, or food products. The protective coatings can, for example, prevent or reduce water loss and gas diffusion from the substrates, oxidation of the substrates, and/or can shield the substrates from threats such as bacteria, fungi, viruses, and the like. The coatings can also protect the substrates from physical damage (e.g., bruising) and photodamage. Accordingly, the coating agents, solutions/suspensions/colloids, and the coatings formed thereof can be used to help store agricultural or other food products for extended periods of time without spoiling. In some instances, the coatings and the coating agents from which they are formed can allow for food to be kept fresh in the absence of refrigeration. The coating agents and coatings described herein can also be edible (i.e., the coating agents and coatings can be non-toxic for human consumption). In some particular implementations, the solutions/suspensions/colloids include a wetting agent or surfactant which cause the solution/suspension/colloid to better spread over the entire surface of the substrate during application, thereby improving surface coverage as well as overall performance of the resulting coating. In some particular implementations, the solutions/suspensions/colloids include an emulsifier which improves the solubility of the coating agent in the solvent and/or allows the coating agent to be suspended or dispersed in the solvent. The wetting agent and/or emulsifier can each be a component of the coating agent, or can be separately added to the solution/suspension/colloid. In some embodiments, the coatings are understood to form lamellar structures on the surface of the substrate (e.g., agricultural product) they are disposed over.

Plant matter (e.g., agricultural products) and other degradable items can be protected against degradation from biotic or abiotic stressors by forming a protective coating over the outer surface of the product. The coating can be formed by adding the constituents of the coating (herein collectively a "coating agent") to a solvent (e.g., water and/or ethanol) to form a mixture (e.g., a solution, suspension, or colloid), applying the mixture to the outer surface of the product to be coated, e.g., by dipping the product in the mixture or by spraying the mixture over the surface of the product, and then removing the solvent from the surface of the product, e.g., by allowing the solvent to evaporate, thereby causing the coating to be formed from the coating agent over the surface of the product. The coating agent can be formulated such that the resulting coating provides a barrier to water and/or oxygen transfer, thereby preventing water loss from and/or oxidation of the coated product. The coating agent can additionally or alternatively be formulated such that the resulting coating provides a barrier to $CO_2$, ethylene and/or other gas transfer.

Coating agents including long chain fatty acids (e.g., palmitic acid, stearic acid, myristic acid, and/or other fatty acids having a carbon chain length greater than 13) and/or esters or salts thereof can both be safe for human consumption and can be used as coating agents to form coatings that are effective at reducing mass loss and oxidation in a variety of produce. For example, coatings formed from coating agents that include various combinations of palmitic acid, myristic acid, stearic acid, 1-glyceryl esters of palmitic acid (i.e., 2,3-dihydroxypropan-1-yl palmitate, herein "PA-1G"), 2-glyceryl esters of palmitic acid (i.e., 1,3-dihydroxypropan-2-yl palmitate, herein "PA-2G"), 1-glyceryl esters of myristic acid (i.e., 2,3-dihydroxypropan-1-yl tetradecanoate, herein "MA-1G"), 1-glyceryl esters of stearic acid (i.e., 2,3-dihydroxypropan-1-yl octadecenoate, herein "SA-1G"), and/or other long chain fatty acids or salts or esters thereof have been shown to be effective at reducing mass loss rates in many types of produce, for example finger limes, avocados, blueberries, and lemons. Specific examples of a variety of coatings and their effects in reducing mass loss rates in various types of produce are provided in Examples 1-4 below.

Figure 5:
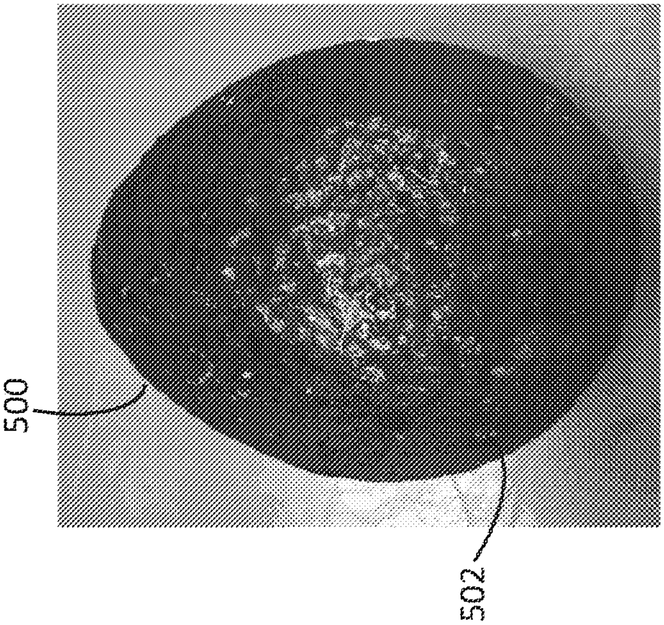
FIG. 5 is a high-resolution photograph of an avocado treated with a mixture of 1-glyceryl esters of undecanoic acid suspended in water.

Medium chain fatty acids (e.g., having a carbon chain length in a range of 7 to 13) and/or salts or esters thereof can also be used as coating agents to form coatings over produce or other plant matter or agricultural products using the methods described above. However, these compounds have typically been found to cause damage to the produce or plant matter, and also typically result in minimal to no reduction in mass loss rates. For example, treating avocados with a solution of 1-glyceryl esters of undecanoic acid (i.e., 2,3-dihydroxypropan-1-yl undecanoate, herein "UA-1G") suspended in water at a concentration as low as 5 mg/mL (UA-1G has a carbon chain length of 11) was shown to cause the avocados' skins to change from being virtually entirely green to having a high density of black discolored regions as a result of skin damage caused by the UA-1G. As seen in FIG. 5, which is a high-resolution photograph of one of the avocados 500 after treatment with the suspension described above, the skin of the previously green avocado exhibited numerous black discolored regions 502 after treatment.

Coating and Coating Agent Compositions

In some embodiments, the compositions (e.g., the coating agents or coatings) herein are derived from cutin obtained from a plant cuticle. In some embodiments, the plant that the cutin is obtained from is selected from palm, rapeseed, grapeseed, pumpkin, and coconut.

In some embodiments, the compositions (e.g., the coating agents or coatings) comprise one or more fatty acid derivatives. In some embodiments, the one or more fatty acid derivatives comprise one or more fatty acids, fatty acid esters, or a combination thereof. In some embodiments, the one or more fatty acid derivatives comprise one or more fatty acid salts. In some embodiments, the one or more fatty acid derivatives comprise two or more fatty acids, fatty acid esters, or a combination thereof. In some embodiments, the one or more fatty acid derivatives comprise two or more fatty acid salts. In some embodiments, the one or more fatty acid derivatives comprise one or more fatty acids, fatty acid esters, or a combination thereof and one or more fatty acid salts. In some embodiments, the one or more fatty acid derivatives comprise two or more fatty acids, fatty acid esters, or a combination thereof and two or more fatty acid salts. In some embodiments, the one or more fatty acid derivatives comprise one fatty acid or ester thereof and one fatty acid salt. In some embodiments, the one or more fatty acid derivatives comprise one fatty acid thereof and one fatty acid salt. In some embodiments, the one or more fatty acid derivatives comprise one fatty acid ester and one fatty acid salt. In some embodiments, the one or more fatty acid derivatives comprise two fatty acids, fatty acid esters, or a combination thereof and two fatty acid salts. In some embodiments, the one or more fatty acid derivatives comprise two fatty acid esters and two fatty acid salts. In some embodiments, the one or more fatty acid derivatives comprise two fatty acid esters and one fatty acid salt. In some embodiments, the one or more fatty acid derivatives comprise one fatty acid ester, one fatty acid, and one fatty acid salts. In some embodiments, the one or more fatty acid derivatives comprise one fatty acid ester and one fatty acid salt.

In some embodiments, the one or more fatty acids, fatty acid esters, or a combination thereof comprise one or more fatty acid esters. In some embodiments, the one or more fatty acid esters is one fatty acid ester. In some embodiments, the one or more fatty acid esters is two fatty acid esters.

In some embodiments, the one or more fatty acid salts is one fatty acid salt. In some embodiments, the one or more fatty acid salts is two fatty acid salts.

In some embodiments, the one or more fatty acids, fatty acid esters, or a combination thereof comprise one monoglyceride (e.g., a 1-monoglyceride or a 2-monoglyceride). In some embodiments, the one or more fatty acids, fatty acid esters, or a combination thereof comprise two monoglycerides (e.g., two 1-monoglycerides, two 2-monoglycerides, or one 1-monoglyceride and one 2-monoglyceride).

In some embodiments, the composition (e.g., coating or coating agent) comprises from about 40% to about 100% by weight of the one or more fatty acids, fatty acid esters, or a combination thereof. For example, the composition comprises from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, from about 95% to about 100%, from about 40% to about 50%, from about 50% to about 60%, from about 60% to about 70%, from about 70% to about 80%, from about 80% to about 90%, from about 65% to about 99%, from about 90% to about 100%, from about 40% to about 60%, from about 60% to about 80%, from about 80% to about 100%, from about 60% to about 100%, from about 70% to about 100%, from about 40% to about 99%, from about 60% to about 99%, from about 70% to about 99%, from about 80% to about 99%, from about 85% to about 99%, from about 90% to about 99%, from about 92% to about 98%, from about 92% to about 96%, from about 93% to about 95%, from about 62% to about 78%, from about 65% to about 75%, from about 67% to about 73%, from about 69% to about 71%, about 68%, about 69%, about 70%, about 71%, about 72%, about 92%, about 93%, about 94%, about 95%, about 96%, about 97%, about 98%, or about 99% by weight of the one or more fatty acids, fatty acid esters, or a combination thereof. For example, the composition comprises from about 60% to about 80%, about 70%, from about 85% to about 99%, about 95%, or about 96% by weight of the one or more fatty acids, fatty acid esters, or a combination thereof.

In some embodiments, the composition (e.g., coating or coating agent) comprises from about 1% to about 50% by weight of the one or more fatty acid salts. For example, the composition comprises from about 1% to about 10%, from about 10% to about 20%, from about 20% to about 30%, from about 30% to about 40%, from about 40% to about 50%, from about 1% to about 40%, from about 1% to about 35%, from about 1% to about 30%, from about 1% to about 20%, from about 10% to about 50%, from about 20% to about 40%, from about 15% to about 45%, from about 25% to about 35%, from about 28% to about 32%, from about 1% to about 10%, from about 2% to about 10%, from about 3% to about 9%, from about 4% to about 8%, from about 4% to about 6%, about 3%, about 4%, about 5%, about 6%, about 7%, about 8%, about 29%, about 30%, or about 31% by weight of the one or more fatty acid salts. In some embodiments, when the composition comprises two fatty acid salts, the molar ratio or weight ratio of the two fatty acid salts is from about 1:20 to about 20:1. For example, from about 1:10 to about 10:1, from about 1:10 to about 2:1, from about 1:4 to about 1:2, from about 1:3 to about 3:1, from about 1:2 to about 2:1, or about 1:1.

In some embodiments, the composition (e.g., coating or coating agent) comprises from about 70% to about 99% by weight of the one or more fatty acids, fatty acid esters, or a combination thereof, and from about 1% to about 30% by weight of the one or more fatty acid salts. In some embodiments, the composition (e.g., coating or coating agent) comprises from about 70% to about 99% by weight of one fatty acid ester; and from about 1% to about 30% by weight of one fatty acid salt. In some embodiments, the composition (e.g., coating or coating agent) comprises from about 70% to about 99% by weight of two fatty acid esters; and from about 1% to about 30% by weight of one fatty acid salt. In some embodiments, the composition (e.g., coating or coating agent) comprises from about 70% to about 99% by weight of one fatty acid ester; and from about 1% to about 30% by weight of two fatty acid salts. In some embodiments, the composition (e.g., coating or coating agent) comprises from about 70% to about 99% by weight of two fatty acid esters; and from about 1% to about 30% by weight of two fatty acid salts. In some embodiments, the composition (e.g., coating or coating agent) comprises one fatty acid ester and one fatty acid salt in a weight ratio of about 70:30 to about 94:6 (e.g., about 70:30 or about 94:6). In some embodiments, the composition (e.g., coating or coating agent) comprises two fatty acid esters and one fatty acid salt in a weight ratio of about 70:30 to about 94:6 (e.g., about 70:30 or about 94:6). In some embodiments, the composition (e.g., coating or coating agent) comprises one fatty acid ester and two fatty acid salts in a weight ratio of about 70:30 to about 94:6 (e.g., about 70:30 or about 94:6). In some embodiments, the composition (e.g., coating or coating agent) comprises two fatty acid esters and two fatty acid salts in a weight ratio of about 70:30 to about 94:6 (e.g., about 70:30 or about 94:6).

In some embodiments, each fatty acid and/or ester thereof is an independently selected compound of Formula IA:

(Formula IA)

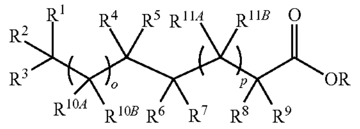

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and o is an integer from 0 to 17;

p is an integer from 0 to 17;

wherein the sum of o and p is from 0 to 17;

or a salt thereof when R is $C_1$-$C_6$ alkyl optionally substituted with one or more of OH and $C_1$-$C_6$ alkoxy.

In some embodiments, R is H.

In some embodiments, R is $C_1$-$C_6$ alkyl optionally substituted with one or more OH or $C_1$-$C_6$ alkoxy. In some embodiments, R is $C_1$-$C_6$ alkyl optionally substituted with one or more OH. In some embodiments, R is $C_1$-$C_6$ alkyl optionally substituted with two OH. In some embodiments, R is $C_1$-$C_3$ alkyl optionally substituted with one or more OH. In some embodiments, R is $C_1$-$C_3$ alkyl optionally substituted with two OH. In some embodiments, R is propyl optionally substituted with one or more OH. In some embodiments, R is propyl optionally substituted with two OH. In some embodiments, R is 1,3-dihydroxy-2-propyl. In some embodiments, R is 1,2-dihydroxy-1-propyl.

In some embodiments, R is $C_1$-$C_6$ alkyl optionally substituted with one or more $C_1$-$C_6$ alkoxy. In some embodiments, R is $C_1$-$C_6$ alkyl optionally substituted with two $C_1$-$C_6$ alkoxy. In some embodiments, R is $C_1$-$C_3$ alkyl optionally substituted with one or more $C_1$-$C_6$ alkoxy. In some embodiments, R is $C_1$-$C_3$ alkyl optionally substituted with two $C_1$-$C_6$ alkoxy.

In some embodiments, the compound of Formula IA is a compound of Formula IA-A:

(Formula IA-A)

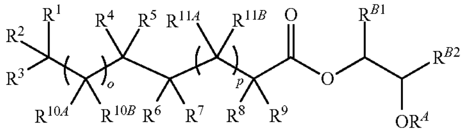

or a salt thereof, wherein:

one of $R^{B1}$ and $R^{B2}$ is H, and the other of $R^{B1}$ and $R^{B2}$ is —$CH_2OR^A$;

each occurrence of $R^A$ is independently selected from H and $C_1$-$C_6$ alkyl;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17; and wherein the sum of o and p is from 0 to 17.

In some embodiments, $R^{B1}$ is H and $R^{B2}$ is —$CH_2OR^A$. In some embodiments, $R^{B1}$ is —$CH_2OR^A$ and $R^{B2}$ is H.

In some embodiments, each $R^A$ is H. In some embodiments, one $R^A$ is H and the other $R^A$ is $C_1$-$C_6$ alkyl. In some embodiments, each $R^A$ is $C_1$-$C_6$ alkyl. In some embodiments, each $R^A$ is $C_1$-$C_6$ alkyl.

In some embodiments, the compound of Formula IA-A is a compound of Formula IA-A-i:

(Formula IA-A-i)

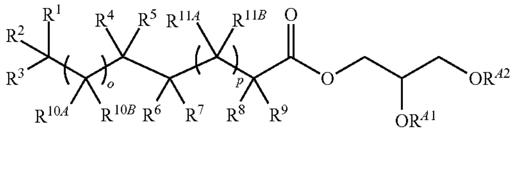

or a salt thereof, wherein:

$R^{A1}$ and $R^{A2}$ are independently selected from H and $C_1$-$C_6$ alkyl;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17; and wherein the sum of o and p is from 0 to 17.

In some embodiments, $R^{A1}$ is H and $R^{A2}$ is $C_1$-$C_6$ alkyl. In some embodiments, $R^{A1}$ is $C_1$-$C_6$ alkyl and $R^{A2}$ is H. In some embodiments, $R^{A1}$ and $R^{A2}$ are H.

In some embodiments, the compound of Formula IA-A is a compound of Formula IA-A-ii:

(Formula IA-A-ii)

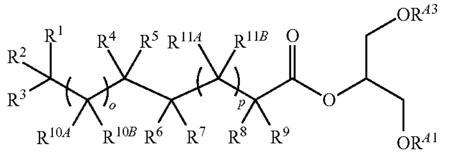

or a salt thereof, wherein:

$R^{A1}$ and $R^{A3}$ are independently selected from H and $C_1$-$C_6$ alkyl; $R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17; and wherein the sum of o and p is from 0 to 17.

In some embodiments, $R^{A1}$ is H and $R^{A3}$ is $C_1$-$C_6$ alkyl. In some embodiments, $R^{A1}$ is $C_1$-$C_6$ alkyl and $R^{A3}$ is H. In some embodiments, $R^{A1}$ and $R^{A3}$ are H.

In some embodiments, the compound of Formula IA is a compound of Formula IA-B:

(Formula IA-B)

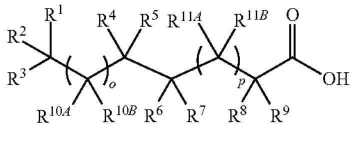

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17; and wherein the sum of o and p is from 0 to 17.

In some embodiments, each fatty acid salt is an independently selected compound of Formula II:

(Formula IIA)

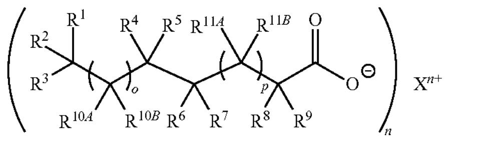

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

In some embodiments, $X^{n+}$ is selected from $Na^+$, $K^+$, $Ag^+$, $Ca^{2+}$, $Mg^{2+}$, $Zn^{2+}$, $Cu^{2+}$, and $(R')_4N^+$.

In some embodiments, each R' is an independently selected $C_1$-$C_6$ alkyl. In some embodiments, one R' is H and the other three R' are independently selected $C_1$-$C_6$ alkyl. In some embodiments, two R' are H and the other two R' are independently selected $C_1$-$C_6$ alkyl. In some embodiments, three R' are H and the other R' is $C_1$-$C_6$ alkyl. In some embodiments, each R' is H.

In some embodiments, $X^{n+}$ is selected from $Na^+$, $K^+$, $Ag^+$, $Ca^{2+}$, $Mg^{2+}$, and $Zn^{2+}$. In some embodiments, $X^{n+}$ is selected from $Na^+$, $K^+$, $Ca^{2+}$, $Mg^{2+}$, and $Zn^{2+}$. In some embodiments, $X^{n+}$ is $Na^+$. In some embodiments, $X^{n+}$ is $K^+$. In some embodiments, $X^{n+}$ is $Ca^{2+}$. In some embodiments, $X^1$ is $Mg^{2+}$. In some embodiments, $X^{n+}$ is $Zn^{2+}$.

In some embodiments, $R^1$, $R^2$, $R^3$, $R^4$, $R^5$, $R^6$, $R^7$, $R^8$, and $R^9$ are independently selected from the group consisting of: H, OH, $C_1$-$C_6$ alkyl, and $C_1$-$C_6$ alkoxy. In some embodiments, $R^1$, $R^2$, $R^3$, $R^4$, $R^5$, $R^6$, $R^7$, $R^8$, and $R^9$ are independently selected from the group consisting of: H, OH, and $C_1$-$C_6$ alkyl. In some embodiments, $R^1$, $R^2$, $R^3$, $R^4$, $R^5$, $R^6$, $R^7$, $R^8$, and $R^9$ are independently selected from the group consisting of: H and OH. In some embodiments, $R^1$, $R^2$, $R^3$, $R^4$, $R^5$, $R^6$, $R^7$, $R^8$, and $R^9$ are each H. In some embodiments, one of $R^1$, $R^2$, $R^3$, $R^4$, $R^5$, $R^6$, $R^7$, $R^8$, and $R^9$ is OH and the remaining $R^1$, $R^2$, $R^3$, $R^4$, $R^5$, $R^6$, $R^7$, $R^8$, and $R^9$ are each H. In some embodiments, two of $R^1$, $R^2$, $R^3$, $R^4$, $R^5$, $R^6$, $R^7$, $R^8$, and $R^9$ is OH and the remaining $R^1$, $R^2$, $R^3$, $R^4$, $R^5$, $R^6$, $R^7$, $R^8$, and $R^9$ are each H.

In some embodiments, $R^4$ is OH. In some embodiments, $R^5$ is OH. In some embodiments, $R^6$ is OH. In some embodiments, $R^7$ is OH.

In some embodiments, each occurrence of $R^{10A}$, $R^{10B}$, $R^{11A}$, and $R^{11B}$ is independently selected from the group consisting of: H, OH, $C_1$-$C_6$ alkyl, and $C_1$-$C_6$ alkoxy. In some embodiments, each occurrence of $R^{10A}$, $R^{10B}$, $R^{11A}$, and $R^{11B}$ is independently selected from the group consisting of: H, OH, and $C_1$-$C_6$ alkyl. In some embodiments, each occurrence of $R^{10A}$, $R^{10B}$, $R^{11A}$, and $R^{11B}$ is independently selected from the group consisting of: H and OH. In some embodiments, each occurrence of $R^{10A}$, $R^{10B}$, $R^{11A}$, and $R^{11B}$ is each H. In some embodiments, one of each occurrence of $R^{10A}$, $R^{10B}$, $R^{11A}$, and $R^{11B}$ is OH and the remaining occurrences of $R^{10A}$, $R^{10B}$, $R^{11A}$, and $R^{11B}$ are each H. In some embodiments, two of each occurrence of $R^{10A}$, $R^{10B}$, $R^{11A}$, and $R^{11B}$ is OH and the remaining occurrences of $R^{10A}$, $R^{10B}$, $R^{11A}$, and $R^{11B}$ are each H.

In some embodiments, any two $R^1$, $R^2$, $R^3$, $R^4$, $R^5$, $R^6$, $R^7$, $R^9$, $R^{10A}$, $R^{10B}$, $R^{11A}$, and $R^{11B}$ on adjacent carbon atoms are taken together with the carbon atoms to which they are attached to form a double bond. In some embodiments, any two pairs of $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are each taken together with the carbon atoms to which they are attached to form two double bonds. In some embodiments, any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a 3- to 6-membered ring heterocycle. In some embodiments, any two $R^1$, $R^2$, $R^3$, $R^4$, $R^5$, $R^6$, $R^7$, $R^8$, $R^9$, $R^{10A}$, $R^{10B}$, $R^{11A}$ and $R^{11B}$ on adjacent carbon atoms are taken together with the carbon atoms to which they are attached to form a double bond, and any two remaining $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a 3- to 6-membered ring heterocycle. In some embodiments, the 3- to 6-membered ring heterocycle is oxiranyl.

In some embodiments, $R^4$ is taken together with $R^6$ and the carbon atoms to which they are attached to form a double bond. In some embodiments, $R^4$ is taken together with $R^6$ and the carbon atoms to which they are attached to form a 3- to 6-membered ring heterocycle.

In some embodiments, one of $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ is OH; and the remaining $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ are each H.

In some embodiments, one of $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ is OH; any two $R^1$, $R^2$, $R^3$, $R^4$, $R^5$, $R^6$, $R^7$, $R^8$, $R^9$, $R^{10A}$, $R^{10B}$, $R^{11A}$ and $R^{11B}$ on adjacent carbon atoms are taken together with the carbon atoms to which they are attached to form a double bond; and the remaining $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ are each H.

In some embodiments, one of $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ is OH; any two $R^1$, $R^2$, $R^3$, $R^4$, $R^5$, $R^6$, $R^7$, $R^8$, $R^9$, $R^{10A}$, $R^{10B}$, $R^{11A}$ and $R^{11B}$ on adjacent carbon atoms are taken together with the carbon atoms to which they are attached to form a double bond; and the remaining $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ are each H.

In some embodiments, one of $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ is OH; any two $R^1$, $R^2$, $R^3$, $R^4$, $R^5$, $R^6$, $R^7$, $R^8$, $R^9$, $R^{10A}$, $R^{10B}$, $R^{11A}$ and $R^{11B}$ on adjacent carbon atoms are taken together with the carbon atoms to which they are attached to form an oxiranyl; and the remaining $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ are each H.

In some embodiments, $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ are each H; and any two $R^1$, $R^2$, $R^3$, $R^4$, $R^5$, $R^6$, $R^7$, $R^8$, $R^9$, $R^{10A}$, $R^{10B}$, $R^{11A}$ and $R^{11B}$ on adjacent carbon atoms are taken together with the carbon atoms to which they are attached to form an oxiranyl.

In some embodiments, $R^1$, $R^2$, $R^3$, $R^4$, $R^5$, $R^6$, $R^7$, $R^8$, $R^9$, and each occurrence of $R^{10A}$, $R^{10B}$, $R^{11A}$, and $R^{11B}$ are each H; and any two $R^1$, $R^2$, $R^3$, $R^4$, $R^5$, $R^6$, $R^7$, $R^8$, $R^9$, $R^{10A}$, $R^{10B}$, $R^{11A}$ and $R^{11B}$ on adjacent carbon atoms are taken together with the carbon atoms to which they are attached to form a double bond.

In some embodiments, the sum of o and p is from 0 to 13. In some embodiments, the sum of o and p is from 1 to 9. In some embodiments, the sum of o and p is from 0 to 13. In some embodiments, the sum of o and p is from 5 to 7. In some embodiments, the sum of o and p is from 10 to 13. In some embodiments, the sum of o and p is from 11 to 13. In some embodiments, the sum of o and p is 1. In some embodiments, the sum of o and p is from 10 to 13. In some embodiments, the sum of o and p is 1. In some embodiments, the sum of o and p is 2. In some embodiments, the sum of o and p is 3. In some embodiments, the sum of o and p is 4. In some embodiments, the sum of o and p is 5. In some embodiments, the sum of o and p is 6. In some embodiments, the sum of o and p is 7. In some embodiments, the sum of o and p is 8. In some embodiments, the sum of o and p is 9. In some embodiments, the sum of o and p is 10. In some embodiments, the sum of o and p is 11. In some embodiments, the sum of o and p is 12. In some embodiments, the sum of o and p is 13. In some embodiments, the sum of o and p is 14. In some embodiments, the sum of o and p is 15. In some embodiments, the sum of o and p is 16. In some embodiments, the sum of o and p is 17. Without wishing to be bound by theory, it is believed that compounds of Formula IA-A wherein the sum of o and p is 0 to 9 are able to function as wetting agents when included in the compositions (e.g., mixtures, coatings, and coating agents) described herein, thus increasing the aptitude of the compositions (e.g., mixtures, coatings, and coating agents) to spread over the surface of an agricultural product or plant to form a coating of substantially uniform thickness.

In some embodiments, the compound of Formula IA is selected from the group consisting of:

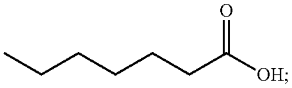
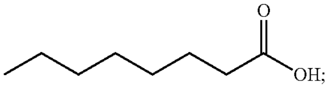
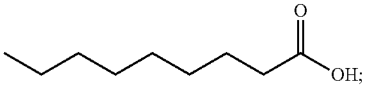
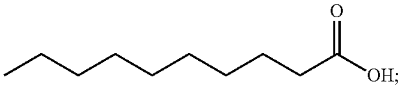
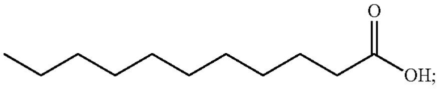
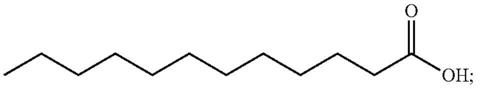
or
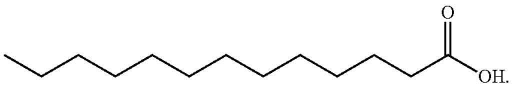
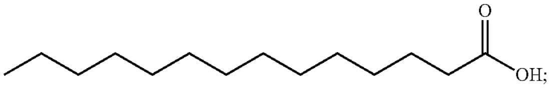
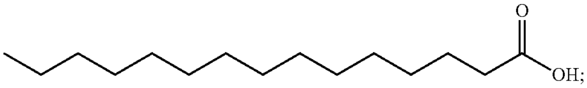
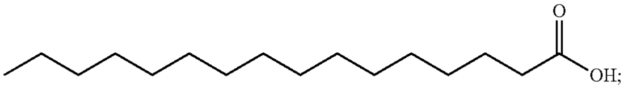
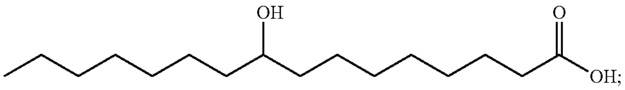
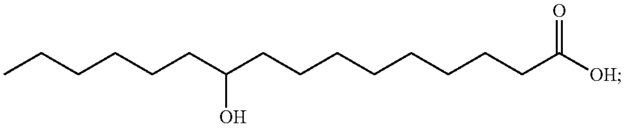
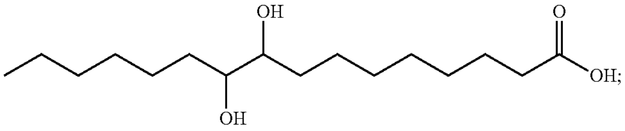
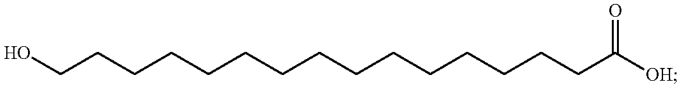
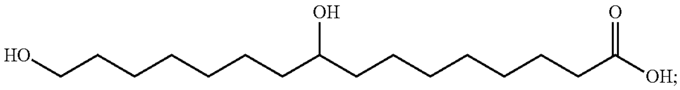

-continued
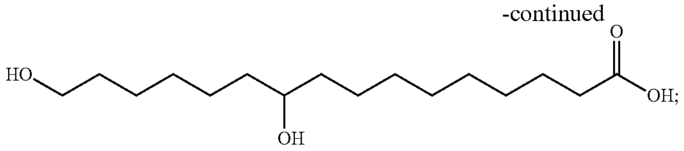
;
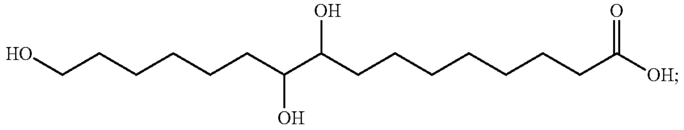
;
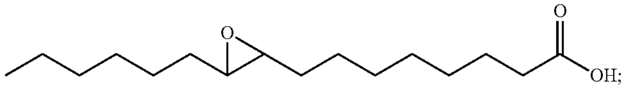
;
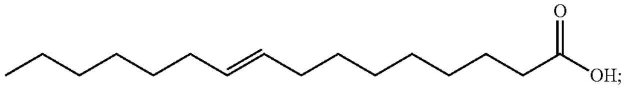
;
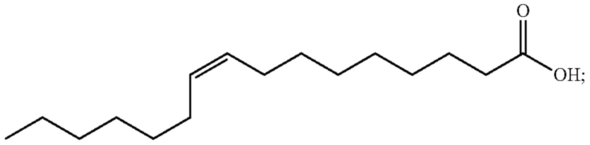
;
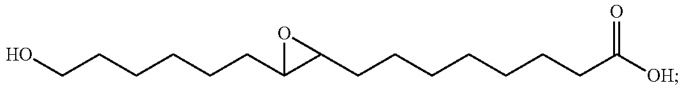
;
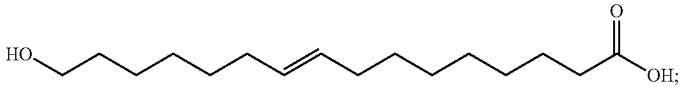
;
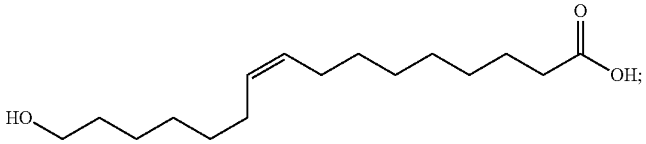
;
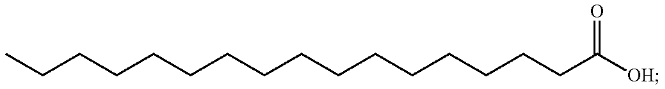
;
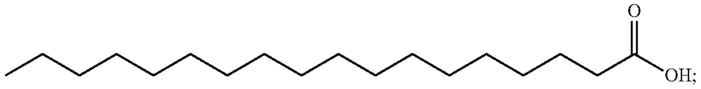
;
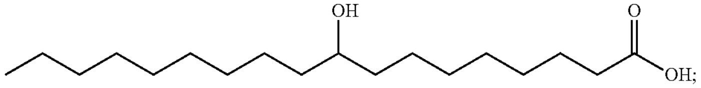
;
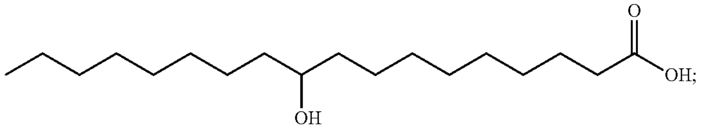
;
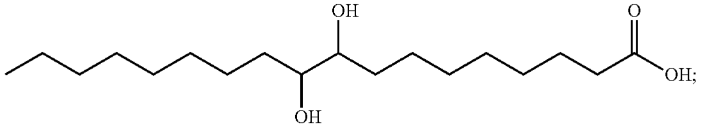
;
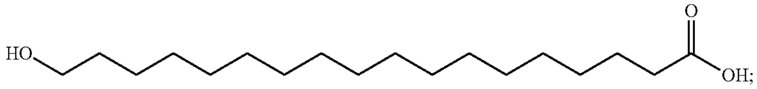
;
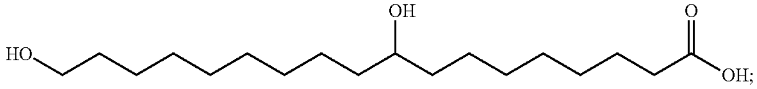
;
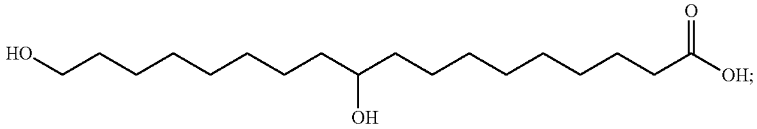
;

-continued
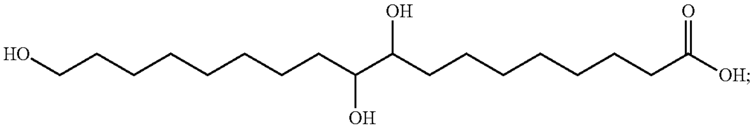
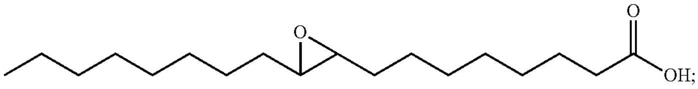
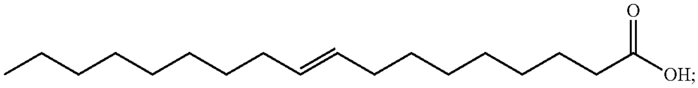
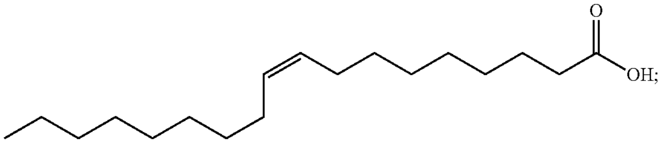
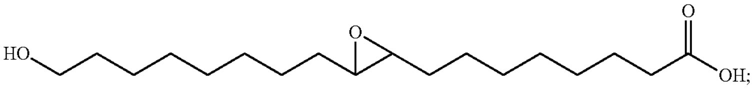
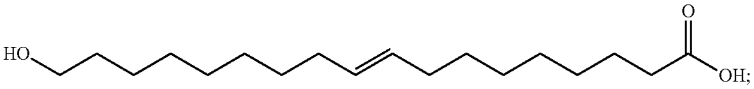
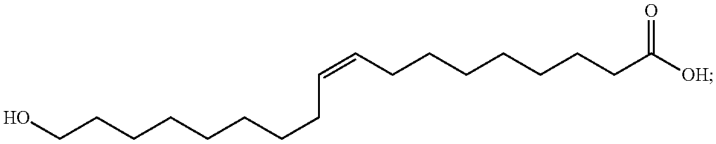
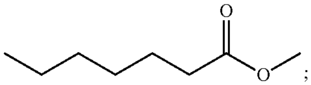 ; 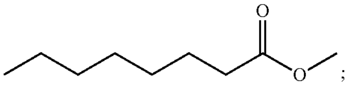 ; 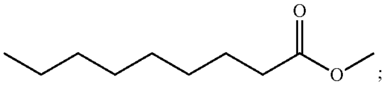 ;
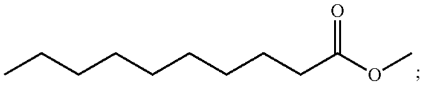 ; 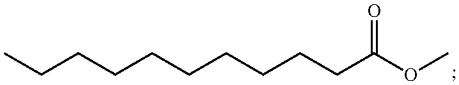 ;
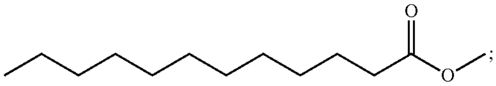 ; 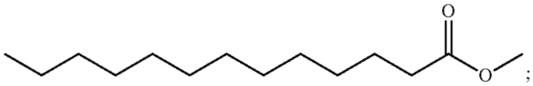 ;
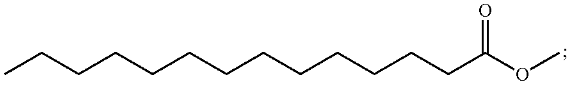 ;
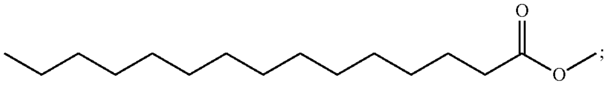 ;
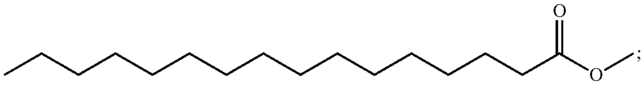 ;
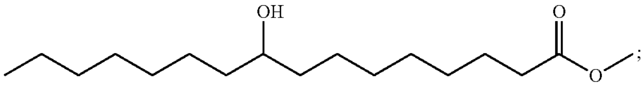 ;
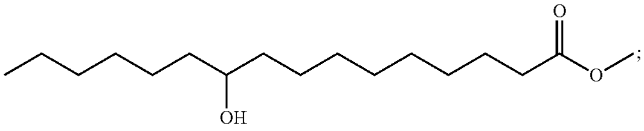 ;
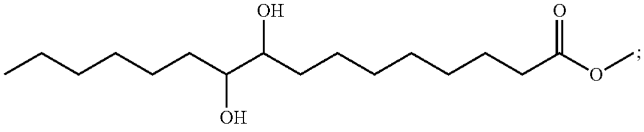 ;
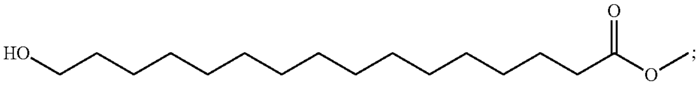 ;

-continued
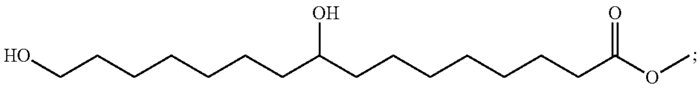;
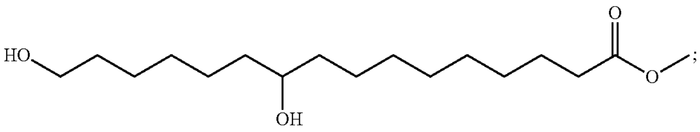;
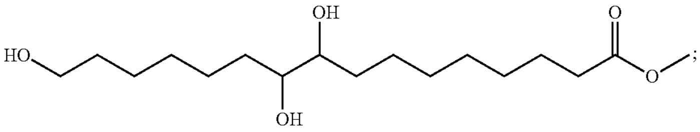;
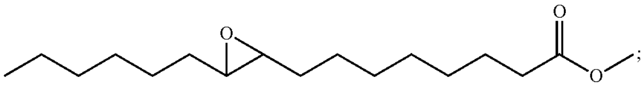;
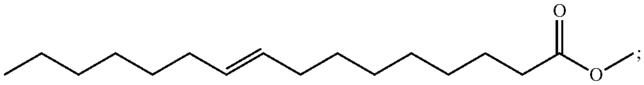;
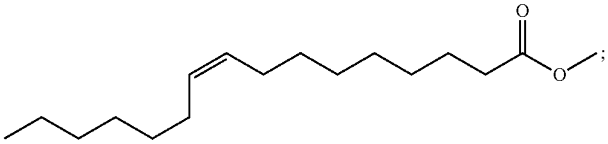;
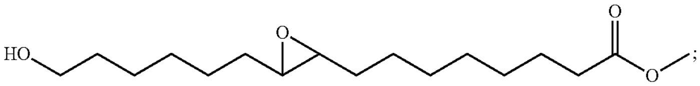;
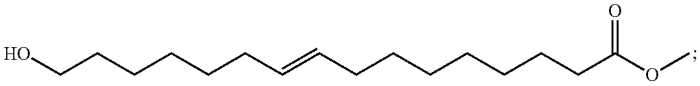;
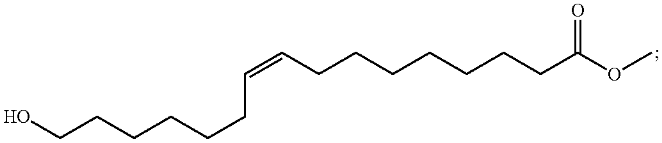;
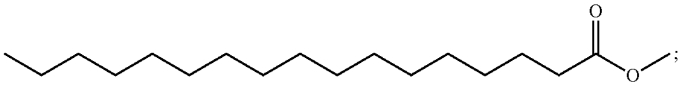;
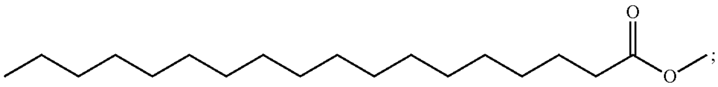;
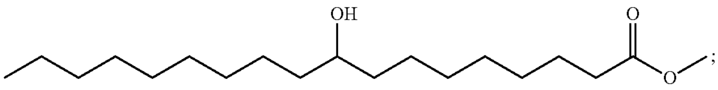;
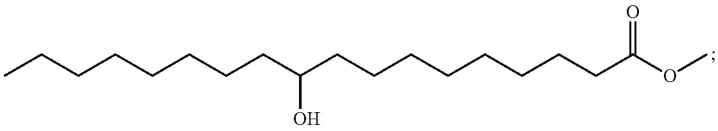;
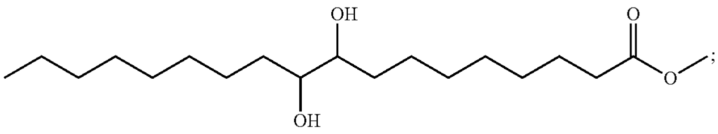;
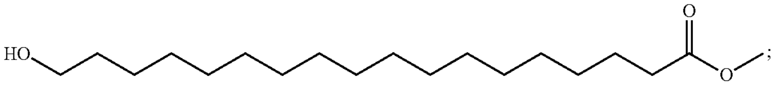;
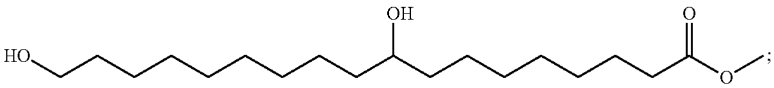;

-continued
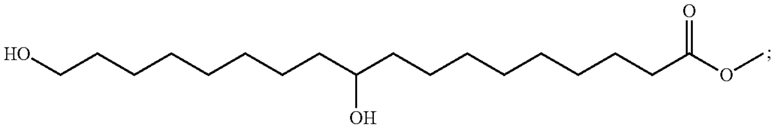;
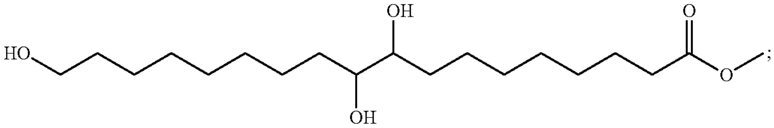;
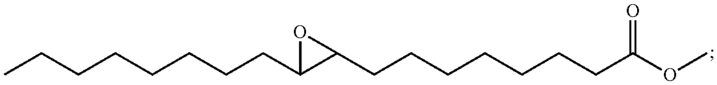;
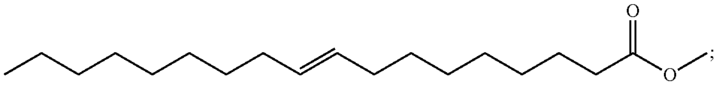;
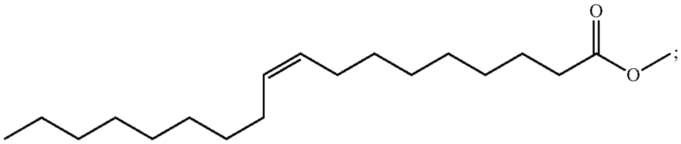;
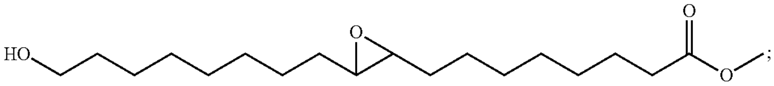;
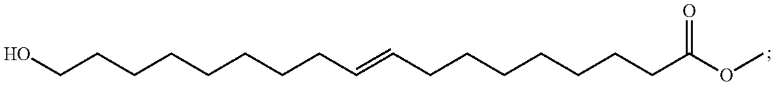;
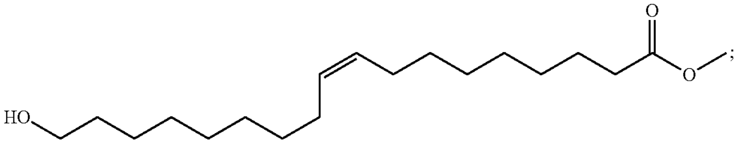;
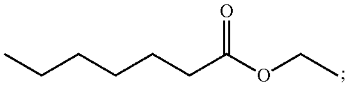; 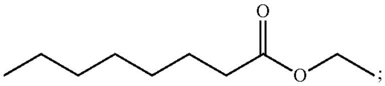;
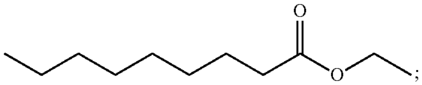; 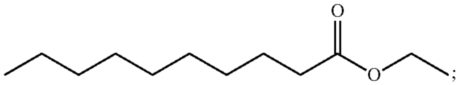;
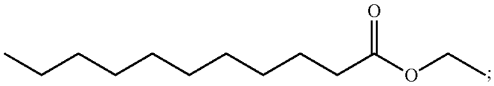; 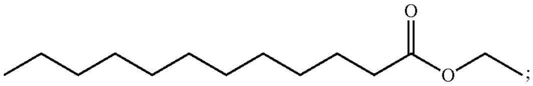;
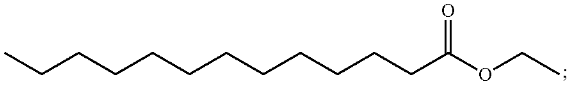;
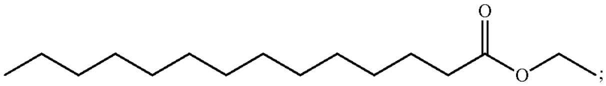;
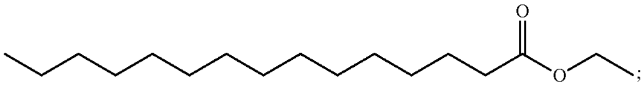;
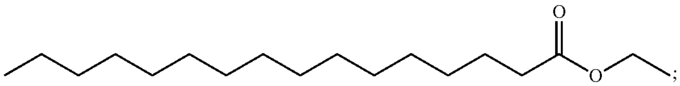;
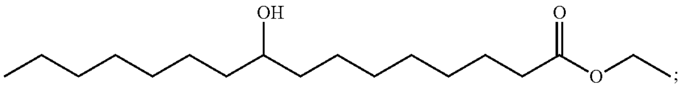;
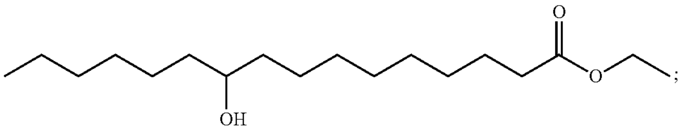;

-continued
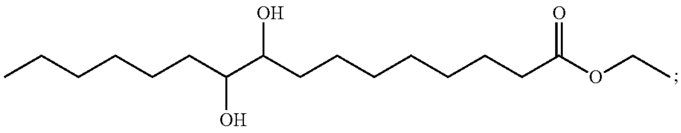;
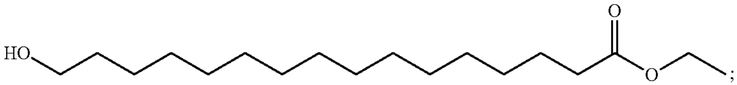;
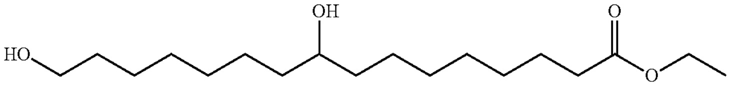;
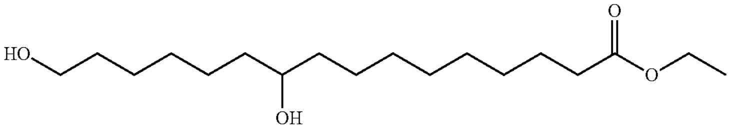;
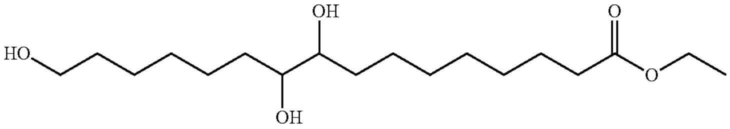;
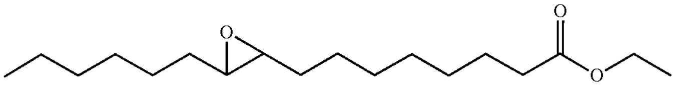;
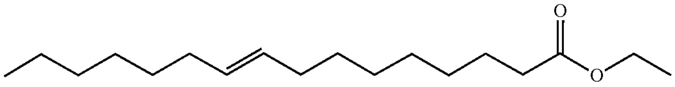;
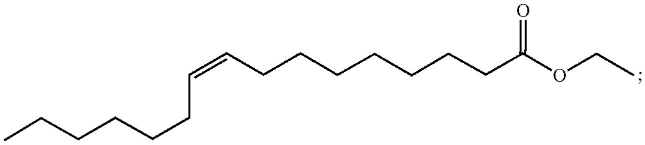;
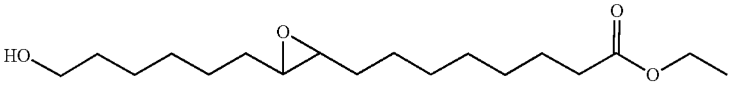;
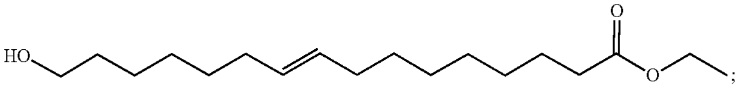;
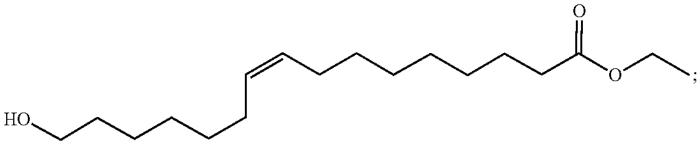;
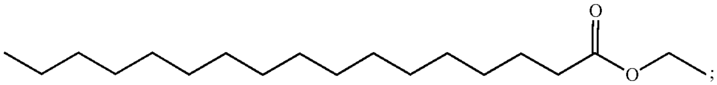;
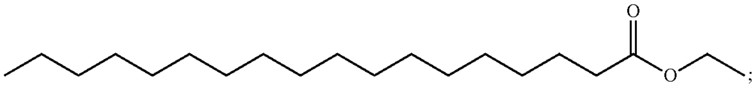;
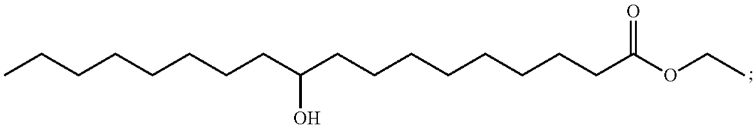;
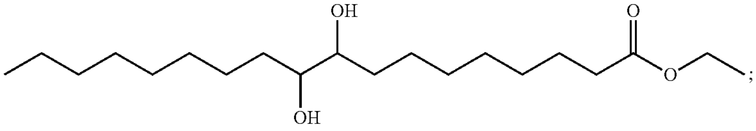;
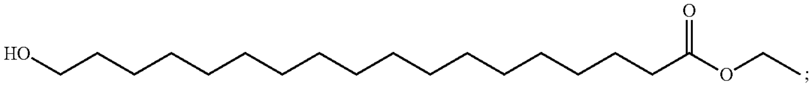;

-continued
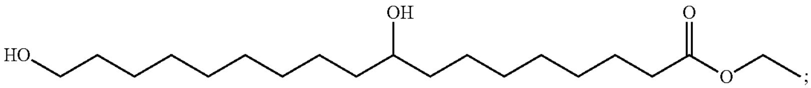
;
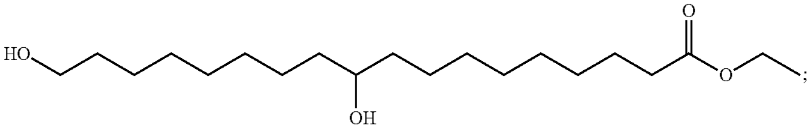
;
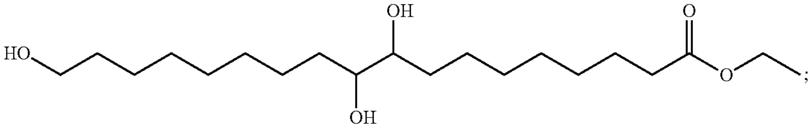
;
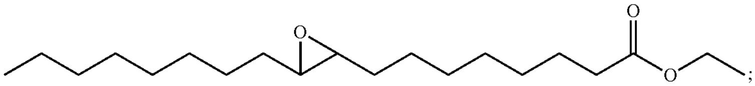
;
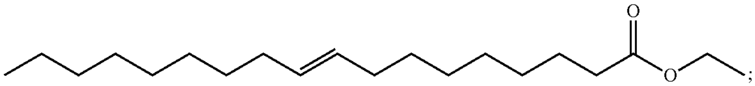
;
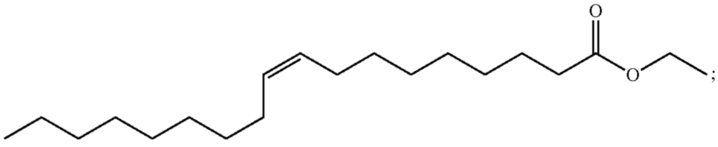
;
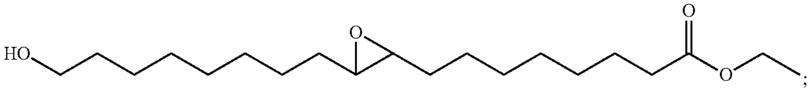
;
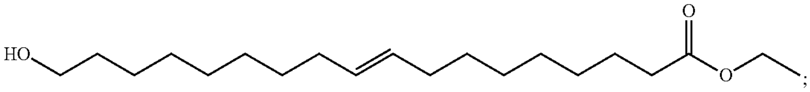
;
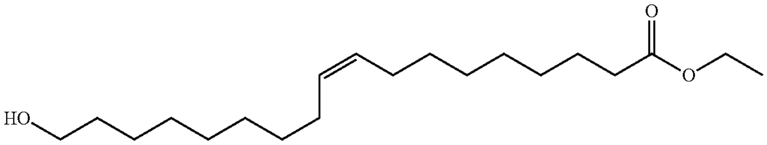
;
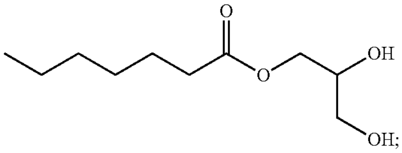
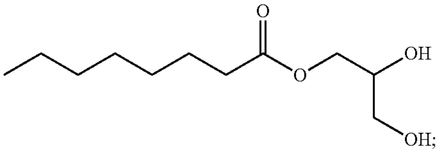
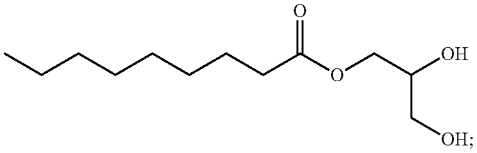
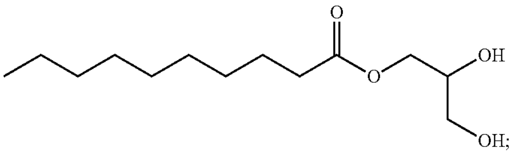
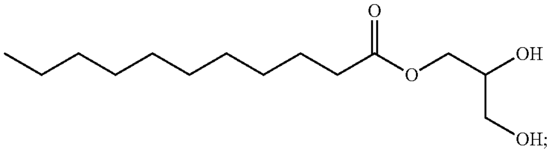
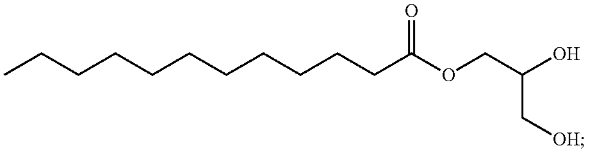
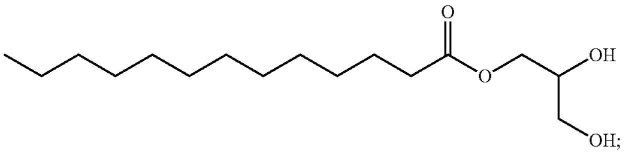

-continued
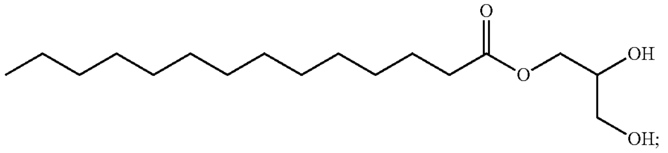
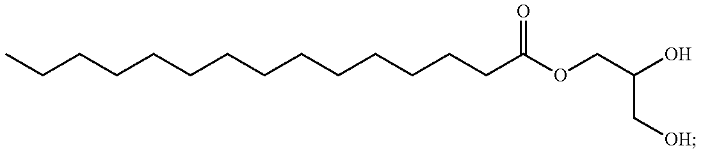
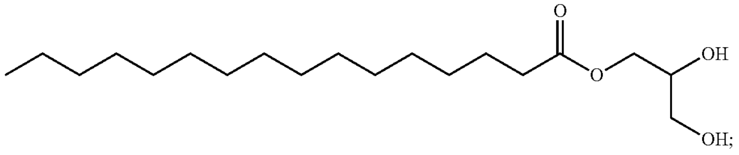
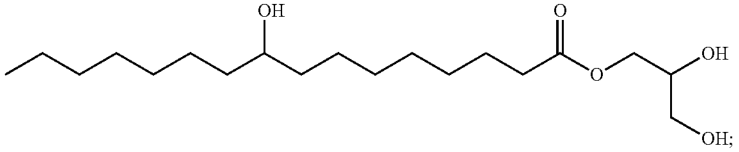
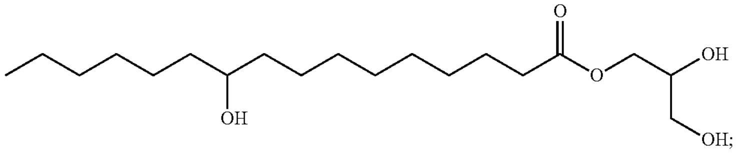
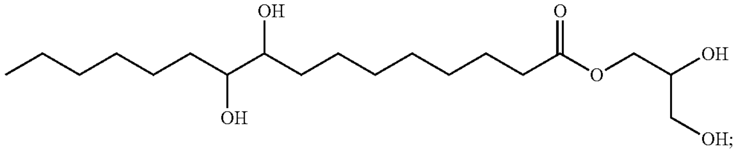
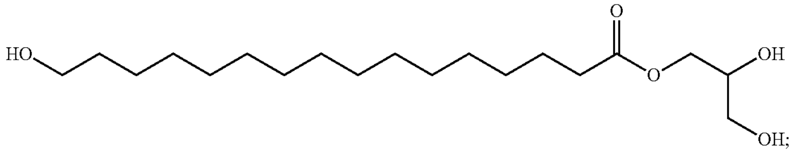
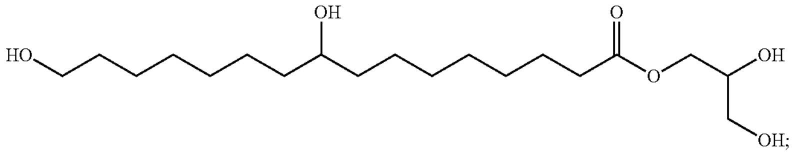
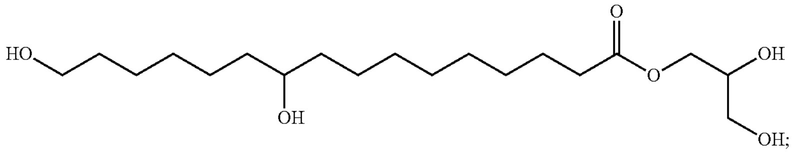
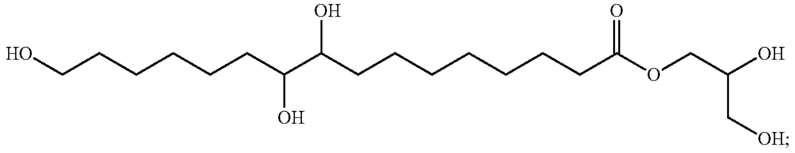
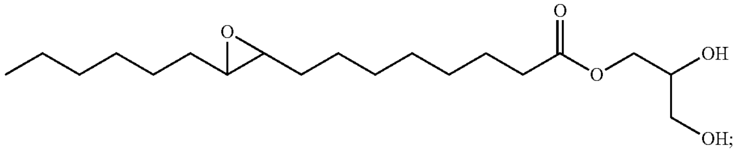

-continued
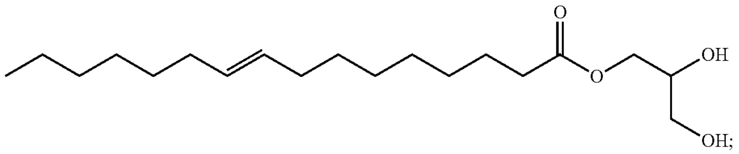
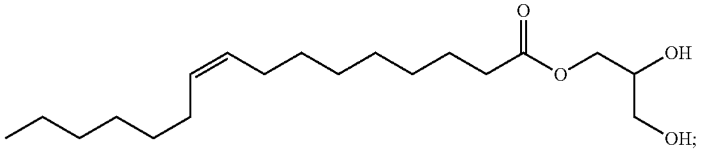
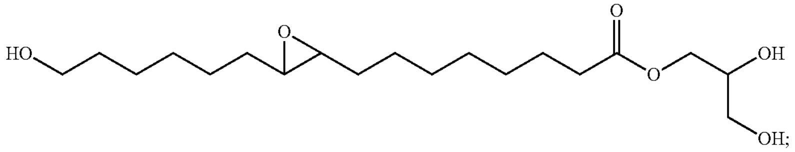
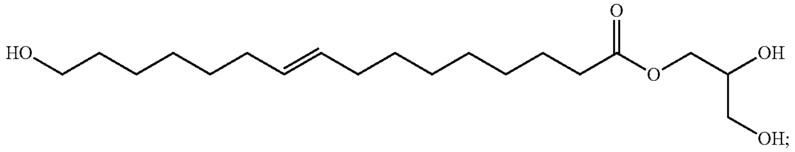
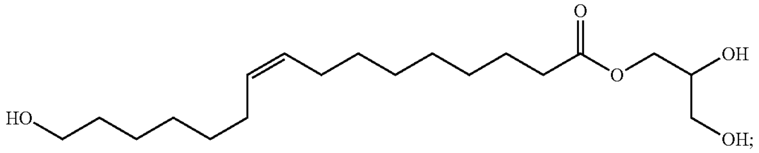
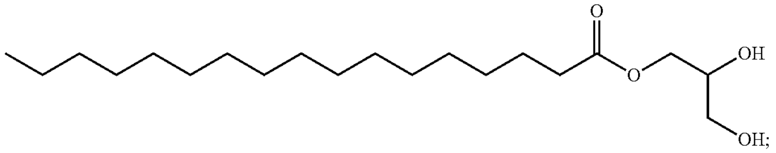
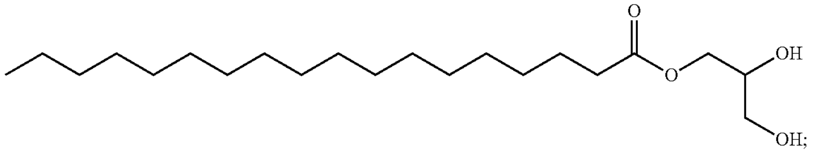
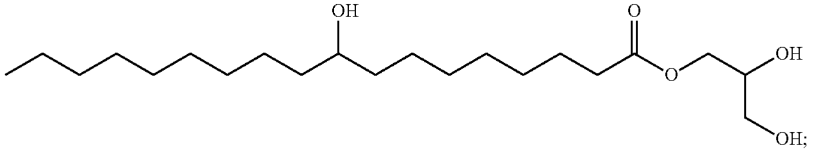
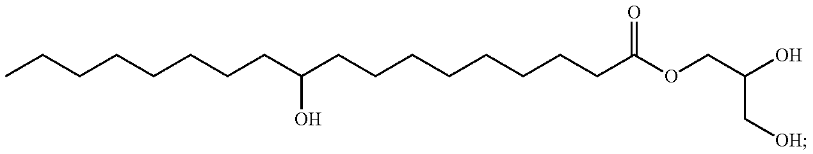
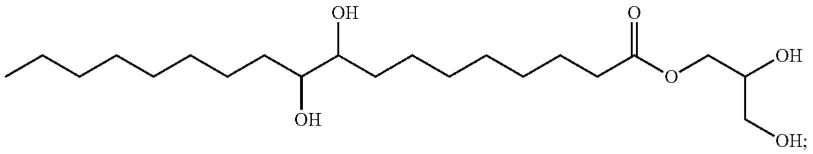
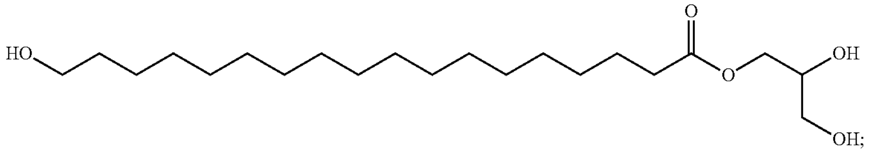

-continued
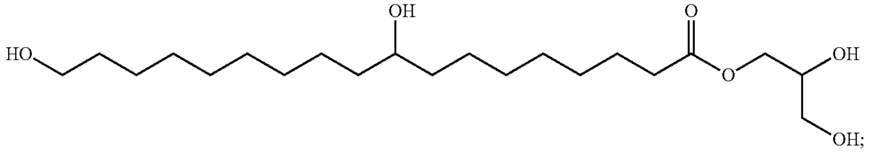
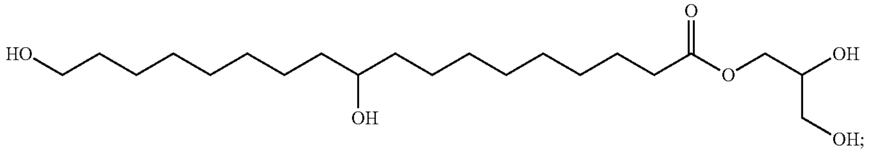
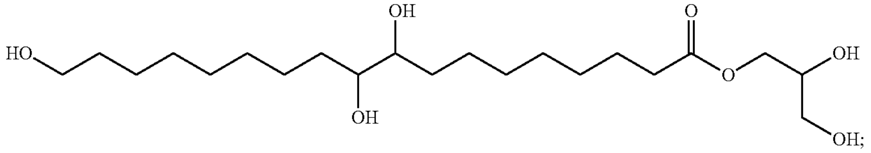
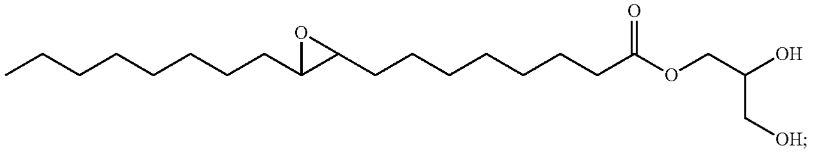
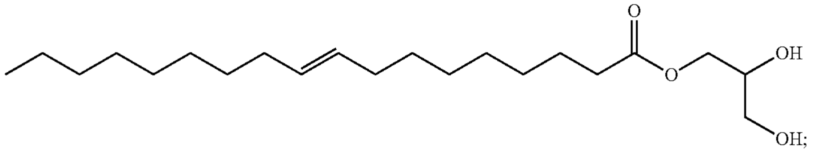
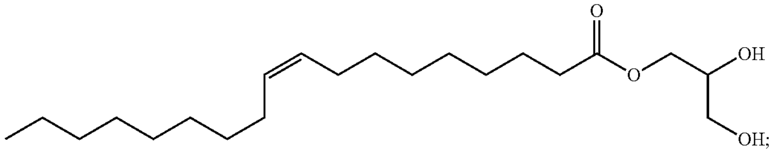
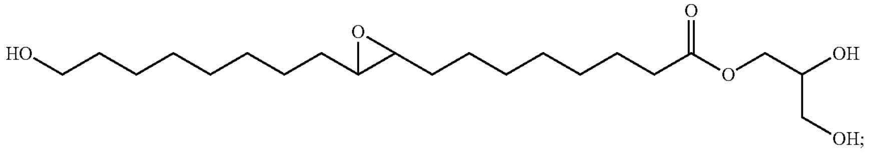
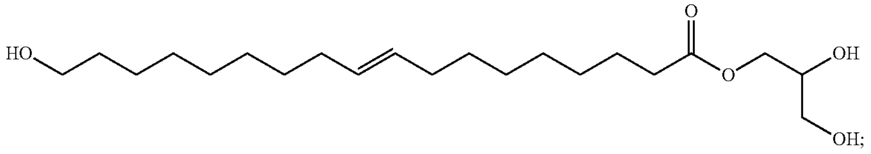
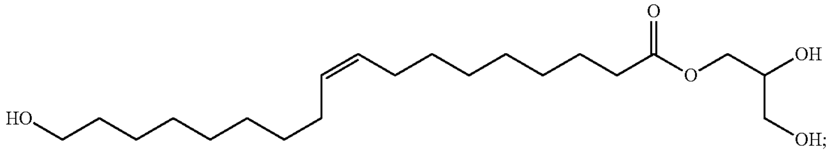
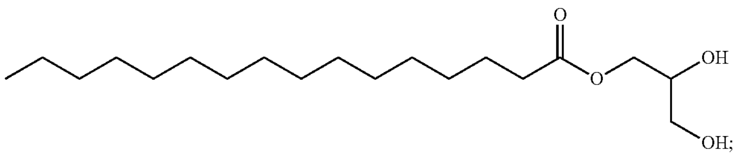
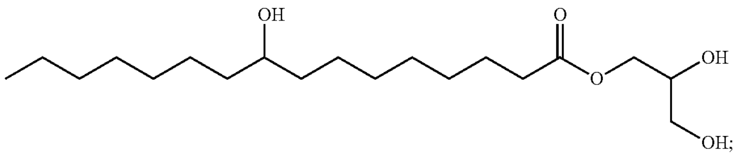

-continued
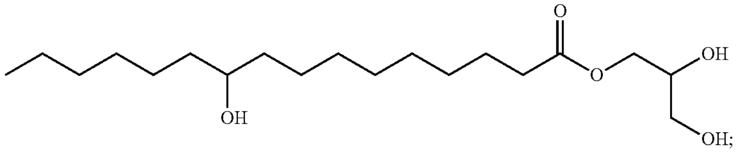
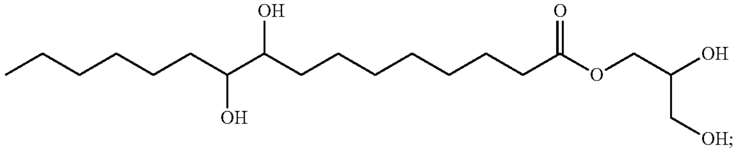
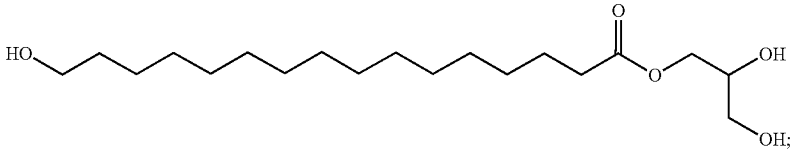
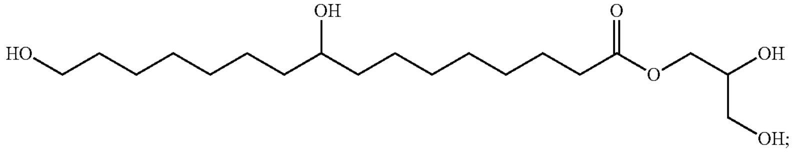
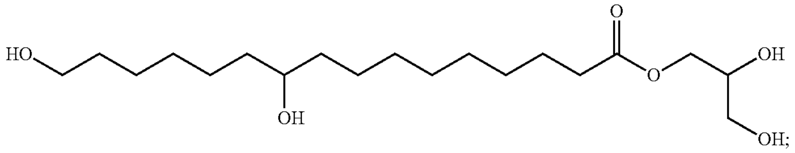
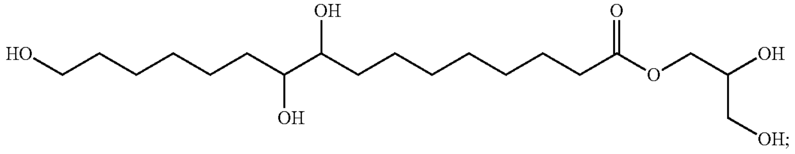
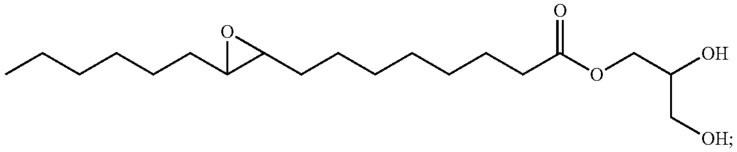
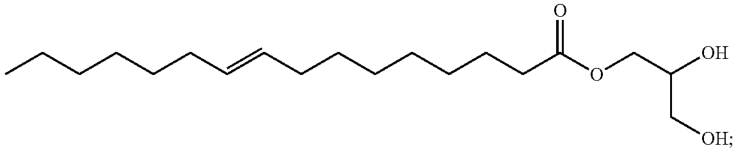
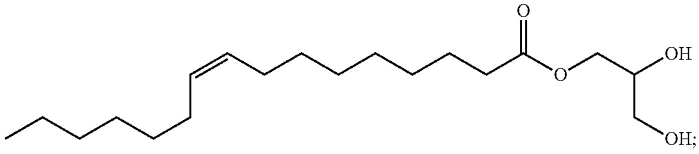
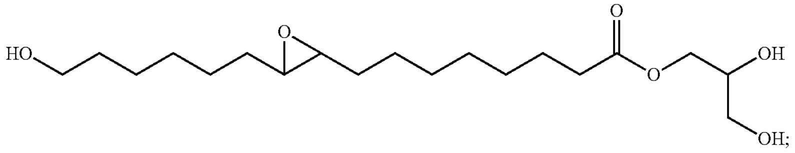
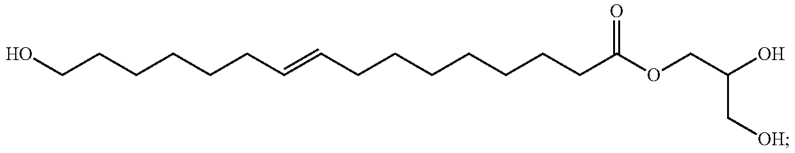

-continued
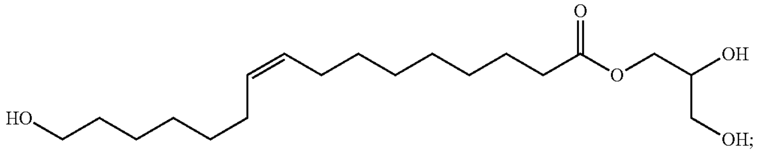
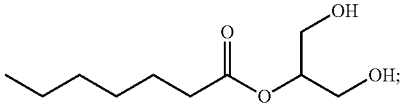
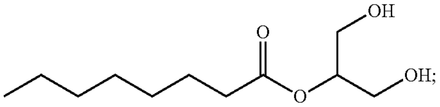
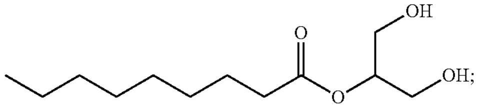
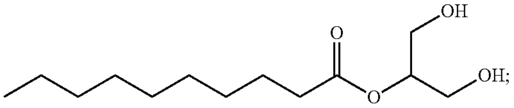
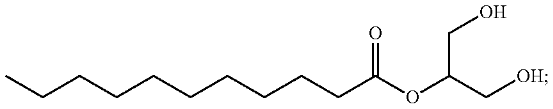
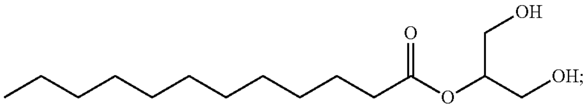
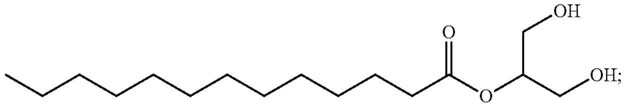
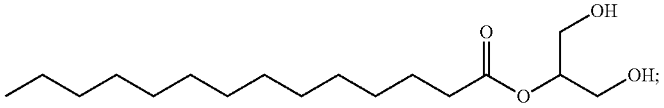
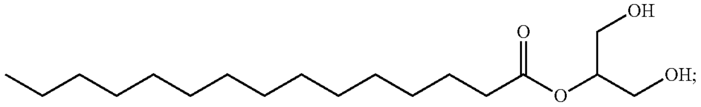
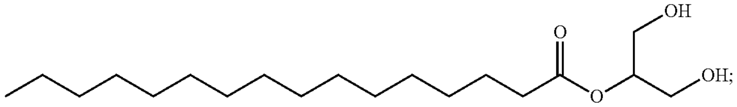
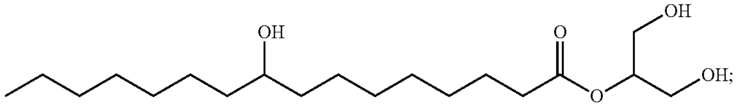
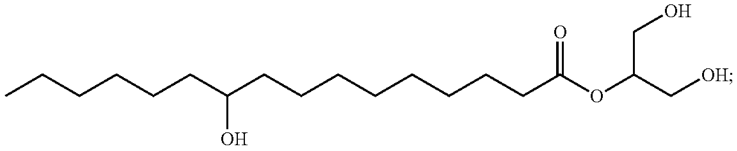
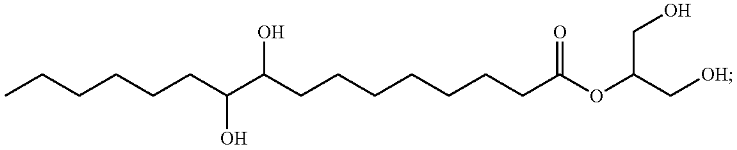
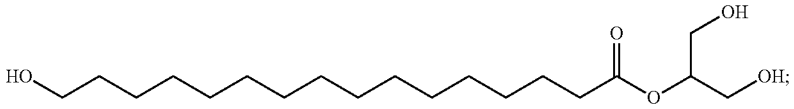
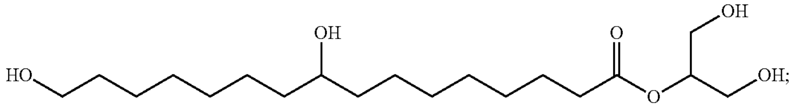
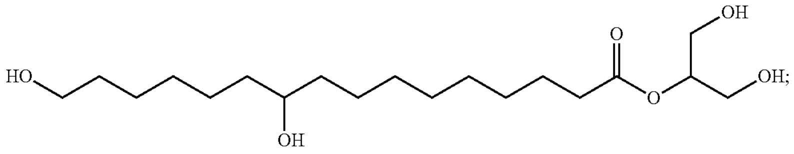

-continued
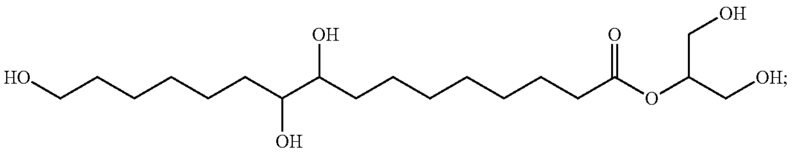
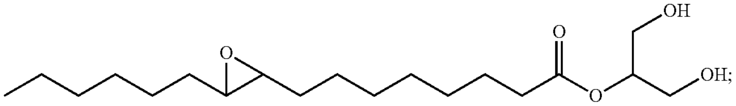
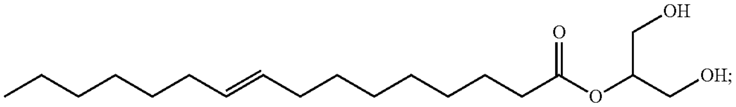
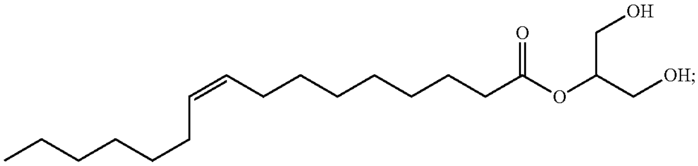
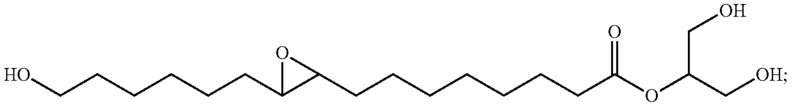
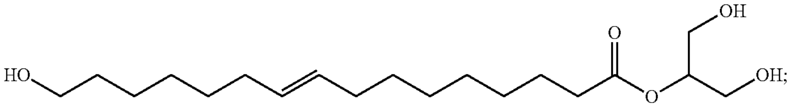
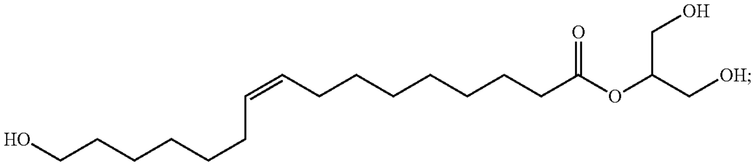
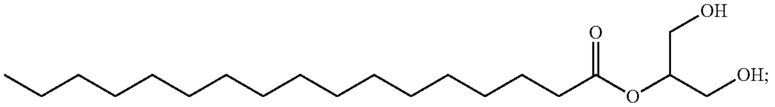
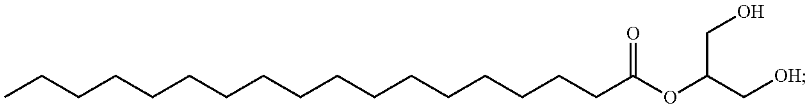
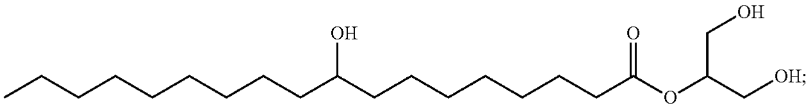
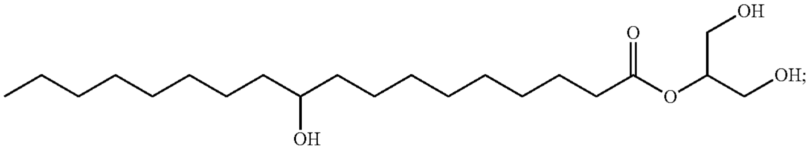
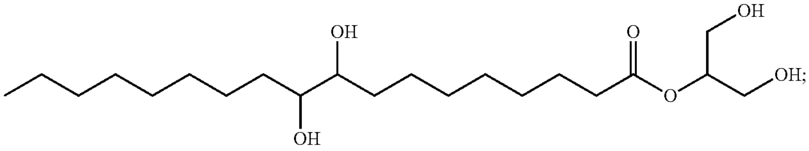
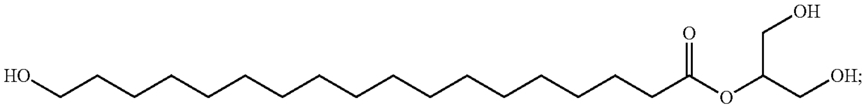

-continued
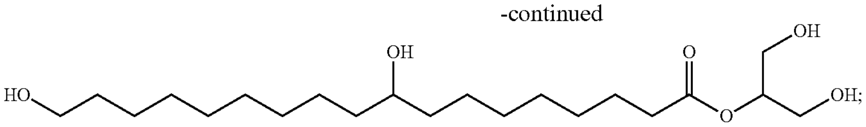
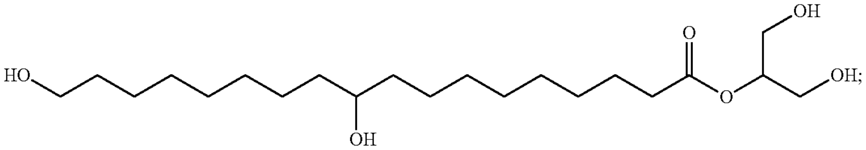
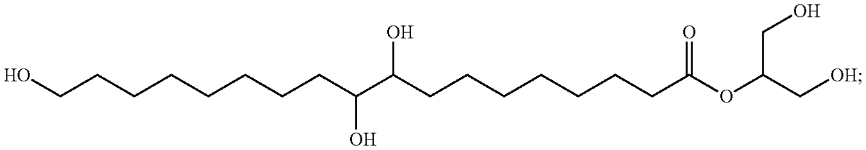
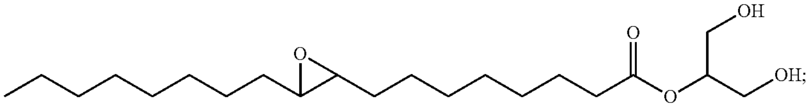
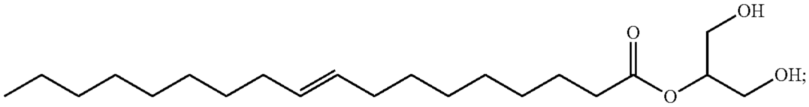
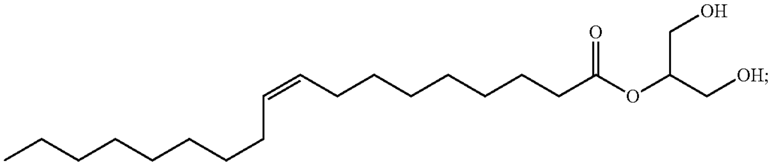
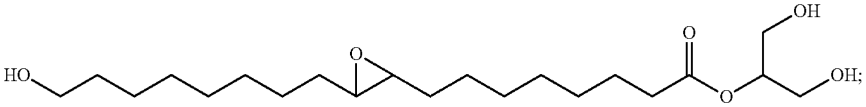
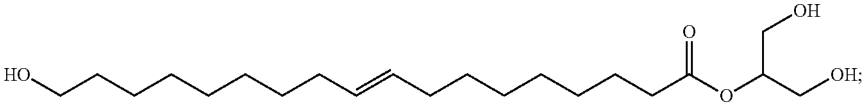
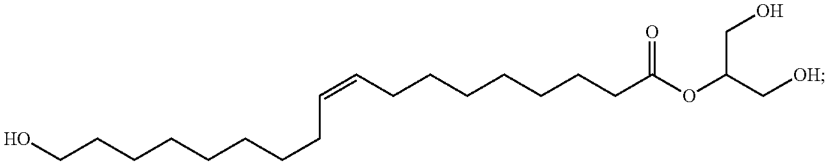
In some embodiments the compound of Formula IA is selected from the group consisting of:
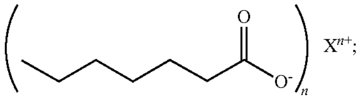
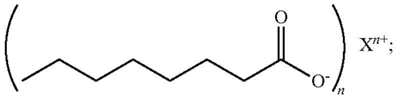
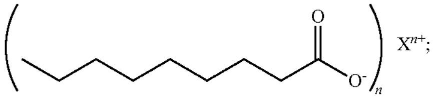
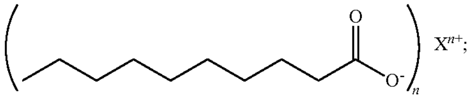
-continued
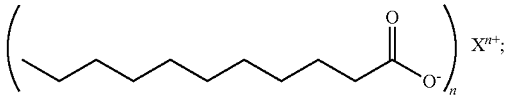
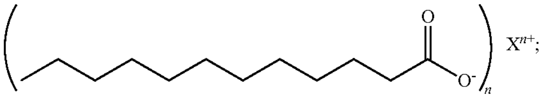
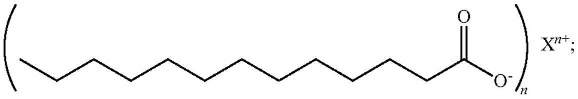
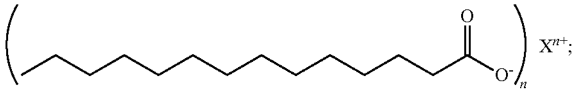
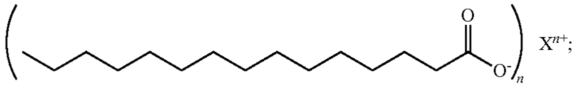

-continued

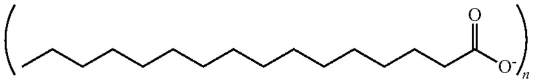 $X^{n+}$;

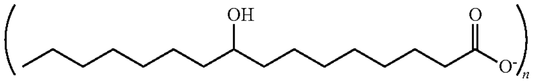 $X^{n+}$;

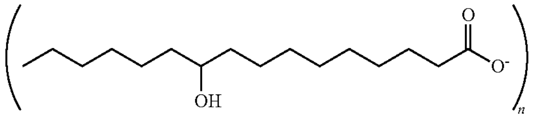 $X^{n+}$;

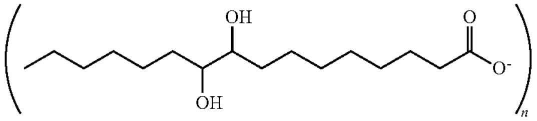 $X^{n+}$;

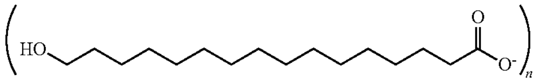 $X^{n+}$;

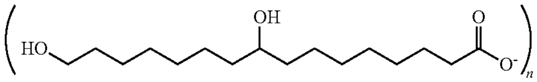 $X^{n+}$;

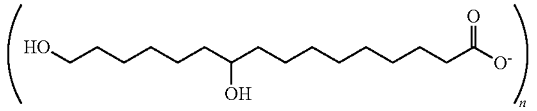 $X^{n+}$;

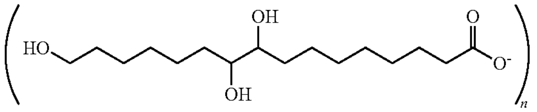 $X^{n+}$;

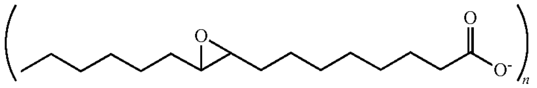 $X^{n+}$;

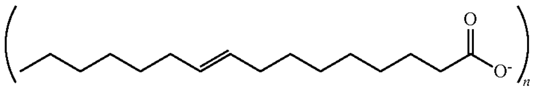 $X^{n+}$;

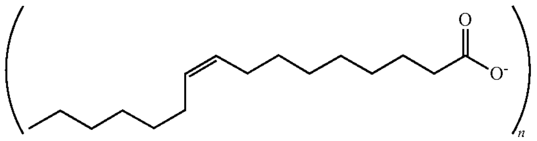 $X^{n+}$;

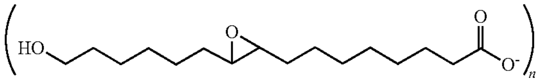 $X^{n+}$;

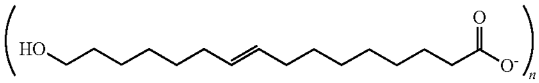 $X^{n+}$;

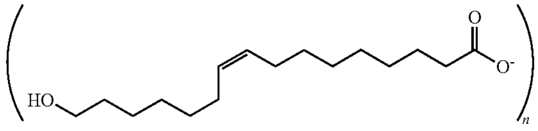 $X^{n+}$;

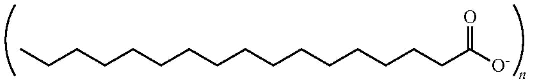 $X^{n+}$;

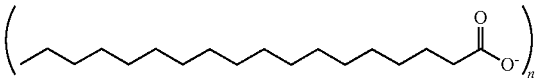 $X^{n+}$;

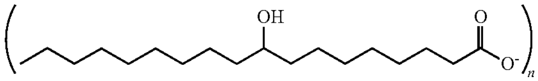 $X^{n+}$;

-continued

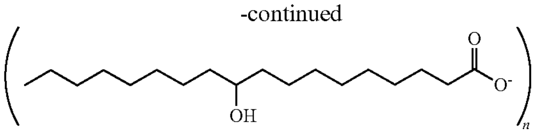 $X^{n+}$;

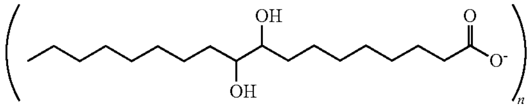 $X^{n+}$;

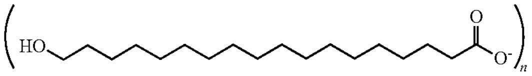 $X^{n+}$;

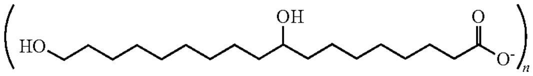 $X^{n+}$;

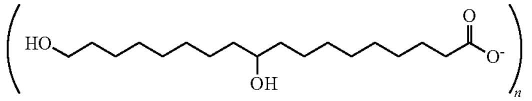 $X^{n+}$;

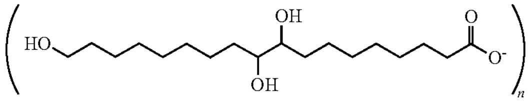 $X^{n+}$;

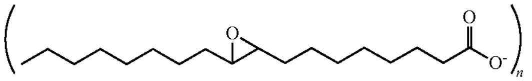 $X^{n+}$;

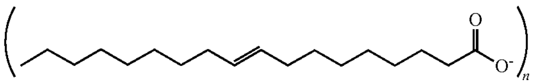 $X^{n+}$;

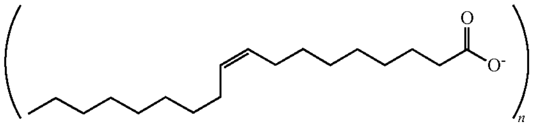 $X^{n+}$;

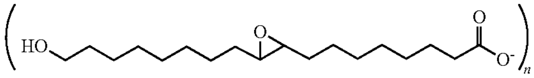 $X^{n+}$;

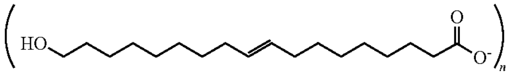 $X^{n+}$; or

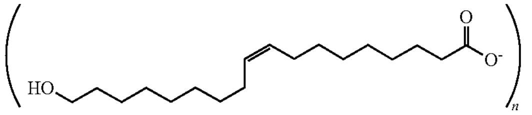 $X^{n+}$.

In some embodiments, the composition (e.g., coating or coating agent) comprises one or more (e.g., 1, 2, or 3) compounds of Formula IA. In some embodiments, the composition comprises one or more (e.g., 1, 2, or 3) compounds of Formula IA-A. In some embodiments, the composition comprises one or more (e.g., 1, 2, or 3) compounds of Formula IA-A-i. In some embodiments, the composition comprises one or more (e.g., 1, 2, or 3) compounds of Formula IA-A-ii. In some embodiments, the composition comprises one or more (e.g., 1, 2, or 3) compounds of Formula IA-B. In some embodiments, the composition comprises one or more (e.g., 1, 2, or 3) compounds of Formula IIA.

In some embodiments, each compound of Formula IA is a compound of Formula IA-A. In some embodiments, each compound of Formula IA-A is independently selected from a compound of Formula IA-A-i and a compound of Formula IA-A-ii. In some embodiments, each compound of Formula IA-A is a compound of Formula IA-A-i. In some embodiments, each compound of Formula IA-A is a compound of Formula IA-A-ii. In some embodiments, at least one (e.g., 1 or 2) compounds of Formula IA-A is a compound of Formula IA-A-i and at least one (e.g., 1 or 2) compounds of Formula IA-A is a compound of Formula IA-A-ii.

In some embodiments, the composition (e.g., coating or coating agent) comprises one compound of Formula IA-A and one compound of Formula IA-B. In some embodiments, the composition comprises one compound of Formula IA-A-i and one compound of Formula IA-B. In some embodiments, the composition comprises one compound of Formula IA-A-ii and one compound of Formula IA-B. In some embodiments, the composition comprises one compound of Formula IA-A-i, one compound of Formula IA-A-ii, and one compound of Formula IA-B.

In some embodiments, the composition (e.g., coating or coating agent) comprises one compound of Formula IA-A-i and one compound of Formula IA-A-ii. In some embodiments, the composition comprises two compounds of Formula IA-A-i. In some embodiments, the composition comprises two compounds of Formula IA-A-ii.

In some embodiments, the composition (e.g., coating or coating agent) comprises one or more (e.g., 1, 2, or 3) compounds of Formula IA and one or more (e.g., 1, 2, or 3) compounds of Formula IIA. In some embodiments, the composition comprises one compound of Formula IA and one compound of Formula IIA. In some embodiments, the composition comprises two compounds of Formula IA and one compound of Formula IIA. In some embodiments, the composition comprises one compound of Formula IA and two compounds of Formula IIA. In some embodiments, the composition comprises two compounds of Formula IA and two compounds of Formula IIA.

In some embodiments, the composition (e.g., coating or coating agent) comprises one or more (e.g., 1, 2, or 3) compounds of Formula IA-A and one or more (e.g., 1, 2, or 3) compounds of Formula IIA. In some embodiments, the composition comprises one compound of Formula IA-A and one compound of Formula IIA. In some embodiments, the composition comprises two compounds of Formula IA-A and one compound of Formula IIA. In some embodiments, the composition comprises one compound of Formula IA-A and two compounds of Formula IIA. In some embodiments, the composition comprises two compounds of Formula IA-A and two compounds of Formula IIA.

In some embodiments, the composition (e.g., coating or coating agent) comprises one or more (e.g., 1, 2, or 3) compounds of Formula IA-A-i and one or more (e.g., 1, 2, or 3) compounds of Formula IIA. In some embodiments, the composition comprises one compound of Formula IA-A-i and one compound of Formula IIA. In some embodiments, the composition comprises two compounds of Formula IA-A-i and one compound of Formula IIA. In some embodiments, the composition comprises one compound of Formula IA-A-i and two compounds of Formula IIA. In some embodiments, the composition comprises two compounds of Formula IA-A-i and two compounds of Formula IIA.

In some embodiments, the composition (e.g., coating or coating agent) comprises a first compound of Formula IA-A-i wherein the sum of o and p is from 9 to 17 (e.g., from 11 to 13 (e.g., 13)); a second compound of Formula IA-A-i wherein the sum of o and p is from 0 to 8 (e.g., from 5 to 7 (e.g., 7)); and one compound of Formula IIA. In some embodiments, the composition comprises a first compound of Formula IA-A-i wherein the sum of o and p is from 9 to 17 (e.g., from 11 to 13); a second compound of Formula IA-A-i wherein the sum of o and p is from 0 to 8 (e.g., from 5 to 7); and two compounds of Formula IIA.

In some embodiments, the composition (e.g., coating or coating agent) comprises a first compound of Formula IA-A-i wherein the sum of o and p is from 9 to 17 (e.g., from 11 to 13 (e.g., 13)); a second compound of Formula IA-A-i wherein the sum of o and p is from 9 to 17 (e.g., from 11 to 13 (e.g., 11)); and one compound of Formula IIA. In some embodiments, the composition comprises a first compound of Formula IA-A-i wherein the sum of o and p is from 9 to 17 (e.g., from 11 to 13); a second compound of Formula IA-A-i wherein the sum of o and p is from 9 to 17 (e.g., from 11 to 13); and two compounds of Formula IIA.

In some embodiments, the composition (e.g., coating or coating agent) comprises one or more (e.g., 1, 2, or 3) compounds of Formula IA-A-ii and one or more (e.g., 1, 2, or 3) compounds of Formula IIA. In some embodiments, the composition comprises one compound of Formula IA-A-ii and one compound of Formula IIA. In some embodiments, the composition comprises two compounds of Formula IA-A-ii and one compound of Formula IIA. In some embodiments, the composition comprises one compound of Formula IA-A-ii and two compounds of Formula IIA. In some embodiments, the composition comprises two compounds of Formula IA-A-ii and two compounds of Formula IIA.

In some embodiments, the composition (e.g., coating or coating agent) comprises one or more (e.g., 1, 2, or 3) compounds of Formula IA-A-i, one or more (e.g., 1, 2, or 3) compounds of Formula IA-A-ii, and one or more (e.g., 1, 2, or 3) compounds of Formula IIA. In some embodiments, the composition comprises one compound of Formula IA-A-i, one compound of Formula IA-A-ii, and one compound of Formula IIA. In some embodiments, the composition comprises two compounds of Formula IA-A-i, one compound of Formula IA-A-ii, and one compound of Formula IIA. In some embodiments, the composition comprises one compound of Formula IA-A-i, two compounds of Formula IA-A-ii, and one compound of Formula IIA. In some embodiments, the composition comprises two compounds of Formula IA-A-i, two compounds of Formula IA-A-ii, and one compound of Formula IIA. In some embodiments, the composition comprises one compound of Formula IA-A-i, one compound of Formula IA-A-ii, and two compounds of Formula IIA. In some embodiments, the composition comprises two compounds of Formula IA-A-i, one compound of Formula IA-A-ii, and two compounds of Formula IIA. In some embodiments, the composition comprises one compound of Formula IA-A-i, two compounds of Formula IA-A-ii, and two compounds of Formula IIA. In some embodiments, the composition comprises two compounds of Formula IA-A-i, two compounds of Formula IA-A-ii, and two compounds of Formula IIA.

In some embodiments, when the composition (e.g., coating or coating agent) comprises two or more compounds of Formula IA, Formula IA-A, Formula IA-A-i, Formula IA-A-ii, Formula IA-B, and/or Formula IIA, the weight ratio of the two compounds is from about 1:1 to about 10:1. For example, from about 1:1 to about 8:1, from about 1:1 to about 6:1, from about 1:1 to about 4:1, from about 1:1 to about 3:1, from about 1:1 to about 2:1, from about 2:1 to about 4:1, from about 4:1 to about 6:1, from about 6:1 to about 8:1, from about 8:1 to about 10:1, about 1:1, about 1:2, about 1:4, about 1:6, about 1:8, or about 1:10.

In some embodiments, when the composition (e.g., coating or coating agent) comprises two or more compounds of Formula IA, Formula IA-A, Formula IA-A-i, Formula IA-A-ii, Formula IA-B, and/or Formula IIA, the sum of o and p of at least two compounds is different. In some embodiments, when the composition comprises two or more compounds of Formula IA, Formula IA-A, Formula IA-A-i, Formula IA-A-ii, Formula IA-B, and/or Formula IIA, the sum of o and p of at least two compounds is the same.

In some embodiments, the composition (e.g., coating or coating agent) comprises from about 40% to about 100% by weight of the one or more compounds of Formula IA, Formula IA-A, Formula IA-A-i, Formula IA-A-ii, and Formula IA-B. For example, the composition comprises from about 40% to about 45%, from about 45% to about 50%, from about 50% to about 55%, from about 55% to about 60%, from about 60% to about 65%, from about 65% to about 70%, from about 65% to about 99%, from about 70% to about 75%, from about 75% to about 80%, from about 80% to about 85%, from about 85% to about 90%, from about 90% to about 95%, from about 95% to about 100%, from about 40% to about 50%, from about 50% to about 60%, from about 60% to about 70%, from about 70% to about 80%, from about 80% to about 90%, from about 90% to about 100%, from about 40% to about 60%, from about 60% to about 80%, from about 80% to about 100%, from about 60% to about 100%, from about 70% to about 100%, from about 40% to about 99%, from about 60% to about 99%, from about 70% to about 99%, from about 80% to about 99%, from about 85% to about 99%, from about 90% to about 99%, from about 92% to about 98%, from about 92% to about 96%, from about 93% to about 95%, from about 62% to about 78%, from about 65% to about 75%, from about 67% to about 73%, from about 69% to about 71%, about 68%, about 69%, about 70%, about 71%, about 72%, about 92%, about 93%, about 94%, about 95%, about 96%, about 97%, about 98%, or about 99% by weight of the one or more compounds of Formula IA, Formula IA-A, Formula IA-A-i, Formula IA-A-ii, and Formula IA-B. For example, the composition comprises from about 60% to about 80%, about 70%, from about 85% to about 99%, about 95%, or about 96% by weight of the one or more compounds of Formula IA, Formula IA-A, Formula IA-A-i, Formula IA-A-ii, and Formula IA-B.

In some embodiments, when the composition (e.g., coating or coating agent) comprises two compounds of Formula IA, Formula IA-A, Formula IA-A-i, Formula IA-A-ii, and/or Formula IA-B (for example, two compounds of Formula IA-A-i, two compounds of Formula IA-A-ii, or one compound of Formula IA-A-i and one compound of Formula IA-A-ii), each compound is independently from about 0.1% to about 99% by weight of the composition. For example, one compound is from about 20% to about 70%, from about 60% to about 99%, from about 70% to about 99%, from about 80% to about 95%, 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 20% to about 30%, from about 30% to about 40%, from about 40% to about 50%, from about 50% to about 60%, from about 60% to about 70%, from about 20% to about 40%, from about 40% to about 60%, from about 20% to about 50%, from about 25% to about 45%, from about 30% to about 40%, from about 32% to about 38%, from about 33% to about 63%, from about 38% to about 58%, from about 43% to about 53%, from about 45% to about 51%, from about 0.1% to about 5%, from about 0.1% to about 3%, from about 0.1 to about 34%, about 35%, about 36%, about 47%, about 48%, or about 49% by weight of the composition; and the other compound is from about 20% to about 70%, from about 60% to about 99%, from about 70% to about 99%, from about 80% to about 95%, 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 20% to about 30%, from about 30% to about 40%, from about 40% to about 50%, from about 50% to about 60%, from about 60% to about 70%, from about 20% to about 40%, from about 40% to about 60%, from about 20% to about 50%, from about 25% to about 45%, from about 30% to about 40%, from about 32% to about 38%, from about 33% to about 63%, from about 38% to about 58%, from about 43% to about 53%, from about 45% to about 51%, from about 0.1% to about 5%, from about 0.1% to about 3%, from about 0.1 to about 34%, about 35%, about 36%, about 47%, about 48%, or about 49% by weight of the composition. In some embodiments, when the composition comprises two compounds of Formula IA, Formula IA-A, Formula IA-A-i, Formula IA-A-ii, and/or Formula IA-B (for example, two compounds of Formula IA-A-i, two compounds of Formula IA-A-ii, or one compound of Formula IA-A-i and one compound of Formula IA-A-ii), the molar ratio or weight ratio of the two compounds is from about 350:1 to about 1:10. For example, from about 330:1 to about 50:1, from about 50:1 to about 10:1, from about 10:1 to about 1:1, from about 1:1 to about 8:1, from about 1:1 to about 6:1, from about 1:1 to about 4:1, from about 1:1 to about 3:1, from about 1:1 to about 2:1, from about 2:1 to about 4:1, from about 4:1 to about 6:1, from about 6:1 to about 8:1, from about 8:1 to about 10:1, from about 10:1 to about 2:1, from about 3:1 to about 1:3, about 316:1, about 200:1, about 189:1, about 77:1, about 31:1, about 15:1, about 13:1, about 6:1, about 5:1, about 1:2, about 1:4, about 1:6, about 1:8, or about 1:10, or about 1:1. For example, about 1:1.

In some embodiments, the composition (e.g., coating or coating agent) comprises from about 1% to about 50% by weight of the one or more compounds of Formula IIA. For example, the composition comprises from about 1% to about 10%, from about 10% to about 20%, from about 20% to about 30%, from about 30% to about 40%, from about 40% to about 50%, from about 10% to about 40%, from about 10% to about 30%, from about 10% to about 35%, from about 1% to about 20%, from about 10% to about 50%, from about 20% to about 40%, from about 15% to about 45%, from about 25% to about 35%, from about 28% to about 32%, from about 1% to about 10%, from about 2% to about 10%, from about 3% to about 9%, from about 4% to about 8%, from about 4% to about 6%, about 3%, about 4%, about 5%, about 6%, about 7%, about 8%, about 29%, about 30%, or about 31% by weight of the one or more compounds of Formula IIA. In some embodiments, when the composition comprises two compounds of Formula IIA, the molar ratio or weight ratio of the two compounds is from about 1:20 to about 20:1. For example, from about 1:10 to about 10:1, from about 1:10 to about 2:1, from about 1:4 to about 1:2, from about 1:3 to about 3:1, from about 1:2 to about 2:1, or about 1:1. For example, about 1:1.

In some embodiments, when the composition (e.g., coating or coating agent) comprises two compounds of Formula IIA, each compound is independently from about 1% to about 49% by weight of the composition. For example, one compound is from about 1% to about 7%, from about 10% to about 20%, from about 20% to about 30%, from about 30% to about 40%, from about 40% to about 49%, from about 1% to about 15%, from about 1% to about 10%, from about 1% to about 20%, from about 10% to about 49%, from about 20% to about 40%, from about 7% to about 25%, from about 12% to about 18%, from about 13% to about 17%, from about 1% to about 10%, from about 2% to about 5%, from about 3% to about 4%, about 1%, about 2%, about 3%, about 4%, about 5%, about 6%, about 7%, about 8%, about 9%, about 10%, about 11%, about 12%, about 13%, about 14%, about 15%, about 16%, or about 17% by weight of the composition; and the other compound is from about 1% to about 7%, from about 10% to about 20%, from about 20% to about 30%, from about 30% to about 40%, from about 40% to about 49%, from about 1% to about 15%, from about 1% to about 10%, from about 1% to about 20%, from about 10% to about 49%, from about 20% to about 40%, from about 7% to about 25%, from about 12% to about 18%, from about 13% to about 17%, from about 1% to about 10%, from about 2% to about 5%, from about 3% to about 4%, about 1%, about 2%, about 3%, about 4%, about 5%, about 6%, about 7%, about 8%, about 9%, about 10%, about 11%, about 12%, about 13%, about 14%, about 15%, about 16%, or about 17% by weight of the composition.

In some embodiments, when the composition (e.g., coating or coating agent) comprises a compound of Formula IA-A-i and a compound of Formula IA-A-ii, the weight or molar ratio of the compound of Formula IA-A-i to the compound of Formula IA-A-ii is from about 1:10 to about 10:1. For example, from about 1:10 to about 2:1, from about 1:8 to about 2:1, from about 1:4 to about 2:1, from about 1:3 to about 2:1, from about 1:2 to about 2:1, from about 1:10 to about 1:1, from about 1:8 to about 1:1, from about 4:1 to about 1:1, from about 3:1 to about 1:1, from about 2:1 to about 1:1, about 3:1, about 2:1, or about 1:1. In some embodiments, the weight or molar ratio of the compound of Formula IA-A-ii to the compound of Formula IA-A-i is from about 1:10 to about 10:1. For example, from about 1:10 to about 2:1, from about 1:8 to about 2:1, from about 1:4 to about 2:1, from about 1:3 to about 2:1, from about 1:2 to about 2:1, from about 1:10 to about 1:1, from about 1:8 to about 1:1, from about 4:1 to about 1:1, from about 3:1 to about 1:1, from about 2:1 to about 1:1, about 3:1, about 2:1, or about 1:1.

In some embodiments, when the composition (e.g., coating or coating agent) comprises two compounds of Formula IA-A-i, the weight or molar ratio of one of the compounds of Formula IA-A-i to the other of the compounds of Formula IA-A-i is from about 1:10 to about 10:1. For example, from about 1:10 to about 2:1, from about 1:8 to about 2:1, from about 1:4 to about 2:1, from about 1:3 to about 2:1, from about 1:2 to about 2:1, from about 1:10 to about 1:1, from about 1:8 to about 1:1, from about 4:1 to about 1:1, from about 3:1 to about 1:1, from about 2:1 to about 1:1, about 3:1, about 2:1, or about 1:1. For example, about 1:1.

In some embodiments, when the composition (e.g., coating or coating agent) comprises two compounds of Formula IA-A-ii, the weight or molar ratio of one of the compounds of Formula IA-A-ii to the other of the compounds of Formula IA-A-ii is from about 1:10 to about 10:1. For example, from about 1:10 to about 2:1, from about 1:8 to about 2:1, from about 1:4 to about 2:1, from about 1:3 to about 2:1, from about 1:2 to about 2:1, from about 1:10 to about 1:1, from about 1:8 to about 1:1, from about 4:1 to about 1:1, from about 3:1 to about 1:1, from about 2:1 to about 1:1, about 3:1, about 2:1, or about 1:1.

In some embodiments, the composition (e.g., coating or coating agent) comprises a compound of Formula IA-A-i and a compound of Formula IIA. In some embodiments, the weight or molar ratio of the compound of Formula IA-A-i to the compound of Formula IIA is from about 30:1 to about 1:1. For example, from about 25:1 to about 2:1, from about 20:1 to about 2:1, from about 10:1 to about 3:1, from about 7:1 to about 3:1, from about 5:1 to about 2:1, from about 4:1 to about 2:1, from about 25:1 to about 15:1, from about 22:1 to about 18:1, from about 88:12 to about 99:1, from about 90:10 to about 97:3, from about 92:8 to about 96:4, from about 93:7 to about 95:5, about 20:1, about 4:1, about 94:6, or about 70:30. In some embodiments, the composition comprises about 40% to about 100% by weight of the compound of Formula IA-A-i. For example, the composition comprises from about 40% to about 45%, from about 45% to about 50%, from about 50% to about 55%, from about 55% to about 60%, from about 60% to about 65%, from about 65% to about 70%, from about 65% to about 99%, from about 70% to about 75%, from about 75% to about 80%, from about 80% to about 85%, from about 85% to about 90%, from about 90% to about 95%, from about 95% to about 100%, from about 40% to about 50%, from about 50% to about 60%, from about 60% to about 70%, from about 70% to about 80%, from about 80% to about 90%, from about 90% to about 100%, from about 40% to about 60%, from about 60% to about 80%, from about 80% to about 100%, from about 60% to about 100%, from about 70% to about 100%, from about 40% to about 99%, from about 60% to about 99%, from about 70% to about 99%, from about 70% to about 94%, from about 80% to about 99%, from about 85% to about 99%, from about 90% to about 99%, from about 92% to about 98%, from about 92% to about 96%, from about 93% to about 95%, from about 62% to about 78%, from about 65% to about 75%, from about 67% to about 73%, from about 69% to about 71%, about 68%, about 69%, about 70%, about 71%, about 72%, about 75%, about 80%, about 85%, about 90%, about 92%, about 93%, about 94%, about 95%, about 96%, about 97%, about 98%, or about 99% by weight of the compound of Formula IA-A-i. For example, the composition comprises from about 60% to about 80%, about 70%, from about 85% to about 99%, about 95%, or about 96% by weight of the compound of Formula IA-A-i. In some embodiments, the composition comprises about 1% to about 50% by weight of the compound of Formula IIA. For example, the composition comprises from about 1% to about 10%, from about 10% to about 20%, from about 20% to about 30%, from about 30% to about 40%, from about 40% to about 50%, from about 1% to about 40%, from about 1% to about 35%, from about 1% to about 30%, from about 1% to about 20%, from about 10% to about 50%, from about 20% to about 40%, from about 15% to about 45%, from about 10% to about 20%, from about 20% to about 30%, from about 25% to about 35%, from about 28% to about 32%, from about 6% to about 30%, from about 1% to about 10%, from about 2% to about 10%, from about 3% to about 9%, from about 4% to about 8%, from about 4% to about 6%, about 3%, about 4%, about 5%, about 6%, about 7%, about 8%, about 10%, about 15%, about 20%, about 25%, about 29%, about 30%, or about 31% by weight of the compound of Formula IIA. In some embodiments, in the compound of Formula IA-A-i, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$ and $R^{11B}$ is H; and the sum of o and p is from 11 to 13. For example, the compound of Formula IA-A-i is 2,3-dihydroxypropan-1-yl octadecanoate. In some embodiments, in the compound of Formula IIA, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$, and $R^{11B}$ is H; and the sum of o and p is from 11 to 13. For example, the compound of Formula IIA is sodium stearate. In some embodiments, the composition comprises about 70% 2,3-dihydroxypropan-1-yl octadecanoate and about 30% sodium stearate. In some embodiments, the composition comprises about 94% 2,3-dihydroxypropan-1-yl octadecanoate and about 6% sodium stearate. In some embodiments, the composition comprises 2,3-dihydroxypropan-1-yl octadecanoate and sodium stearate in a weight ratio of about 70:30 or about 94:6. In some embodiments, the composition further comprises citric acid, sodium bicarbonate, or both. In some embodiments, the composition comprises citric acid and sodium bicarbonate. In some embodiments, the molar ratio of the citric acid to sodium bicarbonate is from about 1:5 to about 1:1, for example, about 1:3 to about 1:1, about 1:3 to about 1:2, about 1:3, about 1:2, or about 1:1. In some embodiments, the weight percentage of citric acid in the composition is from about 0.2% to about 2%, for example, about 0.25% to about 1.5%, about 0.25%, about 0.5%, about 1%, or about 1.5%. In some embodiments, the weight percentage of sodium bicarbonate in the composition is from about 0.2% to about 2%, for example, about 0.25% to about 1.5%, about 0.25%, about 0.5%, about 1%, or about 1.5%. In some embodiments, the collective weight percentage of citric acid and sodium bicarbonate in the composition is from about 0.2% to about 2%, for example, about 0.25% to about 1.5%, about 0.25%, about 0.5%, about 1%, or about 1.5%.

In some embodiments, the composition (e.g., coating or coating agent) comprises a compound of Formula IA-A-i and two compounds of Formula IIA. In some embodiments, the weight or molar ratio of the compound of Formula IA-A-i to both compounds of Formula IIA is from about 30:1 to about 1:1. For example, from about 25:1 to about 2:1, from about 20:1 to about 2:1, from about 10:1 to about 3:1, from about 7:1 to about 3:1, from about 5:1 to about 2:1, from about 4:1 to about 2:1, from about 25:1 to about 15:1, from about 22:1 to about 18:1, from about 88:12 to about 99:1, from about 90:10 to about 97:3, from about 92:8 to about 96:4, from about 93:7 to about 95:5, about 20:1, about 4:1, about 94:6, or about 70:30. In some embodiments, the weight or molar ratio of one compound of Formula IIA to the other compound of Formula IIA is from about 1:20 to about 20:1. For example, from about 1:10 to about 10:1, from about 1:10 to about 2:1, from about 1:4 to about 1:2, from about 1:3 to about 3:1, from about 1:2 to about 2:1, or about 1:1. For example, about 1:1. In some embodiments, the composition comprises about 40% to about 100% by weight of the compound of Formula IA-A-i. For example, the composition comprises from about 40% to about 45%, from about 45% to about 50%, from about 50% to about 55%, from about 55% to about 60%, from about 60% to about 65%, from about 65% to about 70%, from about 65% to about 99%, from about 70% to about 75%, from about 75% to about 80%, from about 80% to about 85%, from about 85% to about 90%, from about 90% to about 95%, from about 95% to about 100%, from about 40% to about 50%, from about 50% to about 60%, from about 60% to about 70%, from about 70% to about 80%, from about 80% to about 90%, from about 90% to about 100%, from about 40% to about 60%, from about 60% to about 80%, from about 80% to about 100%, from about 60% to about 100%, from about 70% to about 100%, from about 40% to about 99%, from about 60% to about 99%, from about 70% to about 99%, from about 70% to about 94%, from about 80% to about 99%, from about 85% to about 99%, from about 90% to about 99%, from about 92% to about 98%, from about 92% to about 96%, from about 93% to about 95%, from about 62% to about 78%, from about 65% to about 75%, from about 67% to about 73%, from about 69% to about 71%, about 68%, about 69%, about 70%, about 71%, about 72%, about 75%, about 80%, about 85%, about 90%, about 92%, about 93%, about 94%, about 95%, about 96%, about 97%, about 98%, or about 99% by weight of the compound of Formula IA-A-i. For example, the composition comprises from about 60% to about 80%, about 70%, from about 85% to about 99%, about 95%, or about 96% by weight of the compound of Formula IA-A-i. In some embodiments, the composition comprises about 1% to about 50% by weight of both compounds of Formula IIA. For example, the composition comprises from about 1% to about 10%, from about 10% to about 20%, from about 20% to about 30%, from about 30% to about 40%, from about 40% to about 50%, from about 1% to about 40%, from about 1% to about 35%, from about 1% to about 30%, from about 1% to about 20%, from about 10% to about 50%, from about 20% to about 40%, from about 15% to about 45%, from about 10% to about 20%, from about 20% to about 30%, from about 25% to about 35%, from about 28% to about 32%, from about 6% to about 30%, from about 1% to about 10%, from about 2% to about 10%, from about 3% to about 9%, from about 4% to about 8%, from about 4% to about 6%, about 3%, about 4%, about 5%, about 6%, about 7%, about 8%, about 10%, about 15%, about 20%, about 25%, about 29%, about 30%, or about 31% by weight of both compounds of Formula IIA. In some embodiments, in the compound of Formula IA-A-i, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$ and $R^{11B}$ is H; and the sum of o and p is from 11 to 13. For example, the compound of Formula IA-A-i is 2,3-dihydroxypropan-1-yl octadecanoate. In some embodiments, in each compound of Formula IIA, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$, and $R^{11B}$ is H; and the sum of o and p is from 11 to 13. In some embodiments, the sum of o and p in one compound of Formula IIA is 13 and the sum of o and p in the other compound of Formula IIA is 11. For example, one compound of Formula IIA is sodium stearate and the other compound of Formula IIA is sodium palmitate. In some embodiments, the composition comprises about 70% 2,3-dihydroxypropan-1-yl octadecanoate and about 30% of sodium stearate and sodium palmitate in a 1:1 weight ratio. In some embodiments, the composition comprises about 94% 2,3-dihydroxypropan-1-yl octadecanoate and about 6% sodium stearate and sodium palmitate in a 1:1 weight ratio. In some embodiments, the composition comprises 2,3-dihydroxypropan-1-yl octadecanoate, sodium stearate, and sodium palmitate in a weight ratio of about 70:15:15 or about 94:3:3. In some embodiments, the composition further comprises citric acid, sodium bicarbonate, or both.

In some embodiments, the molar ratio of the citric acid to sodium bicarbonate is from about 1:5 to about 1:1, for example, about 1:3 to about 1:1, about 1:3 to about 1:2, about 1:3, about 1:2, or about 1:1. In some embodiments, the weight percentage of citric acid in the composition is from about 0.2% to about 2%, for example, about 0.25% to about 1.5%, about 0.25%, about 0.5%, about 1%, or about 1.5%. In some embodiments, the weight percentage of sodium bicarbonate in the composition is from about 0.2% to about 2%, for example, about 0.25% to about 1.5%, about 0.25%, about 0.5%, about 1%, or about 1.5%. In some embodiments, the collective weight percentage of citric acid and sodium bicarbonate in the composition is from about 0.2% to about 2%, for example, about 0.25% to about 1.5%, about 0.25%, about 0.5%, about 1%, or about 1.5%.

In some embodiments, the composition (e.g., coating or coating agent) comprises a first compound of Formula IA-A-i, a second compound of Formula IA-A-i, and one compound of Formula IIA. In some embodiments, the weight or molar ratio of the compound of both compounds of Formula IA-A-i to the compound of Formula IIA is from about 30:1 to about 1:1. For example, from about 25:1 to about 2:1, from about 20:1 to about 2:1, from about 10:1 to about 3:1, from about 7:1 to about 3:1, from about 5:1 to about 2:1, from about 4:1 to about 2:1, from about 25:1 to about 15:1, from about 22:1 to about 18:1, from about 88:12 to about 99:1, from about 90:10 to about 97:3, from about 92:8 to about 96:4, from about 93:7 to about 95:5, about 20:1, about 4:1, about 94:6, or about 70:30. In some embodiments, the weight or molar ratio of one compound of Formula IA-A-i to the other compound of Formula IA-A-i is from about 1:20 to about 20:1. For example, from about 1:10 to about 10:1, from about 1:10 to about 2:1, from about 1:1 to about 8:1, from about 1:1 to about 6:1, from about 1:1 to about 4:1, from about 1:1 to about 3:1, from about 1:1 to about 2:1, from about 2:1 to about 4:1, from about 4:1 to about 6:1, from about 6:1 to about 8:1, from about 8:1 to about 10:1, from about 1:4 to about 1:2, from about 1:3 to about 3:1, from about 1:2 to about 2:1, about 1:1, about 1:2, about 1:4, about 1:6, about 1:8, or about 1:10, or about 1:1. For example, about 1:1. In some embodiments, the composition comprises about 40% to about 100% by weight of both compounds of Formula IA-A-i. For example, the composition comprises from about 40% to about 45%, from about 45% to about 50%, from about 50% to about 55%, from about 55% to about 60%, from about 60% to about 65%, from about 65% to about 70%, from about 65% to about 99%, from about 70% to about 75%, from about 75% to about 80%, from about 80% to about 85%, from about 85% to about 90%, from about 90% to about 95%, from about 95% to about 100%, from about 40% to about 50%, from about 50% to about 60%, from about 60% to about 70%, from about 70% to about 80%, from about 80% to about 90%, from about 90% to about 100%, from about 40% to about 60%, from about 60% to about 80%, from about 80% to about 100%, from about 60% to about 100%, from about 70% to about 100%, from about 40% to about 99%, from about 60% to about 99%, from about 70% to about 99%, from about 70% to about 94%, from about 80% to about 99%, from about 85% to about 99%, from about 90% to about 99%, from about 92% to about 98%, from about 92% to about 96%, from about 93% to about 95%, from about 62% to about 78%, from about 65% to about 75%, from about 67% to about 73%, from about 69% to about 71%, about 68%, about 69%, about 70%, about 71%, about 72%, about 75%, about 80%, about 85%, about 90%, about 92%, about 93%, about 94%, about 95%, about 96%, about 97%, about 98%, or about 99% by weight of both compounds of Formula IA-A-i. For example, the composition comprises from about 60% to about 80%, about 70%, from about 85% to about 99%, about 95%, or about 96% by weight of both compounds of Formula IA-A-i. In some embodiments, the composition comprises about 1% to about 50% by weight of the compound of Formula IIA. For example, the composition comprises from about 1% to about 10%, from about 10% to about 20%, from about 20% to about 30%, from about 30% to about 40%, from about 40% to about 50%, from about 1% to about 40%, from about 1% to about 35%, from about 1% to about 30%, from about 1% to about 20%, from about 10% to about 50%, from about 20% to about 40%, from about 15% to about 45%, from about 10% to about 20%, from about 20% to about 30%, from about 25% to about 35%, from about 28% to about 32%, from about 6% to about 30%, from about 1% to about 10%, from about 2% to about 10%, from about 3% to about 9%, from about 4% to about 8%, from about 4% to about 6%, about 3%, about 4%, about 5%, about 6%, about 7%, about 8%, about 10%, about 15%, about 20%, about 25%, about 29%, about 30%, or about 31% by weight of the compound of Formula IIA. In some embodiments, the weight or molar ratio of the first compound of Formula IA-A-i to the second compound of Formula IA-A-i to the compound of Formula IIA is about 47:47:6 or about 35:35:30. In some embodiments, the weight or molar ratio of the first compound of Formula IA-A-i to the second compound of Formula IA-A-i to the compound of Formula IIA is about 190:1:10, about 316:1:17, about 20:4:1, about 78:1:5, about 13:1:1, about 31:1:2, about 20:4:1, about 20:3:1, or about 18:1:1. In some embodiments, the composition comprises from about 25% to about 75% (e.g., from about 35% to about 65%, from about 40% to about 60%, from about 25% to about 45%, from about 30% to about 40%, from about 32% to about 38%, from about 42% to about 55%, about 34%, about 35%, about 36%, about 45%, about 46%, about 47%, about 48%, about 49% or about 50%) of the first compound of Formula IA-A-i, from about 25% to about 75% (e.g., from about 35% to about 65%, from about 40% to about 60%, from about 25% to about 45%, from about 30% to about 40%, from about 32% to about 38%, from about 42% to about 55%, about 34%, about 35%, about 36%, about 45%, about 46%, about 47%, about 48%, about 49% or about 50%) of the second compound of Formula IA-A-i, and from about 1% to about 40% (e.g., from about 10% to about 40%, from about 20% to about 40%, from about 25% to about 35%, from about 27% to about 33%, from about 1% to about 10%, from about 3% to about 8%, about 29%, about 30%, about 31%, about 6%, about 5%, or about 4%) of the compound of Formula IIA. In some embodiments, the composition comprises from about 75% to about 99% (e.g., from about 78% to about 96%, from about 85% to about 96%, about 81%, about 87%, about 89%, about 92%, about 93%, about 94%, or about 95%) of the first compound of Formula IA-A-i, from about 0.1% to about 20% (e.g., from about 0.1% to about 5%, from about 0.1% to about 10%, from about 3% to about 20%, from about 5% to about 15%, from about 10% to about 20%, about 0.3%, about 0.5%, about 1%, about 3%, about 6%, about 7%, about 14%, or about 17%) of the second compound of Formula IA-A-i, and about 1% to about 10% (e.g., from about 3% to about 8%, about 4%, about 5%, or about 6%) of the compound of Formula IIA. In some embodiments, in one compound of Formula IA-A-i, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$, and $R^{11B}$ is H; and the sum of o and p is from 11 to 13. In some embodiments, in the other compound of Formula IA-A-i, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$, and $R^{11B}$ is H; and the sum of o and p is from 7 to 9. For example, one compound of Formula IA-A-i is 2,3-dihydroxypropan-1-yl octadecanoate and the other compound of Formula IA-A-i is 2,3-dihydroxypropan-1-yl dodecanoate. In some embodiments, in the compound of Formula IIA, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$, and $R^{11B}$ is H; and the sum of o and p is from 11 to 13. For example, the compound of Formula IIA is sodium stearate. In some embodiments, the composition comprises about 70% 2,3-dihydroxypropan-1-yl octadecanoate and 2,3-dihydroxypropan-1-yl dodecanoate in a 1:1 weight ratio and about 30% of sodium stearate. In some embodiments, the composition comprises about 94% 2,3-dihydroxypropan-1-yl octadecanoate and 2,3-dihydroxypropan-1-yl dodecanoate in a 1:1 weight ratio and about 6% sodium stearate. In some embodiments, the composition comprises 2,3-dihydroxypropan-1-yl octadecanoate, 2,3-dihydroxypropan-1-yl dodecanoate, and sodium stearate in a weight ratio of about 35:35:30 or about 47:47:6. In some embodiments, the composition further comprises citric acid, sodium bicarbonate, or both. In some embodiments, the molar ratio of the citric acid to sodium bicarbonate is from about 1:5 to about 1:1, for example, about 1:3 to about 1:1, about 1:3 to about 1:2, about 1:3, about 1:2, or about 1:1. In some embodiments, the weight percentage of citric acid in the composition is from about 0.2% to about 2%, for example, about 0.25% to about 1.5%, about 0.25%, about 0.5%, about 1%, or about 1.5%. In some embodiments, the weight percentage of sodium bicarbonate in the composition is from about 0.2% to about 2%, for example, about 0.25% to about 1.5%, about 0.25%, about 0.5%, about 1%, or about 1.5%. In some embodiments, the collective weight percentage of citric acid and sodium bicarbonate in the composition is from about 0.2% to about 2%, for example, about 0.25% to about 1.5%, about 0.25%, about 0.5%, about 1%, or about 1.5%.

In some embodiments, the composition (e.g., coating or coating agent) comprises a first compound of Formula IA-A-i, a second compound of Formula IA-A-i, a first compound of Formula IIA, and a second compound of Formula IIA. In some embodiments, the weight or molar ratio of the compound of both compounds of Formula IA-A-i to both compounds of Formula IIA is from about 30:1 to about 1:1. For example, from about 25:1 to about 2:1, from about 20:1 to about 2:1, from about 10:1 to about 3:1, from about 7:1 to about 3:1, from about 5:1 to about 2:1, from about 4:1 to about 2:1, from about 25:1 to about 15:1, from about 22:1 to about 18:1, from about 88:12 to about 99:1, from about 90:10 to about 97:3, from about 92:8 to about 96:4, from about 93:7 to about 95:5, about 20:1, about 4:1, about 94:6, or about 70:30. In some embodiments, the weight or molar ratio of one compound of Formula IA-A-i to the other compound of Formula IA-A-i is from about 1:20 to about 20:1. For example, from about 1:10 to about 10:1, from about 1:10 to about 2:1, from about 1:1 to about 8:1, from about 1:1 to about 6:1, from about 1:1 to about 4:1, from about 1:1 to about 3:1, from about 1:1 to about 2:1, from about 2:1 to about 4:1, from about 4:1 to about 6:1, from about 6:1 to about 8:1, from about 8:1 to about 10:1, from about 1:4 to about 1:2, from about 1:3 to about 3:1, from about 1:2 to about 2:1, about 1:1, about 1:2, about 1:4, about 1:6, about 1:8, or about 1:10, or about 1:1. For example, about 1:1. In some embodiments, the weight or molar ratio of one compound of Formula IIA to the other compound of Formula IIA is from about 1:20 to about 20:1. For example, from about 1:10 to about 10:1, from about 1:10 to about 2:1, from about 1:4 to about 1:2, from about 1:3 to about 3:1, from about 1:2 to about 2:1, or about 1:1. For example, about 1:1. In some embodiments, the composition comprises about 40% to about 100% by weight of both compounds of Formula IA-A-i. For example, the composition comprises from about 40% to about 45%, from about 45% to about 50%, from about 50% to about 55%, from about 55% to about 60%, from about 60% to about 65%, from about 65% to about 70%, from about 65% to about 99%, from about 70% to about 75%, from about 75% to about 80%, from about 80% to about 85%, from about 85% to about 90%, from about 90% to about 95%, from about 95% to about 100%, from about 40% to about 50%, from about 50% to about 60%, from about 60% to about 70%, from about 70% to about 80%, from about 80% to about 90%, from about 90% to about 100%, from about 40% to about 60%, from about 60% to about 80%, from about 80% to about 100%, from about 60% to about 100%, from about 70% to about 100%, from about 40% to about 99%, from about 60% to about 99%, from about 70% to about 99%, from about 70% to about 94%, from about 80% to about 99%, from about 85% to about 99%, from about 90% to about 99%, from about 92% to about 98%, from about 92% to about 96%, from about 93% to about 95%, from about 62% to about 78%, from about 65% to about 75%, from about 67% to about 73%, from about 69% to about 71%, about 68%, about 69%, about 70%, about 71%, about 72%, about 75%, about 80%, about 85%, about 90%, about 92%, about 93%, about 94%, about 95%, about 96%, about 97%, about 98%, or about 99% by weight of both compounds of Formula IA-A-i. For example, the composition comprises from about 60% to about 80%, about 70%, from about 85% to about 99%, about 95%, or about 96% by weight of both compounds of Formula IA-A-i. In some embodiments, the composition comprises about 1% to about 50% by weight of both compounds of Formula IIA. For example, the composition comprises from about 1% to about 10%, from about 10% to about 20%, from about 20% to about 30%, from about 30% to about 40%, from about 40% to about 50%, from about 1% to about 40%, from about 10% to about 35%, from about 10% to about 300%, from about 10% to about 20%, from about 10% to about 50%, from about 20% to about 40%, from about 15% to about 45%, from about 10% to about 20%, from about 20% to about 30%, from about 25% to about 35%, from about 28% to about 32%, from about 6% to about 30%, from about 1% to about 10%, from about 2% to about 10%, from about 3% to about 9%, from about 4% to about 8%, from about 4% to about 6%, about 3%, about 4%, about 5%, about 6%, about 7%, about 8%, about 10%, about 15%, about 20%, about 25%, about 29%, about 30%, or about 31% by weight of both compounds of Formula IIA. In some embodiments, the weight or molar ratio of the first compound of Formula IA-A-i to the second compound of Formula IA-A-i to the first compound of Formula IIA to the second compound of Formula IIA is about 47:47:3:3 or about 35:35:15:15. In some embodiments, the composition comprises from about 25% to about 75% (e.g., from about 35% to about 65%, from about 40% to about 60%, from about 25% to about 45%, from about 30% to about 40%, from about 32% to about 38%, from about 42% to about 55%, about 34%, about 35%, about 36%, about 45%, about 46%, about 47%, about 48%, about 49% or about 50%) of the first compound of Formula IA-A-i, from about 25% to about 75% (e.g., from about 35% to about 65%, from about 40% to about 60%, from about 25% to about 45%, from about 30% to about 40%, from about 32% to about 38%, from about 42% to about 55%, about 34%, about 35%, about 36%, about 45%, about 46%, about 47%, about 48%, about 49% or about 50%) of the second compound of Formula IA-A-i, from about 1% to about 30% (e.g., from about 10% to about 30%, from about 20% to about 30%, from about 10% to about 20%, from about 5% to about 20%, from about 12% to about 18%, about 14%, about 15%, or about 16%) of the first compound of Formula IIA, and from about 1% to about 30% (e.g., from about 10% to about 30%, from about 20% to about 30%, from about 10% to about 20%, from about 5% to about 20%, from about 12% to about 18%, about 14%, about 15%, or about 16%) of the second compound of Formula IIA. In some embodiments, in each compound of Formula IA-A-i, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$, and $R^{11B}$ is H; and the sum of o and p is from 11 to 13. For example, one compound of Formula IA-A-i is 2,3-dihydroxypropan-1-yl octadecanoate and the other compound of Formula IA-A-i is 2,3-dihydroxypropan-1-yl palmitate. In some embodiments, in each compound of Formula IIA, $R^{A1}$ and $R^{A2}$ are H; $R^1$, $R^2$, $R^3$, $R^4$, $R^5$, $R^6$, $R^7$, $R^8$, and $R^9$ are independently selected from H and OH; each occurrence of $R^{10A}$, $R^{10B}$, $R^{11A}$, and $R^{11B}$ is H; and the sum of o and p is from 11 to 13. In some embodiments, the sum of o and p in one compound of Formula IIA is 13 and the sum of o and p in the other compound of Formula IIA is 11. For example, one compound of Formula IIA is sodium stearate and the other compound of Formula IIA is sodium palmitate. In some embodiments, the composition comprises about 70% 2,3-dihydroxypropan-1-yl octadecanoate and 2,3-dihydroxypropan-1-yl palmitate in an about 1:1 weight ratio and about 30% of sodium stearate and sodium palmitate in an about 1:1 weight ratio. In some embodiments, the composition comprises about 94% 2,3-dihydroxypropan-1-yl octadecanoate and 2,3-dihydroxypropan-1-yl palmitate in an about 1:1 weight ratio and about 6% of sodium stearate and sodium palmitate in an about 1:1 weight ratio. In some embodiments, the composition comprises 2,3-dihydroxypropan-1-yl octadecanoate, 2,3-dihydroxypropan-1-yl palmitate, sodium stearate, and sodium palmitate in a weight ratio of about 35:35:15:15 or about 47:47:3:3. In some embodiments, the composition further comprises citric acid, sodium bicarbonate, or both. In some embodiments, the molar ratio of the citric acid to sodium bicarbonate is from about 1:5 to about 1:1, for example, about 1:3 to about 1:1, about 1:3 to about 1:2, about 1:3, about 1:2, or about 1:1. In some embodiments, the weight percentage of citric acid in the composition is from about 0.2% to about 2%, for example, about 0.25% to about 1.5%, about 0.25%, about 0.5%, about 1%, or about 1.5%. In some embodiments, the weight percentage of sodium bicarbonate in the composition is from about 0.2% to about 2%, for example, about 0.25% to about 1.5%, about 0.25%, about 0.5%, about 1%, or about 1.5%. In some embodiments, the collective weight percentage of citric acid and sodium bicarbonate in the composition is from about 0.2% to about 2%, for example, about 0.25% to about 1.5%, about 0.25%, about 0.5%, about 1%, or about 1.5%.

In some embodiments, less than 10% (e.g., less than 5%, less than 2%, less than 1%) by weight of the composition is diglycerides. In some embodiments, less than 10% (e.g., less than 5%, less than 2%, less than 1%) by weight of the composition is triglycerides. In some embodiments, the composition does not comprise an acetylated monoglyceride (e.g., a monoglyceride wherein the hydroxyl groups of the glyceryl moiety are acetylated).

Coating agents formed from or containing a high percentage of long chain fatty acids and/or salts or esters thereof (e.g., having a carbon chain length of at least 14) have been found to be effective at forming protective coatings over a variety of substrates that can prevent water loss from and/or oxidation of the substrate. The addition of one or more medium chain fatty acids and/or salts or esters thereof (or other wetting agents) can further improve the performance of the coatings. Accordingly, the coating agents herein can include one or more compounds of Formula I, wherein Formula I is:

(Formula I)

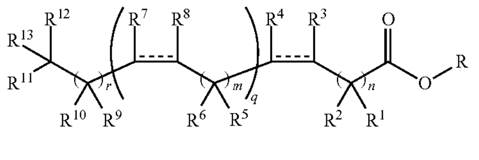

wherein:

R is selected from —H, -glyceryl, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl or heteroaryl is optionally substituted with one or more groups selected from halogen (e.g., Cl, Br, or I), hydroxyl, nitro, —CN, —$NH_2$,—SH, —$SR^{15}$, —$OR^{14}$, —$NR^{14}R^{15}$, $C_1$-$C_6$ alkyl, $C_2$-$C_6$ alkenyl, or $C_2$-$C_6$ alkynyl;

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)$OR^{14}$, —(C═O)—O—(C═O)$R^{14}$, —O(C═O)$R^{14}$, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —$OR^{14}$, —$NR^{14}R^{15}$, —$SR^{14}$, or halogen;

$R^3$, $R^4$, $R^7$, and $R^8$ are each independently, at each occurrence, —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —$OR^{14}$, —$NR^{14}R^{15}$, —$SR^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ------ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, R is selected from —H, —$CH_3$, or —$CH_2CH_3$. In some embodiments, R is selected from —H, -glyceryl, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl or heteroaryl is optionally substituted with one or more $C_1$-$C_6$ alkyl or hydroxyl.

In some embodiments, R is -glyceryl. In some embodiments, $R^1$, $R^2$, $R^5$, $R^6$, $R^9$, $R^{10}$, $R^{11}$, $R^{12}$ and $R^{13}$ are each independently selected from —H, —$C_1$-$C_6$ alkyl, and —OH. In some embodiments, $R^3$, $R^4$, $R^7$, and $R^8$ are each independently selected from —H, —$C_1$-$C_6$ alkyl, and —OH. In some embodiments, $R^3$ and $R^4$ combine with the carbon atoms to which they are attached to form a 3- to 6-membered ring heterocycle. In some embodiments, $R^7$ and $R^8$ combine with the carbon atoms to which they are attached to form a 3- to 6-membered ring heterocycle. In some embodiments, q is 1 and the sum of n, m, and r is from 10 to 12.

As further described herein, the coating agents can additionally or alternatively include fatty acid salts such as sodium salts (e.g., SA-Na, PA-Na, or MA-Na), potassium salts (e.g., SA-K, PA-K, MA-K), calcium salts (e.g., $(SA)_2$-Ca, $(PA)_2$-Ca, or $(MA)_2$-Ca) or magnesium salts (e.g., $(SA)_2$-Mg, $(PA)_2$-Mg, or $(MA)_2$-Mg). Accordingly, the coating agents herein can include one or more compounds of Formula II or Formula III, wherein Formula II and Formula III are:

(Formula II)

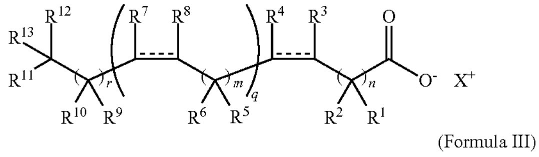

(Formula III)

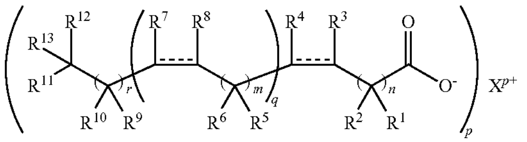

wherein for each formula:

X is a cationic moiety;

$X^{p+}$ is a cationic counter ion having a charge state p, and p is 1, 2, or 3;

$R^1$, $R^2$, $R^5$, $R^6$, $R^9$, $R^{10}$, $R^{11}$, $R^{12}$ and $R^{13}$ are each independently, at each occurrence, —H, —(C=0)$R^{14}$, —(C=0)H, —(C=0)OH, —(C=O)O$R^{14}$, —(C=O)—O—(C=0)$R^{14}$, —O(C=0)$R^{14}$, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —O$R^{14}$, —N$R^{14}R^{15}$, —S$R^{14}$, or halogen;

$R^3$, $R^4$, $R^7$, and $R^8$ are each independently, at each occurrence, —H, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —O$R^{14}$, —N$R^{14}R^{15}$, —S$R^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ===== represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, the fatty acid salt is a compound of Formula II. In some embodiments, the fatty acid salt is a compound of Formula III.

In some embodiments, X is sodium.

In some embodiments, R is -glyceryl. In some embodiments, $R^1$, $R^2$, $R^5$, $R^6$, $R^9$, $R^{10}$, $R^{11}$, $R^{12}$ and $R^{13}$ are each independently selected from —H, —$C_1$-$C_6$ alkyl, and —OH. In some embodiments, $R^3$, $R^4$, $R^7$, and $R^8$ are each independently selected from —H, —$C_1$-$C_6$ alkyl, and —OH. In some embodiments, $R^3$ and $R^4$ combine with the carbon atoms to which they are attached to form a 3- to 6-membered ring heterocycle. In some embodiments, $R^7$ and $R^8$ combine with the carbon atoms to which they are attached to form a 3- to 6-membered ring heterocycle. In some embodiments, q is 1 and the sum of n, m, and r is from 10 to 12.

Any of the coating agents described herein can include one or more of the following medium chain fatty acid compounds (e.g., compounds of Formula I):

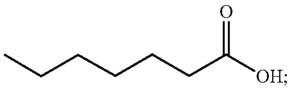

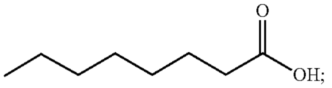

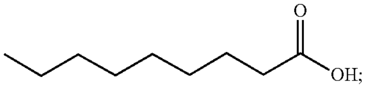

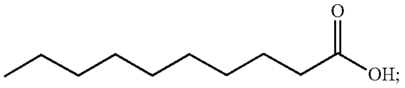

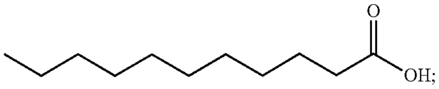

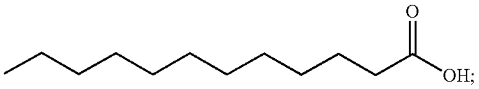
or

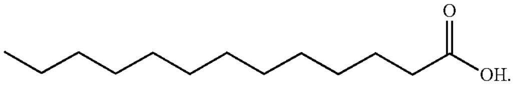

Any of the coating agents described herein can include one or more of the following long chain fatty acid compounds (e.g., compounds of Formula I):

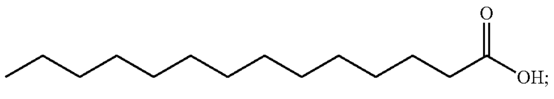

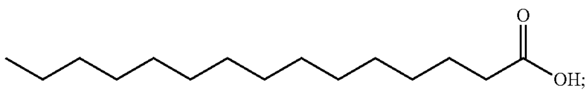

-continued
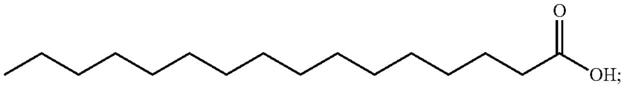;
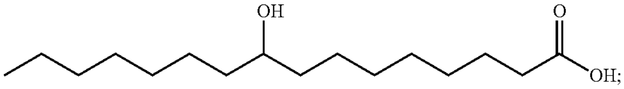;
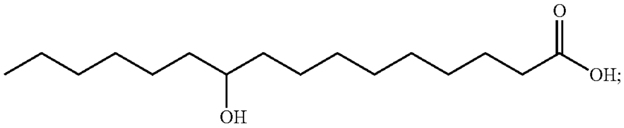;
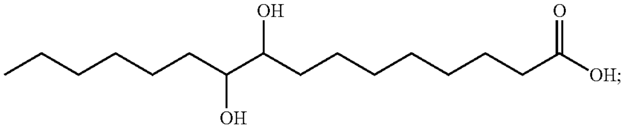;
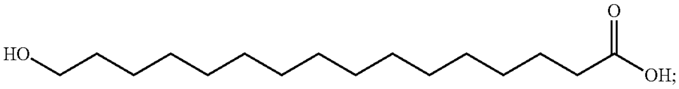;
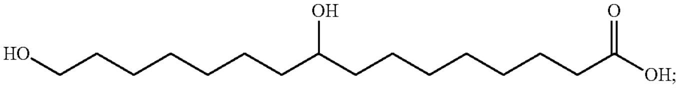;
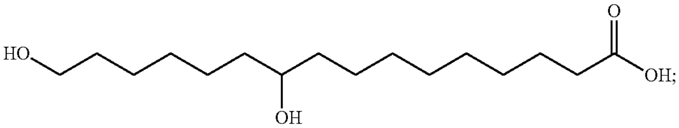;
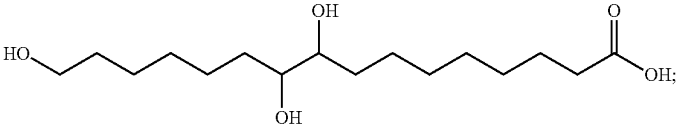;
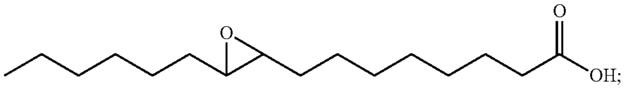;
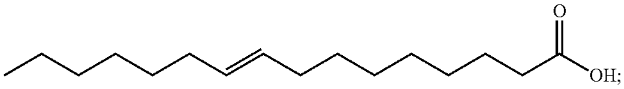;
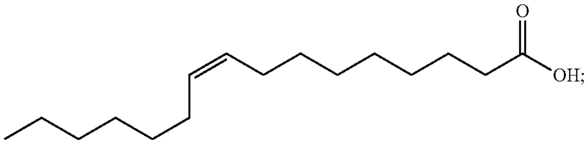;
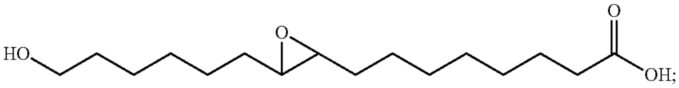;
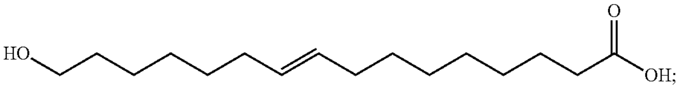;
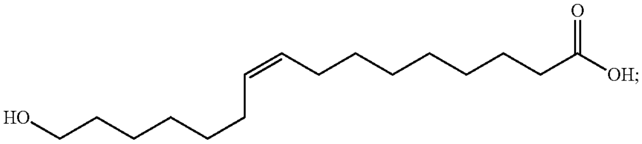;
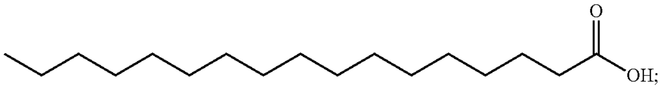;
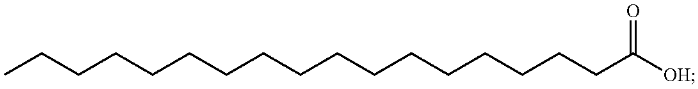;

-continued
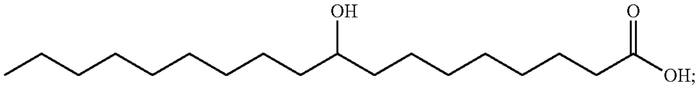
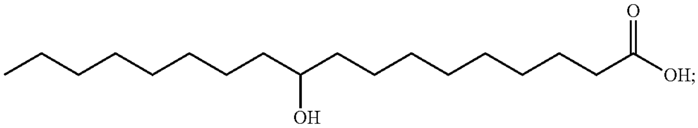
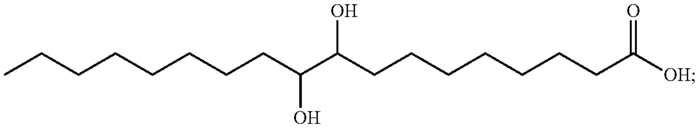
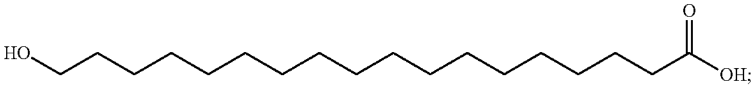
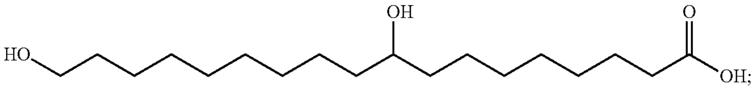
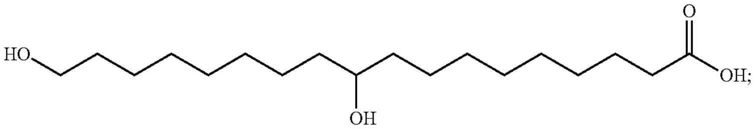
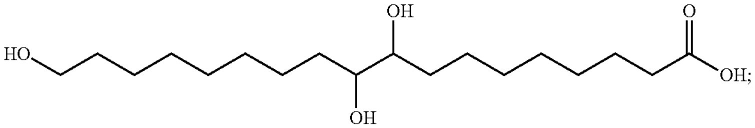
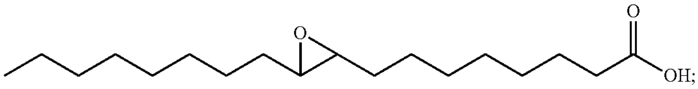
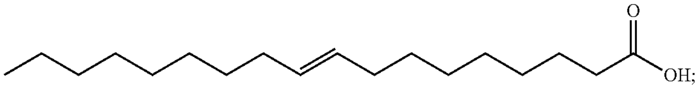
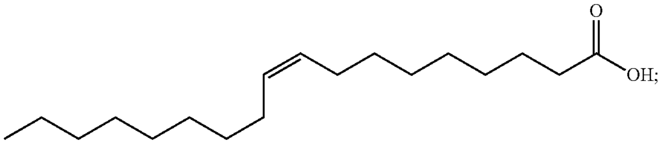
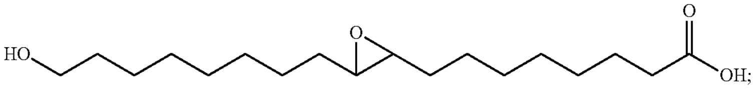
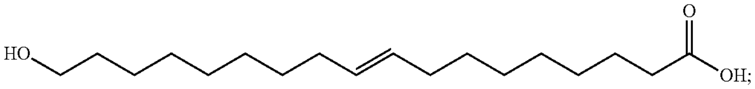
or
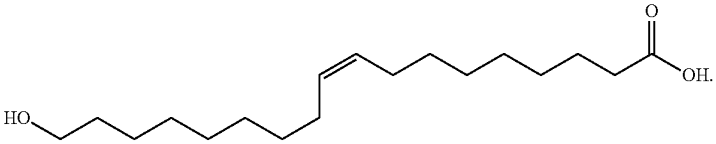
The coating agents herein can include one or more of the following medium chain fatty acid methyl ester compounds (e.g., compounds of Formula I):
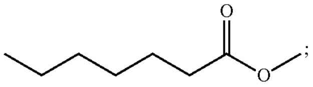
-continued
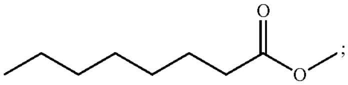
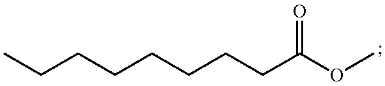

-continued
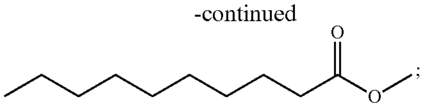
;
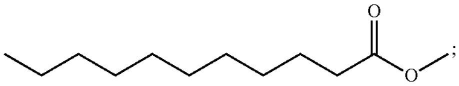
;
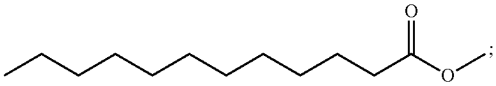
; or
-continued
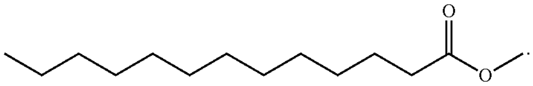
.
The coating agents herein can include one or more of the following long chain fatty acid methyl ester compounds (e.g., compounds of Formula I):
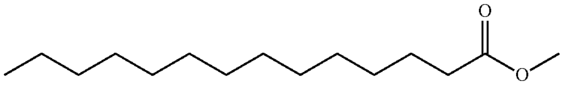
;
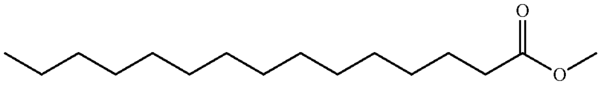
;
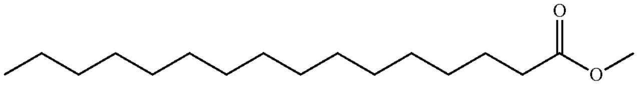
;
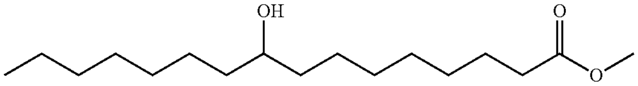
;
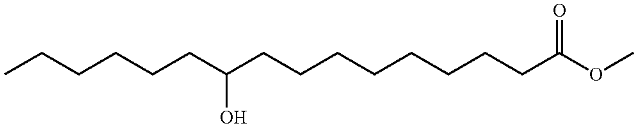
;
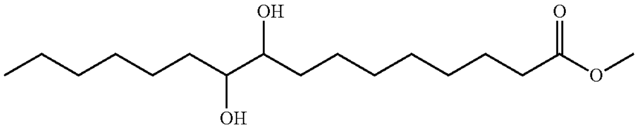
;
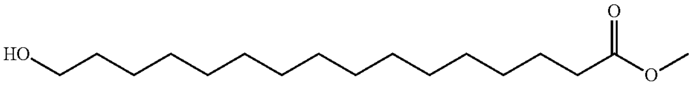
;
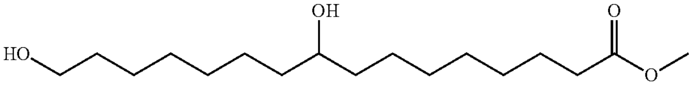
;
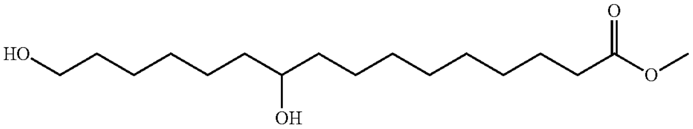
;
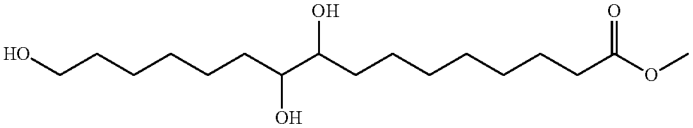
;
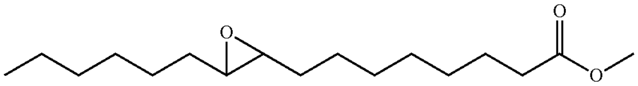
;
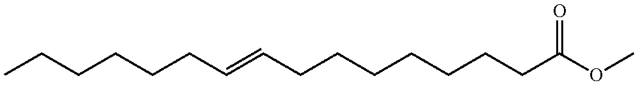
;
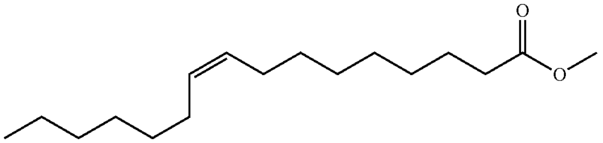
;

-continued
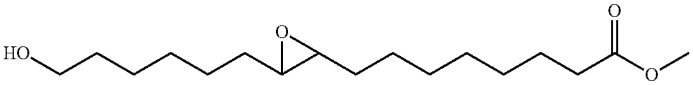
;
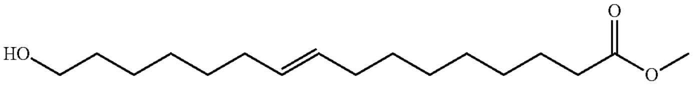
;
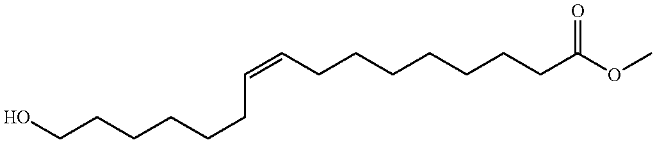
;
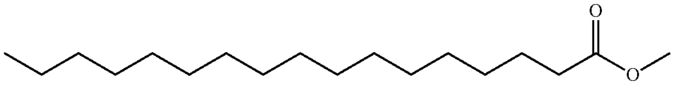
;
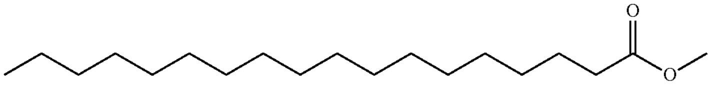
;
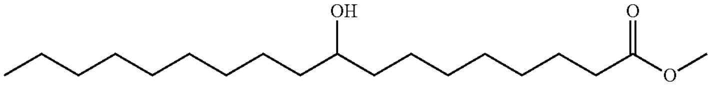
;
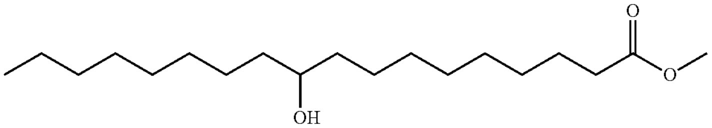
;
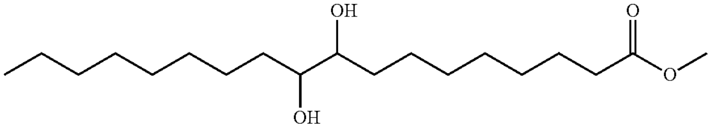
;
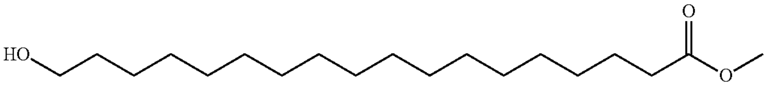
;
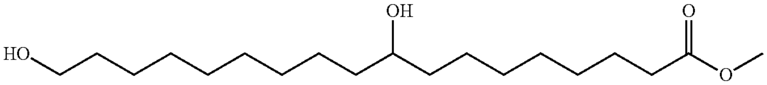
;
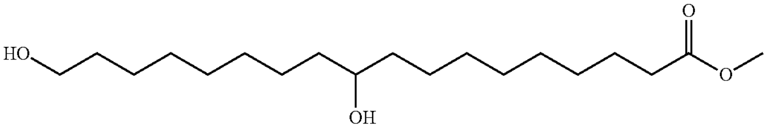
;
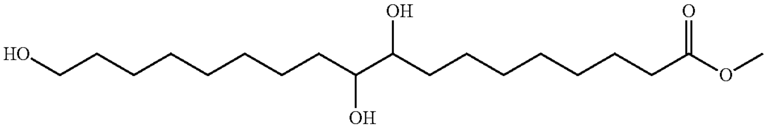
;
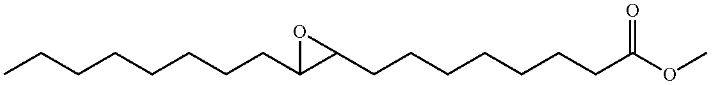
;
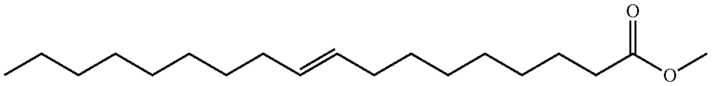
;
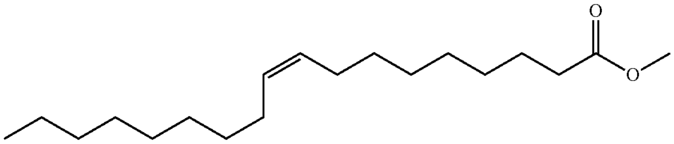
;
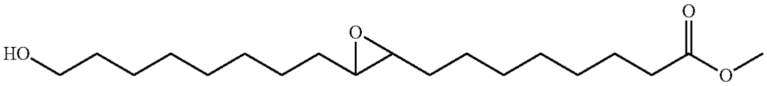
;

-continued
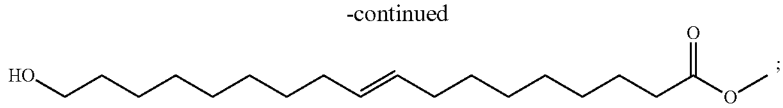
; or
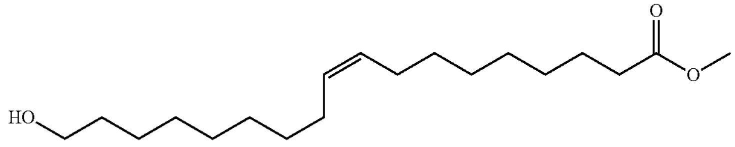
.
The coating agents herein can include one or more of the following medium chain fatty acid ethyl ester compounds (e.g., compounds of Formula I):
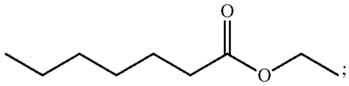
;
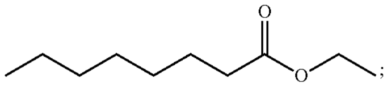
;
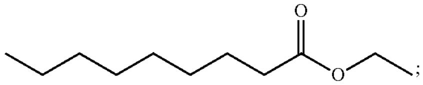
;
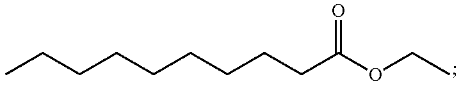
;
-continued
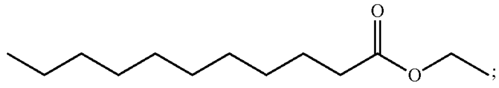
;
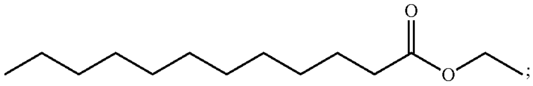
; or
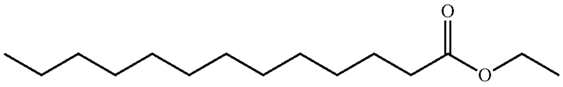
.
The coating agents herein can include one or more of the following long chain fatty acid ethyl ester compounds (e.g., compounds of Formula I):
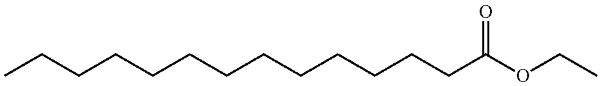
;
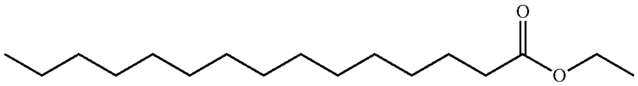
;
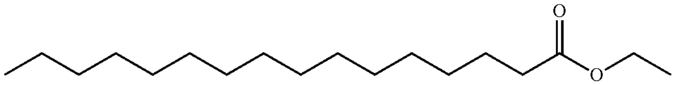
;
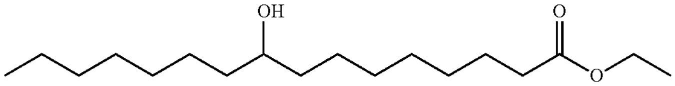
;
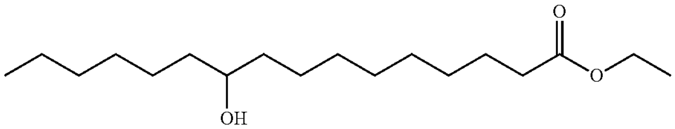
;
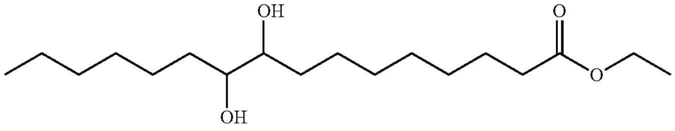
;
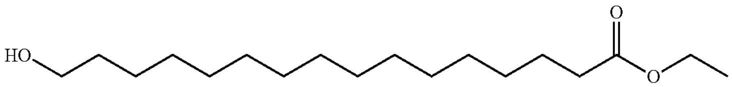
;
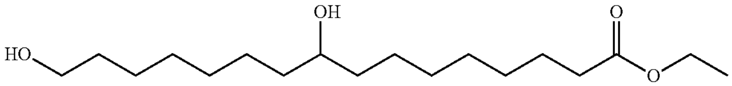
;
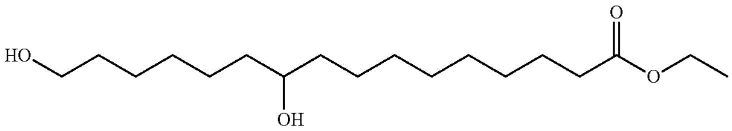
;

-continued
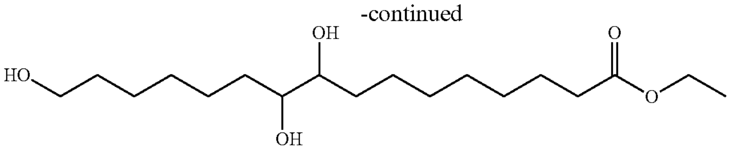
;
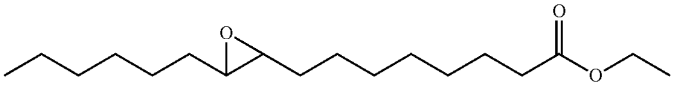
;
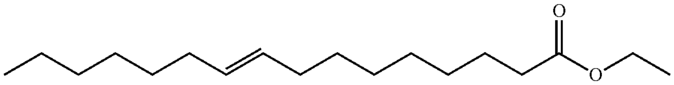
;
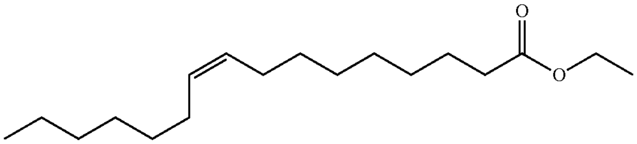
;
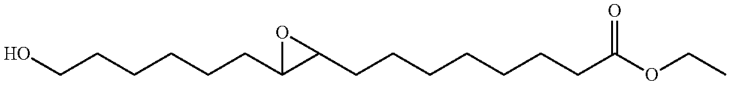
;
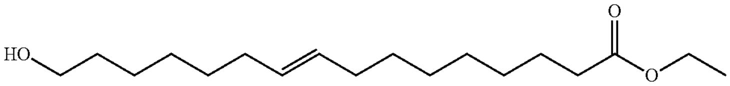
;
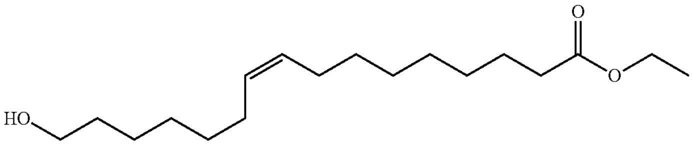
;
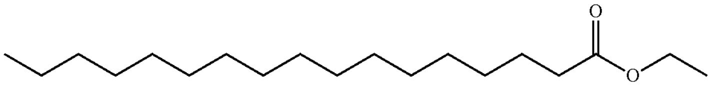
;
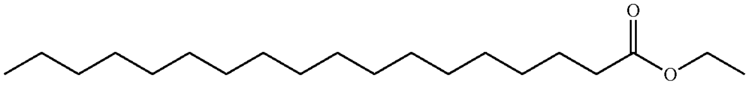
;
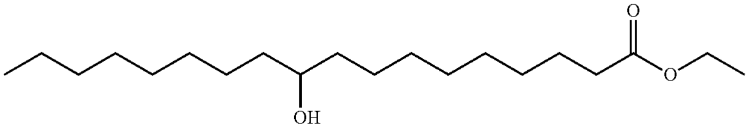
;
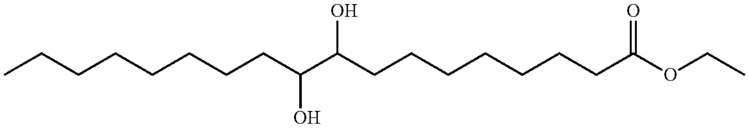
;
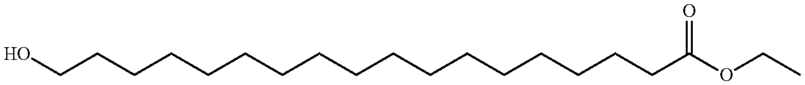
;
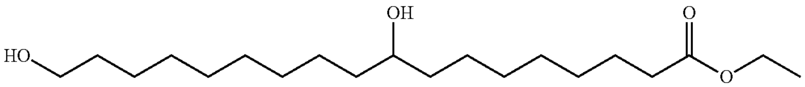
;
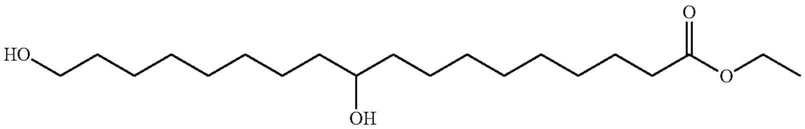
;
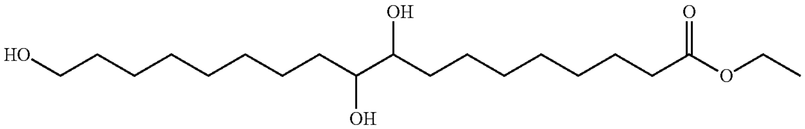
;
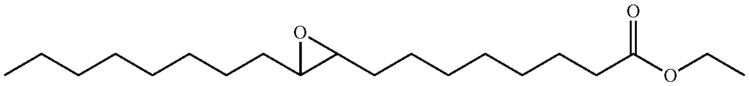
;

-continued
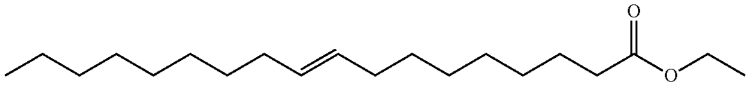
;
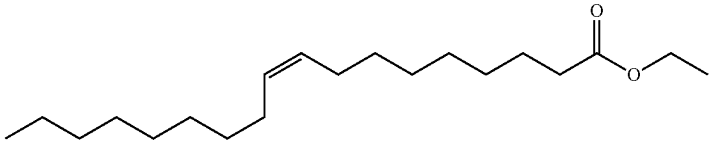
;
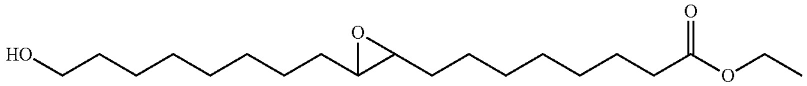
;
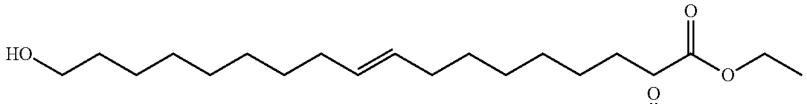
; or
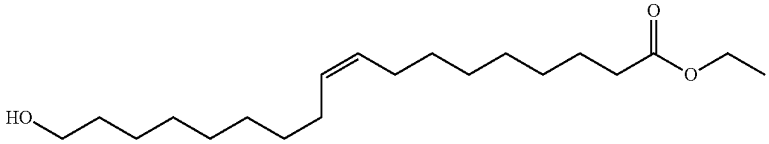
.
The coating agents herein can include one or more of the following medium chain fatty acid 2-glyceryl ester compounds (e.g., compounds of Formula I):
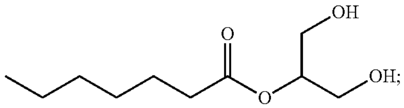
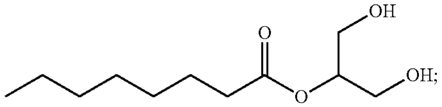
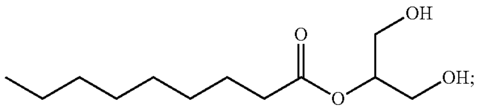
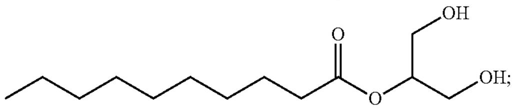
-continued
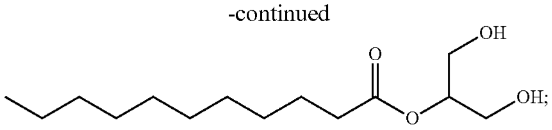
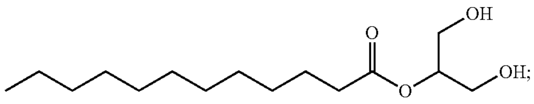
or
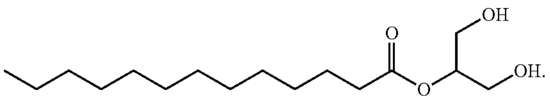
The coating agents herein can include one or more of the following long chain fatty acid 2-glyceryl ester compounds (e.g., compounds of Formula I):
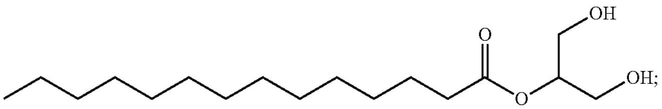
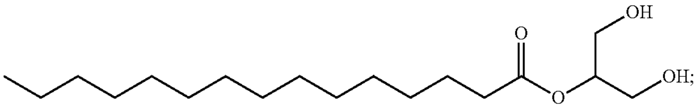
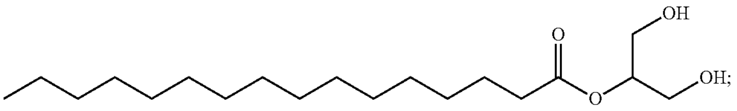
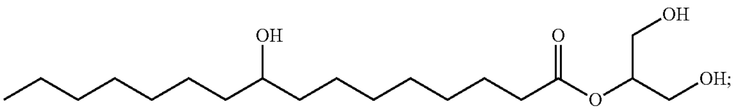

-continued
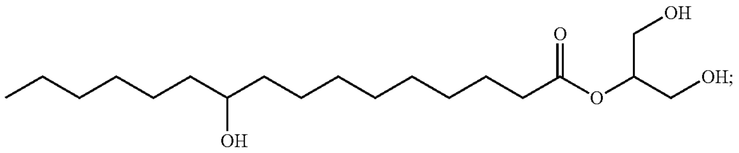
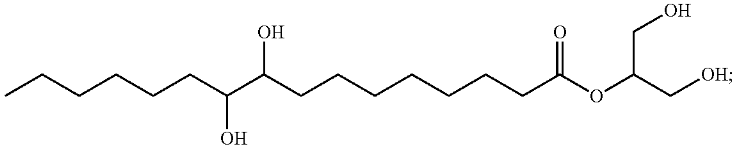
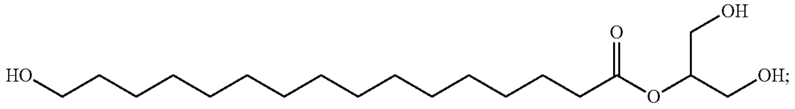
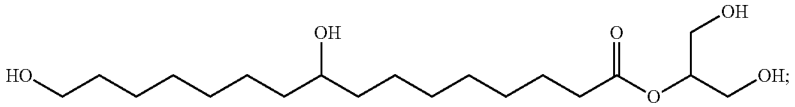
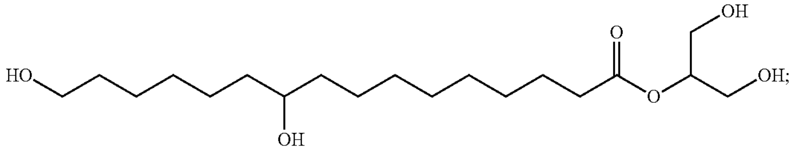
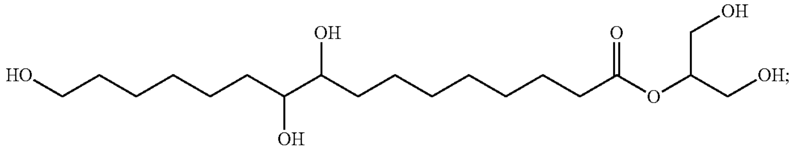
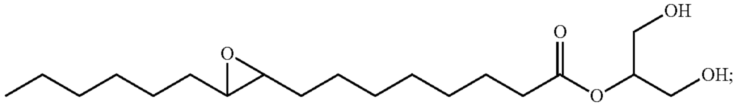
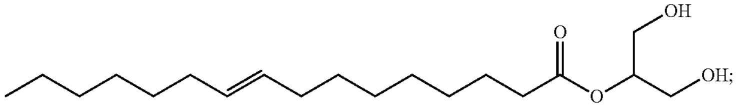
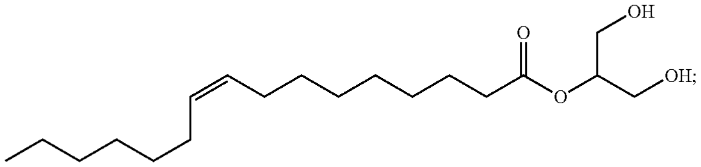
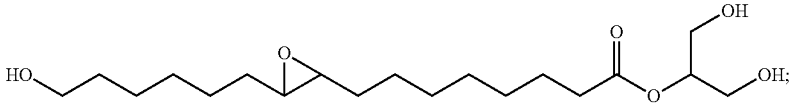
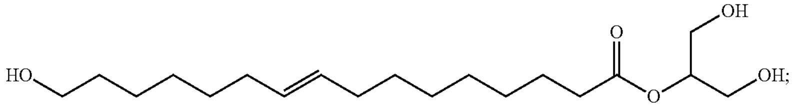
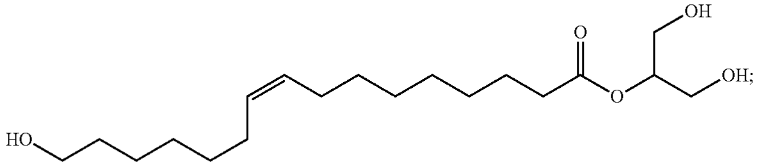
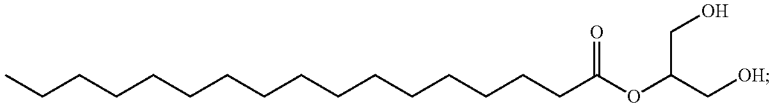

-continued
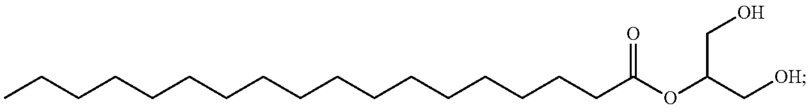
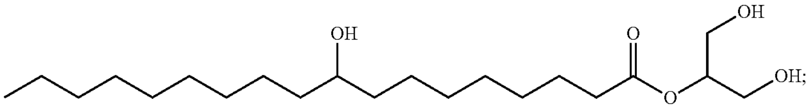
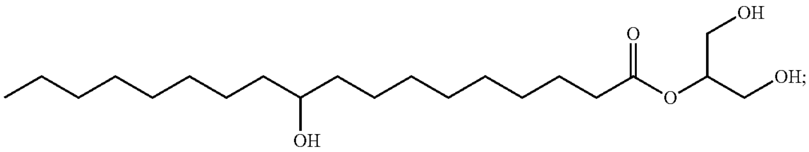
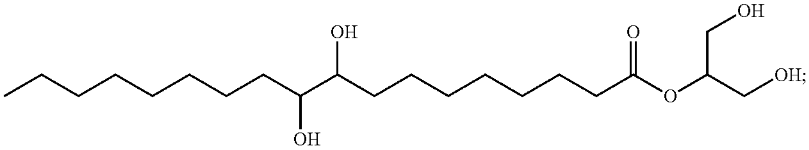
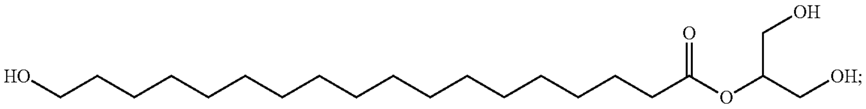
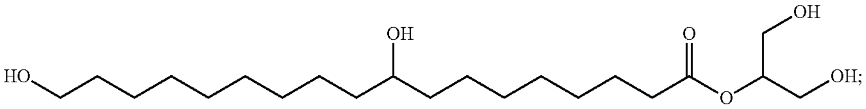
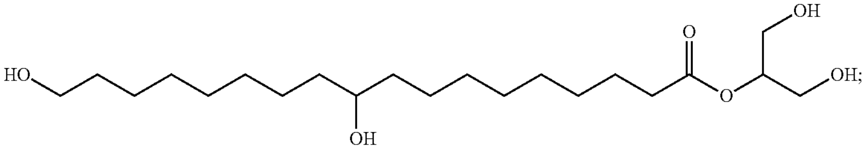
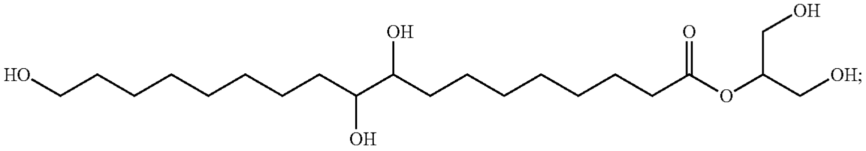
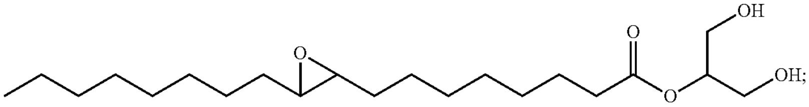
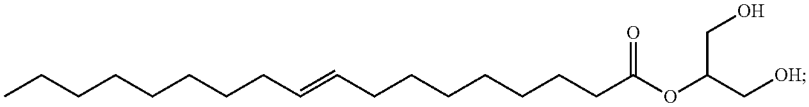
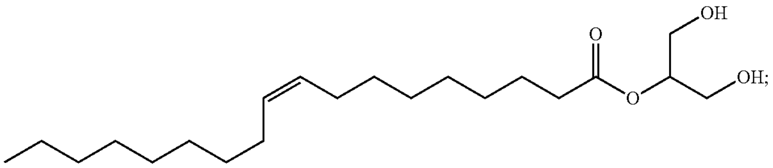
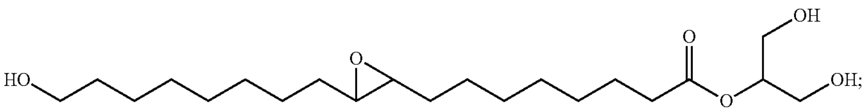
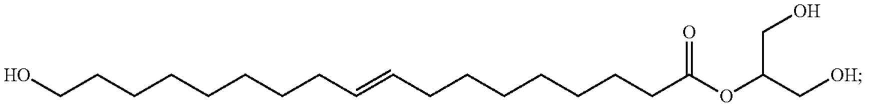
or -continued
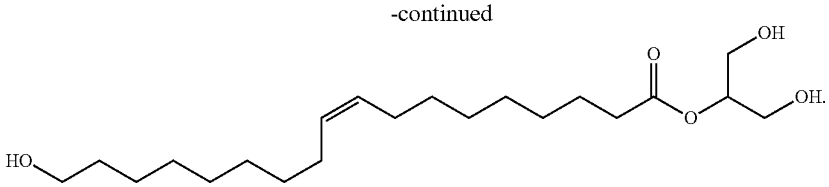
The coating agents herein can include one or more of the following medium chain fatty acid 1-glyceryl ester compounds (e.g., compounds of Formula I):
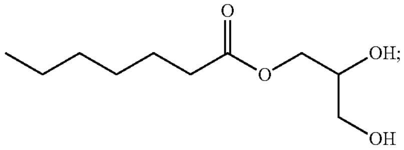
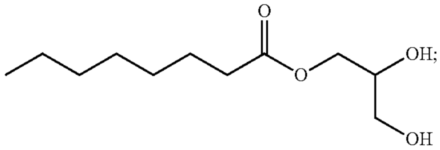
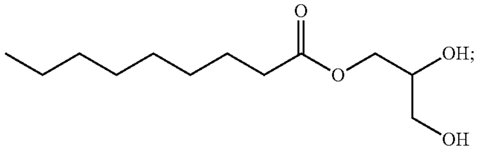
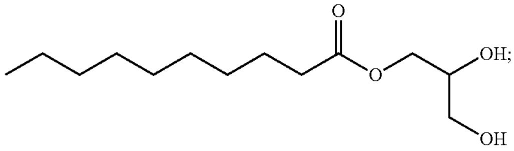
-continued
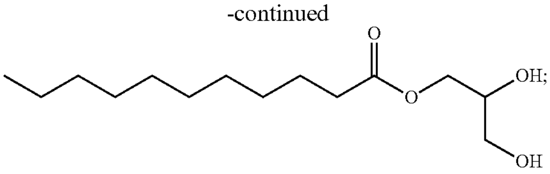
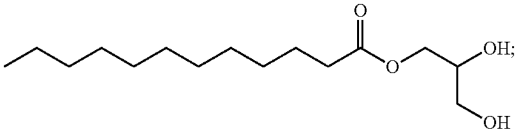
or
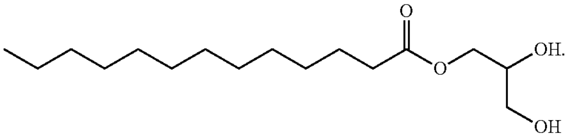
The coating agents herein can include one or more of the following long chain fatty acid 1-glyceryl ester compounds (e.g., compounds of Formula I):
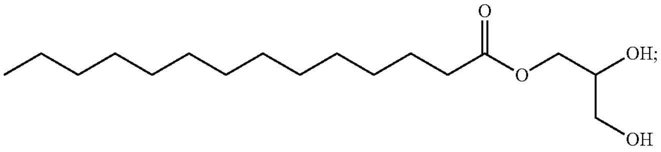
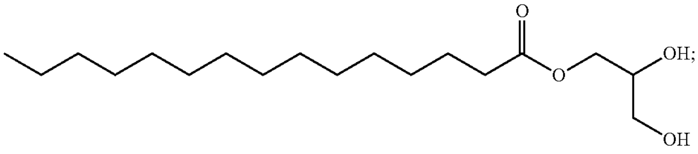
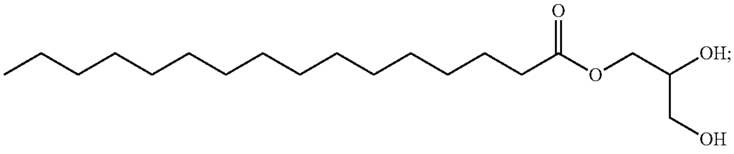
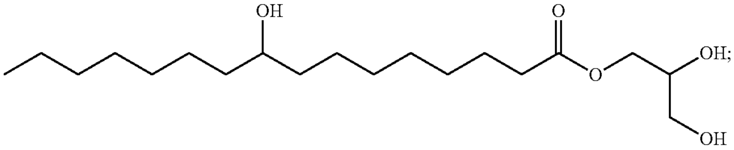

-continued
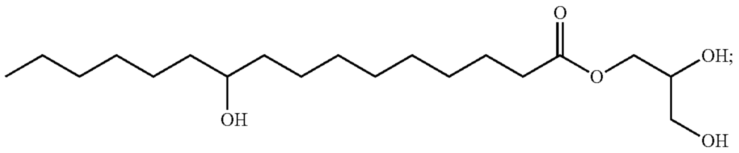
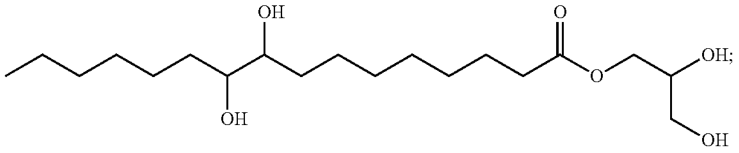
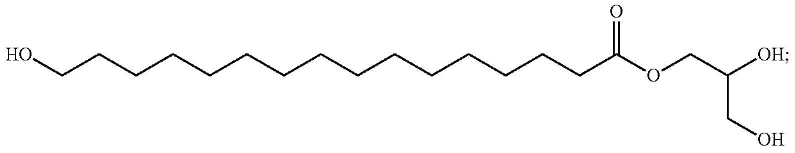
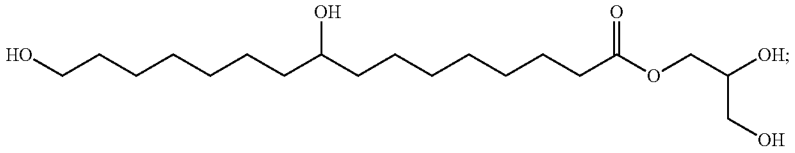
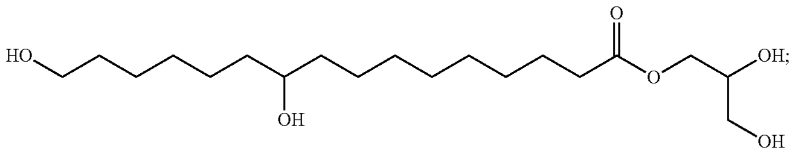
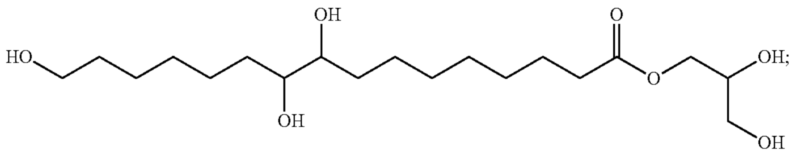
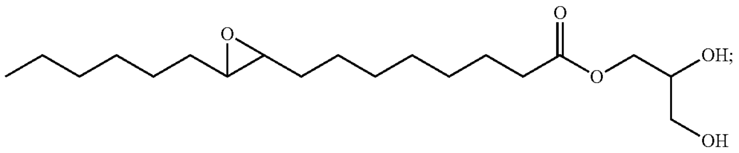
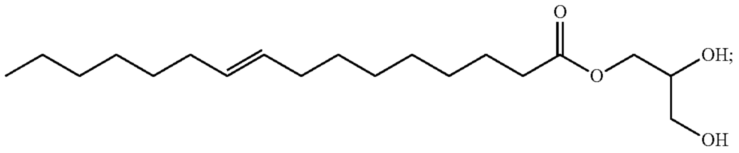
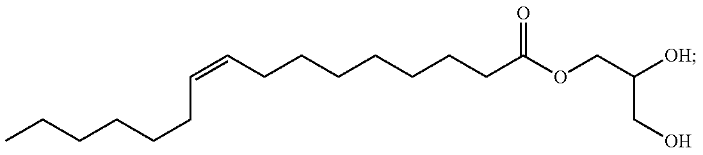
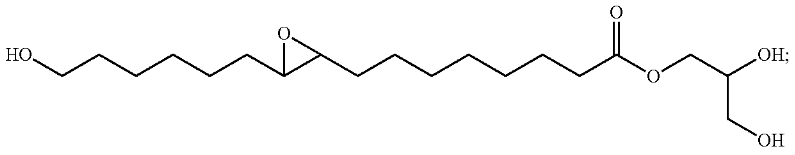
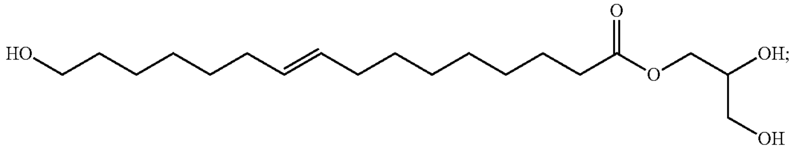

-continued
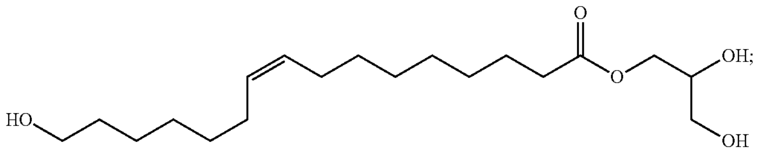
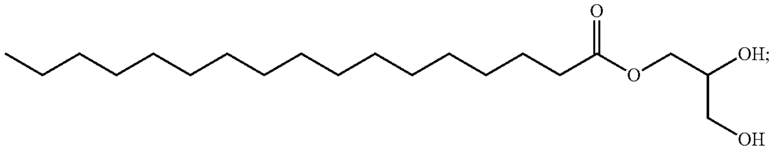
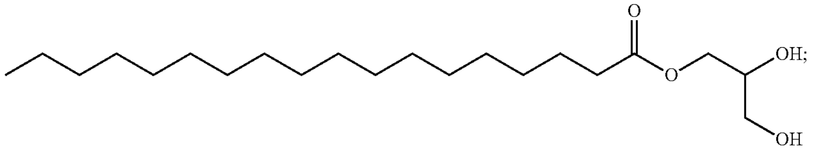
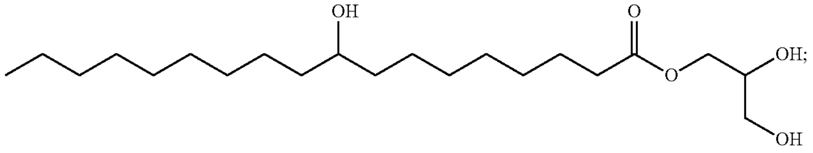
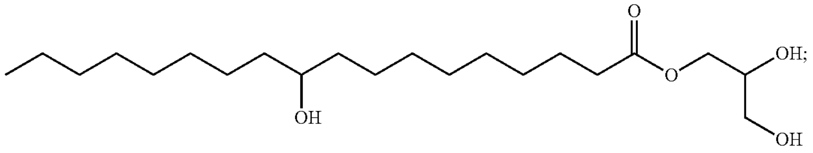
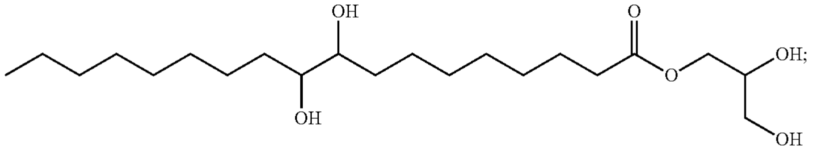
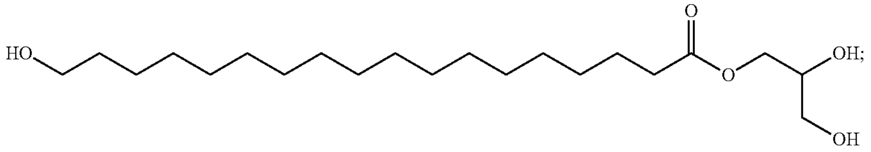
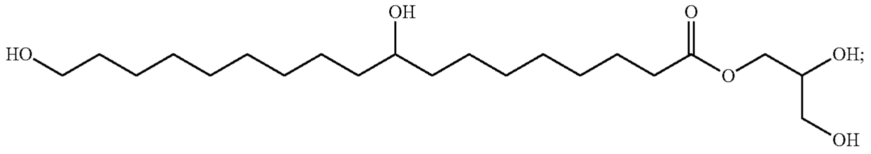
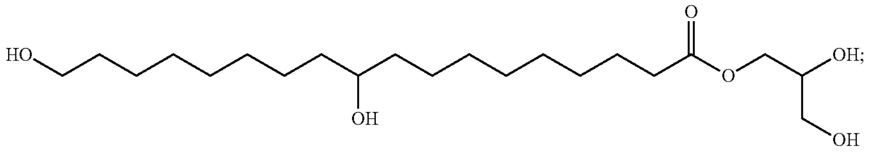
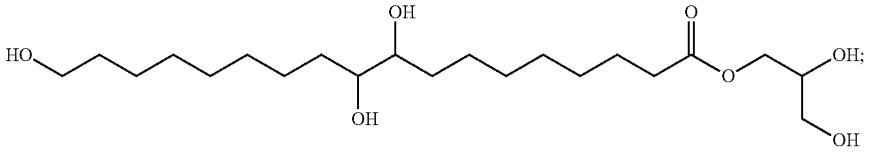
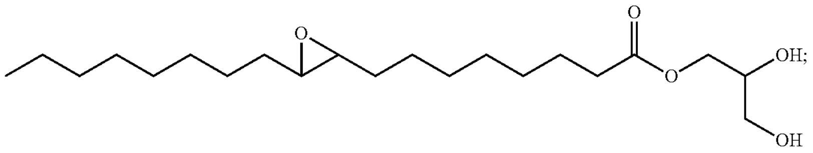

-continued
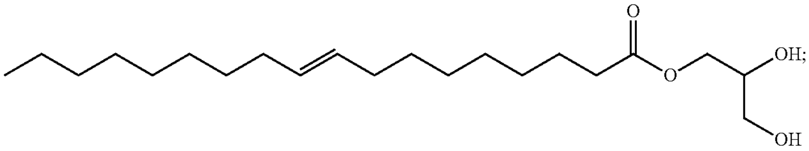
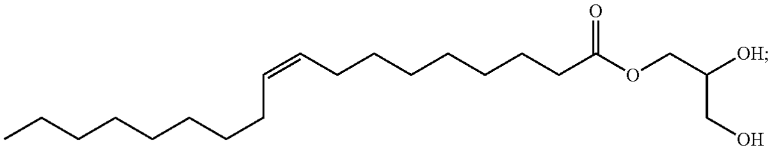
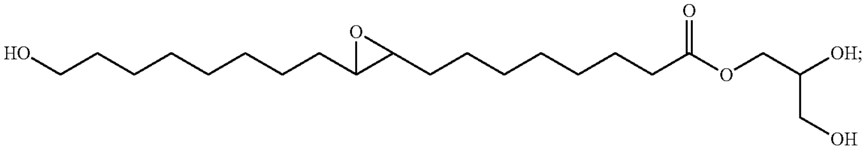
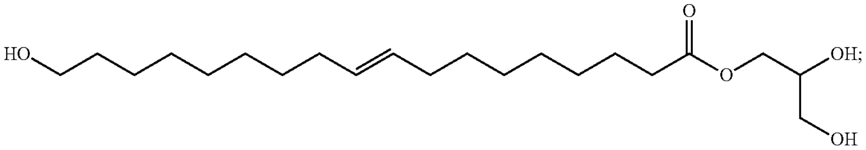
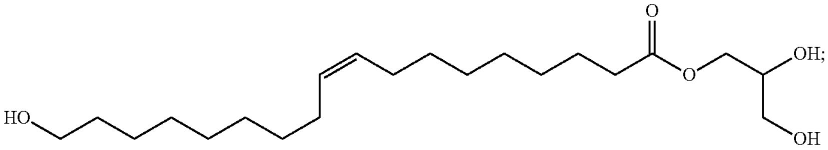
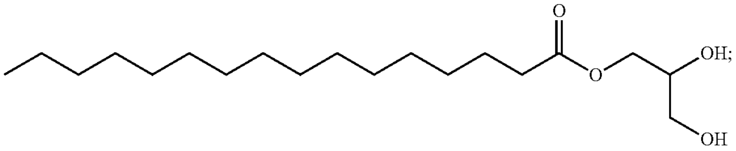
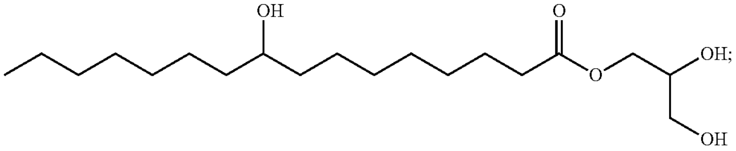
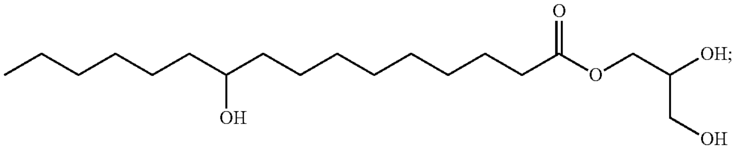
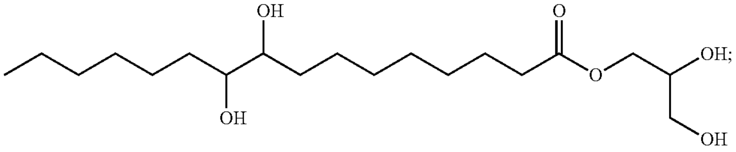
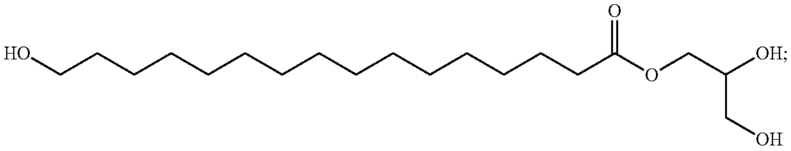
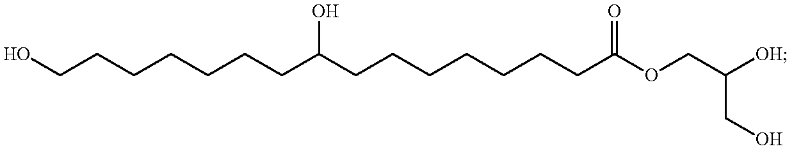

-continued
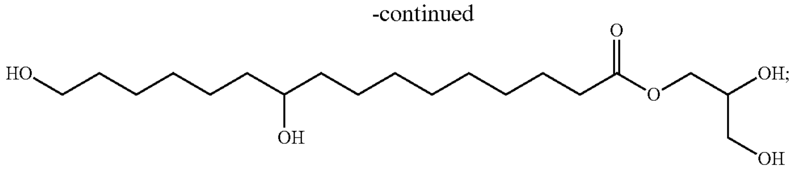
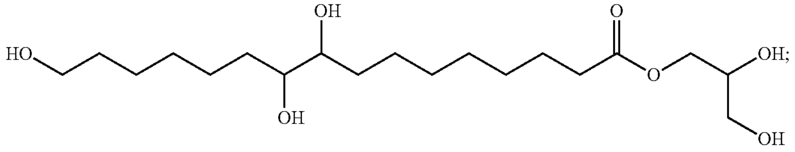
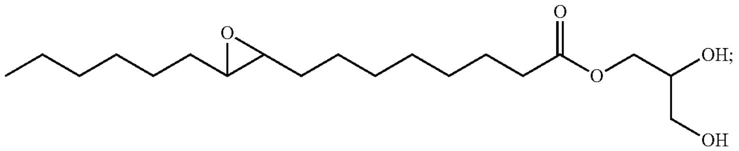
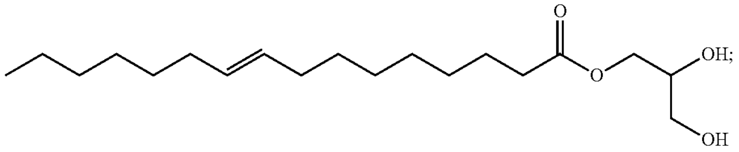
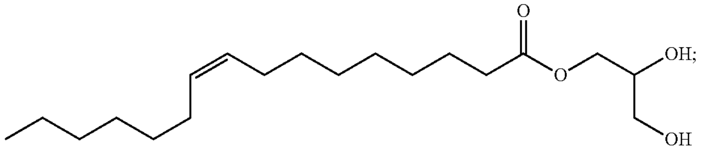
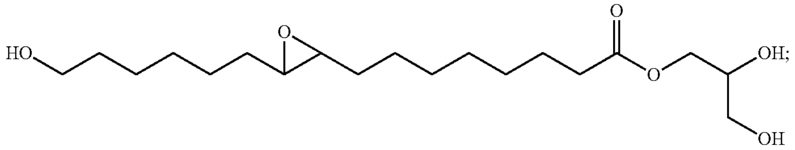
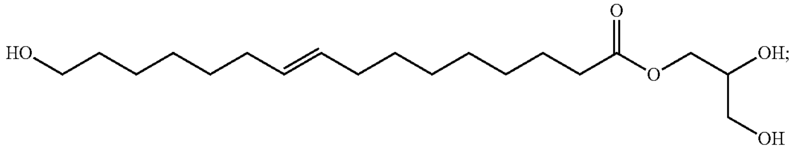
or
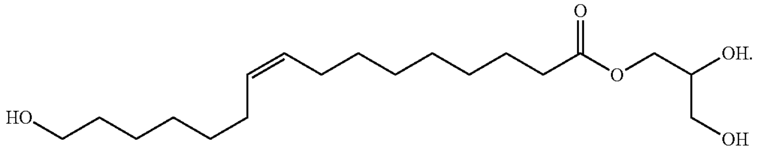
The coating agents herein can include one or more of the following fatty acid salts (e.g., compounds of Formula II or Formula III), where X is a cationic counter ion and n represents the charge state (i.e., the number of proton-equivalent charges) of the cationic counter ion:
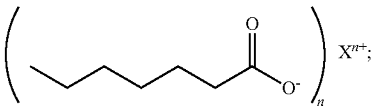
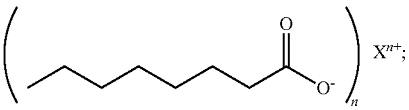
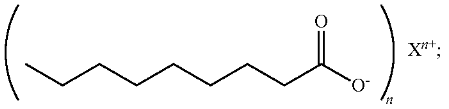
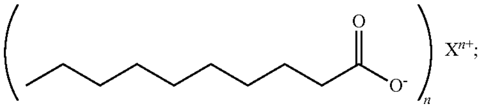

-continued
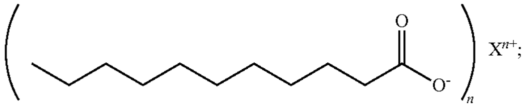
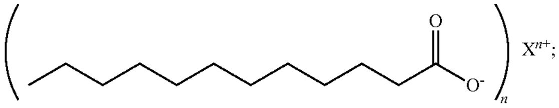
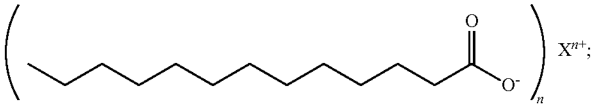
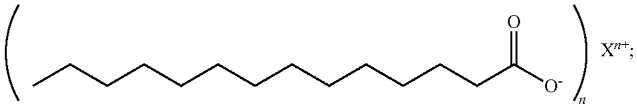
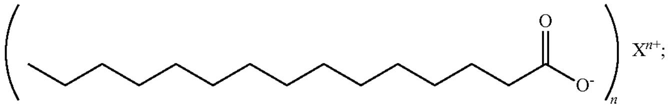
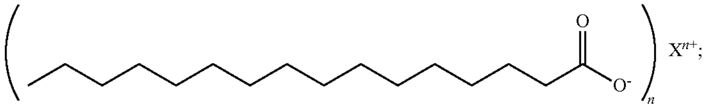
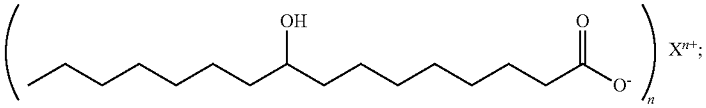
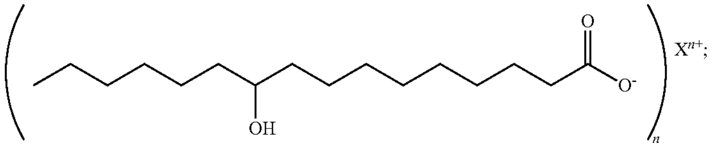
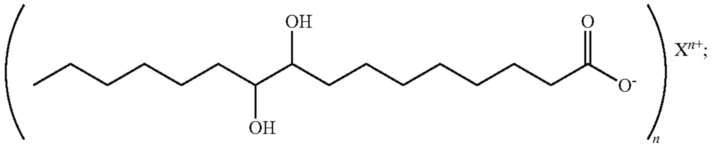
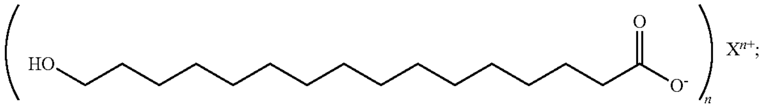
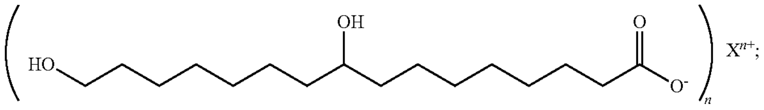
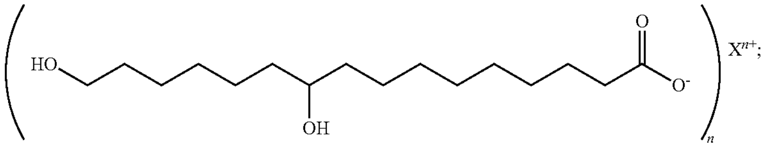
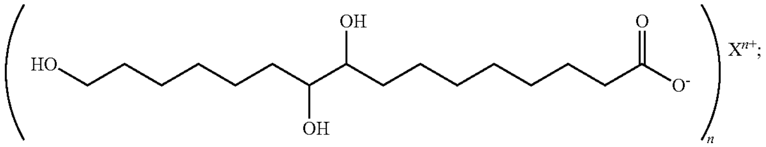
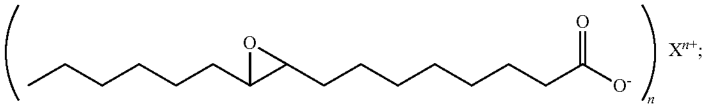
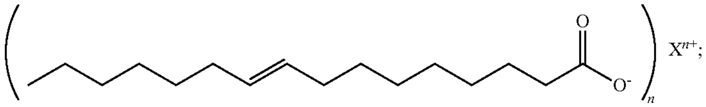

-continued
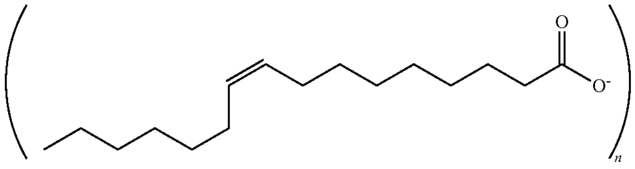
$X^{n+}$;
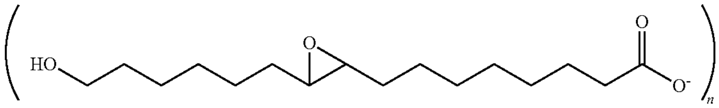
$X^{n+}$;
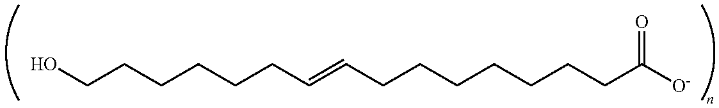
$X^{n+}$;
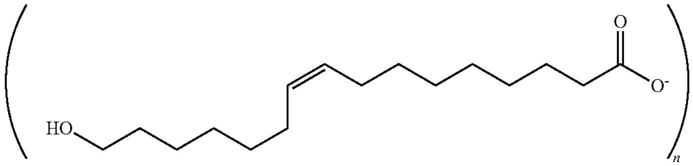
$X^{n+}$;
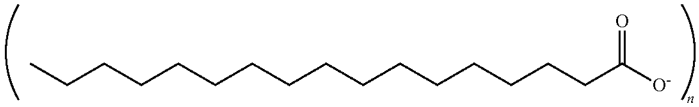
$X^{n+}$;
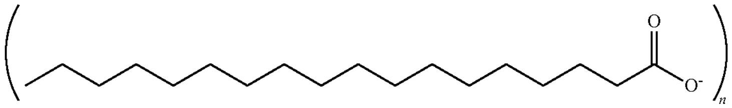
$X^{n+}$;
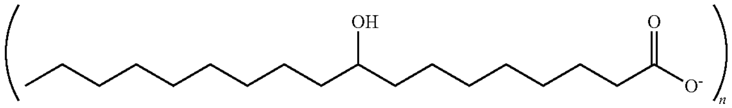
$X^{n+}$;
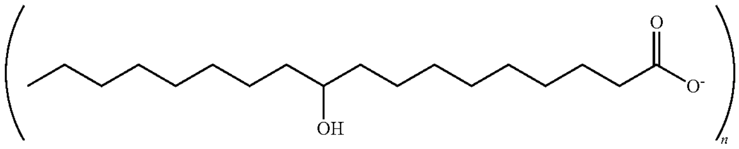
$X^{n+}$;
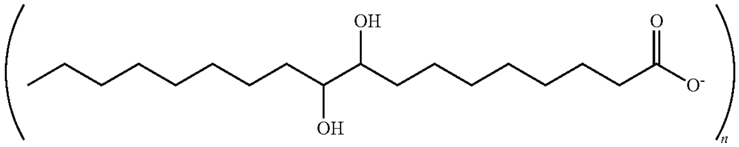
$X^{n+}$;
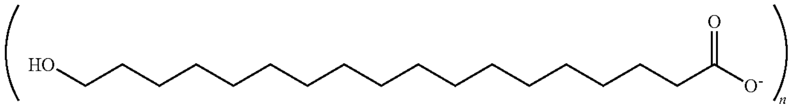
$X^{n+}$;
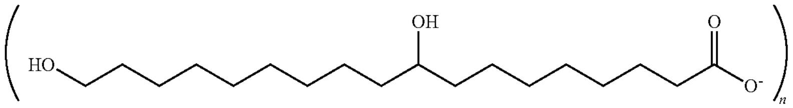
$X^{n+}$;
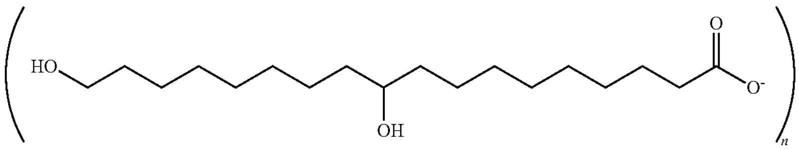
$X^{n+}$;
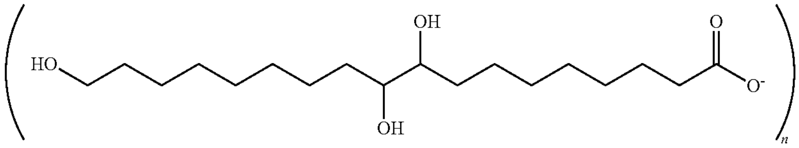
$X^{n+}$;

-continued

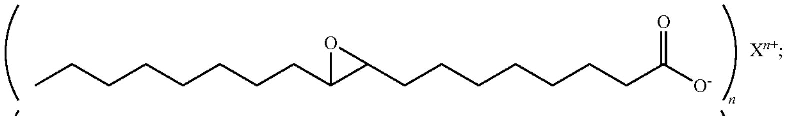

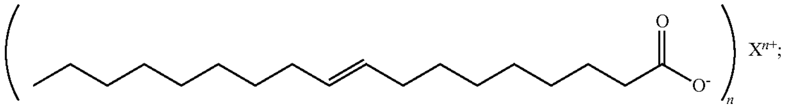

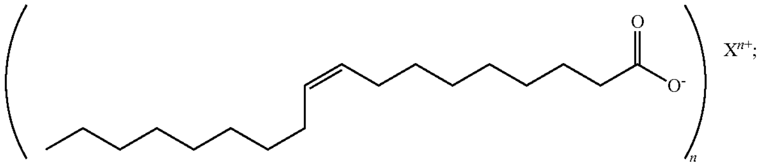

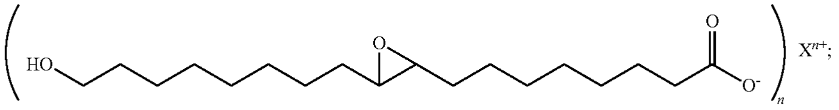

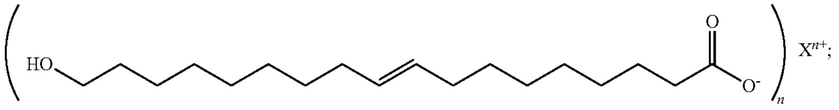

or

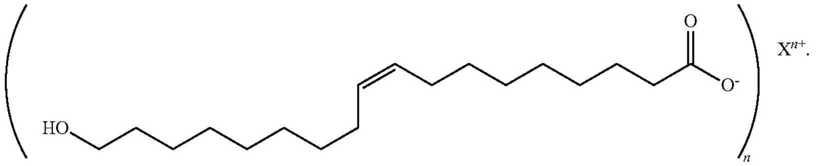

In some embodiments, n is 1, 2, or 3. In some embodiments, X is sodium, potassium, calcium, or magnesium.

Coating Agent Mixtures

In some embodiments, the composition (e.g., coating agent) can be dissolved, mixed, dispersed, or suspended in a solvent to form a mixture (e.g., solution, suspension, or colloid). Examples of solvents that can be used include water, methanol, ethanol, isopropanol, butanol, acetone, ethyl acetate, chloroform, acetonitrile, tetrahydrofuran, diethyl ether, methyl tert-butyl ether, or combinations thereof. For example, the solvent is water. For example, the solvent is ethanol.

In some embodiments, the concentration of the composition (e.g., coating agent) in the solution or mixture (e.g., solution, suspension, or colloid) is from about 1 mg/mL to about 200 mg/mL. For example, from about 1 to about 150 mg/mL, 1 to 100 mg/mL, from about 1 to about 90 mg/mL, from about 1 to about 80 mg/mL, from about 1 to about 75 mg/mL, from about 1 to about 70 mg/mL, from about 1 to about 65 mg/mL, from about 1 to about 60 mg/mL, from about 1 to about 55 mg/mL, from about 1 to about 50 mg/mL, from about 1 to about 45 mg/mL, from about 1 to about 40 mg/mL, from about 2 to about 200 mg/mL, from about 2 to about 150 mg/mL, from about 2 to about 100 mg/mL, from about 2 to about 90 mg/mL, from about 2 to about 80 mg/mL, from about 2 to about 75 mg/mL, from about 2 to about 70 mg/mL, from about 2 to about 65 mg/mL, from about 2 to about 60 mg/mL, from about 2 to about 55 mg/mL, from about 2 to about 50 mg/mL, from about 2 to about 45 mg/mL, from about 2 to about 40 mg/mL, from about 5 to about 200 mg/mL, from about 5 to about 150 mg/mL, from about 5 to about 100 mg/mL, from about 5 to about 90 mg/mL, from about 5 to about 80 mg/mL, from about 5 to about 75 mg/mL, from about 5 to about 70 mg/mL, from about 5 to about 65 mg/mL, from about 5 to about 60 mg/mL, from about 5 to about 55 mg/mL, from about 5 to about 50 mg/mL, from about 5 to about 45 mg/mL, from about 5 to about 40 mg/mL, from about 10 to about 200 mg/mL, from about 10 to about 150 mg/mL, from about 10 to about 100 mg/mL, from about 10 to about 90 mg/mL, from about 10 to about 80 mg/mL, from about 10 to about 75 mg/mL, from about 10 to about 70 mg/mL, from about 10 to about 65 mg/mL, from about 10 to about 60 mg/mL, from about 10 to about 55 mg/mL, from about 10 to about 50 mg/mL, from about 10 to about 45 mg/mL, from about 10 to about 40 mg/mL, from about 20 to about 50 mg/mL, from about 20 to about 40 mg/mL, from about 25 to about 35 mg/mL, from about 30 to about 50 mg/mL, or from about 35 to about 45 mg/mL. For example, the concentration of the composition (e.g., coating agent) in the mixture (e.g., solution, suspension, or colloid) is about 30 mg/mL or about 40 mg/mL.

As previously described, coating agents formed predominantly of various combinations of compounds of Formula I (e.g., coating agents that are at least 50% compounds of Formula I by mass or by molar composition) each having a carbon chain length of at least 14 have been shown to form protective coatings on produce and other agricultural products that are effective at reducing moisture loss and oxidation. As also previously described, the coatings can be formed over the outer surface of the agricultural product by dissolving, suspending, or dispersing the coating agent in a solvent to form a mixture, applying the mixture to the surface of the agricultural product (e.g., by spray coating the product, by dipping the product in the mixture, or by brushing the mixture onto the surface of the product), and then removing the solvent (e.g., by allowing the solvent to evaporate). The solvent can include any polar, non-polar, protic, or aprotic solvents, including any combinations thereof. Examples of solvents that can be used include water, methanol, ethanol, isopropanol, butanol, acetone, ethyl acetate, chloroform, acetonitrile, tetrahydrofuran, diethyl ether, methyl tert-butyl ether, any other suitable solvent or combinations thereof. In cases where the coating is going to be applied to plants or other edible products, it may be preferable to use a solvent that is safe for consumption, for example water, ethanol, or combinations thereof. Depending on the solvent that is used, the solubility limit of the coating agent in the solvent may be lower than desired for particular applications. For example, when compounds of Formula I are used as the coating agent and the solvent is water (or is predominantly water), the solubility limit of the coating agent may be relatively low. In these cases it may still be possible to add the desired concentration of coating agent to the solvent and form a suspension or colloid.

In order to improve the solubility of the coating agent in the solvent, or to allow the coating agent to be suspended or dispersed in the solvent, the coating agent can further include an emulsifier. When the coatings are to be formed over plants or other edible products, it may be preferable that the emulsifier be safe for consumption. Furthermore, it is also preferable that the emulsifier either not be incorporated into the coating or, if the emulsifier is incorporated into the coating, that it does not degrade the performance of the coating.

Through extensive experimentation, it has been shown that organic salts (e.g., compounds of Formula II or Formula III) added to the coating agent can increase the solubility of the coating agent or allow the coating agent to be suspended or dispersed in solvents having a substantial water content (e.g., solvents that are at least 50% water by volume), provided that the concentration of the salts is not too low (relative to the concentration of compounds of Formula I). Furthermore, the added salts do not substantially degrade the performance of subsequently formed coatings provided that the concentration of the salts (relative to the concentration of the compounds of Formula I) is not too high.

For example, coating agents including a first group of compounds of Formula I mixed with a second group of compounds of Formula II and/or III can be added to water to form a suspension by heating the water to about 70° C., adding the coating agent, and then cooling the resulting mixture to about room temperature (or a lower temperature). The cooled mixture can then be applied to substrates such as produce to form a protective coating, as described throughout. However, it has been found that when the compounds of Formula I make up at least 50% of the mass of the coating agent and the compounds of Formula II and/or III make up less than about 3% of the coating agent, the coating agent either cannot be suspended in the water at the elevated temperature, or the coating agent can be suspended in the water at the higher temperature but then crashes out as the temperature is reduced, thus preventing coatings from being able to be formed from the mixture.

Figure 18:
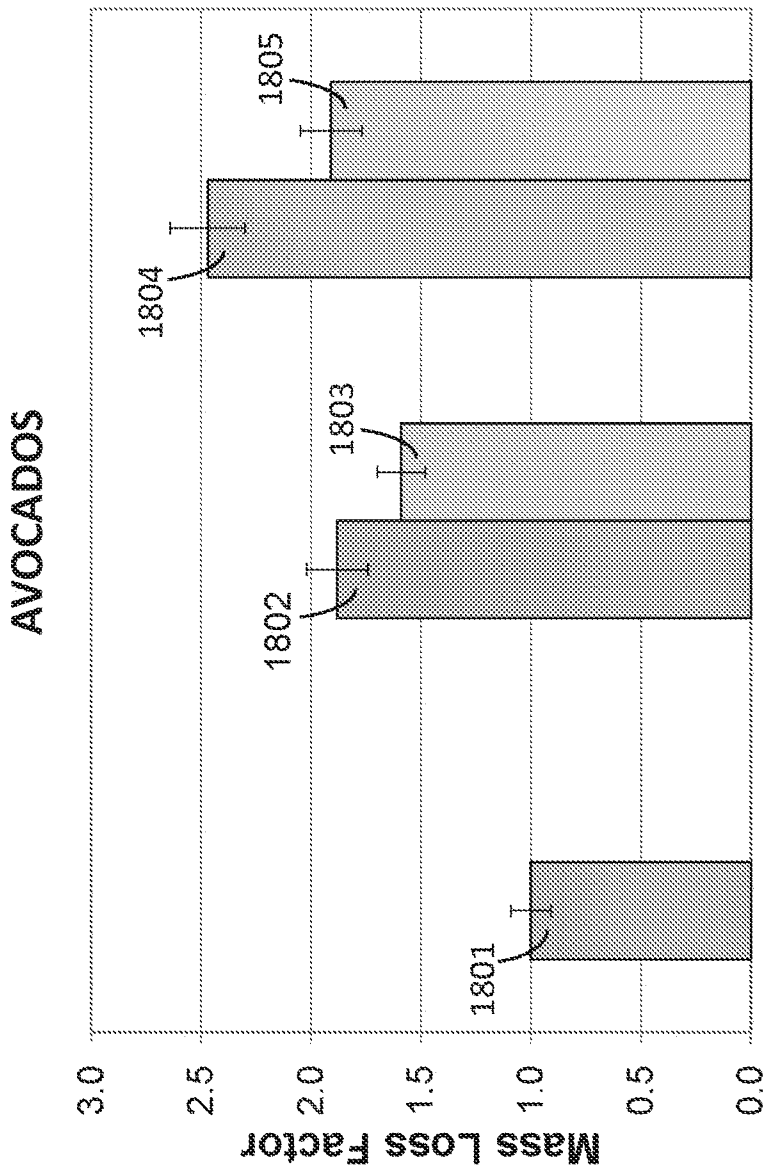
FIG. 18 shows a plot of average daily mass loss rates of avocados treated with mixtures including various combinations of fatty acid esters and fatty acid salts suspended in water.

Additionally, if the concentration of compounds of Formula II and/or III is too high, the performance of the resulting coatings can be degraded. For example, as shown in FIG. 18 and Example 13 below, coatings formed on avocados from a 94:6 mixture of compounds of Formula I (PA-1G and SA-1G) to compounds of Formula II or III (SA-Na) resulted in a mass loss factor of 1.88. However, when the study was repeated with a 70:30 mixture of the same compounds, the mass loss factor of the coated avocados was reduced to 1.59. As further shown in FIG. 18, a similar degradation in the mass loss factor with a high concentration of salts in the coating agent was observed when the compound of Formula II or III in the coating agent was MA-Na.

In view of the above, compositions (e.g., coating agents) can include a first group of compounds that includes one or more compounds of Formula I (e.g., fatty acids or esters thereof) and a second group of compounds that includes one or more salts of Formula II or Formula III (e.g., fatty acid salts). The compound(s) of Formula I and/or the salt(s) of Formula II or III can optionally have a carbon chain length of at least 14. A mass ratio of the first group of compounds (e.g., compounds of Formula I such as fatty acids or esters, including monoacylglycerides) to the second group of compounds (salts of Formula II or III, e.g., fatty acid salts) can, for example, be in a range of about 2 to 200, for example about 2 to 100, 2 to 99, 2 to 90, 2 to 80, 2 to 70, 2 to 60, 2 to 50, 2 to 40, 2 to 30, 2 to 25, 2 to 20, 2 to 15, 2 to 10, 2.5 to 200, 2.5 to 100, 2.5 to 90, 2.5 to 80, 2.5 to 70, 2.5 to 60, 2.5 to 50, 2.5 to 40, 2.5 to 30, 2.5 to 25, 2.5 to 20, 2.5 to 15, 2.5 to 10, 3 to 200, 3 to 100, 3 to 90, 3 to 80, 3 to 70, 3 to 60, 3 to 50, 3 to 40, 3 to 30, 3 to 25, 3 to 20, 3 to 15, 3 to 10, 4 to 200, 4 to 100, 4 to 90, 4 to 80, 4 to 70, 4 to 60, 4 to 50, 4 to 40, 4 to 30, 4 to 25, 4 to 20, 4 to 15, 4 to 10, 5 to 200, 5 to 100, 5 to 90, 5 to 80, 5 to 70, 5 to 60, 5 to 50, 5 to 40, 5 to 30, 5 to 25, 5 to 20, 5 to 15, 5 to 10, 10 to 100, 10 to 99, 10 to 90, 10 to 80, 10 to 70, 10 to 60, 10 to 50, 10 to 40, 10 to 30, 10 to 25, 10 to 20, 10 to 15, 15 to 100, 15 to 99, 15 to 90, 15 to 80, 15 to 70, 15 to 60, 15 to 50, 15 to 40, 15 to 30, 15 to 25, or 15 to 20.

As described above, the coating agent can be added to or dissolved, suspended, or dispersed in a solvent to form a colloid, suspension, or solution. The various components of the coating agent (e.g., the compounds of Formula I and the salts) can be combined prior to being added to the solvent and then added to the solvent together. Alternatively, the components of the coating agent can be kept separate from one another and then be added to the solvent consecutively (or at separate times).

The concentration of the first group of compounds (compounds of Formula I) in the solvent/solution/suspension/colloid can, for example, be in a range of about 1 mg/mL to about 200 mg/mL, such as about 1 to 150 mg/mL, 1 to 100 mg/mL, 1 to 90 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 2 to 200 mg/mL, 2 to 150 mg/mL, 2 to 100 mg/mL, 2 to 90 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 5 to 200 mg/mL, 5 to 150 mg/mL, 5 to 100 mg/mL, 5 to 90 mg/mL, 5 to 80 mg/mL, 5 to 75 mg/mL, 5 to 70 mg/mL, 5 to 65 mg/mL, 5 to 60 mg/mL, 5 to 55 mg/mL, 5 to 50 mg/mL, 5 to 45 mg/mL, 5 to 40 mg/mL, 10 to 200 mg/mL, 10 to 150 mg/mL, 10 to 100 mg/mL, 10 to 90 mg/mL, 10 to 80 mg/mL, 10 to 75 mg/mL, 10 to 70 mg/mL, 10 to 65 mg/mL, 10 to 60 mg/mL, 10 to 55 mg/mL, 10 to 50 mg/mL, 10 to 45 mg/mL, or 10 to 40 mg/mL.

The concentration of the second group of compounds (salts of Formula II or Formula III, e.g., fatty acid salts) in the solvent/solution/suspension/colloid can, for example, be in a range of about 0.01 mg/mL to about 80 mg/mL, such as about 0.01 to 75 mg/mL, 0.01 to 70 mg/mL, 0.01 to 65 mg/mL, 0.01 to 60 mg/mL, 0.01 to 55 mg/mL, 0.01 to 50 mg/mL, 0.01 to 45 mg/mL, 0.01 to 40 mg/mL, 0.01 to 35 mg/mL, 0.01 to 30 mg/mL, 0.01 to 25 mg/mL, 0.01 to 20 mg/mL, 0.01 to 15 mg/mL, 0.01 to 10 mg/mL, 0.1 to 80 mg/mL, 0.1 to 75 mg/mL, 0.1 to 70 mg/mL, 0.1 to 65 mg/mL, 0.1 to 60 mg/mL, 0.1 to 55 mg/mL, 0.1 to 50 mg/mL, 0.1 to 45 mg/mL, 0.1 to 40 mg/mL, 0.1 to 35 mg/mL, 0.1 to 30 mg/mL, 0.1 to 25 mg/mL, 0.1 to 20 mg/mL, 0.1 to 15 mg/mL, 0.1 to 10 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 1 to 35 mg/mL, 1 to 30 mg/mL, 1 to 25 mg/mL, 1 to 20 mg/mL, 1 to 15 mg/mL, 1 to 10 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 2 to 35 mg/mL, 2 to 30 mg/mL, 2 to 25 mg/mL, 2 to 20 mg/mL, 2 to 15 mg/mL, or 2 to 10 mg/mL.

The concentration of the composition (e.g., the coating agent) in the solvent/solution/suspension/colloid can, for example, be in a range of about 1 mg/mL to about 200 mg/mL, such as about 1 to 150 mg/mL, 1 to 100 mg/mL, 1 to 90 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 2 to 200 mg/mL, 2 to 150 mg/mL, 2 to 100 mg/mL, 2 to 90 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 5 to 200 mg/mL, 5 to 150 mg/mL, 5 to 100 mg/mL, 5 to 90 mg/mL, 5 to 80 mg/mL, 5 to 75 mg/mL, 5 to 70 mg/mL, 5 to 65 mg/mL, 5 to 60 mg/mL, 5 to 55 mg/mL, 5 to 50 mg/mL, 5 to 45 mg/mL, 5 to 40 mg/mL, 10 to 200 mg/mL, 10 to 150 mg/mL, 10 to 100 mg/mL, 10 to 90 mg/mL, 10 to 80 mg/mL, 10 to 75 mg/mL, 10 to 70 mg/mL, 10 to 65 mg/mL, 10 to 60 mg/mL, 10 to 55 mg/mL, 10 to 50 mg/mL, 10 to 45 mg/mL, or 10 to 40 mg/mL.

As also described above and demonstrated in the examples below, the coating solutions/suspensions/colloids can further include a wetting agent that serves to reduce the contact angle between the solution/suspension/colloid and the surface of the substrate being coated. The wetting agent can be included as a component of the coating agent and therefore added to the solvent at the same time as other components of the coating agent. Alternatively, the wetting agent can be separate from the coating agent and can be added to the solvent either before, after, or at the same time as the coating agent. Alternatively, the wetting agent can be separate from the coating agent, and can be applied to a surface before the coating agent in order to prime the surface.

The wetting agent can be a fatty acid or salt or ester thereof. The wetting agent can be a compound or group of compounds of Formula I, II, or III, where Formulas I, II, and III are given above. In particular, the wetting agent compounds can each have a carbon chain length of 13 or less. For example, the carbon chain length can be, 7, 8, 9, 10, 11, 12, 13, in a range of 7 to 13, or in a range of 8 to 12. The wetting agent can also or alternatively be one or more of a phospholipid, a lysophospholipid, a glycoglycerolipid, a glycolipid (for example, sucrose esters of fatty acids), an ascorbyl ester of a fatty acid, an ester of lactic acid, an ester of tartaric acid, an ester of malic acid, an ester of fumaric acid, an ester of succinic acid, an ester of citric acid, an ester of pantothenic acid, or a fatty alcohol derivative (e.g., an alkyl sulfate). In some embodiments, the wetting agents included in the mixtures herein are edible and/or safe for consumption.

Prior to adding the wetting agent to the solvent (and either before or after adding the coating agent for cases where the wetting agent and coating agent are separate), the contact angle between the solvent/solution/suspension/colloid and carnauba, candelilla, or paraffin wax can be at least about 70°, for example at least about 75°, at least about 80°, at least about 85°, or at least about 90°. After adding the wetting agent to the solvent (and either before or after adding the coating agent for cases where the wetting agent and coating agent are separate), the contact angle between the resulting solution/suspension/colloid and carnauba, candelilla, or paraffin wax can be less than 85°, for example less than about 80°, less than about 75°, less than about 70°, less than about 65°, less than about 60°, less than about 55°, less than about 50°, less than about 45°, less than about 40°, less than about 35°, less than about 30°, less than about 25°, less than about 20°, less than about 15°, less than about 10°, less than about 5°, or about 0°.

Because the wetting agents can in many cases damage the substrate being coated, the concentration of the wetting agent compounds can be less than that of the other components of the coating agent. However, if the concentration of the wetting agents added to the solvent is too low, the surface energy of the resulting solution/suspension/colloid may not be substantially different from that of the solvent, in which case improved surface wetting of the substrate may not be achieved.

In some embodiments, compounds used as wetting agents can also (or alternatively) be used as emulsifiers. For example, in some embodiments, a medium chain fatty acid (e.g., having a carbon chain length of 7, 8, 9, 10, 11, 12, or 13) or salt or ester thereof is used as an emulsifier (and optionally also functions as a wetting agent) in the composition, thereby enabling the composition to be dissolved or suspended in the solvent. In some embodiments, a phospholipid, a lysophospholipid, a glycoglycerolipid, a glycolipid (for example, sucrose esters of fatty acids), an ascorbyl ester of a fatty acid, an ester of lactic acid, an ester of tartaric acid, an ester of malic acid, an ester of fumaric acid, an ester of succinic acid, an ester of citric acid, an ester of pantothenic acid, or a fatty alcohol derivative (e.g. an alkyl sulfate), is included in the composition and functions as an emulsifier (and optionally also functions as a wetting agent). In some embodiments, the emulsifier is cationic. In some embodiments, the emulsifier is anionic. In some embodiments, the emulsifier is zwitterionic. In some embodiments, the emulsifier is uncharged.

In some embodiments, the composition (e.g., coating or coating agent) comprises one or more (e.g., 1, 2, or 3) wetting agents, surfactants, and/or emulsifiers. In some embodiments, the one or more wetting agents, surfactants, and/or emulsifiers comprise sodium bicarbonate, citric acid, cetyl trimethylammonium bromide, sodium lauryl sulfate, ammonium lauryl sulfate, sodium laureth sulfate, sodium myreth sulfate, docusate, sodium dodecyl sulfate, sodium stearate, sodium lauroyl sarcosinate, perfluorononanoate, perfluorooctanoate, perfluorooctanesulfonate (PFOS), perfluorobutanesulfonate, alkyl-aryl ether phosphates, alkyl ether phosphates, 2-[4-(2,4,4-trimethylpentan-2-yl)phenoxy]ethanol (Triton X-100), 3-[(3-Cholamidopropyl)dimethylammonio]-1-propanesulfonate (CHAPS), cholic acid, nonyl phenoxypolyethoxylethanol (NP-40), octyl thioglucoside, octyl glucoside, dodecyl maltoside, octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB), cocamidopropyl hydroxysultaine, cocamidopropyl betaine, phosphatidylserine, phosphatidylethanolamine, phosphatidylcholine, phosphatidylinositol, phosphatidic acid, lysophosphatidylserine, lysophosphatidylethanolamine, lysophosphatidylcholine, lysophosphatidylinositol, lysophosphatidic acid, sphingomyelins, lauryldimethylamine oxide, myristamine oxide, octaethylene glycol monododecyl ether, pentaethylene glycol monododecyl ether, polyethoxylated tallow amine, cocamide monoethanolamine, cocamide diethanolamine, poloxamers, fatty acid esters of polyhydroxy compounds, fatty acid esters of glycerol, glycerol monostearate, glycerol monolaurate, fatty acid esters of sorbitol, sorbitan monolaurate, sorbitan monostearate, sorbitan tristearate, Tween 20, Tween 40, Tween 60, Tween 80, fatty acid esters of sucrose, alkyl polyglucosides, alkyl polyglycoside, decyl glucoside, lauryl glucoside, octyl glucoside, fatty acid esters of sucrose, sucrose monostearate, sucrose distearate, sucrose tristearate, sucrose polystearate, sucrose monopalmitate, sucrose dipalmitate, sucrose tripalmitate, sucrose polypalmitate, sucrose monomyristate, sucrose dimyristate, sucrose trimyristate, sucrose polymyristate, sucrose monolaurate, sucrose dilaurate, sucrose trilaurate, or sucrose polylaurate. For example, the one or more wetting agents, surfactants, and/or emulsifiers comprises sodium lauryl sulfate. For example, the one or more wetting agents, surfactants, and/or emulsifiers comprises sodium bicarbonate. For example, the one or more wetting agents, surfactants, and/or emulsifiers comprises citric acid.

In some embodiments, the mixture or composition (e.g., coating or coating agent) comprises from about 0.1% to about 40% by weight of the one or more wetting agents, surfactants, and/or emulsifiers. For example, the mixture or composition (e.g., coating or coating agent) comprises from about 0.1% to about 35%, from about 0.1% to about 30%, from about 0.1% to about 25%, from about 0.1% to about 20%, from about 0.1% to about 15%, from about 0.1% to about 10%, from about 0.1% to about 8%, from about 0.1% to about 6%, from about 0.1% to about 5%, from about 0.1% to about 4%, from about 0.1% to about 3%, from about 0.1% to about 2%, from about 0.1% to about 1%, from about 0.1% to about 0.5%, from about 1% to about 40%, from about 1% to about 30%, from about 1% to about 20%, from about 1% to about 15%, from about 1% to about 10%, from about 1% to about 5%, from about 3% to about 9%, from about 5% to about 10%, from about 10% to about 20%, from about 20% to about 30%, from about 30% to about 40%, from about 20% to about 40%, from about 25% to about 35%, about 0.1%, about 1%, about 2%, about 3%, about 4%, about 5%, about 6%, about 7%, about 8%, about 9%, about 29%, about 30%, or about 31%.

In some embodiments, the mixture or composition (e.g., coating or coating agent) comprises one or more (e.g., 1, 2, or 3) preservatives. In some embodiments, the one or more preservatives comprise one or more antioxidants, one or more antimicrobial agents, one or more chelating agents, or any combination thereof. Exemplary preservatives include, but are not limited to, vitamin E, vitamin C, butylatedhydroxyanisole (BHA), butylatedhydroxytoluene (BHT), sodium benzoate, disodium ethylenediaminetetraacetic acid (EDTA), citric acid, benzyl alcohol, benzalkonium chloride, butyl paraben, chlorobutanol, meta cresol, chlorocresol, methyl paraben, phenyl ethyl alcohol, propyl paraben, phenol, benzonic acid, sorbic acid, methyl paraben, propyl paraben, bronidol, and propylene glycol.

In some embodiments, the mixture or composition (e.g., coating or coating agent) comprises from about 0.1% to about 40% by weight of the one or more preservatives. For example, the mixture or composition (e.g., coating or coating agent) comprises from about 0.1% to about 35%, from about 0.1% to about 30%, from about 0.1% to about 25%, from about 0.1% to about 20%, from about 0.1% to about 15%, from about 0.1% to about 10%, from about 0.1% to about 8%, from about 0.1% to about 6%, from about 0.1% to about 5%, from about 0.1% to about 4%, from about 0.1% to about 3%, from about 0.1% to about 2%, from about 0.1% to about 1%, from about 0.1% to about 0.5%, from about 1% to about 40%, from about 1% to about 30%, from about 1% to about 20%, from about 1% to about 15%, from about 1% to about 10%, from about 1% to about 5%, from about 3% to about 9%, from about 5% to about 10%, from about 10% to about 20%, from about 20% to about 30%, from about 30% to about 40%, about 0.1%, about 1%, about 2%, about 3%, about 4%, about 5%, about 6%, about 7%, about 8%, or about 9%.

In view of the above, any of the compositions (e.g., coating agents) described herein can include a first group of compounds of Formulas I, II, and/or III (e.g., fatty acids and/or salts or esters thereof) and a second group of compounds of Formulas I, II, and/or III (e.g., fatty acids and/or salts or esters thereof), where each compound of the first group of compounds has a carbon chain length of at least 14, and each compound of the second group of compounds has a carbon chain length of 13 or less, for example in a range of 7 to 13. The first and second groups of compounds can each, for example, include ethyl esters, methyl esters, glyceryl esters (e.g., monoacylglycerides such as 1-monoacylglycerides or 2-monoacylglycerides), sodium salts of fatty acids, potassium salts of fatty acids, calcium salts of fatty acids, magnesium salts of fatty acids, or combinations thereof. In some embodiments, any of the compositions described herein can include a first group of compounds of Formula I, (e.g., fatty acids and/or esters thereof) and a second group of compounds, where the second group of compounds function as an emulsifier (e.g. is a fatty acid salt, a phospholipid, a lysophospholipid, a glycoglycerolipid, a glycolipid (for example, sucrose esters of fatty acids), an ascorbyl ester of a fatty acid, an ester of lactic acid, an ester of tartaric acid, an ester of malic acid, an ester of fumaric acid, an ester of succinic acid, an ester of citric acid, an ester of pantothenic acid, or a fatty alcohol derivative (e.g. an alkyl sulfate).

A mass ratio of the fatty acids and/or esters in the first group of compounds to the emulsifiers in the second group of compounds can be in any of the ranges given previously (e.g., a range such that the solubility of the coating agent in the solvent is sufficient to allow the desired coating agent concentration to be dissolved, suspended, or dispersed in the solvent). A mass ratio of the first group of compounds (carbon chain length of at least 14) to the second group of compounds (carbon chain length of 13 or less, or emulsifier) can be in a range of about 2 to 200, for example about 2 to 100, 2 to 90, 2 to 80, 2 to 70, 2 to 60, 2 to 50, 2 to 40, 2 to 30, 2 to 25, 2 to 20, 2 to 15, 2 to 10, 2.5 to 200, 2.5 to 100, 2.5 to 90, 2.5 to 80, 2.5 to 70, 2.5 to 60, 2.5 to 50, 2.5 to 40, 2.5 to 30, 2.5 to 25, 2.5 to 20, 2.5 to 15, 2.5 to 10, 3 to 200, 3 to 100, 3 to 90, 3 to 80, 3 to 70, 3 to 60, 3 to 50, 3 to 40, 3 to 30, 3 to 25, 3 to 20, 3 to 15, 3 to 10, 4 to 200, 4 to 100, 4 to 90, 4 to 80, 4 to 70, 4 to 60, 4 to 50, 4 to 40, 4 to 30, 4 to 25, 4 to 20, 4 to 15, 4 to 10, 5 to 200, 5 to 100, 5 to 90, 5 to 80, 5 to 70, 5 to 60, 5 to 50, 5 to 40, 5 to 30, 5 to 25, 5 to 20, 5 to 15, or 5 to 10.

Figure 19:
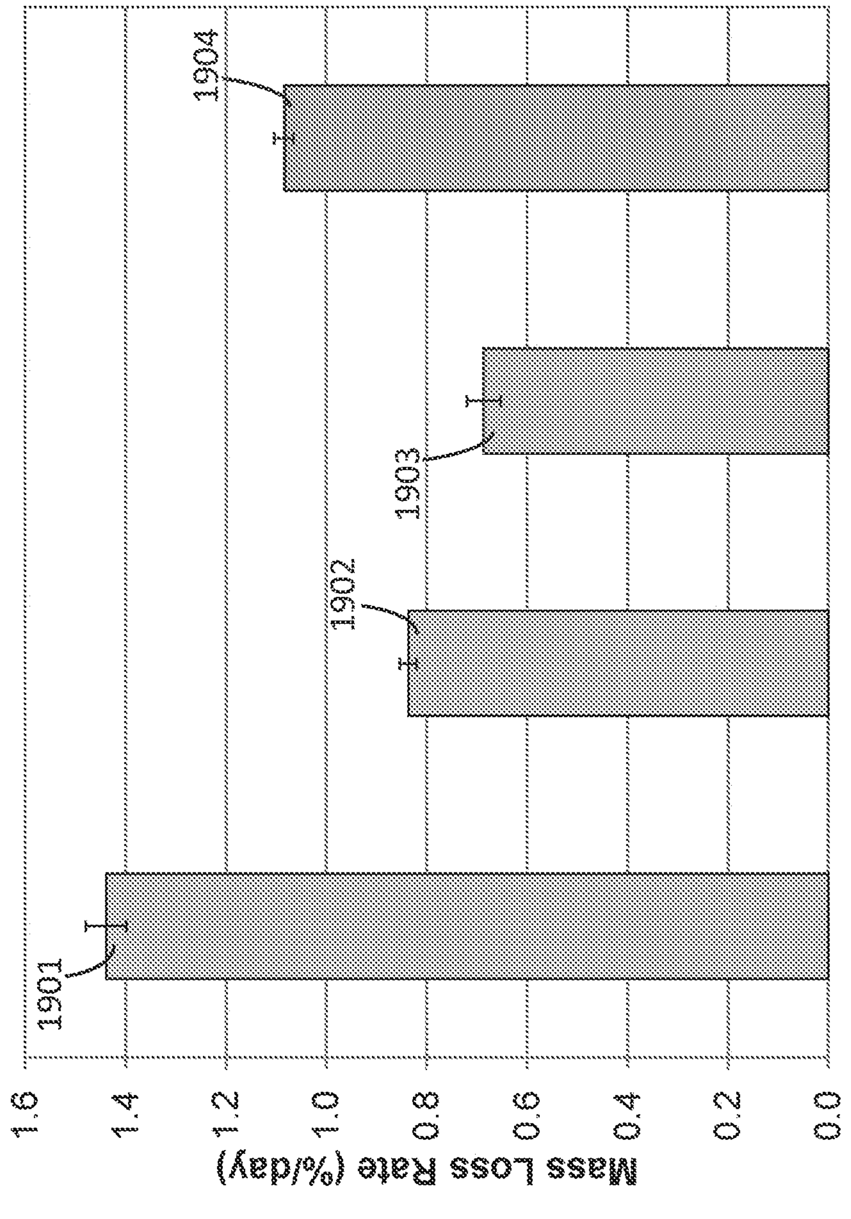
FIG. 19 shows a plot of average daily mass loss rates of avocados treated with mixtures including various combinations of fatty acid esters and emulsifiers suspended in water.

As shown in FIG. 19, mixtures comprising fatty acid esters (e.g. monoacylglycerides) and various emulsifiers can be used as coatings on agricultural products (e.g. fresh produce) to reduce the mass loss rate. For example, as shown in FIG. 19 and Example 14 below, coatings formed on avocados from a 94:6 mixture of compounds of Formula I (PA-1G and SA-1G) to compounds of Formula II or III (SA-Na) resulted in a mass loss rate of 0.84% per day (bar 1902). Coatings formed on avocados from a 94:6 mixture of compounds of Formula I (PA-IG and SA-1G) to a fatty alcohol derivative (e.g. sodium lauryl sulfate) resulted in a mass loss rate of 0.69% per day (bar 1903). Coatings formed on avocados from a 70:30 mixture of compounds of Formula I (PA-1G and SA-1G) to a phospholipid (e.g. lecithin) resulted in a mass loss rate of 1.08% per day (bar 1904). All of the exemplified mixtures reduced the mass loss rate of the avocados as compared to the untreated control, which had a mass loss rate of 1.44% per day (bar 1901).

Figure 20:
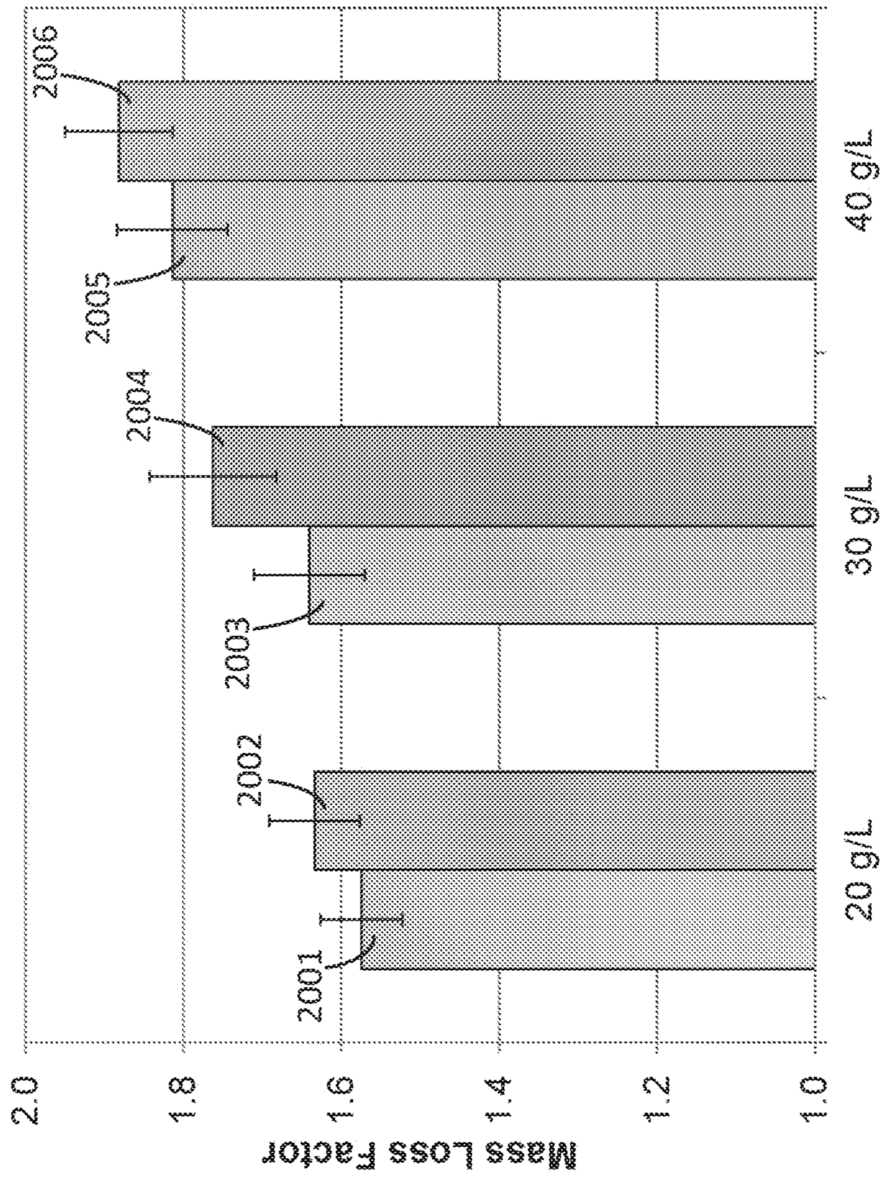
FIG. 20 shows a plot of mass loss factors for avocados treated with mixtures including various combinations of fatty acid esters and emulsifiers suspended in water at different concentrations.
Figure 21:
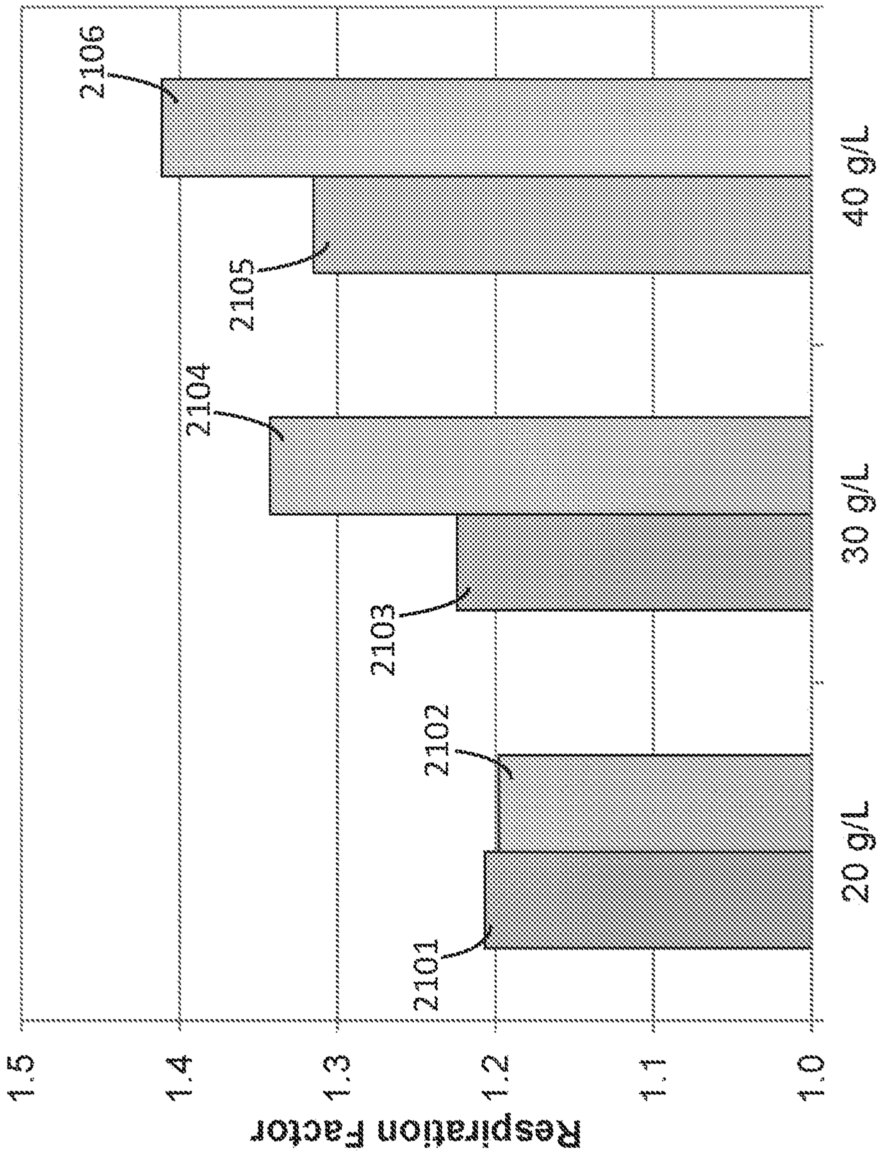
FIG. 21 shows a plot of respiration factors for avocados treated with mixtures including various combinations of fatty acid esters and emulsifiers suspended in water at different concentrations.

As shown in FIGS. 20 and 21, the concentration of the fatty acid esters (e.g. monoacylglycerides) and emulsifier can impact the mass loss and respiration factors of avocados. For example, as shown in FIG. 20, increasing the concentration of the 94:6 mixture of compounds of Formula I (PA-1G and SA-1G) to compounds of Formula II or III (SA-Na) from 20 g/L (bar 2001) to 30 g/L (bar 2003) increased the mass loss factor from 1.57 to 1.64. Increasing the concentration from 30 g/L (bar 2003) to 40 g/L (bar 2005) increased to mass loss factor from 1.64 to 1.81. Correspondingly, as seen in FIG. 21 the respiration factor also increased from 1.21 at 20 g/L (bar 2101) to 1.22 at 30 g/L (bar 2103) to 1.31 at 40 g/L (bar 2105). A concentration dependence was also observed with a the 94:6 mixture of compounds of Formula I (PA-1G and SA-1G) to a fatty alcohol derivative (e.g. sodium lauryl sulfate). As seen in FIG. 20, the mass loss factor increased from 1.63 at 20 g/L (bar 2002) to 1.76 at 30 g/L (bar 2004) to 1.88 at 40 g/L (bar 2006). Correspondingly, as seen in FIG. 21 the respiration factor also increased from 1.20 at 20 g/L (bar 2102) to 1.34 at 30 g/L (bar 2104) to 1.41 at 40 g/L (bar 2106).

Figure 22:
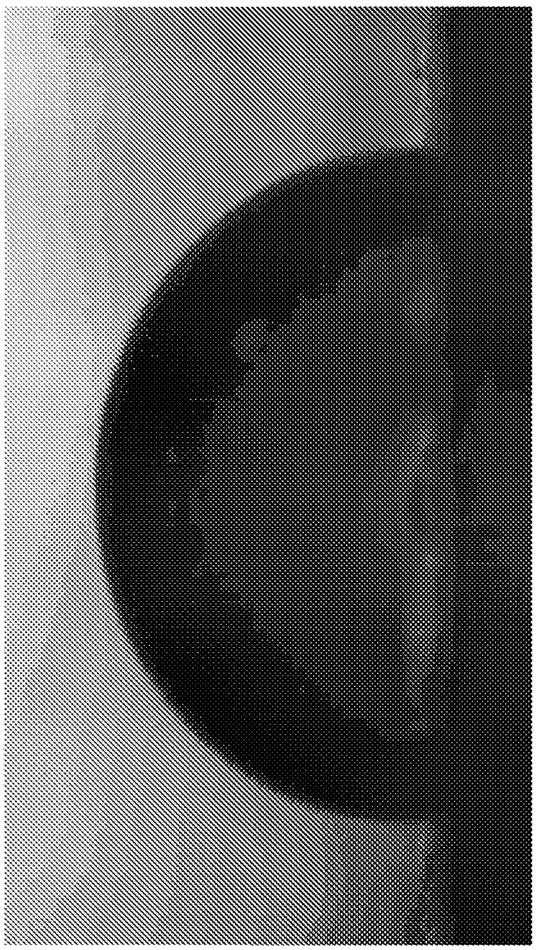
FIG. 22 shows a representative image of a droplet of a mixture including a combination of fatty acid esters and fatty acid salts on a surface.
Figure 23:
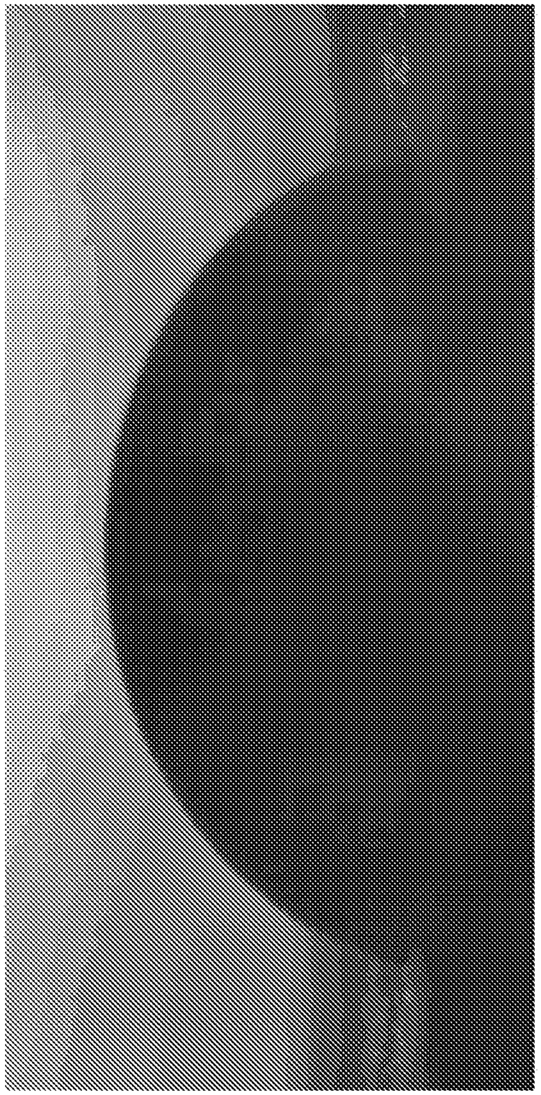
FIG. 23 shows a representative image of a droplet of a mixture including a combination of fatty acid esters and sodium laurel sulfate on a surface.

As seen in FIG. 22, the contact angle a 94:6 mixture of compounds of Formula I (PA-1G and SA-1G) to compounds of Formula II or III (SA-Na) at 45 g/L was 95±5°. As seen in FIG. 23, the contact angle a 94:6 mixture of compounds of Formula I (PA-1G and SA-1G) to a fatty alcohol derivative (e.g. sodium lauryl sulfate) at 45 g/L was 84±4°. Without wishing to be bound to theory, the increase in mass loss factor when utilizing a fatty alcohol derivative (e.g. an alkyl sulfate) as an emulsifier can be attributed to the improved wetting, as compared to a compound of Formula II or III (SA-Na).

As described above, the coating agent can be added to or dissolved, suspended, or dispersed in a solvent to form a suspension, colloid, or solution. The various components of the coating agent (e.g., the compounds of Formula I, the salts of Formula II and/or III, and/or the wetting agents) can be combined prior to being added to the solvent and then added to the solvent together. Alternatively, at least some of the components of the coating agent can be kept separate from other components and can be added to the solvent consecutively (or at separate times).

The concentration of the first group of compounds (compounds of Formula I, II and/or III having a carbon chain length of at least 14) in the solvent/solution/suspension/colloid can, for example, be in a range of about 1 mg/mL to about 200 mg/mL, such as about 1 to 150 mg/mL, 1 to 100 mg/mL, 1 to 90 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 2 to 200 mg/mL, 2 to 150 mg/mL, 2 to 100 mg/mL, 2 to 90 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 5 to 200 mg/mL, 5 to 150 mg/mL, 5 to 100 mg/mL, 5 to 90 mg/mL, 5 to 80 mg/mL, 5 to 75 mg/mL, 5 to 70 mg/mL, 5 to 65 mg/mL, 5 to 60 mg/mL, 5 to 55 mg/mL, 5 to 50 mg/mL, 5 to 45 mg/mL, 5 to 40 mg/mL, 10 to 200 mg/mL, 10 to 150 mg/mL, 10 to 100 mg/mL, 10 to 90 mg/mL, 10 to 80 mg/mL, 10 to 75 mg/mL, 10 to 70 mg/mL, 10 to 65 mg/mL, 10 to 60 mg/mL, 10 to 55 mg/mL, 10 to 50 mg/mL, 10 to 45 mg/mL, or 10 to 40 mg/mL.

The concentration of wetting agents or second group of compounds of Formula I, II, and/or III (e.g., compounds of Formula I and/or salts of Formula II and/or III having a carbon chain length of 13 or less) in the solvent/solution/suspension/colloid can, for example, be about 0.01 mg/mL to about 20 mg/mL, such as about 0.01 mg/mL to 15 mg/mL, 0.01 mg/mL to 12 mg/mL, 0.01 mg/mL to 10 mg/mL, 0.01 mg/mL to 9 mg/mL, 0.01 mg/mL to 8 mg/mL, 0.01 mg/mL to 7 mg/mL, 0.01 mg/mL to 6 mg/mL, 0.01 mg/mL to 5 mg/mL, 0.1 mg/mL to 20 mg/mL, 0.1 mg/mL to 15 mg/mL, 0.1 mg/mL to 12 mg/mL, 0.1 mg/mL to 10 mg/mL, 0.1 mg/mL to 9 mg/mL, 0.1 mg/mL to 8 mg/mL, 0.1 mg/mL to 7 mg/mL, 0.1 mg/mL to 6 mg/mL, 0.1 mg/mL to 5 mg/mL, 0.5 mg/mL to 20 mg/mL, 0.5 mg/mL to 15 mg/mL, 0.5 mg/mL to 12 mg/mL, 0.5 mg/mL to 10 mg/mL, 0.5 mg/mL to 9 mg/mL, 0.5 mg/mL to 8 mg/mL, 0.5 mg/mL to 7 mg/mL, 0.5 mg/mL to 6 mg/mL, or 0.5 mg/mL to 5 mg/mL.

The composition that is added to the solvent (e.g., the coating agent) can be composed from about 50% to about 99.9% (e.g., about 60%-99.9%, 65%-99.9%, 70%-99.9%, 75%-99.9%, 80%-99.9%, 85%-99.9%, 90%-99.9%, 50%-99%, 60%-99%, 65%-99%, 70%-99%, 75%-99%, 80%-99%, 85%-99%, 90%-99%, 50%-98%, 60%-98%, 65%-98%, 70%-98%, 75%-98%, 80%-98%, 85%-98%, 90%-98%, 50%-96%, 60%-96%, 65%-96%, 70%-96%, 75%-96%, 80%-96%, 85%-96%, 90%-96%, 50%-94%, 60%-94%, 65%-94%, 70%-94%, 75%-94%, 80%-94%, 85%-94%, or 90%-94%) by mass of a first group of compounds of fatty acids, fatty acid esters, fatty acid salts, or combinations thereof (e.g., compounds of Formula I and/or salts of Formula II or Formula III), where optionally each compound of the first group optionally has a carbon chain length of at least 14. In some embodiments, the compounds of the first group are fatty acid esters, e.g., monoacylglycerides.

The composition that is added to the solvent (e.g., the coating agent) can be composed from about 0.1% to about 50% (e.g., about 0.1%-45%, 0.1%-40%, 0.1%-35%, 0.1%-30%, 0.1%-25%, 0.1%-20%, 0.1%-15%, 0.1%-10%, 0.1%-8%, 0.1%-6%, 0.1%-5%, 0.1%-4%, 0.4%-50%, 0.4%-45%, 0.4%-40%, 0.4%-35%, 0.4%-30%, 0.4%-25%, 0.4%-20%, 0.4%-15%, 0.4%-10%, 0.4%-8%, 0.4%-6%, 0.4%-5%, 0.4%-4%, 0.7%-50%, 0.7%-45%, 0.7%-40%, 0.7%-35%, 0.7%-30%, 0.7%-25%, 0.7%-20%, 0.7%-15%, 0.7%-10%, 0.7%-8%, 0.7%-6%, 0.7%-5%, 0.7%-4%, 1%-50%, 1%-45%, 1%-40%, 1%-35%, 1%-30%, 1%-25%, 1%-20%, 1%-15%, 1%-10%, 1%-8%, 1%-6%, 1%-5%, or 1%-4%) by mass of a second group of compounds of fatty acids, fatty acid esters, fatty acid salts, or combinations thereof (e.g., compounds of Formula I and/or salts of Formula II and/or III), where each compound of the second group optionally has a carbon chain length of 13 or less (e.g., a carbon chain length in a range of 7 to 13). The compounds of the second group can function as wetting agents, as previously described.

The composition that is added to the solvent (e.g., the coating agent) can be composed from about 0.1% to about 50% (e.g., about 0.1%-45%, 0.1%-40%, 0.1%-35%, 0.1%-30%, 0.1%-25%, 0.1%-20%, 0.1%-15%, 0.1%-10%, 0.1%-8%, 0.1%-6%, 0.1%-5%, 0.1%-4%, 0.4%-50%, 0.4%-45%, 0.4%-40%, 0.4%-35%, 0.4%-30%, 0.4%-25%, 0.4%-20%, 0.4%-15%, 0.4%-10%, 0.4%-8%, 0.4%-6%, 0.4%-5%, 0.4%-4%, 0.7%-50%, 0.7%-45%, 0.7%-40%, 0.7%-35%, 0.7%-30%, 0.7%-25%, 0.7%-20%, 0.7%-15%, 0.7%-10%, 0.7%-8%, 0.7%-6%, 0.7%-5%, 0.7%-4%, 1%-50%, 1%-45%, 1%-40%, 1%-35%, 1%-30%, 1%-25%, 1%-20%, 1%-15%, 1%-10%, 1%-8%, 1%-6%, 1%-5%, or 1%-4%) by mass of a third group of compounds comprised of salts of compounds of Formula II or Formula III, or fatty acid salts. Each compound of the third group can optionally have a carbon chain length greater than 13. The compounds of the third group can function as emulsifiers and, for example, increase the solubility of the coating agent, as previously described.

Any of the coating solutions/suspensions/colloids described herein can further include an antimicrobial agent, for example ethanol or citric acid. In some embodiments, the antimicrobial agent is part of or a component of the solvent. Any of the coating solutions described herein can further include other components or additives such as sodium bicarbonate.

Any of the coating agents described herein can further include additional materials that are also transported to the surface with the coating, or are deposited separately and are subsequently encapsulated by the coating (e.g., the coating is formed at least partially around the additional material), or are deposited separately and are subsequently supported by the coating (e.g., the additional material is anchored to the external surface of the coating).

Examples of such additional materials can include cells, biological signaling molecules, vitamins, minerals, pigments, aromas, enzymes, catalysts, antifungals, antimicrobials, and/or time-released drugs. The additional materials can be non-reactive with surface of the coated product and/or coating, or alternatively can be reactive with the surface and/or coating.

In some embodiments, the coating can include an additive configured, for example, to modify the viscosity, vapor pressure, surface tension, or solubility of the coating. The additive can, for example, be configured to increase the chemical stability of the coating. For example, the additive can be an antioxidant configured to inhibit oxidation of the coating. In some embodiments, the additive can reduce or increase the melting temperature or the glass-transition temperature of the coating. In some embodiments, the additive is configured to reduce the diffusivity of water vapor, oxygen, $CO_2$, or ethylene through the coating or enable the coating to absorb more ultra violet (UV) light, for example to protect the agricultural product (or any of the other products described herein). In some embodiments, the additive can be configured to provide an intentional odor, for example a fragrance (e.g., smell of flowers, fruits, plants, freshness, scents, etc.). In some embodiments, the additive can be configured to provide color and can include, for example, a dye or a US Food and Drug Administration (FDA) approved color additive.

Any of the coating agents or coatings formed thereof that are described herein can be flavorless or have high flavor thresholds, e.g. above 500 ppm, and can be odorless or have a high odor threshold. In some embodiments, the materials included in any of the coatings described herein can be substantially transparent. For example, the coating agent, the solvent, and/or any other additives included in the coating can be selected so that they have substantially the same or similar indices of refraction. By matching their indices of refraction, they may be optically matched to reduce light scattering and improve light transmission. For example, by utilizing materials that have similar indices of refraction and have a clear, transparent property, a coating having substantially transparent characteristics can be formed.

The compositions (e.g., coating agents) described herein can be of high purity. For example, the compositions can be substantially free (e.g., be less than 10% by mass, less than 9% by mass, less than 8% by mass, less than 7% by mass, less than 6% by mass, or less than 5%, 4%, 3%, 2%, or 1% by mass) of diglycerides, triglycerides, acetylated monoglycerides, proteins, polysaccharides, phenols, lignans, aromatic acids, terpenoids, flavonoids, carotenoids, alkaloids, alcohols, alkanes, and/or aldehydes. In some embodiments, the compositions comprise less than 10% (e.g., less than 9%, 8%, 7%, 6%, 5%, 4%, 3%, 2%, or 1%) by mass of diglycerides. In some embodiments, the compositions comprise less than 10% (e.g., less than 9%, 8%, 7%, 6%, 5%, 4%, 3%, 2%, or 1%) by mass of triglycerides. In some embodiments, the compositions comprise less than 10% (e.g., less than 9%, 8%, 7%, 6%, 5%, 4%, 3%, 2%, or 1%) by mass of acetylated monoglycerides.

Any of the coatings described herein can be disposed on the external surface of an agricultural product or other substrate using any suitable means. For example, the substrate can be dip-coated in a bath of the coating formulation (e.g., an aqueous or mixed aqueous-organic or organic solution). The deposited coating can form a thin layer on the surface of an agricultural product, which can protect the agricultural product from biotic stressors, water loss, respiration, and/or oxidation. In some embodiments, the deposited coating can have a thickness of less than 20 microns, less than 10 microns, less than 9 microns, less than 8 microns, less than 7 microns, less than 6 microns, less than 5 microns, less than 4 microns, less than 3 microns, less than 2 microns, less than about 1.5 microns, about 100 nm to about 20 microns, about 100 nm to about 2 microns, about 700 nm to about 1.5 microns, 700 nm to about 1 micron, about 1 micron to about 1.6 microns, about 1.2 microns to about 1.5 microns, and/or the coating can be transparent to the naked eye. For example, the deposited coating can have a thickness of about 10 nm, about 20 nm, about 30 nm, about 40 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, 1,000 nm, about 1,100 nm, about 1,200 nm, about 1,300 nm, about 1,350 nm, about 1,400 nm, about 1,500 nm, about 1,600 nm, about 1,700 nm, about 1,800 nm, about 1,900 nm, about 2,000 nm, about 2,100 nm, about 2,200 nm, about 2,300 nm, about 2,400 nm, about 2,500 nm, about 2,600 nm, about 2,700 nm, about 2,800 nm, about 2,900 nm, or about 3,000 nm, inclusive of all ranges therebetween.

In some embodiments, the deposited coating can be deposited substantially uniformly over the substrate and can be free of defects and/or pinholes. In some embodiments, the dip-coating process can include sequential coating of the agricultural product in baths of coating precursors that can undergo self-assembly or covalent bonding on the agricultural product to form the coating. In some embodiments, the coating can be deposited on agricultural products by passing the agricultural products under a stream of the coating solution/suspension/colloid (e.g., a waterfall of the coating solution/suspension/colloid). For example, the agricultural products can be disposed on a conveyor that passes through the stream of the coating solution/suspension/colloid. In some embodiments, the coating can be misted, vapor- or dry vapor-deposited on the surface of the agricultural product. In some embodiments, the coating solution/suspension/colloid can be mechanically applied to the surface of the product to be coated, for example by brushing it onto the surface. In some embodiments, the coating can be configured to be fixed on the surface of the agricultural product by UV crosslinking or by exposure to a reactive gas, for example oxygen.

In some embodiments, the coating solutions/suspensions/colloids can be spray-coated on the agricultural products. Commercially available sprayers can be used for spraying the coating solutions/suspensions/colloids onto the agricultural product. In some embodiments, the coating formulation can be electrically charged in the sprayer before spray-coating on to the agricultural product, such that the deposited coating electrostatically and/or covalently bonds to the exterior surface of the agricultural product.

In some embodiments, coatings formed from coating agents described herein over agricultural products can be configured to change the surface energy of the agricultural product. Various properties of coatings described herein can be adjusted by tuning the crosslink density of the coating, its thickness, or its chemical composition. This can, for example, be used to control the ripening of postharvest fruit or produce. For example, coatings formed from coating agents that primarily include bifunctional or polyfunctional monomer units can, for example, have higher crosslink densities than those that include monofunctional monomer units. Thus, coatings formed from bifunctional or polyfunctional monomer units can in some cases result in slower rates of ripening as compared to coatings formed from monofunctional monomer units.

In some embodiments, one or more wetting agents such as those described above are used to improve the wetting of the surfaces to which the coating solutions/suspensions/colloids are applied, but the wetting agent are not included in the coating solutions/suspensions/colloids. Instead, the wetting agents are added to a second solvent (which can be the same as or different than the solvent to which the coating agent is added) to form a second mixture, and the second mixture is applied to the surface to be coated prior to applying the coating solution/suspension/colloid to the surface. In this case, the second mixture can prime the surface to be coated such that the contact angle of the coating solution/suspension/colloid with the surface is less than it would have otherwise been, thereby improving surface wetting.

As previously described, the coatings formed from coating agents described herein can be configured to prevent water loss or other moisture loss from the coated portion of the plant, delay ripening, and/or prevent oxygen diffusion into the coated portion of the plant, for example, to reduce oxidation of the coated portion of the plant. The coatings can also serve as a barrier to diffusion of carbon dioxide and/or ethylene into or out of the plant or agricultural product. The coatings can also protect the coated portion of the plant against biotic stressors, such as, for example, bacteria, fungi, viruses, and/or pests that can infest and decompose the coated portion of the plant. Since bacteria, fungi and pests all identify food sources via recognition of specific molecules on the surface of the agricultural product, coating the agricultural products with the coating agent can deposit molecularly contrasting molecules on the surface of the portion of the plant, which can render the agricultural products unrecognizable. Furthermore, the coating can also alter the physical and/or chemical environment of the surface of the agricultural product making the surface unfavorable for bacteria, fungi or pests to grow. The coating can also be formulated to protect the surface of the portion of the plant from abrasion, bruising, or otherwise mechanical damage, and/or protect the portion of the plant from photodegradation. The portion of the plant can include, for example, a leaf, a stem, a shoot, a flower, a fruit, a root, etc.

Any of the coatings described herein can be used to reduce the humidity generated by agricultural products (e.g., fresh produce) via mass loss (e.g. water loss) during transportation and storage by reducing the mass loss rate of the agricultural products (e.g., fresh produce). For example, as seen in Example 16, the mass loss rate from a group of lemons coated with a 94:6 mixture of compounds of Formula I (SA-1G and PA-1G) and compounds of Formula II or Formula III (SA-Na) at 50 g/L in water was 0.37% per day, as compared to 1.61% per day for the untreated control group. This corresponded to a lower humidity in cold storage after 48 hours (i.e. 61% humidity) for the coated group as compared to the untreated group (i.e. 72% humidity).

In some embodiments, the agricultural product is coated with a composition that reduces the mass loss rate by at least 10%, 15%, 20%, 25%, 30%, 35%, 40%, 45%, 50%, 55%, 60%, 65%, 70%, 75%, 80%, 85%, 90% or greater compared to untreated product measured. In some embodiments, treating an agricultural product using any of the coatings described herein can give a mass loss factor of at least 1.1, at least 1.2, at least 1.3, at least 1.4, at least 1.5, at least 1.6, at least 1.7, at least 1.8, at least 1.9, at least 2.0, at least 2.2, at least 2.4, at least 2.6, at least 2.8, at least 3.0. In some embodiments, treating an agricultural product using any of the coatings described herein can reduce the humidity generated during storage by at least 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated product. In some embodiments, the reduction in mass loss rate of the agricultural product can reduce the energy required to maintain a relative humidity at a predetermined level (e.g., at 90% relative humidity or less, at 85% relative humidity or less, at 80% relative humidity or less, at 75% relative humidity or less, at 70% relative humidity or less, at 65% relative humidity or less, at 60% relative humidity or less, at 55% relative humidity or less, at 50% relative humidity or less, or at 45% relative humidity or less) during storage or transportation. In some embodiments, the energy required to maintain a relative humidity at the predetermined level (e.g., any of the predetermined levels listed above) during storage or transportation can be reduced by at least 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated product.

Any of the coatings described herein can be used to reduce the heat generated by agricultural products (e.g., fresh produce) via respiration during transportation and storage by reducing the respiration rate of the agricultural products (e.g., fresh produce). As shown in Example 17, the energy usage to maintain a temperature (16° C.) of a group of avocados coated with a 94:6 mixture of compounds of Formula I (SA-1G and PA-1G) and compounds of Formula II or Formula III (SA-Na) at 50 g/L in water for 72 hours was 0.85 kWh, as compared to 1.19 kWh for the untreated control group. In some embodiments, the product is coated with a composition that reduces the respiration rate by at least 10%, 15%, 20%, 25%, 30%, 35%, 40%, 45%, 50%, 55%, 60%, 65%, 70%, 75%, 80%, 85%, 90% or greater compared to untreated product (measured as described above). In some embodiments, the reduction in heat generated by the agricultural product can reduce the energy required to maintain a temperature (e.g., a predetermined temperature) during storage or transportation. In some embodiments, the heat generated can be reduced by at least 5%, 10%, 15%, 20%, 25%, 30%, 35%, 40%, 45%, 50%, 55%, 60%, 65%, 70%, 75%, 80%, 85%, 90% or greater for coated products compared to untreated products. In some embodiments, the energy required to maintain the coated products at a predetermined temperature (e.g., at 25° C. or less, at 23° C. or less, at 20° C. or less, at 18° C. or less, at 15° C. or less, at 13° C. or less, at 10° C. or less, at 8° C. or less, at 5° C. or less, or at 3° C. or less) can be reduced by at least 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated products.

Respiration rate approximations for various types of agricultural products (e.g., fresh produce) are shown below:

| Produce Type | Respiration Rate (ml $CO_2$/kg · hour) at 20° C. |
|---|---|
| Apples | 10-30 |
| Apricot | 15-25 |
| Asparagus | 138-250 |
| Avocado | 40-150 |
| Bananas | 20-70 |
| Broccoli | 140-160 |
| Cantaloupe | 23-33 |
| Cherry | 22-28 |
| Corn | 268-311 |
| Cucumber | 7-24 |
| Fig | 20-30 |
| Grape | 12-15 |
| Grapefruit | 7-12 |
| Honeydew | 20-27 |
| Kiwifruit | 15-20 |
| Lemon | 10-14 |
| Lime | 6-10 |
| Mandarin | 10-15 |
| Mango | 35-80 |
| Orange | 11-17 |
| Papaya | 15-35 (at 15° C.) |
| Peach | 32-55 |
| Pear | 15-35 |
| Peas | 123-180 |
| Pineapple | 15-20 |
| Strawberry | 50-100 |
| Tomato | 12-22 |
| Watermelon | 17-25 |

Figure 24:
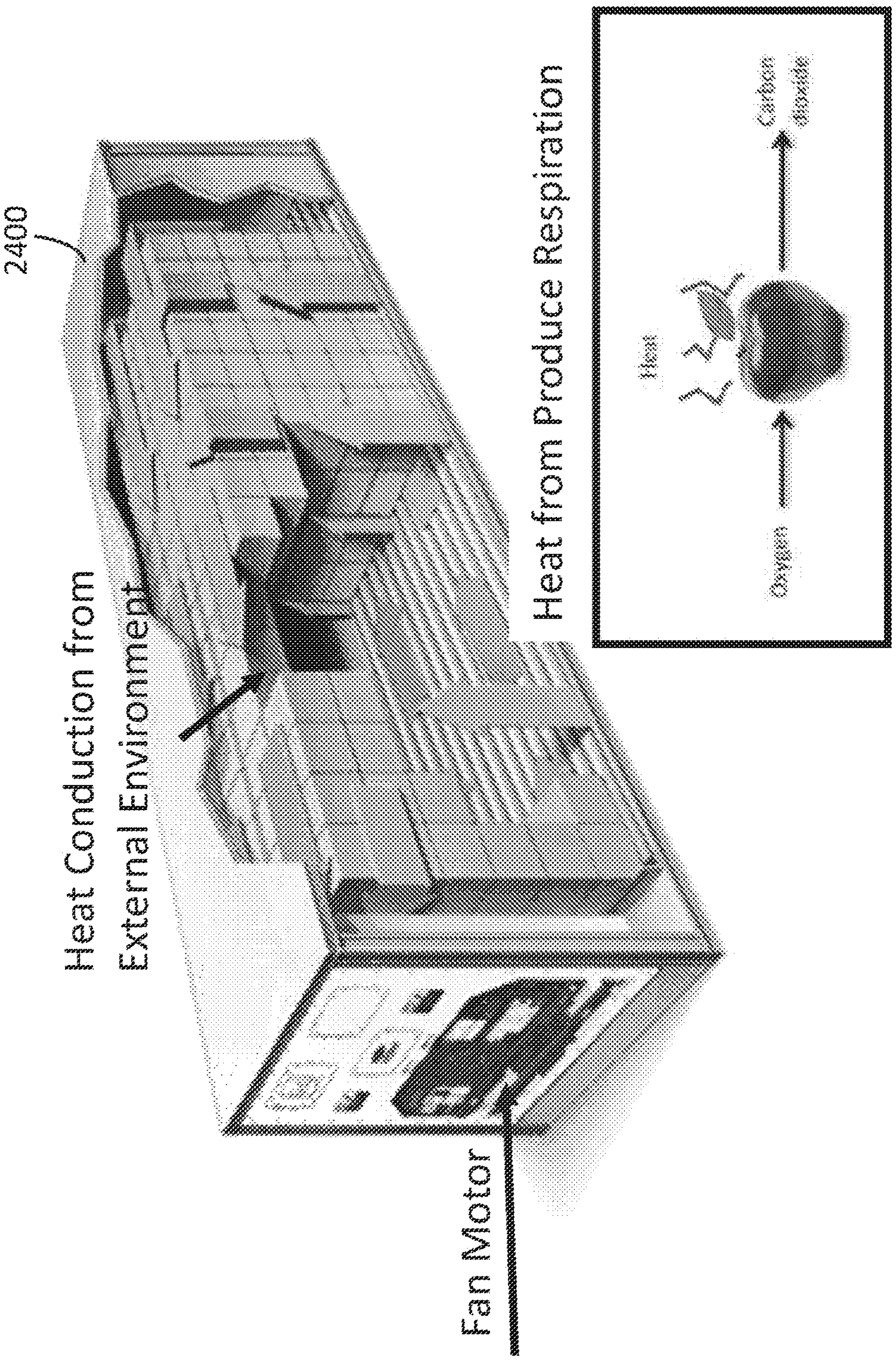
FIG. 24 shows the sources of heat generation or conduction in a shipping container.

In some embodiments, the methods and compositions described herein are used to treat agricultural products (e.g., fresh produce) that are stored and/or transported in a refrigerated container or "reefer" 2400, illustrated schematically in FIG. 24. As shown in FIG. 24, heat from produce respiration is a contributor to the overall heat within a refrigerated container. In some embodiments, the methods and compositions described herein can reduce the respiration rate of the treated agricultural products (e.g., fresh produce) in order to reduce the heat generated due to respiration of the agricultural products (e.g., fresh produce) in a refrigerated container or "reefer". In some embodiments, the methods and compositions described herein can reduce the mass loss rate of the treated agricultural products (e.g., fresh produce) in order to reduce the humidity generated due to mass loss (e.g. water loss) of the agricultural products (e.g., fresh produce) in a refrigerated container or "reefer".

Figure 25:
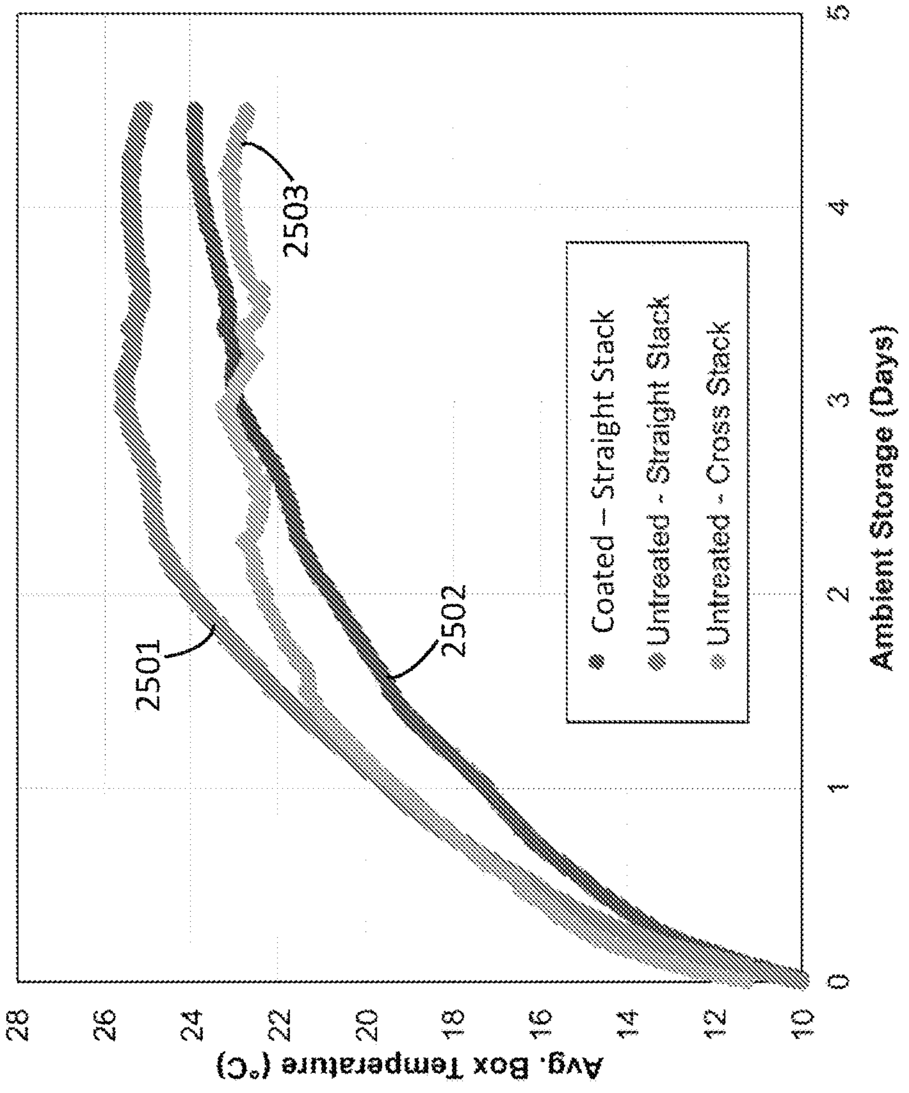
FIG. 25 shows the average temperature of stacks of boxes of avocados, untreated and coated with a mixture of fatty acid esters and fatty acid salts, in different orientations after removal from 10° C. storage.

The methods and compositions described herein can also be used to minimize or reduce temperature or humidity gradients that arise from concentrating agricultural products (e.g., fresh produce) in stacks or pallets in order to prevent uneven ripening. The treated agricultural products (e.g., fresh produce) can be straight stacked during storage or can be stacked in an alternative fashion (e.g. cross stacked) to increase circulation around the agricultural products (e.g., fresh produce). Within the produce supply chain, boxes of agricultural products may be reoriented from a straight stack, which can be preferable during shipment, to a cross stack, which can be used during storage to increase air circulation and to prevent uneven ripening. As shown in FIG. 25 and Example 18, coating an agricultural product with a 94:6 mixture of compounds of Formula I (PA-1G and SA-1G) to compounds of Formula II or III (SA-Na) can reduce the rate at which the temperature rises in a stack of boxes of avocados after removal from 10° C. storage. As shown in FIG. 25, the rate of temperature rise in produce after removal from 10° C. cold storage was slowed in the treated produce during the first three days after removal. The untreated straight-stacked and cross-stacked produce generated more heat under ambient storage conditions over the first three days compared to the treated, straight-stacked produce, with the untreated, straight-stacked produce generating the most heat. Therefore, the temperature gradient across the pallet should be reduced as well, allowing more even and predictable ripening. In some embodiments, coating an agricultural product with a coating composition that reduces the heat generated (e.g. from respiration) within a stack of produce can reduce labor requirements throughout the produce supply chain by minimizing the need for reorientation of the stacks from a straight stack to an alternative stack (e.g. cross stack).

In some embodiments, treating an agricultural product with a coating that reduces the respiration rate can reduce the rate at which the temperature increases in a stack (e.g. upon removal from cold storage) by at least 0.5° C. per day, at least 1.0° C. per day, at least 1.5° C. per day, at least 2.0° C. per day, at least 2.5° C. per day, at least 3.0° C. per day, at least 3.5° C. per day, at least 4.0° C. per day, at least 4.5° C. per day, or at least 5° C. per day, as compared to an untreated stack. In some embodiments, treating an agricultural product with a coating that reduces the respiration rate can reduce the equilibrium temperature difference between the atmosphere and the average temperature of the stack by at least 0.5° C., at least 1.0° C., at least 1.5° C., at least 2.0° C., at least 2.5° C., at least 3.0° C., at least 3.5° C., at least 4.0° C., at least 4.5° C., or at least 5° C.

Any of the coatings described herein can be used to protect any agricultural product. In some embodiments, the coating can be coated on an edible agricultural product, for example, fruits, vegetables, edible seeds and nuts, herbs, spices, produce, meat, eggs, dairy products, seafood, grains, or any other consumable item. In such embodiments, the coating can include components that are non-toxic and safe for consumption by humans and/or animals. For example, the coating can include components that are U.S. Food and Drug Administration (FDA) approved direct or indirect food additives, FDA approved food contact substances, satisfy FDA regulatory requirements to be used as a food additive or food contact substance, and/or is an FDA Generally Recognized as Safe (GRAS) material. Examples of such materials can be found within the FDA Code of Federal Regulations Title 21, located at "www.accessdata.fda.gov/scripts/cdrh/cfdocs/cfcfr/cfrsearch.cfm", the entire contents of which are hereby incorporated by reference herein. In some embodiments, the components of the coating can include a dietary supplement or ingredient of a dietary supplement. The components of the coating can also include an FDA approved food additive or color additive. In some embodiments, the coating can include components that are naturally derived, as described herein. In some embodiments, the coating can be flavorless or have a high flavor threshold of below 500 ppm, are odorless or have a high odor threshold, and/or are substantially transparent. In some embodiments, the coating can be configured to be washed off an edible agricultural product, for example, with water.

In some embodiments, the coatings described herein can be formed on an inedible agricultural product. Such inedible agricultural products can include, for example, inedible flowers, seeds, shoots, stems, leaves, whole plants, and the like. In such embodiments, the coating can include components that are non-toxic, but the threshold level for non-toxicity can be higher than that prescribed for edible products. In such embodiments, the coating can include an FDA approved food contact substance, an FDA approved food additive, or an FDA approved drug ingredient, for example, any ingredient included in the FDA's database of approved drugs, which can be found at "http://www.accessdata.fda-.gov/scripts/cder/drugsatfda/index.cfm", the entire contents of which are hereby incorporated herein by reference. In some embodiments, the coating can include materials that satisfy FDA requirements to be used in drugs or are listed within the FDA's National Drug Discovery Code Directory, "www.accessdata.fda.gov/scripts/cder/ndc/default.cfm", the entire contents of which are hereby incorporated herein by reference. In some embodiments, the materials can include inactive drug ingredients of an approved drug product as listed within the FDA's database, "www.accessdata.fda.gov/scripts/cder/ndc/default.cfm", the entire contents of which are hereby incorporated herein by reference.

Embodiments of the coatings described herein provide several advantages, including, for example: (1) the coatings can protect the agricultural products from biotic stressors, i.e. bacteria, viruses, fungi, or pests; (2) the coatings can prevent evaporation of water and/or diffusion of oxygen, carbon dioxide, and/or ethylene; (3) coating can help extend the shelf life of agricultural products, for example, post-harvest produce, without refrigeration; (4) the coatings can introduce mechanical stability to the surface of the agricultural products eliminating the need for expensive packaging designed to prevent the types of bruising which accelerate spoilage; (5) use of agricultural waste materials to obtain the coatings can help eliminate the breeding environments of bacteria, fungi, and pests; (6) the coatings can be used in place of pesticides to protect plants, thereby minimizing the harmful impact of pesticides to human health and the environment; (7) the coatings can be naturally derived and hence, safe for human consumption. Since in some cases the components of the coatings described herein can be obtained from agricultural waste, such coatings can be made at a relatively low cost. Therefore, the coatings can be particularly suited for small scale farmers, for example, by reducing the cost required to protect crops from pesticides and reducing post-harvest losses of agricultural products due to decomposition by biotic and/or environmental stressors.

Due to segmentation in the marketplace, the preparation/formation of coating agents or coating solutions/suspensions/colloids and the formation of coatings over substrates from the coating solutions/suspensions/colloids are often carried out by different parties or entities. For example, a manufacturer of compositions such as coating agents described herein (i.e., a first party) can form the compositions by one or more of the methods described herein. The manufacturer can then sell or otherwise provide the resulting composition to a second party, for example a farmer, shipper, distributor, or retailer of produce, and the second party can apply the composition to one or more agricultural products to form a protective coating over the products. Alternatively, the manufacturer can sell or otherwise provide the resulting composition to an intermediary party, for example a wholesaler, who then sells or otherwise provides the composition to a second party such as a farmer, shipper, distributor, or retailer of produce, and the second party can apply the composition to one or more agricultural products to form a protective coating over the products.

In some cases where multiple parties are involved, the first party may optionally provide instructions or recommendations about the composition (i.e., the coating agent), either written or oral, indicating one or more of the following: (i) that the composition is intended to be applied to a product for the purpose of coating or protecting the product, to extend the life of the product, to reduce spoilage of the product, or to modify or improve the aesthetic appearance of the product; (ii) conditions and/or methods that are suitable for applying the compositions to the surfaces of products; and/or (iii) potential benefits (e.g., extended shelf life, reduced rate of mass loss, reduced rate of molding and/or spoilage, etc.) that can result from the application of the composition to a product. While the instructions or recommendations may be supplied by the first party directly with the plant extract composition (e.g., on packaging in which the composition is sold or distributed), the instructions or recommendations may alternatively be supplied separately, for example on a website owned or controlled by the first party, or in advertising or marketing material provided by or on behalf of the first party.

In view of the above, it is recognized that in some cases, a party that manufactures compositions (i.e., coating agents) or coating solutions/suspensions/colloids according to one or more methods described herein (i.e., a first party) may not directly form a coating over a product from the composition, but can instead direct (e.g., can instruct or request) a second party to form a coating over a product from the composition. That is, even if the first party does not coat a product by the methods and compositions described herein, the first party may still cause the coating agent or solution to be applied to the product to form a protective coating over the product by providing instructions or recommendations as described above. Accordingly, as used herein, the act of applying a coating agent or solution/suspension/colloid to a product (e.g., a plant or agricultural product) also includes directing or instructing another party to apply the coating agent or solution to the product, thereby causing the coating agent or solution to be applied to the product.

Solvents

The solvent to which the coating agent and wetting agent (when separate from the coating agent) is added to form the solution/suspension/colloid can, for example, be water, methanol, ethanol, isopropanol, butanol, acetone, ethyl acetate, chloroform, acetonitrile, tetrahydrofuran, diethyl ether, methyl tert-butyl ether, an alcohol, any other suitable solvent, or a combination thereof. The resulting solutions, suspensions, or colloids can be suitable for forming coatings on agricultural products. For example, the solutions, suspensions, or colloids can be applied to the surface of the agricultural product, after which the solvent can be removed (e.g., by evaporation or convective drying), leaving a protective coating formed from the coating agent on the surface of the agricultural product.

While a number of the solvents above (particularly water and ethanol) can be safely and effectively used in solutions/suspensions/colloids that are applied to edible products such as produce or other agricultural products, in many cases it can be advantageous to use either water or otherwise a solvent which is at least about 40% (and in many cases higher) water by volume. This is because water is typically cheaper than other suitable solvents and can also be safer to work with than solvents that have a higher volatility and/or a lower flash point (e.g., acetone or alcohols such as isopropanol or ethanol). In some embodiments, the solvent comprises water. For example, the solvent is water. Accordingly, for any of the solutions/suspensions/colloids described herein, the solvent or solution/suspension/colloid can be at least about 40%, at least about 45%, at least about 50%, at least about 55%, at least about 60%, at least about 65%, at least about 70%, at least about 75%, at least about 80%, at least about 85%, at least about 90%, at least about 95%, or at least about 99% water by mass or by volume. In some embodiments, the solvent includes a combination of water and ethanol, and can optionally be at least about 40%, at least about 45%, at least about 50%, at least about 55%, at least about 60%, at least about 65%, at least about 70%, at least about 75%, at least about 80%, at least about 85%, at least about 90%, at least about 95%, or at least about 99% water by volume. In some embodiments, the solvent or solution/suspension/colloid can be about 40% to 100% water by mass or volume, about 40% to 99% water by mass or volume, about 40% to 95% water by mass or volume, about 40% to 90% water by mass or volume, about 40% to 85% water by mass or volume, about 40% to 80% water by mass or volume, about 50% to 100% water by mass or volume, about 50% to 99% water by mass or volume, about 50% to 95% water by mass or volume, about 50% to 90% water by mass or volume, about 50% to 85% water by mass or volume, about 50% to 80% water by mass or volume, about 60% to 100% water by mass or volume, about 60% to 99% water by mass or volume, about 60% to 95% water by mass or volume, about 60% to 90% water by mass or volume, about 60% to 85% water by mass or volume, about 60% to 80% water by mass or volume, about 70% to 100% water by mass or volume, about 70% to 99% water by mass or volume, about 70% to 95% water by mass or volume, about 70% to 90% water by mass or volume, about 70% to 85% water by mass or volume, about 80% to 100% water by mass or volume, about 80% to 99% water by mass or volume, about 80% to 97% water by mass or volume, about 80% to 95% water by mass or volume, about 80% to 93% water by mass or volume, about 80% to 90% water by mass or volume, about 85% to 100% water by mass or volume, about 85% to 99% water by mass or volume, about 85% to 97% water by mass or volume, about 85% to 95% water by mass or volume, about 90% to 100% water by mass or volume, about 90% to 99% water by mass or volume, about 90% to 98% water by mass or volume, or about 90% to 97% water by mass or volume.

In view of the above, for some applications the solvent can be a low wetting solvent (i.e., a solvent exhibiting a large contact angle with respect to the surface to which it is applied). For example, in the absence of any added wetting agents or other surfactants, the contact angle between the solvent and either (a) carnauba wax, (b) candelilla wax, (c) paraffin wax, or (d) the surface of a non-waxed lemon can be at least about 70°, for example at least about 75°, 80°, 85°, or 90°. Addition of any of the wetting agents described herein to the solvent, either alone or in combination with other compounds or coating agents, can cause the contact angle between the resulting solution/suspension/colloid and either (a) carnauba wax, (b) candelilla wax, (c) paraffin wax, or (d) the surface of a non-waxed lemon to be less than about 85°, for example less than about 80°, 75°, 70°, 65°, 60°, 55° 50°, 45° 40°, 35° 30°, 25°, 20°, 15°, 10°, 5°, or 0°.

The coating agent that is added to or dissolved, suspended, or dispersed in the solvent to form the coating solution/suspension/colloid can be any compound or combination of compounds capable of forming a protective coating over the substrate to which the solution/suspension/colloid is applied. The coating agent can be formulated such that the resulting coating protects the substrate from biotic and/or abiotic stressors. For example, the coating can prevent or suppress the transfer of oxygen and/or water, thereby preventing the substrate from oxidizing and/or from losing water via transpiration/osmosis/evaporation. In cases where the substrate is perishable and/or edible, for example when the substrate is a plant, an agricultural product, or a piece of produce, the coating agent is preferably composed of non-toxic compounds that are safe for consumption. For example, the coating agent can be formed from or include fatty acids and/or salts or esters thereof. The fatty acid esters can, for example, be ethyl esters, methyl esters, or glyceryl esters (e.g., 1-glyceryl or 2-glyceryl esters).

Coated Agricultural Products and Methods of Preparation and Use Thereof

In some embodiments, when the components of the coating agent (e.g, fatty acids, fatty acid esters, or a combination thereof and/or fatty acid salts) are mixed with a solvent, they form microstructures, such as, for example, vesicles in the solvent. Referring to FIG. 49, when this mixture contacts a surface, such as an agricultural product (e.g., produce), the vesicles can adsorb to the surface, rupture, and form a lamella (e.g., a lipid bilayer) on the surface. As more vesicles approach the surface and rupture, additional lamellae can be added to the lamella to form a lamellar structure. In some embodiments, upon removal or drying of the solvent, the lamellar structure partitions into grains. The boundaries between the grains are crystal defects. For purposes of illustration, FIG. 56A is a scanning electron microscope image of a plurality of grains in a polycrystalline material.

In some embodiments, an advantage of the lamellar structure is its low permeability. Without being bound by any theory, when water passes through the coating, it travels through grain boundaries and between the lamellae if the outer surfaces of the lamellae are sufficiently hydrophilic (e.g., when the lamellae are lipid bilayers). In some embodiments, when the lamellar structure is composed of lipid bilayers formed from fatty acids, fatty acid esters, or a combination thereof and/or fatty acid salts, higher amounts of fatty acid salts in the coating increases the hydrophilicity of the outer surfaces of the lipid bilayers that make up the coating, thus allowing more water to intercalate between the lipid bilayers and therefore increasing the water permeability of the coating, resulting in an increased mass loss rate. In some embodiments, the mass loss rate of a coated agricultural product can be increased by increasing the fatty acid salt content of the coating, or, alternatively, the mass loss rate of the coated agricultural product can be decreased by decreasing the fatty acid salt content. In some such embodiments, the respiration rate changes less than the mass loss rate (e.g., remains nearly the same). This is illustrated in Example 26 and FIGS. 37A-37B, wherein the difference in mass loss rates between a 94:6 monoglyceride:fatty acid salt coating and a 70:30 monoglyceride:fatty acid salt coating at different concentrations of coating agent in a mixture applied to avocados (FIG. 37A) is higher than the difference in respiration rates between the same compositions applied at the same concentrations (FIG. 37B).

In some embodiments, increasing the concentration of the coating agent in the mixture increases the thickness of the coating, which, for example, can reduce the water permeability (and can therefore reduce mass loss when the coating is disposed over an agricultural product) and can lower the gas diffusion ratio (and can therefore reduce the respiration rate when the coating is disposed over an agricultural product).

In some embodiments, the higher the temperature of drying, the larger the grain size and lower the mosaicity (which is a measure of the probabilities that the orientation of lamellae in a coating deviate from a plane that is substantially parallel with the plane of the substrate surface, recognized as a type of crystal defect) in the coating, which can result in fewer grain boundaries and defects for water and/or gas to travel through. In some embodiments, this can result in a lower water and gas permeability that can translate into a lower mass loss rate and lower respiration rate when, e.g., the coating is disposed on an agricultural product.

In some embodiments, heating the coating (or coated agricultural product) from a first temperature to a second temperature higher than the first temperature but below the melting point (i.e., the phase transition temperature) of the coating, then cooling the coating, can increase the grain size in the coating, which can result in a lower mass loss rate, lower gas diffusion ratio, and lower respiration rate.

Coated Agricultural Products

In one aspect, described herein is a coated substrate comprising a coating that forms a lamellar structure on the substrate, wherein the coating has a thickness of less than 20 microns.

In another aspect, described herein is a coated substrate comprising a coating that forms a lamellar structure on the substrate, wherein the coating comprises a plurality of grains.

In some embodiments, the substrate is an agricultural product, a silicon substrate, or a substrate comprising a polysaccharide (e.g., cellulose). For example, the substrate is an agricultural product.

In another aspect, described herein is a coated agricultural product comprising a coating that forms a lamellar structure on the agricultural product, wherein the coating has a thickness of less than 20 microns.

In another aspect, described herein is a coated agricultural product comprising a coating that forms a lamellar structure on the agricultural product, wherein the coating comprises a plurality of grains.

Figure 42:
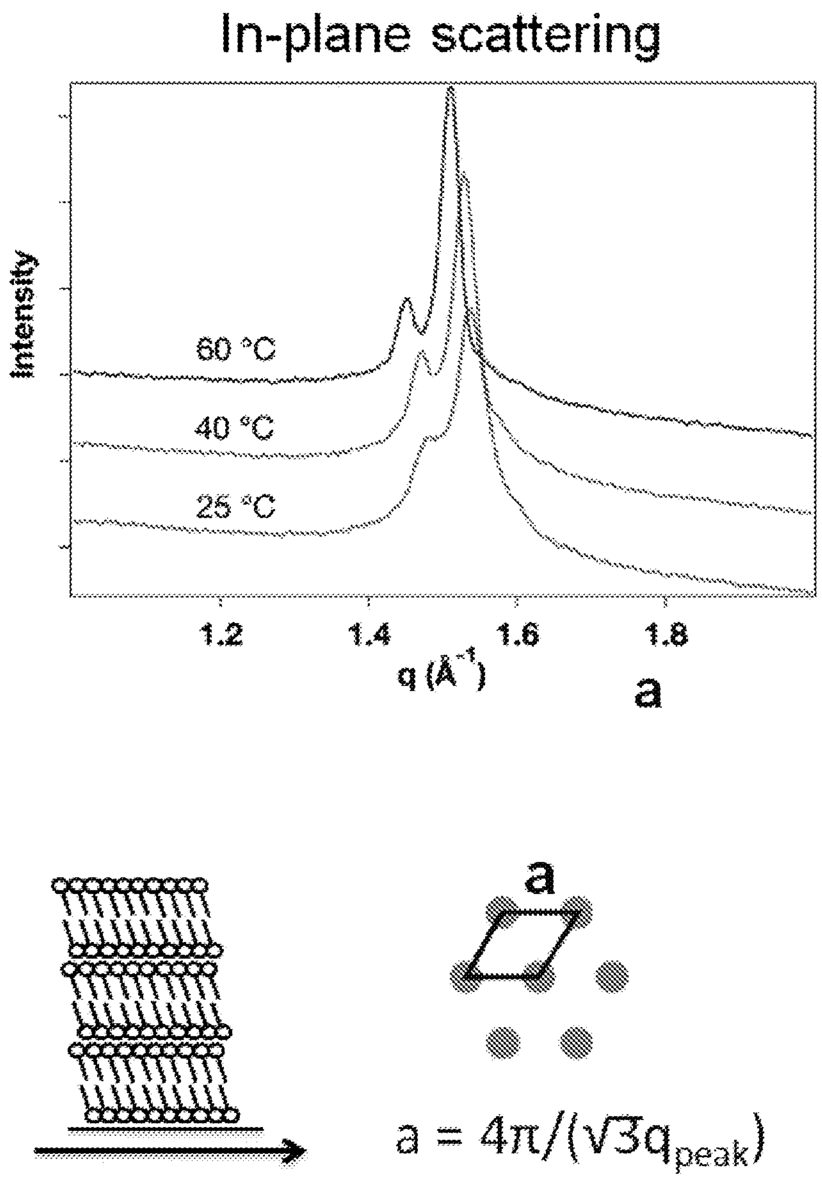
FIG. 42 is an overlay of in plane X-ray scattering plots of a coating on a silicon substrate taken at various temperatures; an illustration of a stack of lipid bilayers and associated lattice geometry; and a table showing associated calculated values of intermolecular spacing in the lipid bilayers.

In some embodiments (e.g., when the lamella is a lipid bilayer (e.g., when the lamella is a lipid bilayer comprising one or more fatty acid derivatives)), the lattice formation is defined by a hexagonal unit cell such as, for example, the unit cell depicted in FIG. 42. The distance (referred to as "a") between each adjacent molecule in the unit cell is from about 0.2 nm to about 2 nm. For example, from about 0.2 to about 0.7 nm, from about 0.2 to about 1.2 nm, from about 0.2 nm to about 0.4 nm, from about 0.3 nm to about 0.5 nm, from about 0.4 nm to about 0.6 nm, from about 0.43 nm to about 0.5 nm, from about 0.47 nm to about 0.48 nm, about 0.2 nm, about 0.3 nm, about 0.4 nm, about 0.47 nm, about 0.5 nm, or about 0.6 nm.

In some embodiments, the lamellar structure comprises a plurality of lamellae. The distance between a surface of a lamella and the surface of an adjacent lamella that is facing the same direction is referred to herein as "interlayer spacing". In some embodiments, the interlayer spacing of the lamellae is from about 1.0 to about 20 nm. For example, the interlayer spacing is from about 1 to about 20 nm, from about 2 to about 13 nm, from about 3 nm to about 10 nm, from about 3 to about 7 nm, from about 3 to about 6 nm, from about 3 to about 5 nm, from about 5 to about 7 nm, from about 4 to about 6 nm, from about 4 to about 5 nm, from about 5 to about 6 nm, from about 5.0 to about 5.8 nm, about 3.3 nm, about 3.7 nm, about 4.1 nm, about 4.5 nm, about 5.0 nm, about 5.2 nm, about 5.4 nm, about 5.5 nm, about 5.6 nm, or about 5.7 nm.

In some embodiments, the coating comprises a plurality of grains.

In some embodiments, the grain size is from about 2 nm to about 100 nm. For example, from about 4 nm to about 100 nm, from about 7 nm to about 100 nm, from about 6 nm to about 100 nm, from about 6 nm to about 80 nm, from about 6 nm to about 60 nm, from about 6 nm to about 40 nm, from about 6 nm to about 25 nm, from about 9 nm to about 22 nm, from about 9 nm to about 15 nm, from about 13 nm to about 25 nm, from about 8 nm to about 25 nm, from about 11 nm to about 17 nm, from about 11 nm to about 14 nm, from about 13 nm to about 17 nm, from about 12 nm to about 16 nm, from about 15 nm to about 17 nm, from about 9 nm to about 13 nm, from about 13 nm to about 17 nm, from about 17 nm to about 25 nm, from about 2 nm to about 10 nm, 5 nm to about 10 nm, from about 8 nm to about 9 nm, from about 8.5 nm to about 9.5 nm, from about 9 nm to about 10 nm, about 8 nm, about 9 nm, about 10 nm, about 11 nm, about 12 nm, about 13 nm, about 14 nm, about 15 nm, about 16 nm, about 17 nm, about 19 nm, about 21 nm, or about 22 nm.

In one aspect, described herein is a coated substrate comprising a coating that forms a lamellar structure on the substrate, wherein:

the coating has a thickness of less than 2 microns;

the lamellar structure comprises a plurality of lamellae;

the interlayer spacing of the lamellae is from about 3 nm to about 6 nm; and the coating comprises one or more compounds of Formula IA and one or more compounds of Formula IIA, wherein Formula IA is (Formula IA)

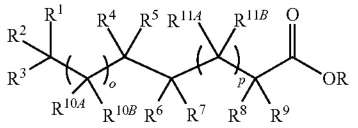

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and o is an integer from 0 to 17;

p is an integer from 0 to 17;

wherein the sum of o and p is from 0 to 17; and wherein Formula IIA is:

(Formula IIA)

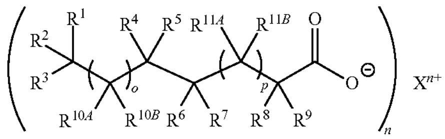

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

In one aspect, described herein is a coated substrate comprising a coating that forms a lamellar structure on the substrate, wherein:

the coating has a thickness of less than 2 microns;

the grain size is from about 13 nm to about 25 nm; and the coating comprises one or more compounds of Formula IA and one or more compounds of Formula IIA, wherein Formula IA is (Formula IA)

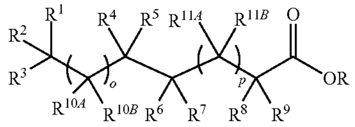

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and o is an integer from 0 to 17;

p is an integer from 0 to 17;

wherein the sum of o and p is from 0 to 17; and wherein Formula IIA is:

(Formula IIA)

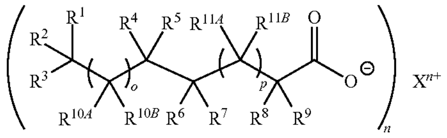

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

In one aspect, described herein is a coated substrate comprising a coating that forms a lamellar structure on the substrate, wherein:

the coating has a thickness of less than 2 microns;

the lamellar structure comprises a plurality of lamellae;

the interlayer spacing of the lamellae is from about 3 nm to about 6 nm; and the grain size is from about 13 nm to about 25 nm.

Methods of Use and Application

In another aspect, described herein is a method of coating a substrate, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the substrate; and the coating has a thickness of less than 20 microns.

In another aspect, described herein is a method of coating a substrate, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the substrate; and the coating comprises a plurality of grains.

In another aspect, described herein is a method of coating a substrate, comprising:

(i) applying a mixture comprising a coating agent and a solvent to the substrate;

(ii) removing the solvent to form a coating on the substrate;

(iii) heating the coated agricultural product from a first temperature to a second temperature, wherein the second temperature is greater than the first temperature and less than the melting point of the coating; and (iv) cooling the coated substrate from the second temperature to a third temperature, wherein the third temperature is less than the second temperature;

wherein:

the coating forms a lamellar structure on the substrate; and the coating comprises a plurality of grains.

In another aspect, described herein is a method of coating an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating has a thickness of less than 20 microns.

In another aspect, described herein is a method of coating an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating comprises a plurality of grains.

In another aspect, described herein is a method of coating an agricultural product, comprising:

(i) applying a mixture comprising a coating agent and a solvent to the agricultural product;

(ii) removing the solvent to form a coating on the agricultural product;

(iii) heating the coated agricultural product from a first temperature to a second temperature, wherein the second temperature is greater than the first temperature and less than the melting point of the coating; and (iv) cooling the coated agricultural product from the second temperature to a third temperature, wherein the third temperature is less than the second temperature;

wherein:

the coating forms a lamellar structure on the agricultural product; and the coating comprises a plurality of grains.

In some embodiments, the first temperature is from about 0° C. to about 50° C. For example, the first temperature is from about 10° C. to about 40° C., from about 20° C. to about 30° C., from about 23° C. to about 27° C., or about 25° C. In some embodiments, the first temperature is greater than the temperature of the surrounding atmosphere. In some embodiments, the first temperature is less than the temperature of the surrounding atmosphere.

In some embodiments, the second temperature is from about 40° C. to about 65° C. For example, the second temperature is from about 45° C. to about 65° C., from about 50° C. to about 65° C., from about 55° C. to about 65° C., from about 57° C. to about 63° C., or about 60° C. In some embodiments, the second temperature is greater than the temperature of the surrounding atmosphere. In some embodiments, the second temperature is less than the temperature of the surrounding atmosphere. In some embodiments, the coated agricultural product is heated with air having a temperature higher than the temperature of the agricultural product. In some embodiments, the air that the coated agricultural product is heated with is higher than the second temperature. In some embodiments, the air that the coated agricultural product is heated with is higher than the melting point of the coating.

In some embodiments, if the coating is heated at or above its melting temperature (about 65° C. to about 70° C., or about 70° C.), the lattice formation of the lamellae in the coating can be disrupted, the constituent molecules can adopt random orientations, and the coating can liquify.

In some embodiments, the third temperature is from about 0° C. to about 50° C. For example, the first temperature is from about 10° C. to about 40° C., from about 20° C. to about 30° C., from about 23° C. to about 27° C., or about 25° C. In some embodiments, the third temperature is greater than the temperature of the surrounding atmosphere. In some embodiments, the third temperature is less than the temperature of the surrounding atmosphere.

In some embodiments, the second temperature is maintained for about 5 seconds to about 10 hours. For example, the second temperature is maintained for about 5 seconds to about 7 hours, about 5 seconds to about 3 hours, about 5 seconds to about 1.5 hours, about 5 seconds to about 60 minutes, about 30 seconds to about 45 minutes, about 5 minutes to about 60 minutes, about 10 minutes to about 45 minutes, about 20 minutes to about 40 minutes, about 25 minutes to about 35 minutes, about 30 seconds to about 10 minutes, about 30 seconds to about 7 minutes, about 30 seconds to about 3 minutes, about 3 minutes to about 7 minutes, about 30 seconds to about 1 minute, about 1 minute to about 5 minutes, about 25 minutes, about 27 minutes, about 29 minutes, about 30 minutes, about 32 minutes, about 35 minutes, about 30 seconds, about 1 minute, about 2 minutes, about 3 minutes, about 4 minutes, about 5 minutes, about 6 minutes, or about 7 minutes.

In some embodiments, the grain size after cooling the coated agricultural product from the second temperature to the third temperature is larger than the grain size before heating the coated agricultural product from the first temperature to the second temperature. In some embodiments, the grain size of the coating before heating the coated agricultural product from the first temperature to the second temperature is from about 2 nm to about 10 nm. For example, from about 5 nm to about 10 nm, from about 8 nm to about 9 nm, from about 8.5 nm to about 9.5 nm, from about 9 nm to about 10 nm, about 8 nm, about 9 nm, or about 10 nm. For example, the grain size of the coating after cooling the coated agricultural product from the second temperature to the third temperature is from about 7 nm to about 100 nm. For example, from about 8 nm to about 25 nm, from about 11 nm to about 17 nm, from about 11 nm to about 14 nm, from about 13 nm to about 17 nm, from about 12 nm to about 16 nm, from about 15 nm to about 17 nm, about 11 nm, about 12 nm, about 13 nm, about 14 nm, about 15 nm, about 16 nm, or about 17 nm.

In another aspect, described herein is a method of reducing the mass loss rate of an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating has a thickness of less than 20 microns.

In another aspect, described herein is a method of reducing the respiration rate of an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product; and the coating has a thickness of less than 20 microns.

In some embodiments, the concentration of the coating agent in the mixture is from about 1 g/L to about 200 g/L. For example, the concentration of the coating agent in the mixture is from about 1 g/L to about 150 g/L, from about 1 g/L to about 50 g/L, from about 50 g/L to about 100 g/L, from about 100 g/L to about 150 g/L, from about 150 g/L to about 200 g/L, from about 5 g/L to about 100 g/L, from about 5 g/L to about 80 g/L, from about 70 g/L to about 130 g/L, from about 10 g/L to about 80 g/L, from about 25 g/L to about 60 g/L, from about 30 g/L to about 60 g/L, from about 30 g/L to about 50 g/L, from about 40 g/L to about 60 g/L, from about 30 g/L to about 40 g/L, from about 40 g/L to about 50 g/L, from about 50 g/L to about 60 g/L, about 10 g/L, about 20 g/L, about 30 g/L, about 40 g/L, about 50 g/L, about 60 g/L, about 70 g/L, about 80 g/L, about 90 g/L, about 100 g/L, about 110 g/L, about 120 g/L, about 130 g/L or about 140 g/L.

In some embodiments, the mixture is dried at a temperature of from about 20° C. to about 100° C. For example, the mixture is dried at a temperature of from about from about 25° C. to about 80° C., from about 25° C. to about 70° C., from about 30° C. to about 65° C., from about 40° C. to about 65° C., 50° C. to about 65° C., from about 55° C. to about 65° C., from about 60° C. to about 65° C., about 55° C., about 60° C., or about 65° C. In some embodiments, the mixture is partially dried. In some embodiments, the drying removes greater than 5% of the solvent. For example, the drying removes greater than 10%, greater than 20%, greater than 30%, greater than 40%, greater than 50%, greater than 60%, greater than 70%, greater than 80%, greater than 90%, or greater than 95% of the solvent. In some embodiments, the lamellar structure forms when the mixture is partially dried. In some embodiments, the lamellar structure forms after at least 5% of the solvent has been removed. For example, the lamellar structure forms after at least 10%, at least 20%, at least 30%, at least 40%, at least 50%, at least 60%, at least 70%, at least 80%, at least 90%, or at least 95% of the solvent has been removed.

In some embodiments, faster solvent removal and/or drying can improve the performance of the coating. For example, faster solvent removal and/or drying can result in thicker and more homogeneous coatings. In some embodiments, removing the solvent or drying the mixture is performed in under 2 hours. For example, the solvent is removed or dried in under 1.5 hours, under 1 hour, under 45 minutes, under 30 minutes, under 25 minutes, under 20 minutes, under 15 minutes, under 10 minutes, under 5 minutes, under 4 minutes, under 2 minutes, under 1 minute, under 30 seconds, under 15 seconds, under 10 seconds, under 5 seconds, or under 3 seconds.

In another aspect, described herein is a method of coating an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product;

the coating has a thickness of less than 2 microns; and the coating agent comprises one or more compounds of Formula IA and one or more compounds of Formula IIA, wherein Formula IA is (Formula IA)

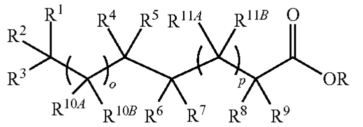

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and is an integer from 0 to 17;

p is an integer from 0 to 17;

wherein the sum of o and p is from 0 to 17; and wherein Formula IIA is:

(Formula IIA)

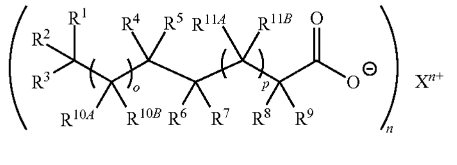

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

In another aspect, described herein is a method of coating an agricultural product, comprising:

(i) applying a mixture comprising a coating agent and a solvent to the agricultural product;

(ii) drying the mixture at a temperature of greater than 50° C. to form a coating on the agricultural product;

wherein:

the coating forms a lamellar structure on the agricultural product;

the grain size is from about 13 nm to about 25 nm;

the coating has a thickness of less than 2 microns; and the concentration of the coating agent in the mixture is from about 30 g/L to about 50 g/L.

In another aspect, described herein is a method of coating an agricultural product, comprising:

(i) applying a mixture comprising a coating agent and a solvent to the agricultural product;

(ii) drying the mixture at a temperature of greater than 60° C. to form a coating on the agricultural product;

wherein:

the coating forms a lamellar structure on the agricultural product;

the grain size is from about 13 nm to about 25 nm;

the coating has a thickness of less than 2 microns; and the coating agent comprises one or more compounds of Formula IA and one or more compounds of Formula IIA, wherein Formula IA is (Formula IA)

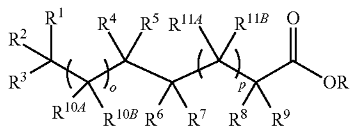

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and is an integer from 0 to 17;

p is an integer from 0 to 17;

wherein the sum of o and p is from 0 to 17; and wherein Formula IIA is:

(Formula IIA)

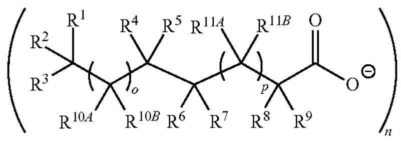

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

In another aspect, described herein is a method of reducing the water permeability of a coating on a substrate, comprising:

(i) heating the coated substrate from a first temperature to a second temperature; and (ii) cooling the coated substrate from the second temperature to a third temperature, wherein the third temperature is less than the second temperature;

wherein:

the coating forms a lamellar structure on the substrate; and the coating comprises a plurality of grains.

In another aspect, described herein is a method of reducing the gas diffusion ratio of a coating on a substrate, comprising:

(i) heating the coated substrate from a first temperature to a second temperature; and (ii) cooling the coated substrate from the second temperature to a third temperature, wherein the third temperature is less than the second temperature;

wherein:

the coating forms a lamellar structure on the substrate; and the coating comprises a plurality of grains.

In some embodiments, the substrate is an agricultural product, a silicon substrate, or a substrate comprising a polysaccharide (e.g., cellulose). For example, the substrate is an agricultural product.

In another aspect, described herein is a method of reducing the mass loss rate of an agricultural product having a coating disposed thereon, comprising:

(i) heating the coated agricultural product from a first temperature to a second temperature; and (ii) cooling the coated agricultural product from the second temperature to a third temperature, wherein the third temperature is less than the second temperature; wherein:

the coating forms a lamellar structure on the agricultural product; and the coating comprises a plurality of grains.

In another aspect, described herein is a method of reducing the respiration rate of an agricultural product having a coating disposed thereon, comprising:

(i) heating the coated agricultural product from a first temperature to a second temperature; and (ii) cooling the coated agricultural product from the second temperature to a third temperature, wherein the third temperature is less than the second temperature; wherein:

the coating forms a lamellar structure on the agricultural product; and the coating comprises a plurality of grains.

In some embodiments, the first temperature is from about 0° C. to about 50° C. For example, the first temperature is from about 10° C. to about 40° C., from about 20° C. to about 30° C., from about 23° C. to about 27° C., or about 25°

C. In some embodiments, the first temperature is greater than the temperature of the surrounding atmosphere. In some embodiments, the first temperature is less than the temperature of the surrounding atmosphere.

In some embodiments, the second temperature is from about 40° C. to about 65° C. For example, the second temperature is from about 45° C. to about 65° C., from about 50° C. to about 65° C., from about 55° C. to about 65° C., from about 57° C. to about 63° C., or about 60° C. In some embodiments, the second temperature is greater than the temperature of the surrounding atmosphere. In some embodiments, the second temperature is less than the temperature of the surrounding atmosphere. In some embodiments, the agricultural product is heated with air having a temperature higher than the first temperature of the agricultural product. In some embodiments, the agricultural product is heated with air having a temperature higher than the second temperature of the agricultural product. In some embodiments, the air that the coated agricultural product is heated with is higher than the melting point of the coating.

In some embodiments, if the coating is heated at or above its melting temperature (about 65° C. to about 70° C., or about 70° C.), the lattice formation of the lamellae in the coating can be disrupted, the constituent molecules can adopt random orientations, and the coating can liquify.

In some embodiments, the third temperature is from about 0° C. to about 50° C. For example, the first temperature is from about 10° C. to about 40° C., from about 20° C. to about 30° C., from about 23° C. to about 27° C., or about 25° C. In some embodiments, the third temperature is greater than the temperature of the surrounding atmosphere. In some embodiments, the third temperature is less than the temperature of the surrounding atmosphere.

In some embodiments, the second temperature is maintained for about 5 seconds to about 10 hours. For example, the second temperature is maintained for about 5 seconds to about 7 hours, about 5 seconds to about 3 hours, about 5 seconds to about 1.5 hours, about 5 seconds to about 60 minutes, about 30 seconds to about 45 minutes, about 5 minutes to about 60 minutes, about 10 minutes to about 45 minutes, about 20 minutes to about 40 minutes, about 25 minutes to about 35 minutes, about 30 seconds to about 10 minutes, about 30 seconds to about 7 minutes, about 30 seconds to about 3 minutes, about 3 minutes to about 7 minutes, about 30 seconds to about 1 minute, about 1 minute to about 5 minutes, about 25 minutes, about 27 minutes, about 29 minutes, about 30 minutes, about 32 minutes, about 35 minutes, about 30 seconds, about 1 minute, about 2 minutes, about 3 minutes, about 4 minutes, about 5 minutes, about 6 minutes, or about 7 minutes.

In some embodiments, the grain size after cooling the coated agricultural product from the second temperature to the third temperature is larger than the grain size before heating the coated agricultural product from the first temperature to the second temperature. In some embodiments, the grain size of the coating before heating the coated agricultural product from the first temperature to the second temperature is from about 2 nm to about 10 nm. For example, from about 5 nm to about 10 nm, from about 8 nm to about 9 nm, from about 8.5 nm to about 9.5 nm, from about 9 nm to about 10 nm, about 8 nm, about 9 nm, or about 10 nm. For example, the grain size of the coating after cooling the coated agricultural product from the second temperature to the third temperature is from about 7 nm to about 100 nm. For example, from about 8 nm to about 25 nm, from about 11 nm to about 17 nm, from about 11 nm to about 14 nm, from about 13 nm to about 17 nm, from about 12 nm to about 16 nm, from about 15 nm to about 17 nm, about 11 nm, about 12 nm, about 13 nm, about 14 nm, about 15 nm, about 16 nm, or about 17 nm.

Coating Thickness and Mass Loss Factor/Rate

In some embodiments, for coatings that are formulated to prevent water loss from or oxidation of coated substrates such as produce, thicker coatings will be less permeable to water and oxygen as compared to thinner coatings formed from the same coating agent, and should therefore result in lower mass loss rates as compared to thinner coatings. Thicker coatings can be formed by increasing the concentration of the coating agent in the solution/suspension/colloid and applying a similar volume of solution/suspension/colloid to each piece of (similarly sized) produce. The effect of increasing the coating thickness on harvested produce is demonstrated in FIG. 6, which shows plots of the percent mass loss over the course of 5 days in untreated blueberries (602), blueberries treated with a first solution including 10 mg/mL of coating agent compounds dissolved in ethanol (604), and blueberries treated with a second solution including 20 mg/mL of coating agent compounds dissolved in ethanol (606). The coating agents in both the first and second solutions were about 75% PA-2G and about 25% PA-1G by mass. As shown, the mass loss rates of the blueberries decreased significantly with increasing coating thickness.

Figure 7:
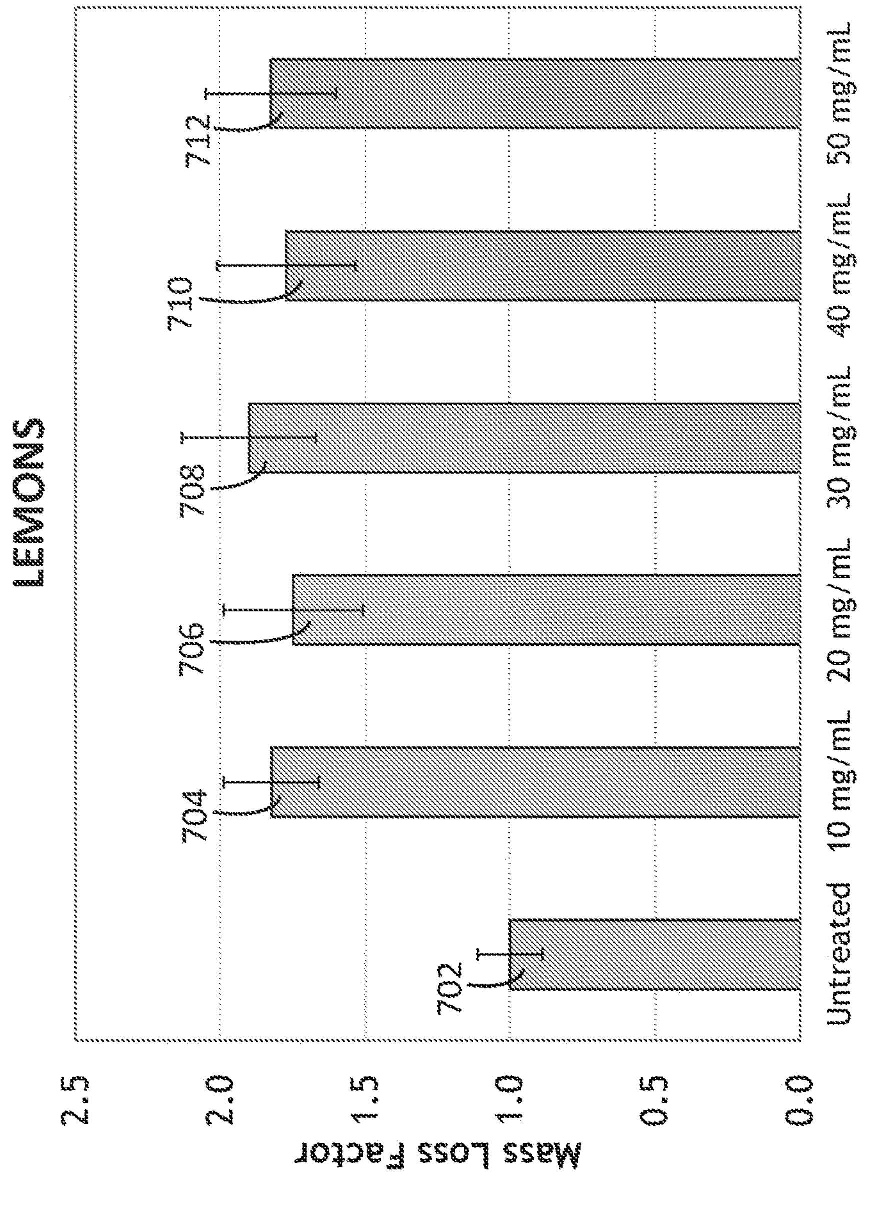
FIG. 7 shows a plot of mass loss factors of lemons treated with various concentrations of SA-1G and SA-Na (mass ratio 4:1) suspended in water.

For certain solutions/suspensions/colloids including long chain fatty acids and/or salts or esters thereof dissolved or suspended or dispersed in a solvent, protective coatings formed over certain types of produce by the methods described above were found to reduce the mass loss rate of the produce but did not result in lower mass loss rates as the thickness of the coating was increased, as in the blueberries described above. Instead, the mass loss rate in these cases was found to be lower than in uncoated produce but was approximately the same for thinner and thicker coatings. For example, FIG. 7 shows a plot of mass loss factor of lemons treated with various concentrations of a coating agent (e.g., SA-1G and SA-Na combined at a mass ratio of 4:1) suspended or dispersed in water. Bar 702 corresponds to a group of untreated lemons. Bar 704 corresponds to a group of lemons for which the concentration of coating agent in the solvent was 10 mg/mL. Bar 706 corresponds to a group of lemons for which the concentration of coating agent in the solvent was 20 mg/mL. Bar 708 corresponds to a group of lemons for which the concentration of coating agent in the solvent was 30 mg/mL. Bar 710 corresponds to a group of lemons for which the concentration of coating agent in the solvent was 40 mg/mL. Bar 712 corresponds to a group of lemons for which the concentration of coating agent in the solvent was 50 mg/mL. As shown in FIG. 7, while the mass loss factor for all the coated lemons was greater than 1 (indicating that the coating was causing a reduction in the mass loss rate), the mass loss rate was approximately the same for all coating agent concentrations tested in a range of 10 mg/mL to 50 mg/mL and hence did not vary with concentration.

Surprisingly, for many cases in which the mass loss rate did not vary with coating thickness (as with the lemons in FIG. 7), it was found that if a small concentration of medium chain fatty acids and/or salts or esters thereof was added to the mixture (i.e., the solution, suspension, or colloid) prior to application to produce (e.g., by including them in the coating agent at a lower concentration than that of the long chain fatty acids and/or salts or esters thereof, or by separately adding them to the mixture), then mass loss rates did increase with coating thickness. Furthermore, in many of these cases, the resulting mass loss rates for coatings that included a small concentration of medium chain fatty acids and/or salts or esters thereof were substantially lower as compared to coatings formed from coating agents that lacked the medium chain fatty acids and/or salts or esters thereof but were otherwise identical, and surface damage to the produce in these cases was either absent or minimal. These results were particularly surprising in view of the fact that medium chain fatty acids and/or salts or esters thereof were generally found to cause damage to produce or other plant matter when applied individually at similar concentrations, as shown in FIG. 5.

Figure 8:
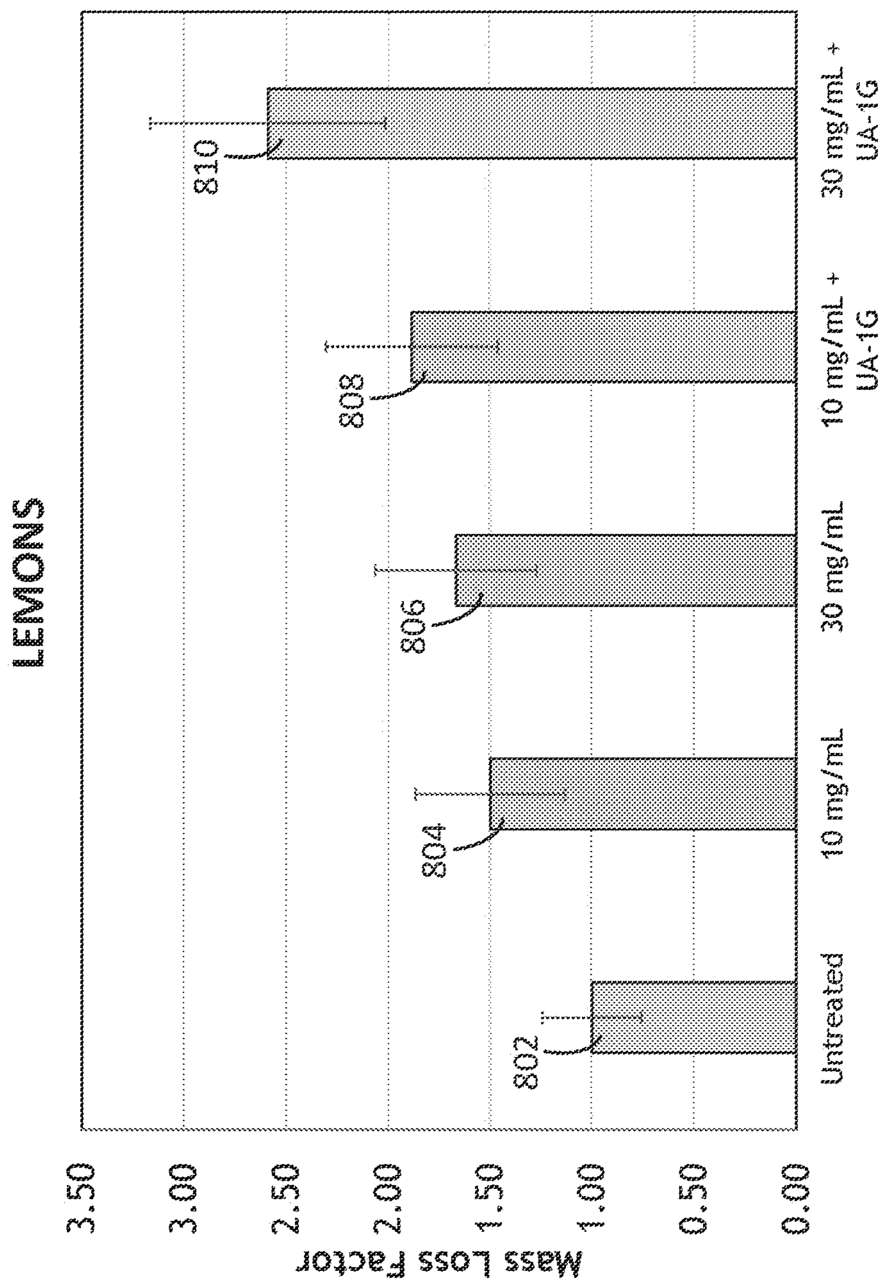
FIG. 8 shows a plot of mass loss factors of lemons treated with mixtures including various coating agents suspended in water.

The beneficial effects of adding small concentrations of medium chain fatty acids or salts or esters thereof to coating solutions/suspensions/colloids that include long chain fatty acids or salts/esters thereof are shown in FIG. 8. FIG. 8 is a graph showing mass loss factors of untreated lemons (802), lemons treated with suspensions in which the coating agent included only long chain fatty acid esters and fatty acid salts (804 and 806), and lemons treated with suspensions in which the coating agent included a small concentration of medium chain fatty acids or salts or esters thereof in combination with a larger concentration of long chain fatty acid esters and fatty acid salts (808 and 810). Specifically, bar 804 corresponds to lemons treated with 10 mg/mL of the long chain fatty acid esters/salts suspended in water. Bar 806 corresponds to lemons treated with 30 mg/mL of the long chain fatty acid esters/salts solvent in water. Bar 808 corresponds to lemons treated with 10 mg/mL of long chain fatty acid esters/salts plus 5 mg/mL of medium chain fatty acid esters solvent in water. Bar 810 corresponds to lemons treated with 30 mg/mL of long chain fatty acid esters/salts plus 5 mg/mL of medium chain fatty acid esters solvent in water.

While treating the lemons with the coating agents that only included long chain fatty acid salts and esters (804 and 806) did reduce the average mass loss rate of the lemons, the mass loss factor did not substantially increase when the concentration of the coating agent compounds in the mixture was increased from 10 mg/mL (804) to 30 mg/mL (806). However, the mass loss factor did increase substantially when a small concentration of medium chain fatty acid esters (5 mg/mL of UA-1G) was added to each of the mixtures. Specifically, adding 5 mg/mL of medium chain esters to the mixture with 10 mg/mL of long chain fatty acid esters/salts caused the mass loss factor of the lemons due to the resulting coatings to increase from about 1.5 (bar 804) to about 1.9 (bar 808), corresponding to an increase in mass loss factor of over 25%. Adding 5 mg/mL of medium chain esters to the mixture with 30 mg/mL of long chain fatty acid esters/salts caused the mass loss factor of the lemons due to the resulting coatings to increase from about 1.7 (bar 806) to about 2.6 (bar 810), corresponding to an increase in mass loss factor of over 50%. The mass loss factor of the lemons corresponding to bar 810 was in fact substantially larger than that of groups of lemons coated with any of the concentrations of long chain fatty acid esters/salts in solution for which medium chain fatty acids or salts/esters thereof were not also added.

Figure 9:
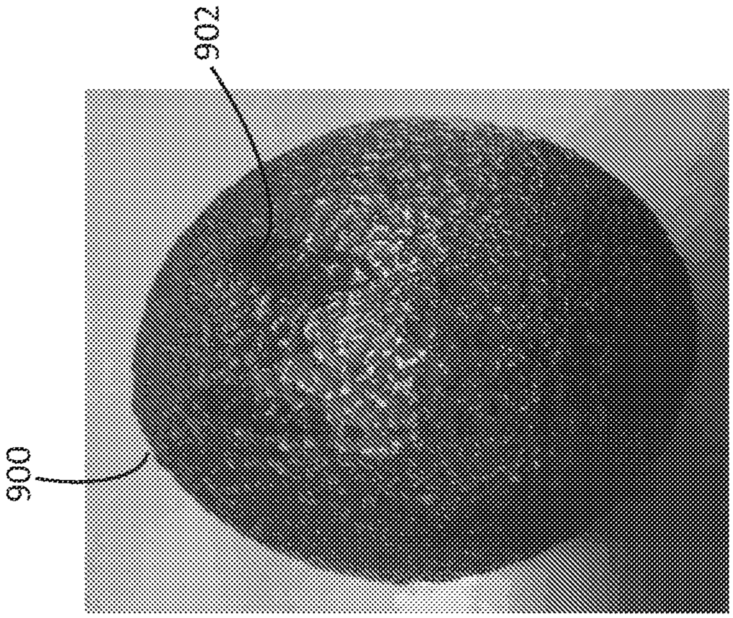
FIG. 9 is a high-resolution photograph of an avocado treated with a mixture including a combination of medium and long chain fatty acid esters/salts suspended in water.

FIG. 9 is a high-resolution photograph of an avocado 900 treated with the same mixture used to treat the lemons of bar 810 in FIG. 8 (5 mg/mL of UA-1G plus 30 mg/mL of long chain fatty acid esters/salts suspended in water). Prior to treatment, the avocado skin was virtually entirely green (not shown). As seen in FIG. 9, after treatment the avocado skin was mostly still green, with only a small density of black discolored regions 902, indicating that the treatment caused very little skin damage to the avocado. In contrast, the avocado shown in FIG. 5, which was treated with a solution that included the same concentration of UA-1G in water (5 mg/mL) but lacked the long chain fatty acid esters/salts, displayed extensive skin damage.

Contact Angle/Wetting Agent

Without wishing to be bound by theory, it is believed that many of the mixtures (i.e., solutions, suspensions, or colloids) that lacked the medium chain fatty acids or salts/esters thereof were not sufficiently wetting the entire surface of the produce to which they were applied due to a difference in surface energy of the mixture as compared to that of the surface of the produce. Consequently, the coatings formed from these mixtures did not completely cover the surface of the produce. As such, mass loss was dominated by water loss through the openings in the coating, and was relatively unaffected by increasing the coating thickness. Thus, in cases where this effect was believed to occur (e.g., in lemons coated from a water-based solution such as in FIG. 7), mass loss rates were relatively unaffected by increasing the thickness of the coating.

Without wishing to be bound by theory, it is believed that the medium chain fatty acids that were added to the mixtures acted as surfactants/wetting agents, reducing the contact angle of the mixture on the surface of the produce. In some embodiments, the addition of the wetting agents can improve coverage of the mixture over the surface of the produce, thereby allowing a substantially contiguous coating to be formed over the entire surface. Consequently, the mass loss rates of coated produce were found to decrease with increasing coating thickness, and overall mass loss rates were found to be substantially reduced as compared to produce coated with similar mixtures that lacked the wetting agents. Furthermore, the long chain fatty acids and/or salts or esters thereof appeared, for example, to suppress surface damage to the produce observed in cases where the wetting agent was dissolved, dispersed, or suspended in the mixture and applied on its own without also including the long chain fatty acids and/or salts or esters thereof. Additional evidence of these effects is provided below.

Through extensive experimentation, it was found that the contact angle of droplets of some solvents and coating solutions/suspensions on the surfaces of at least some types of produce was quite large, indicating a large difference in surface energy of the droplets as compared to the surface of the produce. This effect was particularly evident in cases where the coating solution/suspension was at least 70% water by volume, since the surfaces of many plants or other agricultural products often tend to be hydrophobic due to the presence of epicuticular waxes. This phenomenon was characterized as follows. Droplets of solvent or coating solution/suspension/colloid (i.e., solvent with coating agent dissolved, suspended or dispersed therein) were deposited either directly on produce surfaces or directly on carnauba, candellila, or paraffin wax (carnauba, candellila, and paraffin wax all tend to have similar native hydrophobicity to that of the surfaces of lemons as well as many other types of produce, see FIG. 12 for example), and contact angles were determined with image analysis software. Results of various studies are summarized as follows.

Figure 10:
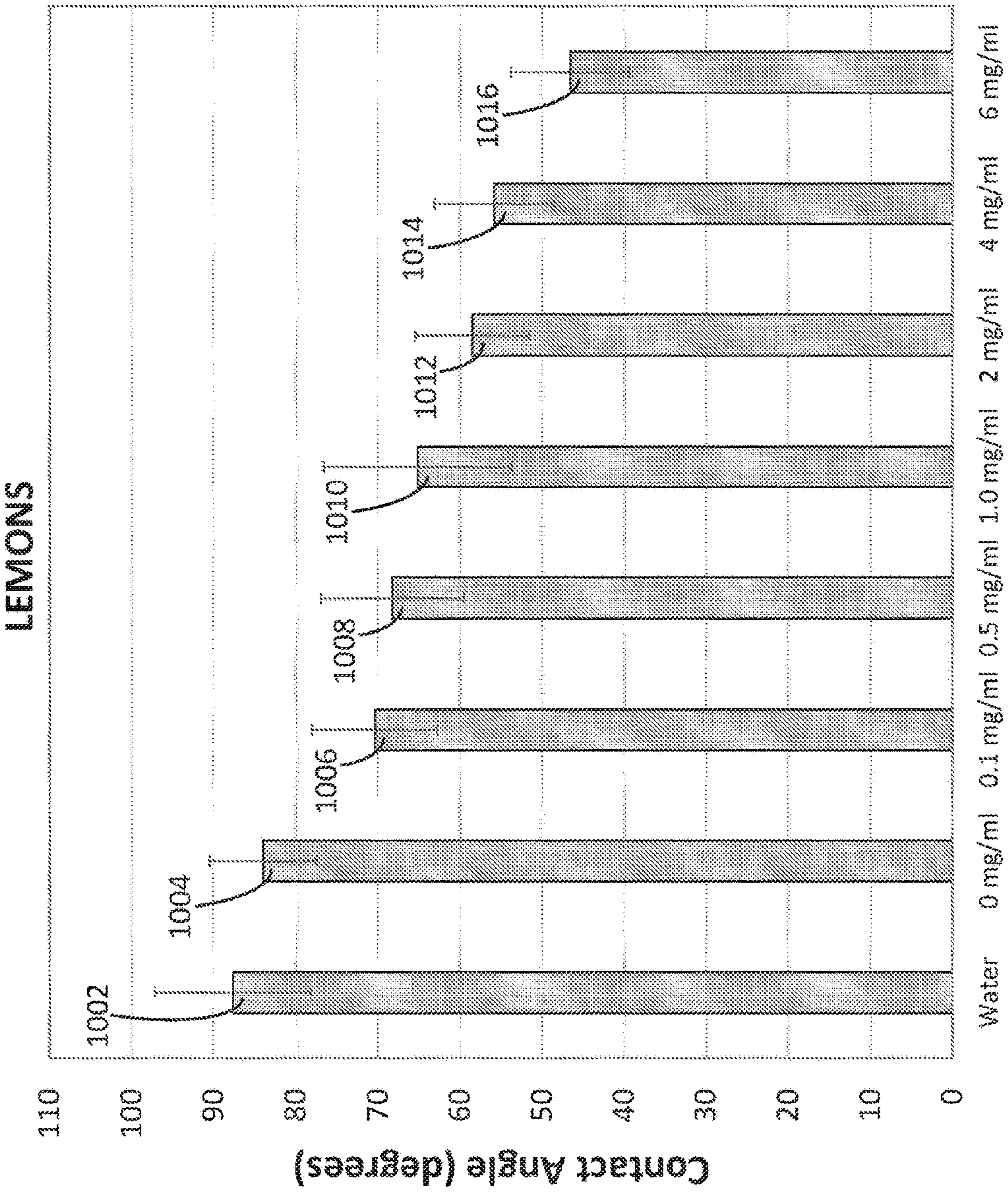
FIGS. 10 and 11 show graphs of contact angles of various mixtures on the surfaces of non-waxed lemons.

In some embodiments, increasing the concentration of the wetting agent (e.g., the medium chain fatty acids and/or salts or esters thereof) in water-based or high water content coating mixtures decreased the contact angle of the solution/suspension/colloid on the produce or wax surface. For example, as shown in FIG. 10, water (bar 1002) exhibited a contact angle of about 88° on the surface of non-waxed lemons, and coating mixtures containing only long chain fatty acid esters/salts (SA-1G and MA-Na combined at a mass ratio of 95:5) suspended in water at a concentration of 30 mg/mL (bar 1004) exhibited a contact angle of about 84°. However, as small concentrations of medium chain fatty acid esters (e.g., CA-1G) were added, the contact angle gradually decreased from about 70° for 0.1 mg/mL of CA-1G (bar 1006) to about 47° for 6 mg/mL of CA-1G (bar 1016).

Figure 11:
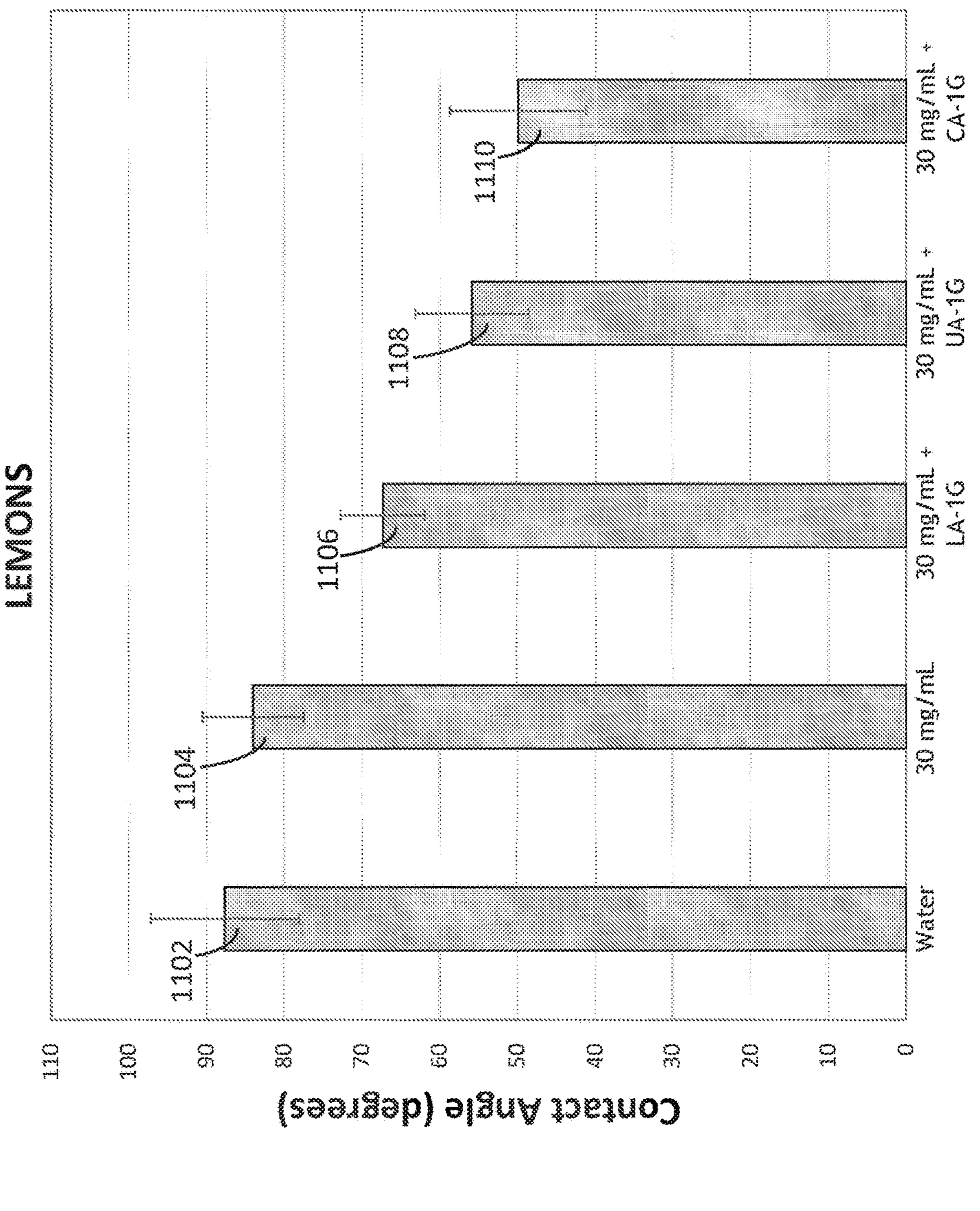

It was further found that for some mixtures, the addition of medium chain fatty acids and/or salts or esters thereof having a smaller chain length caused a larger reduction in contact angle of droplets on produce than addition of similar concentrations of medium chain fatty acids and/or salts or esters thereof having a longer chain length. For example, FIG. 11 shows results of a study in which different medium chain fatty acid esters ($C_{10}$, $C_{11}$, and $C_{12}$) were added to water-based coating mixtures, and contact angles of droplets of the various mixtures on non-waxed lemons were measured. Bar 1102 corresponds to droplets of water. Bar 1104 corresponds to SA-1G and MA-Na combined at a mass ratio of 95:5 and suspended in water at a concentration of 30 mg/mL. Bars 1106, 1108, and 1110 correspond to the same mixture as bar 1104 but with the addition of 4 mg/mL of LA-1G (for bar 1106), 4 mg/mL of UA-1G (for bar 1108), or 4 mg/mL of CA-1G (for bar 1110).

As seen in FIG. 11, drops of water (1102) on lemons as well as drops of the mixture that included only long chain fatty acid esters/salts (1104) on lemons exhibited larger contact angles than mixtures for which a small concentration of medium chain fatty acid esters (1106, 1108, and 1110) were added. Furthermore, for a given concentration of medium chain fatty acid esters, the contact angle decreased with decreasing carbon chain length. Specifically, the mixtures that lacked the medium chain fatty acid esters (1102 and 1104) exhibited contact angles of about 84° to 88°. Adding 4 mg/mL of LA-1G (carbon chain length of 12) decreased the contact angle to about 67°, adding 4 mg/mL of UA-1G (carbon chain length of 11) decreased the contact angle to about 56°, and adding 4 mg/mL of CA-1G (carbon chain length of 10) decreased the contact angle to about 50°.

Figure 12:
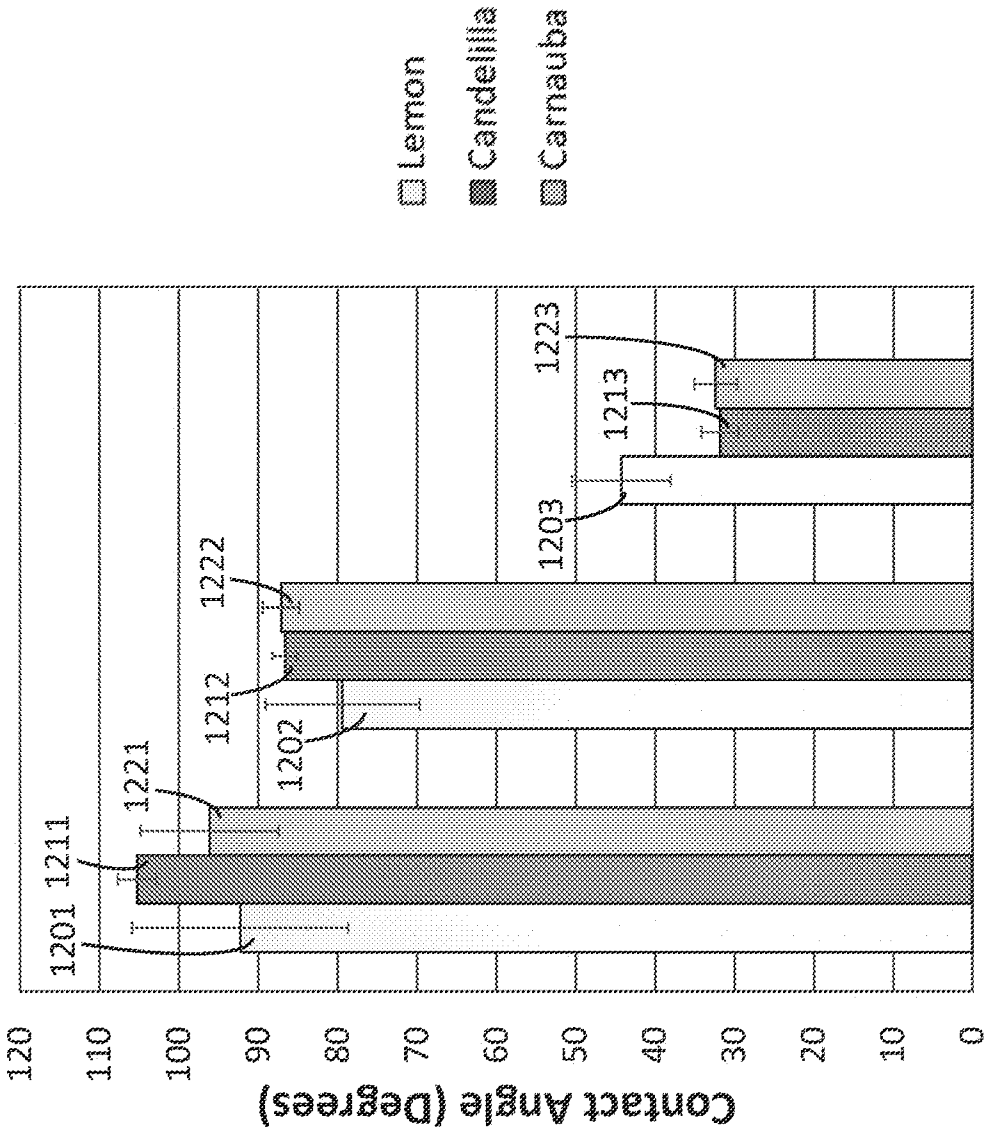
FIG. 12 shows a graph of contact angles of various solvents and mixtures on the surfaces of non-waxed lemons, candelilla wax, and carnauba wax.

As previously described, carnauba, candellila, and paraffin wax were all found to have similar native hydrophobicity to that of the surfaces of lemons (as well as other produce). Hence the wetting properties (e.g., contact angle) of mixtures characterized on carnauba, candellila, or paraffin wax surfaces are typically predictive of the wetting properties of the mixtures on produce. For example, FIG. 12 shows contact angles of water as well as two other mixtures on the surfaces of lemons (bars 1201-1203), candellila wax (bars 1211-1213), and carnauba wax (bars 1221-1223). The first group of bars (1201, 1211, and 1221) each correspond to water, and the contact angle on all 3 surfaces was in a range of about 920 to 105°. The second group of bars (1202, 1212, and 1222) correspond to a suspension for which the solvent was water and the coating agent included 30 mg/mL of SA-1G and SA-Na (long chain fatty acid salts/esters) combined at a mass ratio of 94:6, as well as 0.25 mg/mL of citric acid and 0.325 mg/mL of sodium bicarbonate. As shown, the contact angle on all 3 surfaces was in a range of about 80° to 88°, which was slightly lower than for pure water but was still generally quite large. The third group of bars (1203, 1213, and 1223) correspond to a suspension which was the same as that of the second group of bars but also included 3 mg/mL of CA-1G (medium chain fatty acid ester). As shown, the contact angles on all 3 surfaces remained quite similar to one another and were greatly reduced as compared to the solutions which lacked the medium chain fatty acid esters, each being in a range of about 310 to 44°.

Figure 13:
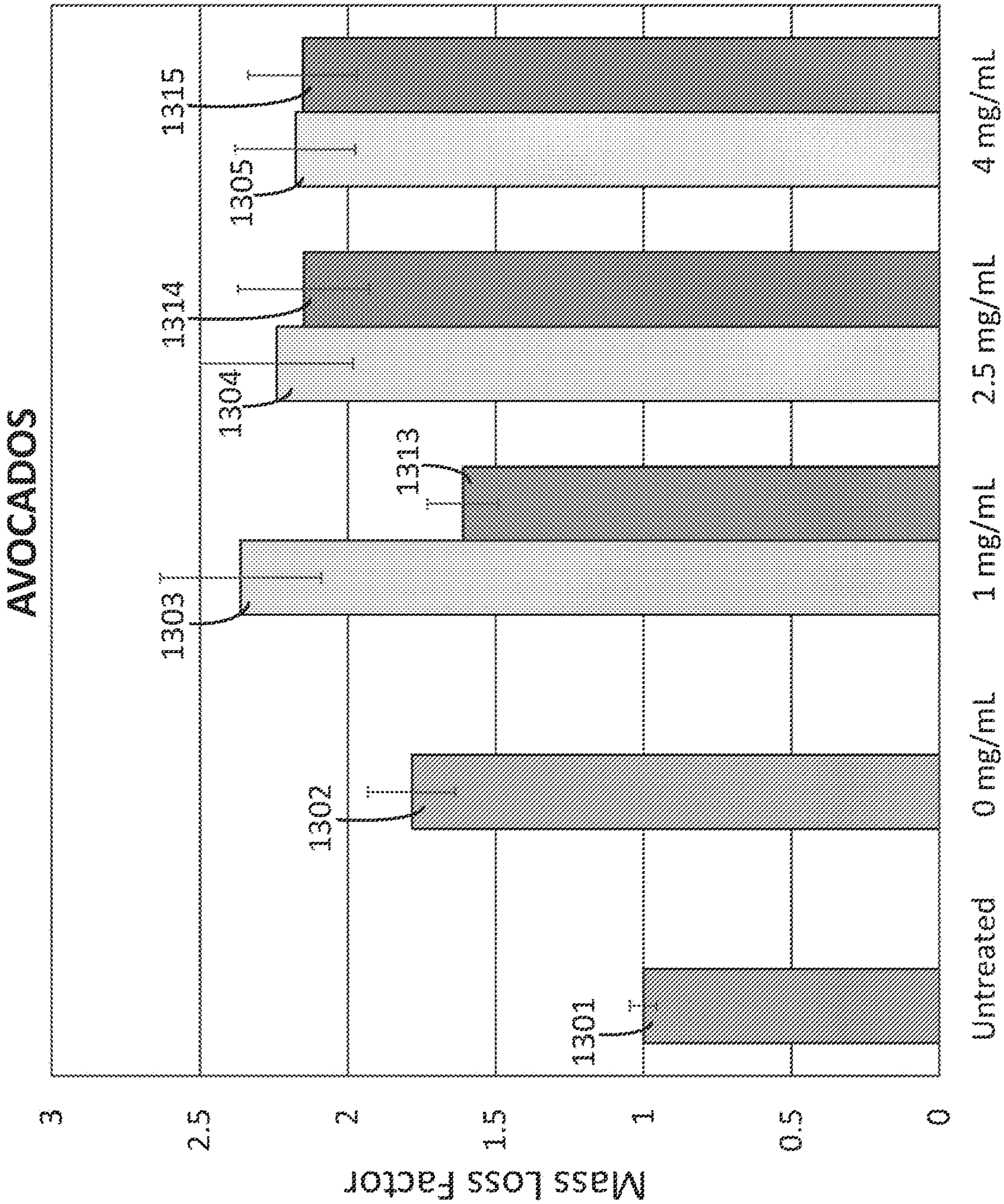
FIG. 13 shows a plot of mass loss factors of avocados treated with mixtures including various combinations of medium and long chain fatty acid esters/salts suspended in water.

The effects of adding small concentrations of LA-1G and CA-1G to coating mixtures used to form coatings on avocados is shown in the graph of FIG. 13. As seen, avocados coated from a mixture that included SA-1G and MA-Na (long chain fatty acid esters/salts) combined at a mass ratio of 94:6 and suspended in water at a concentration of 30 mg/mL (bar 1302) exhibited a mass loss factor of about 1.78. Bars 1303-1305 show the effects of adding CA-1G to the mixture at concentrations of 1 mg/mL, 2.5 mg/mL, and 4 mg/mL, respectively, and bars 1313-1315 show the effects of adding LA-1G to the mixture at concentrations of 1 mg/mL, 2.5 mg/mL, and 4 mg/mL, respectively.

The addition of the CA-1G (carbon chain length of 10) to the coating mixture increased the mass loss factor to about 2.35 for a CA-1G concentration of 1 mg/mL (bar 1303), to about 2.24 for a CA-1G concentration of 2.5 mg/mL (bar 1304), and to about 2.18 for a CA-1G concentration of 4 mg/mL (bar 1305). So while the mass loss factor was substantially larger for all concentrations of CA-1G in a range of 1 to 4 mg/mL as compared to mixtures lacking the medium chain fatty acid esters (bar 1302), the mass loss factor appeared to decrease slightly as the concentration of CA-1G was increased. Without wishing to be bound by theory, it is believed that the addition of CA-1G at all concentrations of at least 1 mg/mL was effective at improving the wetting of the solution on the surfaces of the avocados, but that increasing the concentration of the CA-1G began to cause some moderate damage to the avocados, thereby mitigating the beneficial surface wetting effects and causing a slight decrease in the mass loss factor.

Still referring to FIG. 13, the addition of the LA-1G (carbon chain length of 12) to the coating mixture caused a decrease in the mass loss factor to about 1.61 for an LA-1G concentration of 1 mg/mL (bar 1313), but caused the mass loss factor to increase to about 2.15 for LA-1G concentrations of both 2.5 mg/mL (bar 1314) and 4 mg/mL (bar 1315). Without wishing to be bound by theory, it is believed that at a concentration of 1 mg/mL of LA-1G, the surface wetting of the solution was not sufficiently improved to overcome surface damage to the avocados caused by the LA-1G, and so the mass loss factor decreased relative to treatment by the coating mixture that lacked the medium chain fatty acid esters. However, for larger concentrations of LA-1G, the surface wetting was sufficiently improved such that the mass loss factor substantially increased relative to treatment by the coating solution that lacked the medium chain fatty acid esters. This result is consistent with that of FIG. 11, which found that shorter chain fatty esters (e.g., CA-1G) caused a larger reduction in contact angle as compared to longer chain fatty esters (e.g., LA-1G) when added to water-based coating mixtures at the same concentration.

Figure 14:
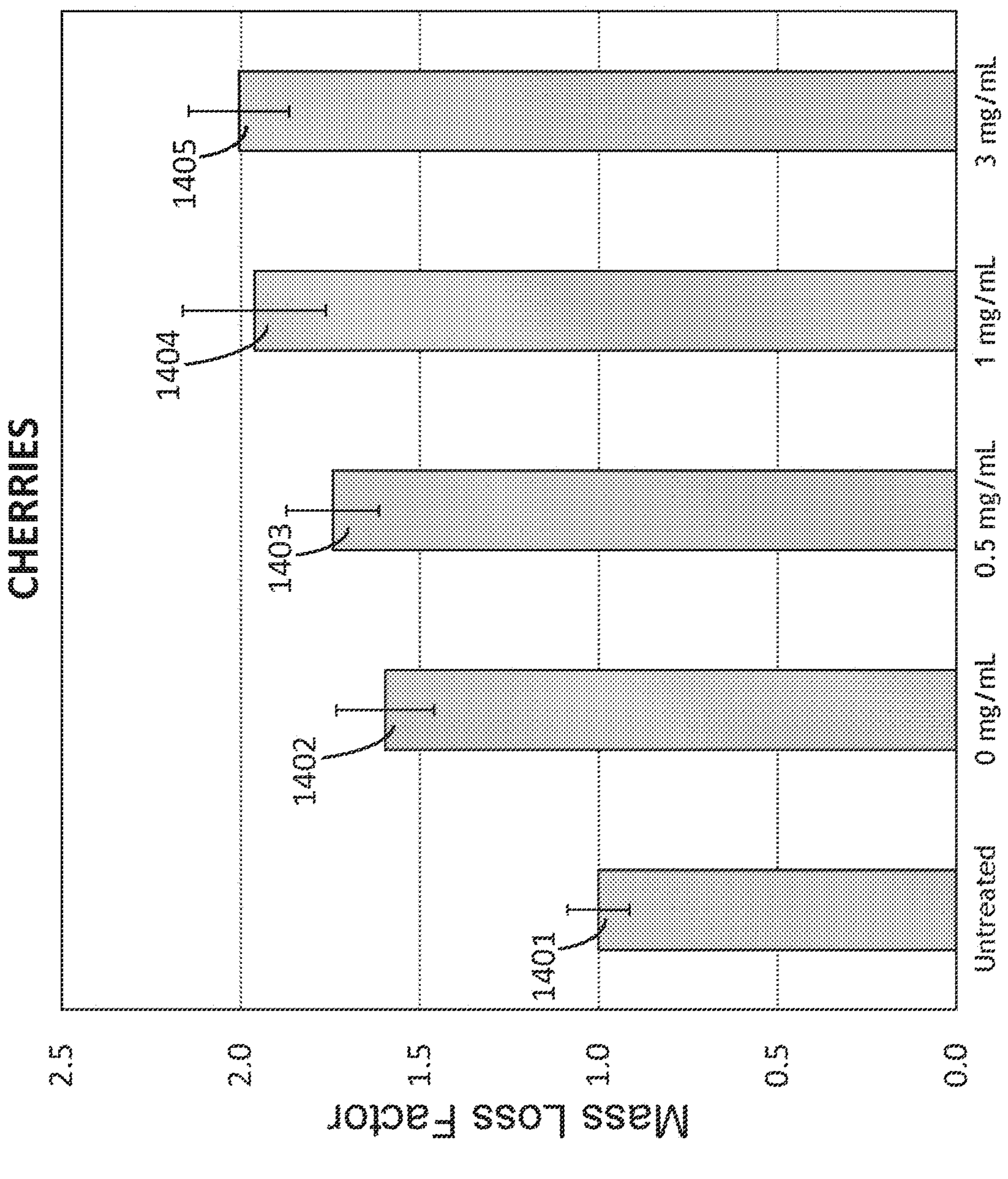
FIG. 14 shows a plot of mass loss factors of cherries treated with mixtures including various combinations of medium and long chain fatty acid esters/salts suspended in water.

The effects of adding small concentrations of CA-1G to coating mixtures used to form coatings on cherries is shown in FIG. 14. As seen, cherries coated from a mixture that included SA-1G and MA-Na (long chain fatty acid esters/salts) combined at a mass ratio of 94:6 and suspended in water at a concentration of 40 mg/mL (bar 1402) exhibited a mass loss factor of about 1.60. Bars 1403-1405 show the effects of adding CA-1G to the mixture at concentrations of 0.5 mg/mL, 1 mg/mL, and 3 mg/mL, respectively. The addition of the CA-1G (carbon chain length of 10) to the coating mixture increased the mass loss factor to about 1.75 for a CA-1G concentration of 0.5 mg/mL (bar 1403), to about 1.96 for a CA-1G concentration of 1 mg/mL (bar 1404), and to about 2.00 for a CA-1G concentration of 4 mg/mL (bar 1405). As shown, the addition of small concentrations of CA-1G to the mixture increased the mass loss factor of the coated cherries. This increase may result from the improved surface wetting resulting from the addition of the CA-1G to the coating mixture.

Figure 15:
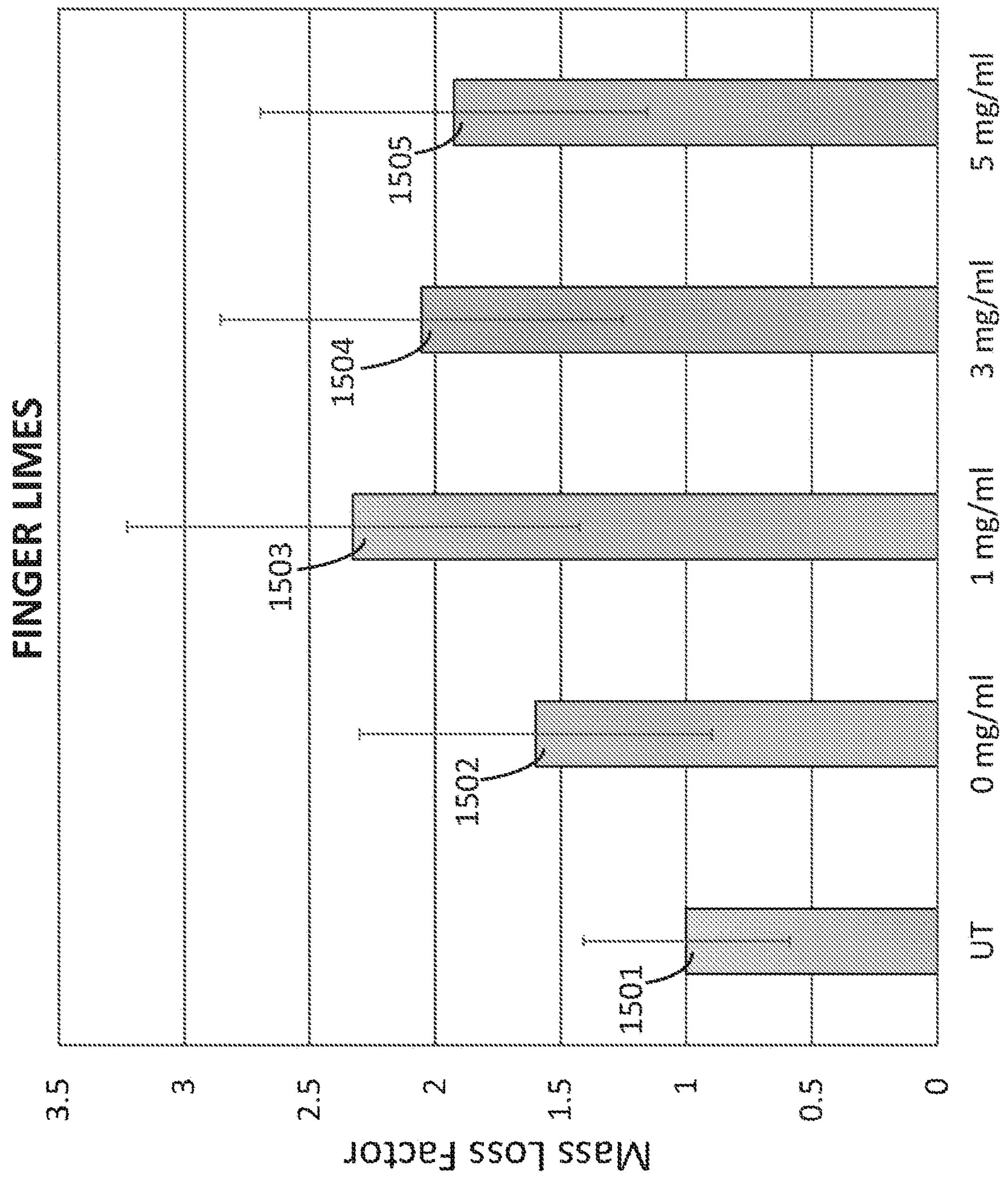
FIG. 15 shows a plot of average daily mass loss rates of finger limes treated with mixtures including various combinations of medium and long chain fatty acid esters/salts suspended in water.

The effects of adding small concentrations of UA-1G to coating mixtures used to form coatings on finger limes is shown FIG. 15. As seen, finger limes coated from a mixture that included SA-1G and SA-Na (long chain fatty acid esters/salts) combined at a mass ratio of 94:6 and suspended in water at a concentration of 30 mg/mL (bar 1502) exhibited a mass loss factor of about 1.61. Bars 1503-1505 show the effects of adding UA-1G to the mixture at concentrations of 1 mg/mL, 3 mg/mL, and 5 mg/mL, respectively. The addition of the UA-1G (carbon chain length of 11) to the mixture increased the mass loss factor to about 2.33 for a UA-1G concentration of 1 mg/mL (bar 1503), to about 2.06 for a UA-1G concentration of 3 mg/mL (bar 1504), and to about 1.93 for a UA-1G concentration of 5 mg/mL (bar 1505). Although the addition of UA-1G did increase the mass loss factor of the finger limes at all concentrations in a range of 1 to 5 mg/mL, the peak mass loss factor occurred at 1 mg/mL, and the mass loss factor decreased as the concentration of UA-1G increased. Without wishing to be bound by theory, it is believed that increasing the concentration of UA-1G began to damage the surface of the finger limes, and that any improvements in surface wetting caused by the increased UA-1G concentration were not sufficient to mitigate this effect, thus resulting in gradually decreasing mass loss factors with increasing UA-1G concentrations.

As described throughout, wetting agents can be included in coating solutions/suspensions/colloids in order to, e.g., improve the surface wetting of substrates to which the solutions/suspensions/colloids are applied, thereby resulting in, e.g., improved surface coverage of the coatings that are formed thereover. The wetting agents can be included within or as part of the coating agent that is dissolved or suspended in the solvent to form the coating solution/suspension/colloid. That is, a sub-group of the compounds of the coating agent can cause a change in surface energy of the solvent to which the coating agent is added, thereby acting as a wetting agent. Alternatively, the wetting agent can be a separate compound (or group of compounds) from the coating agent, and can be added to the solvent either before, after, or at the same time as the coating agent.

Alternatively, the wetting agent can be a separate compound (or group of compounds) from the coating agent and can be applied to the surface prior to applying the coating agent. For example, the wetting agent can first be added to a separate solvent to form a wetting agent solution/suspension/colloid. The wetting agent solution/suspension/colloid can then be applied to the surface, after which the coating solution/suspension/colloid is applied to the surface to form the coating. Priming of the surface in this manner can improve the surface wetting of the coating solution/suspension/colloid with the surface.

An example of the surface priming effect described above is shown in FIG. 16, which is a graph of contact angles of various solvents or mixtures on the surface of paraffin wax. As shown, water applied directly to the paraffin wax surface (bar 1601) exhibited an average contact angle of 74°. When a coating agent mixture of SA-1G and SA-Na combined at a mass ratio of 95:5 was dispersed in water at a concentration of 45 mg/mL and applied directly to the paraffin wax surface (bar 1602), the average contact angle was even larger (83°). However, when a wetting agent (e.g., a medium chain fatty acid or salt/ester thereof) was added to the coating agent mixture, the contact angle of the coating agent mixture was substantially reduced. Additionally, when a wetting agent (e.g., a medium chain fatty acid or salt/ester thereof) was applied to the paraffin wax surface prior to applying either the water or the coating agent mixture, the contact angle was also substantially reduce. For example, when 3 mg/mL of CA-1G was added to the mixture corresponding to bar 1602, the resulting contact angle (bar 1603) was 43°. When the paraffin wax surface was primed by applying a wetting agent mixture of CA-1G at a concentration of 3 mg/mL in water and then allowing the surface to dry prior to applying water (bar 1604) or the SA-1G/SA-Na coating agent mixture described above (bar 1605), the resulting contact angles were 240 and 30°, respectively.

EXAMPLES

The following examples describe effects of various coating agents and solutions/suspensions/colloids on various substrates, as well as characterization of some of the various coating agents and solutions/suspensions/colloids. These examples are only for illustrative purposes and are not meant to limit the scope of the present disclosure. In each of the examples below, all reagents and solvents were purchased and used without further purification unless specified.

Example 1: Effect of Coatings Formed of Long Chain Fatty Acid Esters on Mass Loss Rates of Finger Limes FIG. 1 is a graph showing average daily mass loss rates for finger limes coated with various mixtures of PA-2G and PA-IG measured over the course of several days. Each bar in the graph represents average daily mass loss rates for a group of 24 finger limes. The finger limes corresponding to bar 102 were untreated. The finger limes corresponding to bar 104 were coated with a coating agent that was substantially pure PA-1G. The finger limes corresponding to bar 106 were coated with a coating agent that was about 75% PA-1G and 25% PA-2G by mass. The finger limes corresponding to bar 108 were coated with a coating agent that was about 50% PA-IG and 50% PA-2G by mass. The finger limes corresponding to bar 110 were coated with a coating agent that was about 25% PA-1G and 75% PA-2G by mass. The finger limes corresponding to bar 112 were coated with a coating agent that was substantially pure PA-2G. The coating agents were each dissolved in ethanol at a concentration of 10 mg/mL to form solutions, and the solutions were applied to the surface of the corresponding finger limes to form the coatings.

In order to form the coatings, the finger limes were placed in bags, and the solution containing the composition was poured into the bag. The bag was then sealed and lightly agitated until the entire surface of each finger lime was wet. The finger limes were then removed from the bag and allowed to dry on drying racks. The finger limes were kept under ambient room conditions at a temperature in the range of about 23° C.-27° C. and humidity in the range of about 40%-55% while they dried and for the entire duration of the time they were tested.

As shown in FIG. 1, the untreated finger limes (102) exhibited an average mass loss rate of 5.3% per day. The mass loss rates of the finger limes coated with the substantially pure PA-1G formulation (104) and the substantially pure PA-2G formulation (112) exhibited average daily mass loss rates of 4.3% and 3.7%, respectively. The groups of finger limes corresponding to bars 106 (75:25 mass ratio of PA-1G to PA-2G) and 108 (50:50 mass ratio of PA-1G to PA-2G) both exhibited average daily mass loss rates of 3.4%. The finger limes corresponding to bar 110 (25:75 mass ratio of PA-1G to PA-2G) exhibited average daily mass loss rates of 2.5%.

Example 2: Effect of Coatings Formed of Long Chain Fatty Acids and/or Esters Thereof on Mass Loss Rates of Avocados Nine solutions using combinations of long chain fatty acid esters were prepared to examine the effects of various coating agent compositions on the mass loss rate of avocados treated with a solution composed of the coating agent dissolved in a solvent to form a coating over the avocados. Each solution was composed of the coating agents described below dissolved in ethanol at a concentration of 5 mg/mL.

The first solution contained MA-1G and PA-2G combined at a molar ratio of 1:3. The second solution contained MA-1G and PA-2G combined at a molar ratio of 1:1. The third solution contained MA-1G and PA-2G combined at a molar ratio of 3:1. The fourth solution contained PA-1G and PA-2G combined at a molar ratio of 3:1. The fifth solution contained PA-1G and PA-2G combined at a molar ratio of 1:1. The sixth solution contained PA-1G and PA-2G combined at a molar ratio of 1:3. The seventh solution contained SA-1G and PA-2G combined at a molar ratio of 1:3. The eighth solution contained SA-1G and PA-2G combined at a molar ratio of 1:1. The ninth solution contained SA-1G and PA-2G combined at a molar ratio of 3:1.

Avocados were harvested simultaneously and divided into nine groups of 30 avocados, each of the groups being qualitatively identical (i.e., all groups had avocados of approximately the same average size and quality). In order to form the coatings, the avocados were each individually dipped in one of the solutions, with each group of 30 avocados being treated with the same solution. The avocados were then placed on drying racks and allowed to dry under ambient room conditions at a temperature in the range of about 23° C.-27° C. and relative humidity in the range of about 40%-55%. The avocados were all held at these same temperature and humidity conditions for the entire duration of time they were tested.

Figure 2:
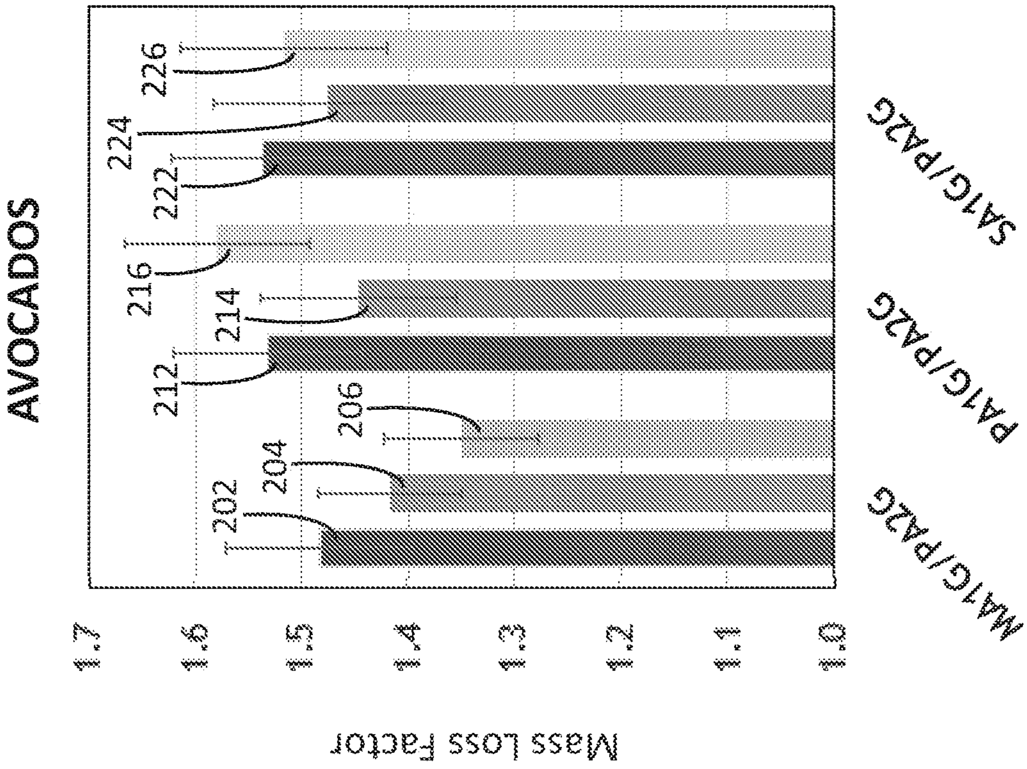
FIG. 2 shows a plot of mass loss factors for avocados coated with combinations of 1-glyceryl and 2-glyceryl esters of palmitic acid, stearic acid, and myristic acid.

FIG. 2 is a graph showing the mass loss factor for avocados coated with various solutions described above. Bars 202, 204, and 206 correspond to MA-1G and PA-2G combined at a molar ratio of about 1:3, 1:1, and 3:1 (first, second, and third solutions), respectively. Bars 212, 214, and 216 correspond to PA-1G and PA-2G combined at a molar ratio of about 1:3, 1:1, and 3:1 (fourth, fifth, and sixth solutions), respectively. Bars 222, 224, and 226 correspond to SA-1G and PA-2G combined at a molar ratio of about 1:3, 1:1, and 3:1 (seventh, eighth, and ninth solutions), respectively.

As shown in FIG. 2, treatment in the first solution (202) resulted in a mass loss factor of 1.48, treatment in the second solution (204) resulted in a mass loss factor of 1.42, treatment in the third solution (206) resulted in a mass loss factor of 1.35, treatment in the fourth solution (212) resulted in a mass loss factor of 1.53, treatment in the fifth solution (214) resulted in a mass loss factor of 1.45, treatment in the sixth solution (216) resulted in a mass loss factor of 1.58, treatment in the seventh solution (222) resulted in a mass loss factor of 1.54, treatment in the eighth solution (224) resulted in a mass loss factor of 1.47, and treatment in the ninth solution (226) resulted in a mass loss factor of 1.52.

Figure 3:
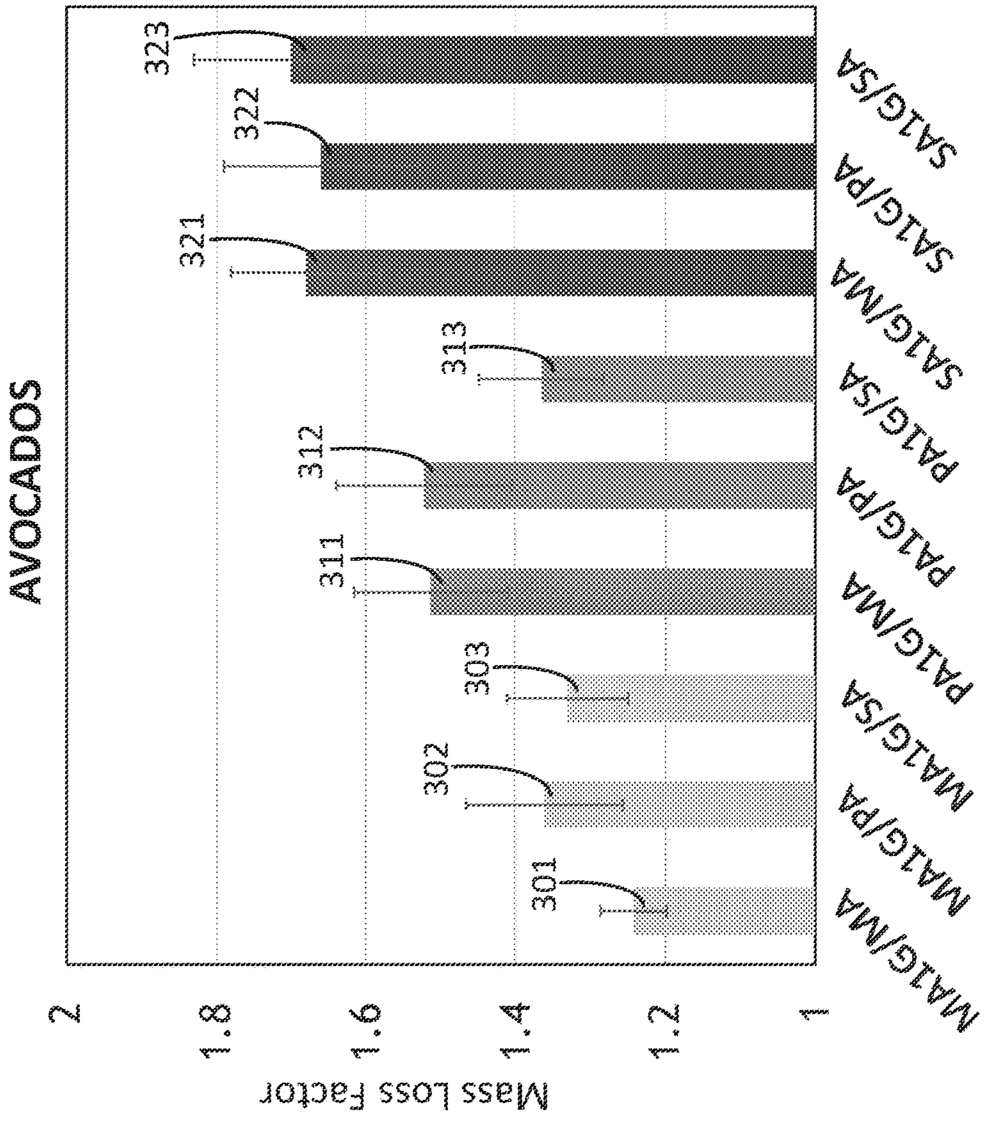
FIG. 3 shows a plot of mass loss factors for avocados coated with combinations of fatty acids (MA, PA, and SA) and glyceryl esters of fatty acids (MA-1G, PA-1G, and SA-1G).

FIG. 3 is a graph showing the mass loss factor for avocados each coated with a mixture including a long chain fatty acid ester and a long chain fatty acid. All mixtures were a 1:1 mix by mole ratio of the compound of fatty acid ester and the fatty acid. Bars 301-303 correspond to coating agents composed of MA-1G and MA (301), MA-1G and PA (302), and MA-1G and SA (303). Bars 311-313 correspond to coating agents composed of PA-1G and MA (311), PA-1G and PA (312), and PA-1G and SA (313). Bars 321-323 correspond to coating agents composed of SA-1G and MA (321), SA-1G and PA (322), and SA-1G and SA (323). Each bar in the graph represents a group of 30 avocados. All coatings were formed by dipping the avocados in a solution comprising the associated mixture dissolved in ethanol at a concentration of 5 mg/mL, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As shown, the mass loss factor tended to increase as the carbon chain length of the fatty acid ester was increased. For example, all mixtures for which the carbon chain length of the ester was greater than 13 resulted in a mass loss factor greater than 1.2, all mixtures for which the carbon chain length of the ester was greater than 15 resulted in a mass loss factor greater than 1.35, and all mixtures for which the carbon chain length of the ester was greater than 17 resulted in a mass loss factor great than 1.6.

Figure 4:
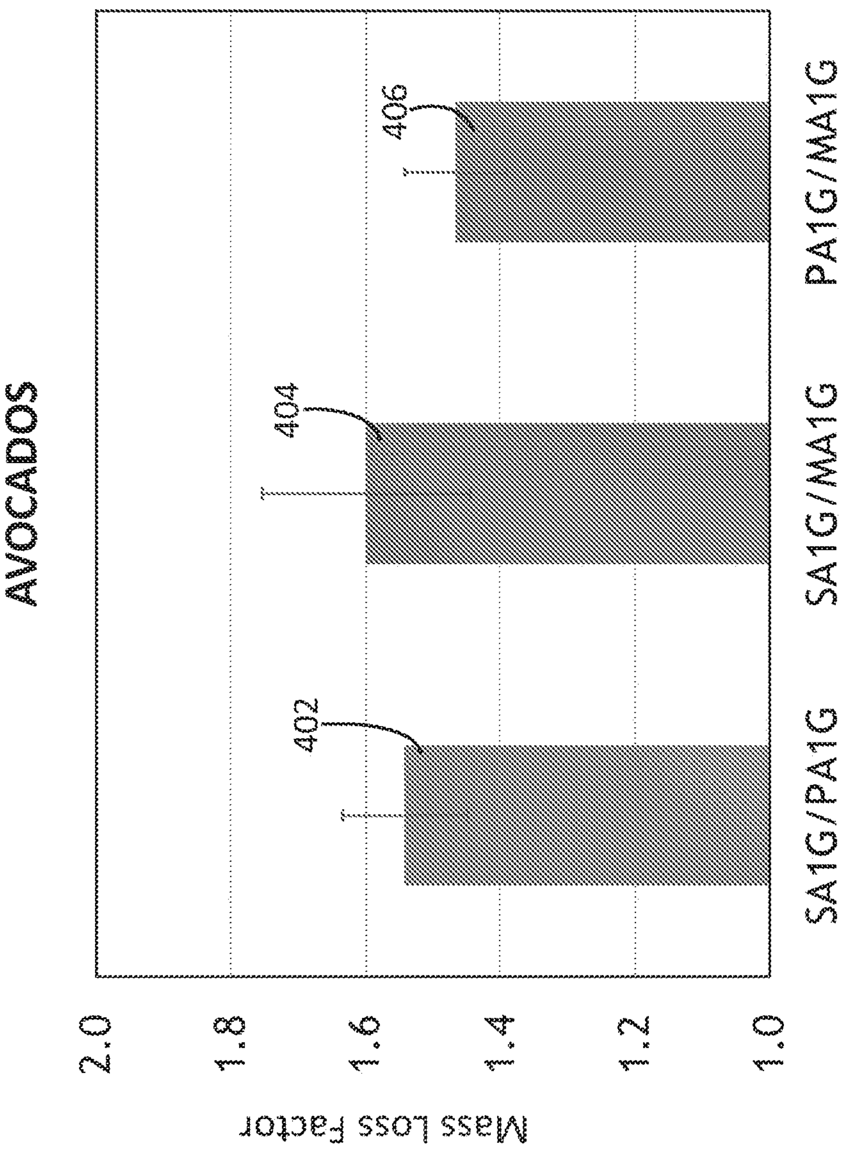
FIG. 4 shows a plot of mass loss factors for avocados coated with combinations of 1-glyceryl esters of palmitic acid, stearic acid, and myristic acid.

FIG. 4 is a graph showing the mass loss factor for avocados each coated with a coating agent including two different long chain fatty acid ester compounds mixed at a 1:1 mole ratio. Bar 402 corresponds to a mixture of SA-1G and PA-1G, bar 404 corresponds to a mixture of SA-1G and MA-1G, and bar 406 corresponds to a mixture of PA-1G and MA-1G. Each bar in the graph represents a group of 30 avocados. All coatings were formed by dipping the avocados in a solution composed of the associated mixture dissolved in ethanol at a concentration of 5 mg/mL, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested. As shown, the PA-1G/MA-1G mixture (406) resulted in a mass loss factor of 1.47, the SA-1G/PA-1G mixture (402) resulted in a mass loss factor of 1.54, and the SA-1G/MA-1G mixture (1604) resulted in a mass loss factor of 1.60.

Example 3: Effect of Coating Agent Concentration on Mass Loss Rates of Coated Blueberries Two solutions were prepared by dissolving a coating agent formed of PA-2G and PA-1G mixed at a mass ratio of 75:25 in substantially pure ethanol. For the first solution, the coating agent was dissolved in the ethanol at a concentration of 10 mg/mL, and for the second solution, the coating agent was dissolved in the ethanol at a concentration of 20 mg/mL.

Blueberries were harvested simultaneously and divided into three groups of 60 blueberries each, each of the groups being qualitatively identical (i.e., all groups had blueberries of approximately the same average size and quality). The first group was a control group of untreated blueberries, the second group was treated with the 10 mg/mL solution, and the third group was treated with the 20 mg/mL solution.

To treat the blueberries, each blueberry was picked up with a set of tweezers and individually dipped in the solution for approximately 1 second, after which the blueberry was placed on a drying rack and allowed to dry. The blueberries were kept under ambient room conditions at a temperature in the range of 23° C.-27° C. and humidity in the range of 40%-55% while they dried and for the entire duration of the time they were tested. Mass loss was measured by carefully weighing the blueberries each day, where the reported percent mass loss was equal to the ratio of mass reduction to initial mass.

Figure 6:
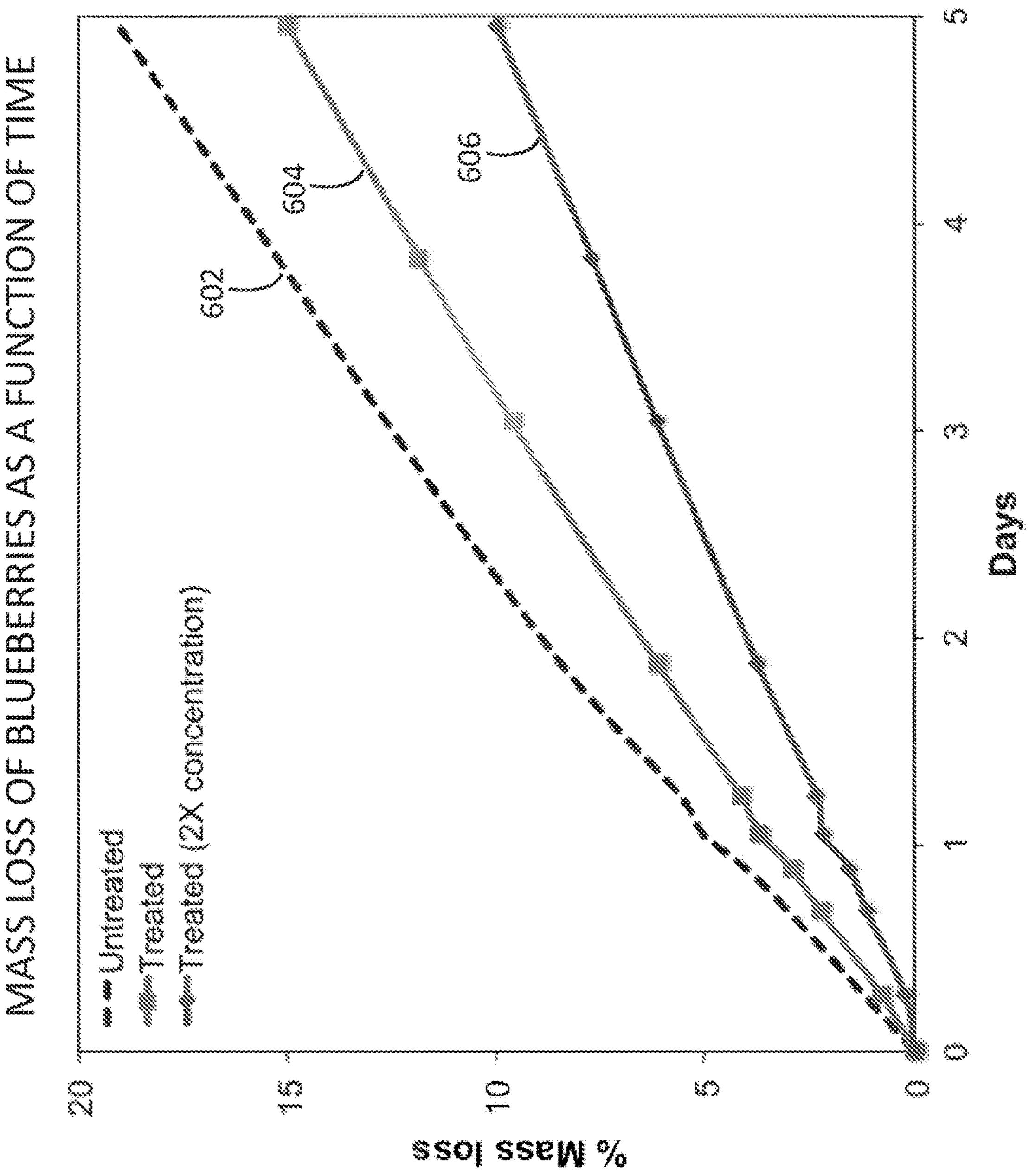
FIG. 6 is a plot of percent mass loss of both treated and untreated blueberries over the course of 5 days.

FIG. 6 shows plots of the percent mass loss over the course of 5 days in untreated (control) blueberries (602), blueberries treated using the first solution of 10 mg/mL (604), and blueberries treated using the second solution of 20 mg/mL (606). As shown, the percent mass loss for untreated blueberries was 19.2% after 5 days, whereas the percent mass loss for blueberries treated with the 10 mg/mL solution was 15% after 5 days, and the percent mass loss for blueberries treated with the 20 mg/mL solution was 10% after 5 days.

Example 4: Effect of Coatings Formed of Esters and Salts of Long Chain Fatty Acids on Mass Loss Rates of Lemons FIG. 7 is a graph showing the mass loss factor for lemons each coated with a coating agent including SA-1G and SA-Na mixed at a 4:1 mass ratio. Bar 702 corresponds to untreated lemons (control group), bar 704 corresponds to lemons treated with a suspension composed of the coating agent suspended in water at a concentration of 10 mg/mL, bar 706 corresponds to lemons treated with a suspension composed of the coating agent suspended in water at a concentration of 20 mg/mL, bar 708 corresponds to lemons treated with a suspension composed of the coating agent suspended in water at a concentration of 30 mg/mL, bar 710 corresponds to lemons treated with a suspension composed of the coating agent suspended in water at a concentration of 40 mg/mL, and bar 712 corresponds to lemons treated with a suspension composed of the coating agent suspended in water at a concentration of 50 mg/mL.

Each bar in the graph represents a group of 90 lemons. All coatings were formed by dipping the lemons in their associated suspension, placing the lemons on drying racks, and allowing the lemons to dry under ambient room conditions at a temperature in the range of about 23° C.-27° C. and humidity in the range of about 40%-55%. The lemons were held at these same temperature and humidity conditions for the entire duration of the time they were tested. As seen in FIG. 7, the mass loss factor for the lemons treated with the 10 mg/mL solution (704) was 1.83, the mass loss factor for the lemons treated with the 20 mg/mL solution (706) was 1.75, the mass loss factor for the lemons treated with the 30 mg/mL solution (708) was 1.90, the mass loss factor for the lemons treated with the 40 mg/mL solution (710) was 1.78, and the mass loss factor for the lemons treated with the 50 mg/mL solution (712) was 1.83.

Example 5: Effect of Coatings Formed of Esters/Salts of Long Chain Fatty Acids and Esters of Medium Chain Esters on Mass Loss Rates of Lemons FIG. 8 is a graph showing mass loss factors of lemons treated with various coating agents suspended in water. Bar 802 corresponds to untreated lemons. Bar 804 corresponds a coating agent formed of SA-1G and MA-Na mixed at a 95:5 mass ratio and added to the water at a concentration of 10 mg/mL. Bar 806 corresponds a coating agent formed of SA-1G and MA-Na mixed at a 95:5 mass ratio and added to the water at a concentration of 30 mg/mL. Bar 808 corresponds a coating agent formed of 10 mg/mL of SA-1G and MA-Na (mixed at a 95:5 mass ratio) and 5 mg/mL of UA-1G suspended in water. Bar 810 corresponds to a coating agent formed of 30 mg/mL of SA-1G and MA-Na (mixed at a 95:5 mass ratio) and 5 mg/mL of UA-1G suspended in water.

Each bar in the graph represents a group of 60 lemons. All coatings were formed by dipping the lemons in their associated solution, placing the lemons on drying racks, and allowing the lemons to dry under ambient room conditions at a temperature in the range of about 23° C.-27° C. and humidity in the range of about 40%-55%. The lemons were held at these same temperature and humidity conditions for the entire duration of the time they were tested. As seen in FIG. 8, the mass loss factor for the lemons corresponding to bar 804 was 1.50, the mass loss factor for the lemons corresponding to bar 806 was 1.68, the mass loss factor for the lemons corresponding to bar 808 was 1.87, and the mass loss factor for the lemons corresponding to bar 810 was 2.59.

Example 6: Contact Angles of Solvents and Mixtures on the Surfaces of Lemons FIG. 10 shows a graph of contact angles of various solvents or mixtures on the surfaces of non-waxed lemons. Contact angles were determined by placing drops containing 5 microliters of solvent/mixture on the surface of a lemon and determining the contact angle by digital image analysis. Each bar in the graph represents measurements of 15-20 drops. For bar 1002, the solvent was pure water (control sample). For bar 1004, the mixture included SA-1G and MA-Na combined at a mass ratio of 95:5 and dispersed in water at a concentration of 30 mg/mL. The mixtures corresponding to bars 1006, 1008, 1010, 1012, 1014, and 1016 were the same as that of bar 1004 but also included small concentrations of CA-1G. Bar 1006 included 0.1 mg/mL of CA-1G, bar 1008 included 0.5 mg/mL of CA-1G, bar 1010 included 1 mg/mL of CA-1G, bar 1012 included 2 mg/mL of CA-1G, bar 1014 included 4 mg/mL of CA-1G, and bar 1016 included 6 mg/mL of CA-IG.

As seen in FIG. 10, the drops corresponding to bar 1002 (pure water) exhibited an average contact angle of 88° on lemons. The drops corresponding to bar 1004 (SA-1G/MA-Na in water) exhibited an average contact angle of 84° on lemons. The drops corresponding to bar 1006 (addition of 0.1 mg/mL of CA-1G) exhibited an average contact angle of 70° on lemons. The drops corresponding to bar 1008 (addition of 0.5 mg/mL of CA-1G) exhibited an average contact angle of 68° on lemons. The drops corresponding to bar 1010 (addition of 1 mg/mL of CA-1G) exhibited an average contact angle of 65° on lemons. The drops corresponding to bar 1012 (addition of 2 mg/mL of CA-1G) exhibited an average contact angle of 58° on lemons. The drops corresponding to bar 1014 (addition of 4 mg/mL of CA-1G) exhibited an average contact angle of 56° on lemons. The drops corresponding to bar 1016 (addition of 6 mg/mL of CA-1G) exhibited an average contact angle of 47° on lemons.

Example 7: Dependence on Carbon Chain Length of Surfactant on Contact Angles of Mixtures on the Surfaces of Lemons FIG. 11 shows a graph of contact angles of various mixtures on the surfaces of non-waxed lemons. Contact angles were determined by placing drops containing 5 microliters of the mixture on the surface of a lemon and determining the contact angle by digital image analysis. Each bar in the graph represents measurements of 15-20 drops. For bar 1102, the solvent was pure water (control sample). For bar 1104, the mixture included SA-1G and MA-Na combined at a mass ratio of 95:5 and dispersed in water at a concentration of 30 mg/mL. The suspensions corresponding to bars 1106, 1108, and 1110 were the same as that of bar 1104 but also included 4 mg/mL of a medium chain fatty acid ester. For bar 1106 the medium chain fatty acid ester was LA-1G (carbon chain length of 12), for bar 1108 the medium chain fatty acid ester was UA-1G (carbon chain length of 11), and for bar 1110 the medium chain fatty acid ester was CA-1G (carbon chain length of 10).

As seen in FIG. 11, the drops corresponding to bar 1102 (pure water) exhibited an average contact angle of 88° on lemons. The drops corresponding to bar 1104 (SA-1G/MA-Na in water) exhibited an average contact angle of 84° on lemons. The drops corresponding to bar 1106 (addition of 4 mg/mL of LA-1G) exhibited an average contact angle of 67° on lemons. The drops corresponding to bar 1108 (addition of 4 mg/mL of UA-1G) exhibited an average contact angle of 56° on lemons. The drops corresponding to bar 1110 (addition of 1 mg/mL of CA-1G) exhibited an average contact angle of 50° on lemons.

Example 8: Contact Angles of Solvents and Mixtures on the Surfaces of Lemons, Candelilla Wax, and Carnauba Wax FIG. 12 shows a graph of contact angles of various solvents and mixtures on the surfaces of non-waxed lemons (1201-1203), candelilla wax (1211-1213), and carnauba wax (1221-1223). Contact angles were determined by placing drops containing 5 microliters of solution on the surface being tested and determining the contact angle by digital image analysis. Each bar in the graph represents measurements of 15-20 drops. For bars 1201, 1211, and 1221, the solvent was pure water (control sample). The second group of bars (1202, 1212, and 1222) correspond to 30 mg/mL of SA-1G and SA-Na combined at a mass ratio of 94:6, as well as 0.25 mg/mL of citric acid and 0.325 mg/mL of sodium bicarbonate dispersed in water. The third group of bars (1203, 1213, and 1223) correspond to a mixture which was the same as that of the second group of bars but also included 3 mg/mL of CA-1G.

As seen in FIG. 12, the drops corresponding to bar 1201 exhibited an average contact angle of 92° on lemons. The drops corresponding to bar 1202 exhibited an average contact angle of 105° on candelilla wax. The drops corresponding to bar 1203 exhibited an average contact angle of 96° on carnauba wax. The drops corresponding to bar 1211 exhibited an average contact angle of 80° on lemons. The drops corresponding to bar 1212 exhibited an average contact angle of 87° on candelilla wax. The drops corresponding to bar 1213 exhibited an average contact angle of 88° on carnauba wax. The drops corresponding to bar 1221 exhibited an average contact angle of 44° on lemons. The drops corresponding to bar 1222 exhibited an average contact angle of 31° on candelilla wax. The drops corresponding to bar 1223 exhibited an average contact angle of 32° on carnauba wax.

Example 9: Effect of Adding Medium Chain Fatty Acid Esters to Coating Mixtures Used to Form Protective Coatings Over Avocados FIG. 13 shows the mass loss factor for groups of avocados that were coated with a coating agent including SA-1G and MA-Na mixed with various concentrations of CA-1G or LA-1G. Coatings were formed by adding each coating agent in water at the specified concentration to form a mixture, applying the mixture to the surface of the avocados, and allowing the solvent to evaporate. Bar 1301 corresponds to untreated avocados (control group). Bar 1302 corresponds to a coating agent including SA-1G and MA-Na combined at a mass ratio of 94:6 and added to water at a concentration of 30 mg/mL. For bars 1303 and 1313, the mixture was the same as that for bar 1302, except that 1 mg/mL of CA-1G (bar 1303) or LA-1G (bar 1313) was also added. For bars 1304 and 1314, the mixture was the same as that for bar 1302, except that 2.5 mg/mL of CA-1G (bar 1304) or LA-1G (bar 1314) was also added. For bars 1305 and 1315, the mixture was the same as that for bar 1302, except that 4 mg/mL of CA-1G (bar 1305) or LA-1G (bar 1315) was also added. Each bar in the graph represents a group of 30 avocados. All coatings were formed by dipping the avocados in their associated mixture, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As seen in FIG. 13, the average mass loss factor for the avocados corresponding to bar 1302 (no medium chain fatty acid esters) was 1.78. For mixtures including small concentrations of CA-1G (bars 1303-1305), the average mass loss factors of the coated avocados were 2.35 for bar 1303 (CA-1G concentration of 1 mg/mL), 2.24 for bar 1304 (CA-1G concentration of 2.5 mg/mL), and 2.18 for bar 1305 (CA-1G concentration of 4 mg/mL). For mixtures including small concentrations of LA-1G (bars 1313-1315), the average mass loss factors of the coated avocados were 1.61 for bar 1313 (LA-1G concentration of 1 mg/mL), 2.15 for bar 1314 (LA-1G concentration of 2.5 mg/mL), and 2.15 for bar 1315 (LA-1G concentration of 4 mg/mL).

Example 10: Effect of Adding CA-1G to Coating Mixtures Used to Form Protective Coatings Over Cherries FIG. 14 shows the mass loss factor for groups of cherries (Bing variety) that were coated with a coating agent including SA-1G and MA-Na mixed with various concentrations of CA-1G. Coatings were formed by dissolving each coating agent in water at the specified concentration to form a solution, applying the solution to the surface of the cherries, and allowing the solvent to evaporate. Bar 1401 corresponds to untreated cherries (control group). Bar 1402 corresponds to a coating agent including SA-1G and MA-Na combined at a mass ratio of 94:6 and suspended in water at a concentration of 40 mg/mL. For bar 1403, the suspension was the same as that for bar 1402, except that 0.5 mg/mL of CA-1G was also added. For bar 1404, the suspension was the same as that for bar 1402, except that 1 mg/mL of CA-1G was also added. For bar 1405, the suspension was the same as that for bar 1402, except that 3 mg/mL of CA-1G was also added. Each bar in the graph represents a group of 90 cherries. All coatings were formed by dipping the cherries in their associated suspension, placing the cherries on drying racks, and allowing the cherries to dry under ambient room conditions at a temperature in the range of about 23° C.-27° C. and humidity in the range of about 40%-55%. The cherries were held at these same temperature and humidity conditions for the entire duration of the time they were tested.

As seen in FIG. 14, the average mass loss factor for the cherries corresponding to bar 1402 (no medium chain fatty acid esters) was 1.60. For suspensions including small concentrations of CA-1G (bars 1403-1405), the average mass loss factors of the coated cherries were 1.75 for bar 1403 (CA-1G concentration of 0.5 mg/mL), 1.96 for bar 1404 (CA-1G concentration of 1 mg/mL), and 2.00 for bar 1405 (CA-1G concentration of 3 mg/mL).

Example 11: Effect of Adding UA-1G to Coating Mixtures Used to Form Protective Coatings Over Finger Limes FIG. 15 shows the mass loss factor for groups of finger limes that were coated with a coating agent including SA-1G and SA-Na mixed with various concentrations of UA-1G. Coatings were formed by adding each coating agent to water at the specified concentration to form a suspension, applying the suspension to the surface of the finger limes, and allowing the solvent to evaporate. Bar 1501 corresponds to untreated finger limes (control group). Bar 1502 corresponds to a coating agent including SA-1G and SA-Na combined at a mass ratio of 94:6 and suspended in water at a concentration of 30 mg/mL. For bar 1503, the suspension was the same as that for bar 1502, except that 1 mg/mL of UA-1G was also added. For bar 1504, the suspension was the same as that for bar 1502, except that 3 mg/mL of UA-1G was also added. For bar 1505, the suspension was the same as that for bar 1502, except that 5 mg/mL of UA-1G was also added. Each bar in the graph represents a group of 48 finger limes. All coatings were formed by dipping the finger limes in their associated suspension, placing the finger limes on drying racks, and allowing the finger limes to dry under ambient room conditions at a temperature in the range of about 23° C.-27° C. and humidity in the range of about 40%-55%. The finger limes were held at these same temperature and humidity conditions for the entire duration of the time they were tested.

As seen in FIG. 15, the average mass loss factor for the finger limes corresponding to bar 1502 (no medium chain fatty acid esters) was 1.61. For suspensions including small concentrations of UA-1G (bars 1503-1505), the average mass loss factors of the coated finger limes were 2.33 for bar 1503 (UA-1G concentration of 1 mg/mL), 2.06 for bar 1504 (UA-1G concentration of 3 mg/mL), and 1.93 for bar 1505 (UA-1G concentration of 5 mg/mL).

Figure 16:
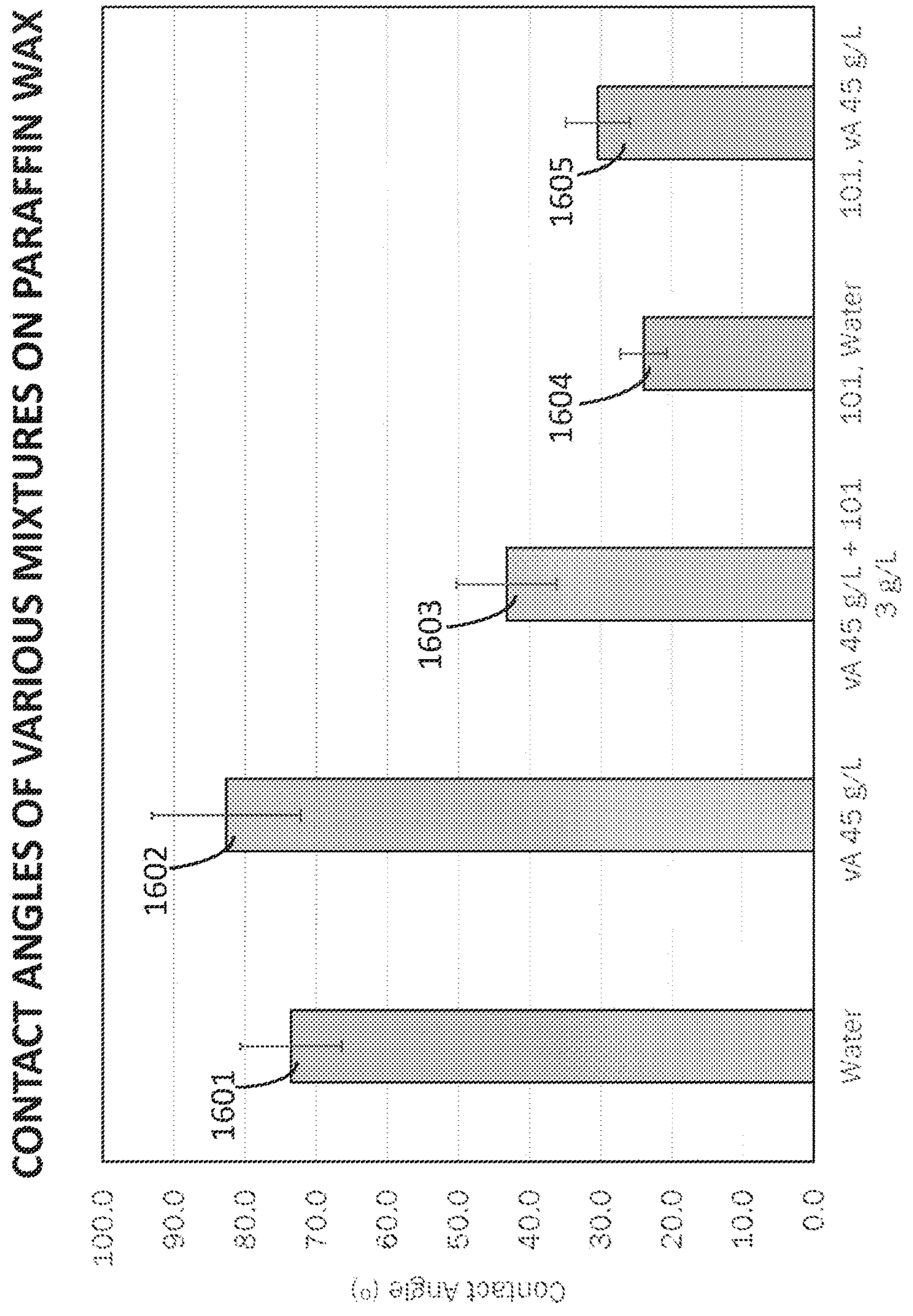
FIG. 16 shows a graph of contact angles of various solvents and mixtures on the surface of paraffin wax.

Example 12: Effect of Priming the Surface of Paraffin Wax on the Contact Angle of Solvents and Mixtures FIG. 16 shows a graph of contact angles of various solvents and mixtures on the surface of paraffin wax. Contact angles were determined by placing drops containing 5 microliters of solvent/mixture on the surface of paraffin wax and determining the contact angle by digital image analysis. Each bar in the graph represents measurements of 15-20 drops. For bar 1601, the solvent was pure water. For bar 1602, the mixture included SA-1G and SA-Na combined at a mass ratio of 95:5 and dispersed in water at a concentration of 45 mg/mL. The mixture corresponding to bar 1603 was the same as that of bar 1602 but also included 3 mg/mL of CA-1G. For bar 1604, a mixture of CA-1G at a concentration of 3 mg/mL in water was first deposited on the surface of the paraffin wax and then allowed to dry in order to prime the surface. Afterward, the contact angle of water on the primed surface was determined. For bar 1605, a mixture of CA-1G at a concentration of 3 mg/mL in water was first deposited on the surface of the paraffin wax and then allowed to dry in order to prime the surface. Afterward, the contact angle of a mixture of SA-1G and SA-Na at a mass ratio of 95:5 dispersed in water at a concentration of 45 mg/mL on the primed surface was determined.

As seen in FIG. 16, the drops corresponding to bar 1601 (pure water) exhibited an average contact angle of 74° on paraffin wax. The drops corresponding to bar 1602 (a mixture of SA-1G and SA-Na) exhibited an average contact angle of 83° on paraffin wax. The drops corresponding to bar 1603 (a mixture of SA-1G, Sa-Na, and CA-1G) exhibited an average contact angle of 43° on paraffin wax. The drops corresponding to bar 1604 (pure water on primed paraffin wax surface) exhibited an average contact angle of 24°. The drops corresponding to bar 1605 (mixture of SA-1G and SA-Na in water on primed paraffin wax surface) exhibited an average contact angle of 30°.

Example 13: Effect of Ester to Salt Ratio in Coatings Over Avocados on Mass Loss Factor FIG. 18 shows the mass loss factor for groups of avocados that were coated with a coating agent including either SA-Na or MA-Na combined at different ratios with a mixture that was approximately a 50/50 mix of SA-1G and PA-1G. Coatings were formed by adding each coating agent to water at a concentration of 30 mg/mL to form a suspension, applying the suspension to the surface of the avocados, and allowing the solvent to evaporate. Bar 1801 corresponds to untreated avocados (control group). Bar 1802 corresponds to a coating agent including the SA-1G/PA-1G mixture and SA-Na combined at a mass ratio of 94:6. Bar 1803 corresponds to a coating agent including the SA-1G/PA-1G mixture and SA-Na combined at a mass ratio of 70:30. Bar 1804 corresponds to a coating agent including the SA-1G/PA-1G mixture and MA-Na combined at a mass ratio of 94:6. Bar 1805 corresponds to a coating agent including the SA-1G/PA-1G mixture and MA-Na combined at a mass ratio of 70:30. Each bar in the graph represents a group of 180 avocados. All coatings were formed by brushing the suspension onto the avocados on a brushbed, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As seen in FIG. 18, the average mass loss factor for the avocados corresponding to bar 1802 was 1.88, the average mass loss factor for the avocados corresponding to bar 1803 was 1.59, the average mass loss factor for the avocados corresponding to bar 1804 was 2.47, and the average mass loss factor for the avocados corresponding to bar 1805 was 1.91.

Example 14: Effect of Emulsifier on Mass Loss Rate of Avocados

FIG. 19 shows the mass loss rate of a group of avocados that were coated with a coating agent including either a compound of Formula II or Formula III (SA-Na), a fatty alcohol derivative (sodium lauryl sulfate), or a phospholipid (lecithin) combined with a mixture that was approximately a 50/50 mix of SA-1G and PA-1G. Coatings were formed by adding to water 28.2 g/L of the SA-1G, along with the SA-Na (at a 94 to 6 ratio of SA-1G/PA-1G mixture to SA-Na), sodium lauryl sulfate (at a 94 to 6 ratio of SA-1G/PA-1G mixture to SLS), or lecithin (at a 70 to 30 ratio of SA-1G/PA-1G mixture to lecithin) to form a suspension, applying the suspension to the surface of the avocados, and allowing the solvent to evaporate. Bar 1901 corresponds to untreated avocados (control group). Bar 1902 corresponds to a coating agent including the SA-1G/PA-1G mixture and SA-Na. Bar 1903 corresponds to a coating agent including the SA-1G/PA-1G mixture and SLS. Bar 1904 corresponds to a coating agent including the SA-1G/PA-1G mixture and soy lecithin. All coatings were formed by brushing the suspension onto the avocados on a brushbed, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As seen in FIG. 19, the average mass loss rate for the avocados corresponding to bar 1901 was 1.44% per day, the average mass loss rate for the avocados corresponding to bar 1902 was 0.88% per day, the average mass loss rate for the avocados corresponding to bar 1903 was 0.69% per day, and the average mass loss rate for the avocados corresponding to bar 1904 was 1.08% per day.

Example 15: Effect of Concentration and Emulsifier in Coatings Over Avocados on Respiration and Mass Loss FIG. 20 shows the mass loss factor of a group of avocados that were coated with a coating agent including either SA-Na or sodium lauryl sulfate (SLS), with a mixture that was approximately a 50/50 mix of SA-1G and PA-1G. All of the coatings were formed using a 94 to 6 ratio of the SA-1G/PA-1G mixture to either SA-Na or SLS. Coatings were formed by adding each coating agent to water at a concentration of 20 g/L, 30 g/L, or 40 g/L to form a suspension, applying the suspension to the surface of the avocados, and allowing the solvent to evaporate. Bar 2001 corresponds to a coating agent including the SA-1G/PA-1G mixture and SA-Na at 20 g/L. Bar 2002 corresponds to a coating agent including the SA-1G/PA-1G mixture and SLS at 20 g/L. Bar 2003 corresponds to a coating agent including the SA-1G/PA-1G mixture and SA-Na at 30 g/L. Bar 2004 corresponds to a coating agent including the SA-1G/PA-1G mixture and SLS at 30 g/L. Bar 2005 corresponds to a coating agent including the SA-1G/PA-1G mixture and SA-Na at 40 g/L. Bar 2006 corresponds to a coating agent including the SA-1G/PA-1G mixture and SLS at 40 g/L. All coatings were formed by brushing the suspension onto the avocados on a brushbed, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As seen in FIG. 20, the mass loss factor for the avocados corresponding to bar 2001 was 1.57, the mass loss factor for the avocados corresponding to bar 2002 was 1.63, the mass loss factor for the avocados corresponding to bar 2003 was 1.64, the mass loss factor for the avocados corresponding to bar 2004 was 1.76, the mass loss factor for the avocados corresponding to bar 2005 was 1.81, and the mass loss factor for the avocados corresponding to bar 2006 was 1.88.

FIG. 21 shows the respiration factor for the same group of avocados as above. Bar 2101 corresponds to a coating agent including the SA-1G/PA-1G mixture and SA-Na at 20 g/L. Bar 2102 corresponds to a coating agent including the SA-1G/PA-1G mixture and SLS at 20 g/L. Bar 2103 corresponds to a coating agent including the SA-1G/PA-1G mixture and SA-Na at 30 g/L. Bar 2104 corresponds to a coating agent including the SA-1G/PA-1G mixture and SLS at 30 g/L. Bar 2105 corresponds to a coating agent including the SA-1G/PA-1G mixture and SA-Na at 40 g/L. Bar 2106 corresponds to a coating agent including the SA-1G/PA-1G mixture and SLS at 40 g/L.

As seen in FIG. 21, the respiration factor for the avocados corresponding to bar 2101 was 1.21, the respiration factor for the avocados corresponding to bar 2102 was 1.20, the respiration factor for the avocados corresponding to bar 2103 was 1.22, the respiration factor for the avocados corresponding to bar 2104 was 1.34, the respiration factor for the avocados corresponding to bar 2105 was 1.32, and the respiration factor for the avocados corresponding to bar 2102 was 1.41.

FIGS. 22 and 23 show droplets of coating mixtures (i.e., coating agents in a solvent) on a surface. Contact angles were determined by placing drops containing 5 microliters of solution on the surface being tested and determining the contact angle by digital image analysis. FIG. 22 corresponds to a representative image of a droplet of a coating mixture that included a 94 to 6 ratio of a 50/50 mixture of SA-1G and PA-1G to SA-Na in water at 45 g/L. The observed contact angle from coating mixtures such as that in FIG. 22 is 95±5°. FIG. 23 corresponds to representative image of a coating mixture including a 94 to 6 ratio of a 50/50 mixture of SA-1G and PA-1G to SLS in water at 45 g/L. The observed contact angle from coating mixtures such as that in FIG. 23 is 84 4°.

Example 16: Effect of Coating on Humidity During Cold Storage of Lemons

| Treatment Group (Lemons) | Mass Loss Rate (% per day) | Humidity (after 48 hours) |
|---|---|---|
| Untreated | 1.61 | 72% |
| 50 g/L | 0.37 | 61% |

The table above shows a comparison between mass loss rates and cold storage humidity for untreated lemons and lemons treated with a 94:6 mixture of fatty acid esters (an approximately 50/50 mix of SA-1G and PA-1G) and fatty acid salts (SA-Na) at 50 g/L in water. Each treatment group included 7 boxes of lemons with 60 lemons per box. Each treatment group was placed in a chest freezer equipped with a fan and a humidity sensor. As seen in the table above the untreated group had a mass loss rate of 1.61% per day, as compared to 0.37% per day for the lemons treated with the 50 g/L mixture. The higher mass loss rate of the untreated group corresponded to a higher humidity inside the chest freezer, with the freezer containing the untreated lemons having a humidity of 72%, as compared to 61% humidity in the freezer with the lemons treated with the 50 g/L mixture.

Example 17: Effect of Coating on Energy Usage During Cold Storage of Avocados

| Treatment Group | Energy Usage after 72 hours (at 16° C.) |
|---|---|
| Untreated | 1.19 kWh |
| 50 g/L | 0.85 kWh |

The table above shows a comparison between energy usage of untreated avocados and avocados treated with a 94:6 mixture of fatty acid esters (an approximately 50/50 mix of SA-1G and PA-1G) and fatty acid salts (SA-Na) at 50 g/L in water. Each treatment group included 7 boxes of avocados with 60 avocados per box. Each treatment group was placed in a chest freezer equipped with a fan and an energy usage meter. As seen in the table above, the freezer containing the untreated group consumed 1.19 kWh of energy after 72 hours, as compared to 0.85 kWh for the freezer containing the avocados treated with the 50 g/L mixture.

Example 18: Temperature as a Function of Stacking and Coating

FIG. 25 is a graph showing the average temperature (° C.) of three sample groups over the course of approximately 5 days. Each sample group included 10 boxes of 60 Hass avocados that were either straight stacked (i.e. 5 boxes high, 2 stacks wide, each box stacked parallel to the box below) or cross stacked (i.e. 5 boxes high, 2 stacks wide, each box stacked perpendicular to the box below). One of the straight stack groups (corresponding to 2502) was coated with a coating agent formed of SA-1G and SA-Na mixed at a mass ratio of 94:6 dispersed in water at a concentration of 30 mg/mL. The other groups were untreated avocados that were either straight stacked (corresponding to 2501) or cross stacked (corresponding to 2503). In each group, the data represents the average temperature from 4 temperature loggers distributed throughout the stack after removal from 10° C. cold storage as a function of time.

As shown in FIG. 25, the rate of temperature rise in produce after removal from 10° C. cold storage during the first three days was slowed in the treated produce as compared to the untreated produce. The untreated straight-stacked and cross-stacked produce generated more heat under ambient storage conditions over the first three days compared to the treated, straight-stacked produce, with the untreated, straight-stacked produce generating the most heat. Therefore, the temperature gradient across the pallet should be reduced as well, allowing more even and predictable ripening.

Example 19: Long Chain Fatty Acid Ester/Fatty Acid Salt Coatings as a Gas and Water Barrier Coating agents including a monoglyceride mixture and fatty acid salt mixture combined at a mass ratio of 94:6 were coated on the surface of a lemon. Mass loss and respiration rates were measured and compared with an uncoated lemon and a wax-coated lemon.

Specifically, a coating agent of 94% monoglyceride (thereof ~50% glycerol monostearate (SA-1G) and 50% glycerol monopalmitate (PA-1G)) and 6% fatty acid salt (thereof 50% sodium stearate (SA-Na) and 50% sodium palmitate (PA-Na)) was prepared. Coatings were formed by adding each coating agent to water at a concentration of 10 g/L or 20 g/L to form a suspension, dipping the lemons in their associated suspension, placing the lemons on drying racks, and allowing the lemons to dry under ambient room conditions at a temperature in the range of about 23° C.-27° C. and humidity in the range of about 40%-55%. The lemons were held at these same temperature and humidity conditions for the entire duration of the time they were tested.

Figure 26A:
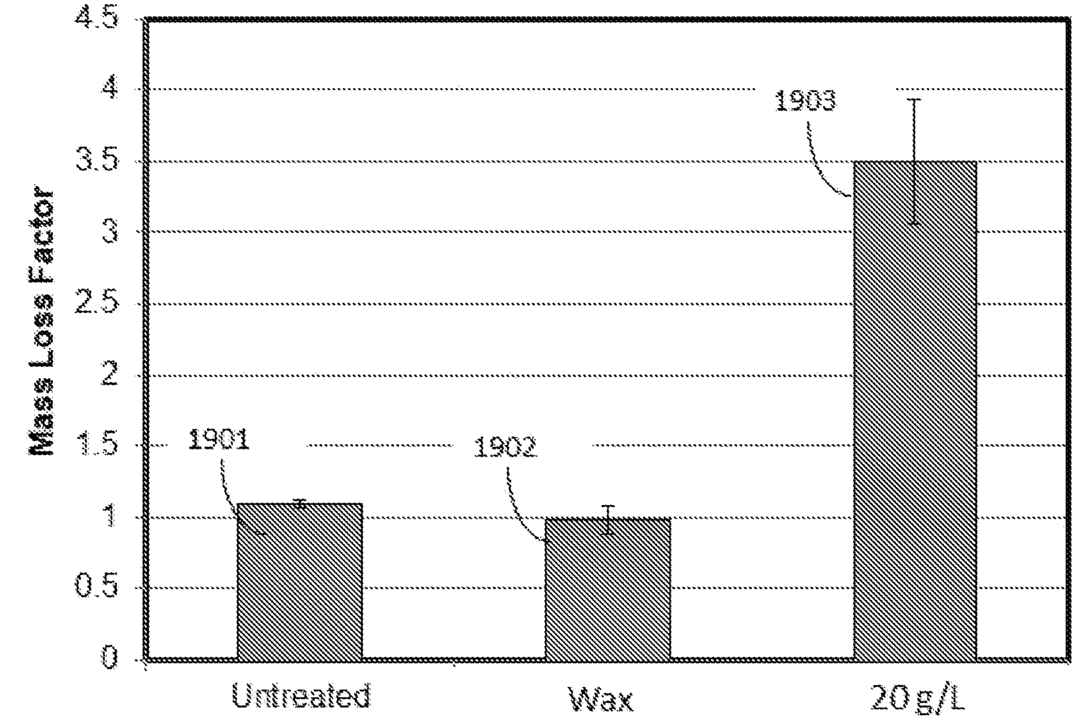
FIG. 26A is a bar graph showing the average mass loss factor for uncoated lemons (bar 1901), wax-coated lemons (bar 1902), and lemons coated with 94% monoglyceride/6% fatty acid salt at a concentration of 20 g/L (bar 1903).
Figure 26B:
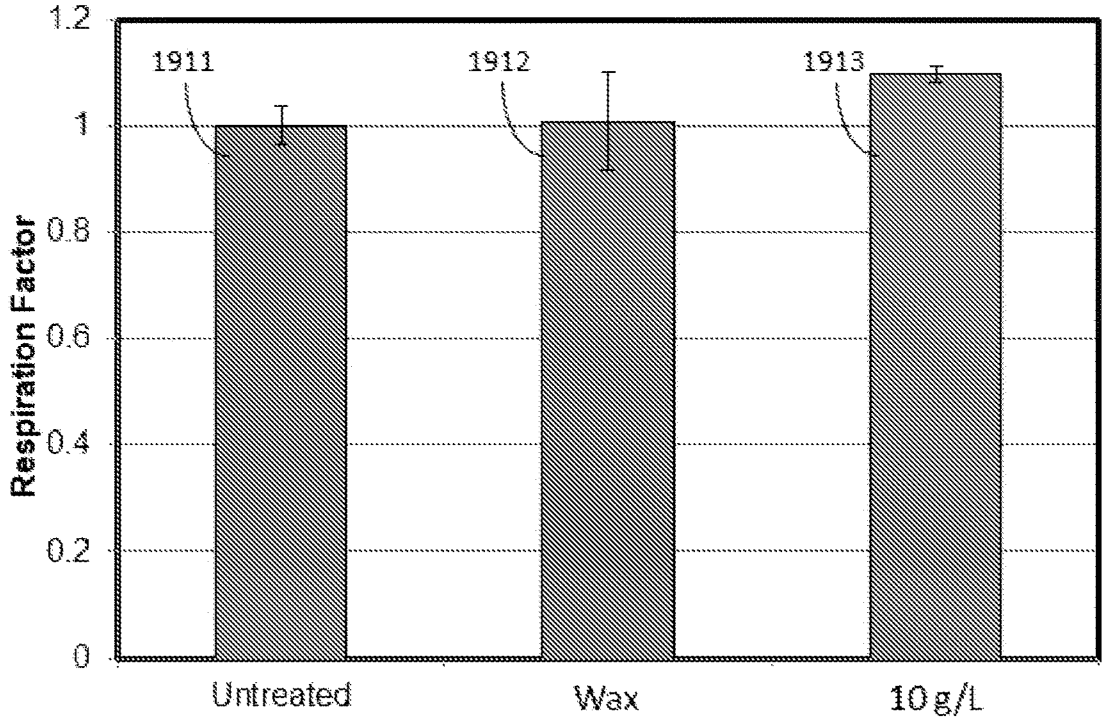
FIG. 26B is a bar graph showing the average respiration factor for uncoated lemons (bar 1911), wax-coated lemons (bar 1912), and lemons coated with 94% monoglyceride/6% fatty acid salt at a concentration of 20 g/L (bar 1913).

Mass loss and respiration rates of the coated lemons were measured and compared to uncoated lemons and lemons coated with a conventional wax coating. Mass loss factor was determined as the ratio of the average mass loss rate of uncoated produce (measured for a control group) to the average mass loss rate of the corresponding tested produce. FIG. 26A shows the average mass loss factor for uncoated lemons (bar 1901), wax-coated lemons (bar 1902), and lemons coated with 94% monoglyceride/6% fatty acid salt at a concentration of 20 g/L (bar 1903). Respiration factor was determined as the average respiration rate of uncoated produce (measured for a control group) to the average respiration rate of the corresponding tested produce. FIG. 26B shows the average respiration factor for uncoated lemons (bar 1911), wax-coated lemons (bar 1912), and lemons coated with 94% monoglyceride/6% fatty acid salt at a concentration of 20 g/L (bar 1913). As shown, the 94/6 monoglyceride/fatty acid salt coatings is a more effective water and gas barrier compared with conventional wax coating.

Example 20: Structure of Fatty Acid Coatings Measured by X-Ray Scattering

Coating agents were applied to the surface of a silicon substrate, which as a hydrophilic surface when expose to air. An X-ray scattering image of the applied coat was obtained to identify characteristics of the coating.

Specifically, a coating agent of 94% monoglyceride (thereof 50% SA-1G/50% PA-1G) and 6% fatty acid salt (thereof 50% SA-Na/50% PA-Na) was applied to the surface of a silicon substrate. An X-ray scattering image of the applied coat was obtained and analyzed to determine characteristics of the coating based on the scattering pattern.

Figure 27A:
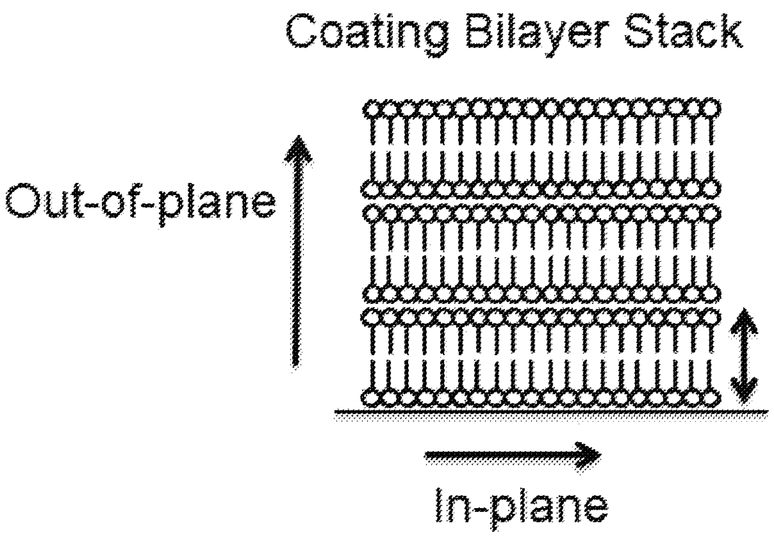
FIG. 27A is an illustration of bilayer stacks on the surface of a substrate.
Figure 27B:
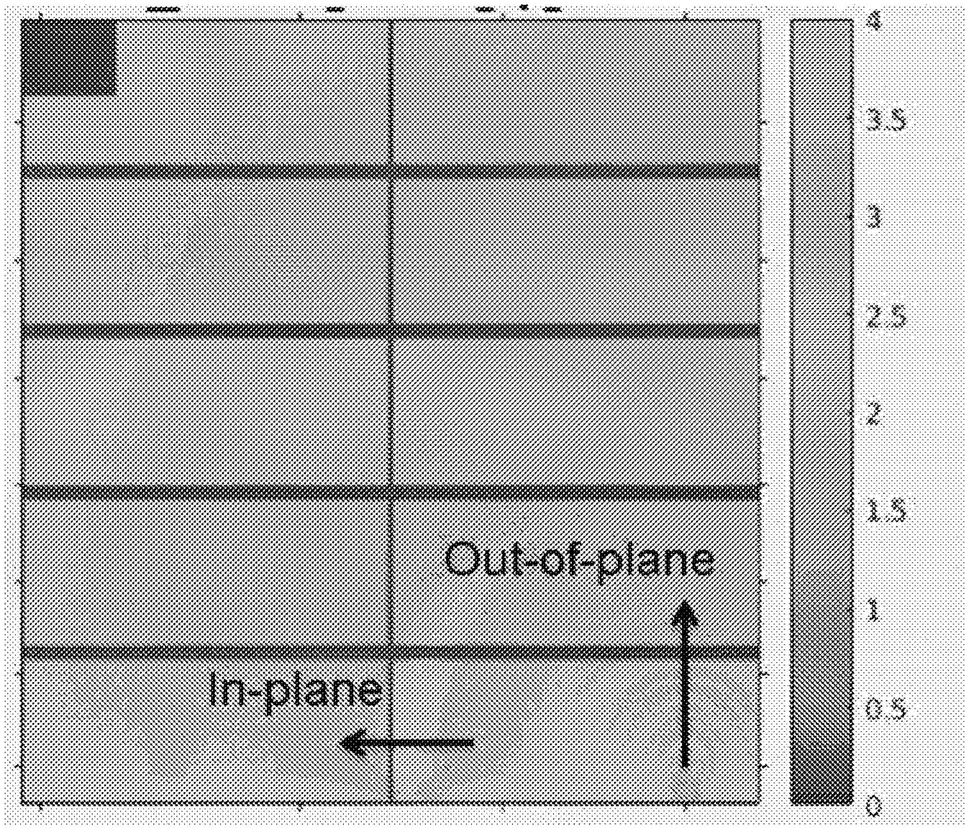
FIG. 27B shows an X-ray scattering image of a coating applied on the surface of a silicon substrate, including scattering from in-plane and out-of-plane features.

As illustrated in FIG. 27A, as determined by the scattering pattern, the coating has a lamellar structure comprising repeating units of bilayer stacks on the surface of the substrate. In-plane x-ray scattering corresponds with features along the length of a single bilayer, such as intermolecular packing. Out-of-plane x-ray scattering corresponds with features through the lamellar structure, such as interlayer spacing (d). FIG. 27B shows an X-ray scattering image of the coating applied on the surface of a silicon substrate, including scattering from in-plane and out-of-plane features. The repeating units of bilayer stacks are observed in the X-ray scattering image in the out-of-plane direction.

Figure 28A:
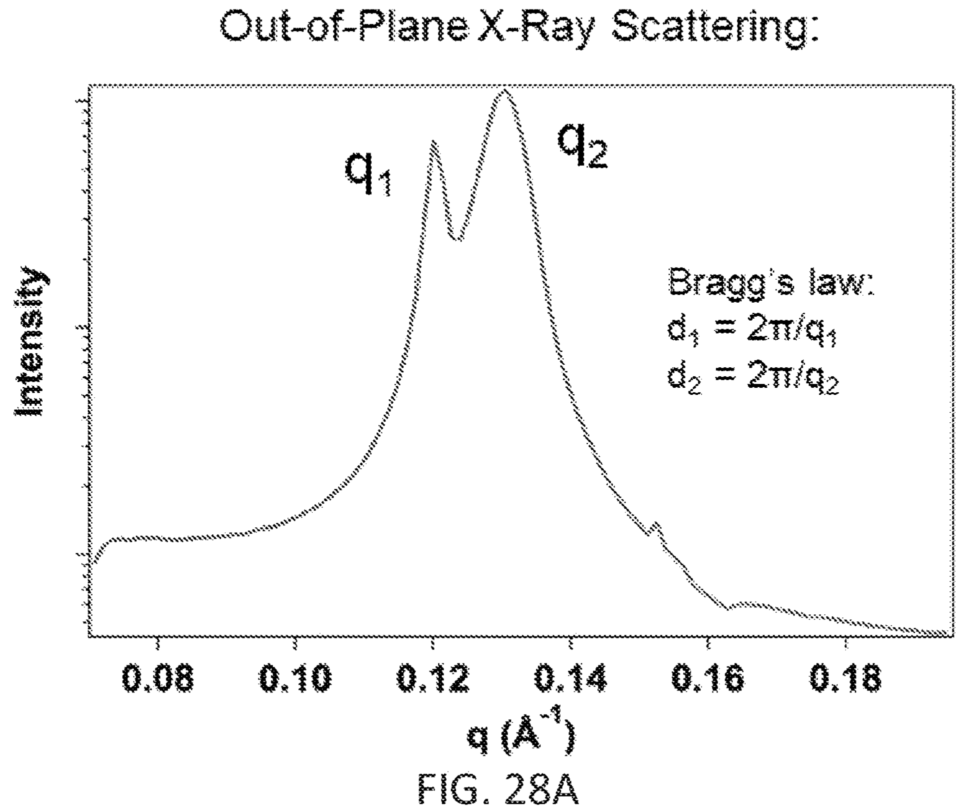
FIGS. 28A and 28B shows plots of intensity vs. $q(A^{-1})$ from the out-of-plane axis of the x-ray scattering image of a coating on a silicon substrate.
Figure 28B:
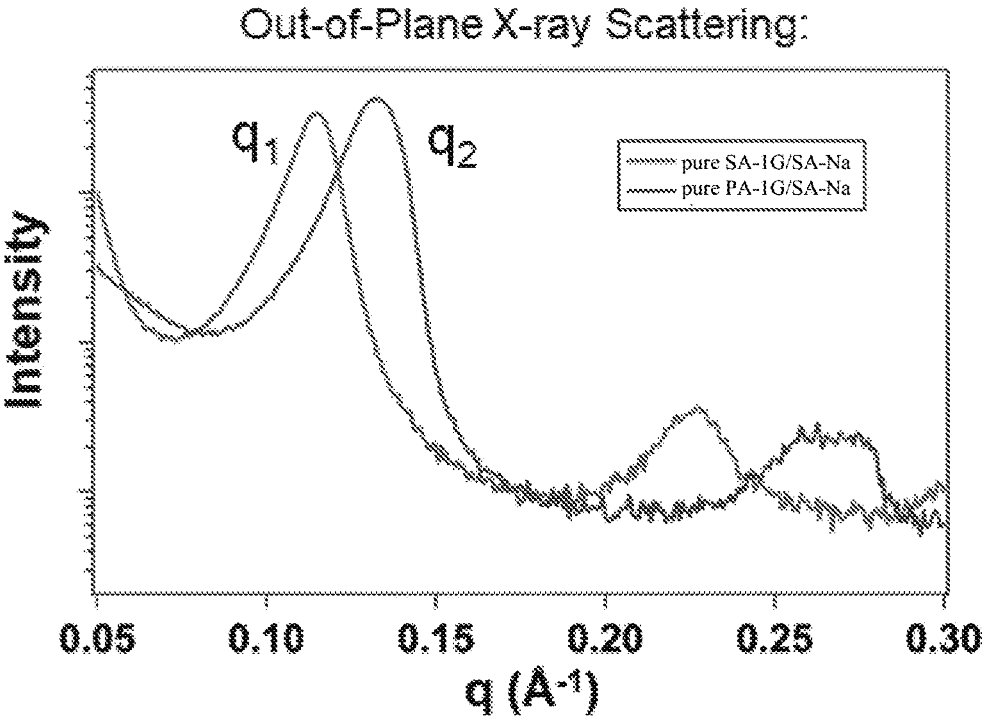
Figure 29:
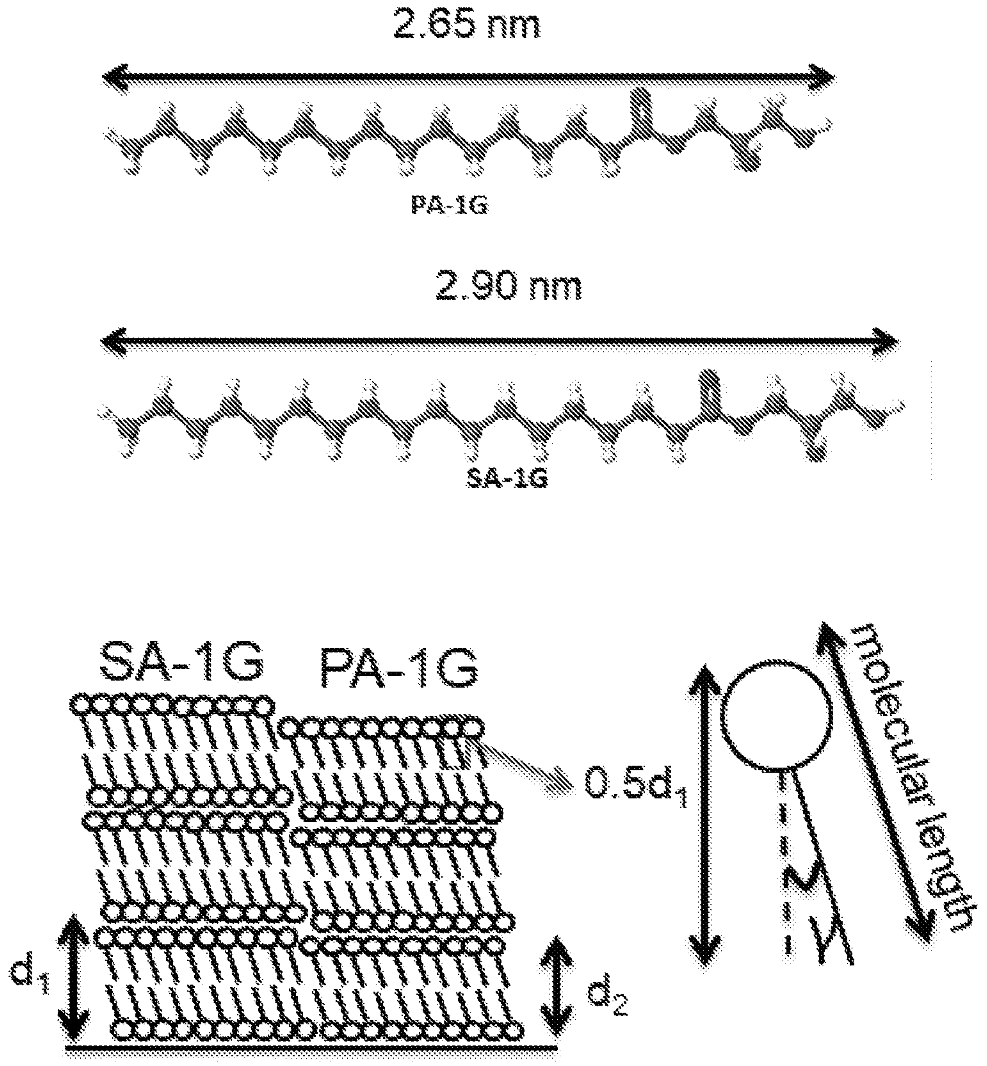
FIG. 29 depicts chain lengths of PA-1G and SA-1G and an illustration of phase separation of bilayers based on chain lengths of molecules in a coating agent on a surface.
Figure 50:
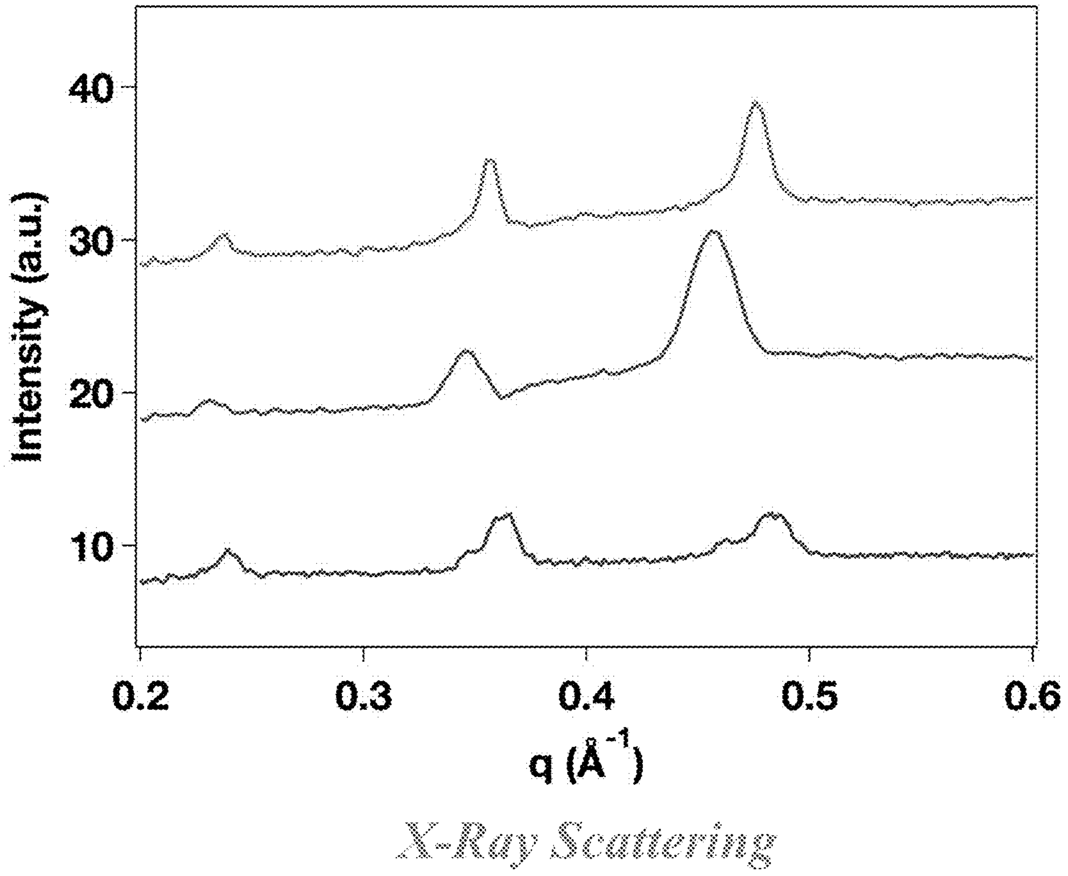
FIG. 50 is an overlay of the out of plane X-ray scattering plots of a coating on apple peel (uppermost plot), avocado peel (middle plot), and silicon wafer (bottom plot).

FIG. 28A shows a plot of intensity vs. q($A^{-1}$) from the out-of-plane axis of the x-ray scattering image of the coating described above. The two peaks, q1 and q2, are consistent with phase separation based on the chain lengths of the molecules (i.e., between molecules comprising stearate or palmitate), as they correspond with intensity peaks from out-of-plane x-ray scattering images of a coating of 94% SA-1G/6% SA-Na (pure 181/S180) on a silicon substrate (q1 on FIG. 28B) and of a coating of 94% PA-1G/6% PA-Na (pure 161/S180) on a silicon substrate (q2 on FIG. 28B). An illustration of phase separation of bilayers based on chain lengths of molecules in a coating agent on a surface is shown in FIG. 29. FIG. 50 is an overlay of the out of plane X-ray scattering plots of the coating on apple peel (uppermost plot), avocado peel (middle plot), and silicon wafer (bottom plot), showing that the coating forms a lamellar structure on all three substrates.

The molecular tilt of SA-1G and PA-1G in the lipid bilayer was estimated from q1 and q2 in FIG. 28A. Using Bragg's law (d=2π/q), where d corresponds to the height of a bilayer, and q is the observed intensity peak from the out-of-plane x-ray scattering (FIG. 28A), The height of an SA-1G bilayer was determined to be 5.24 nm, and the height of a PA-1G bilayer was determined to be 4.80 nm. Given the length of SA-1G of 2.65 nm and the length of PA-1G of 2.90 nm, the tilt angle giving rise to the observed bilayer height formed from 2 molecule lengths was determined from the relationship between molecular length and observed height (illustrated in FIG. 29) as follows:

$$\text{Tilt angle for } SA\text{-}1G\text{: } \gamma = \cos^{-1}\left(0.5d_1/2.90\right) = 254^\circ$$

$$\text{Tilt angle for } PA\text{-}1G\text{: } \gamma = \cos^{-1}\left(0.5d_2/2.65\right) = 25.1^\circ$$

Thus, the coating composition comprising 94% monoglyceride (thereof 50% SA-1G/50% PA-1G) and 6% fatty acid salt (thereof 50% SA-Na/50% PA-Na) showed phase separation between PA-1G and SA-1G and tilt of molecules within the bilayers of about 25°.

Figure 30A:
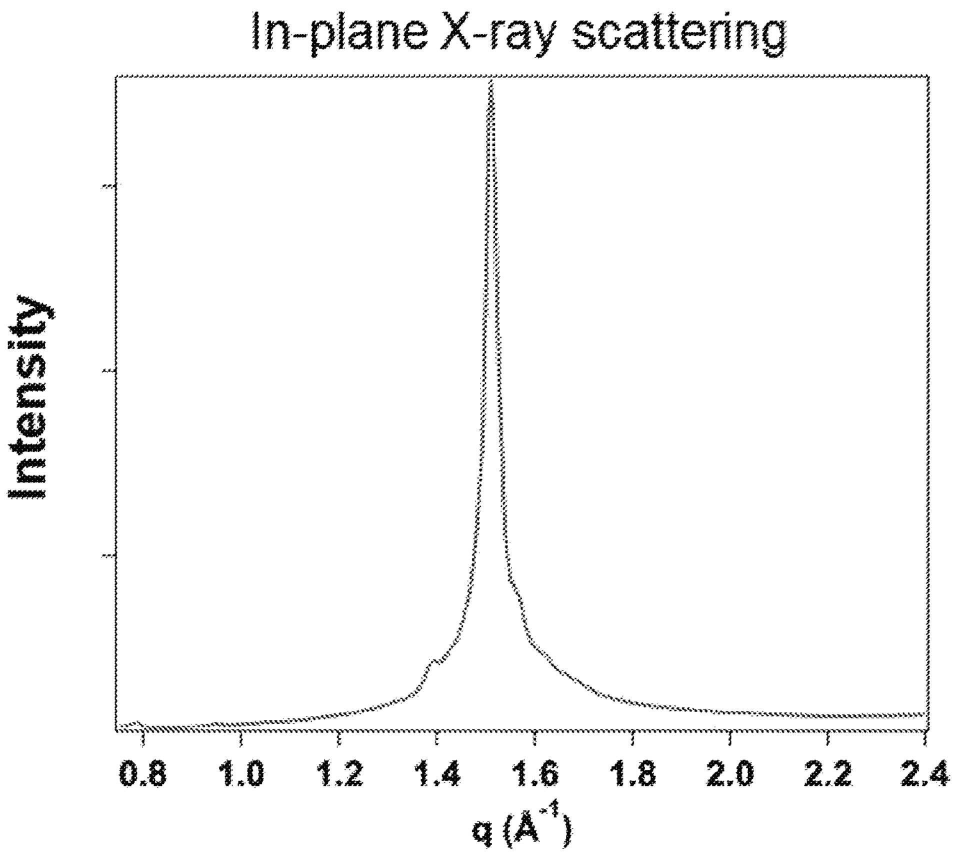
FIG. 30A shows a plot of intensity vs. $q(A^{-1})$ from the in-plane axis of the x-ray scattering image of a coating on a surface.
Figure 30B:
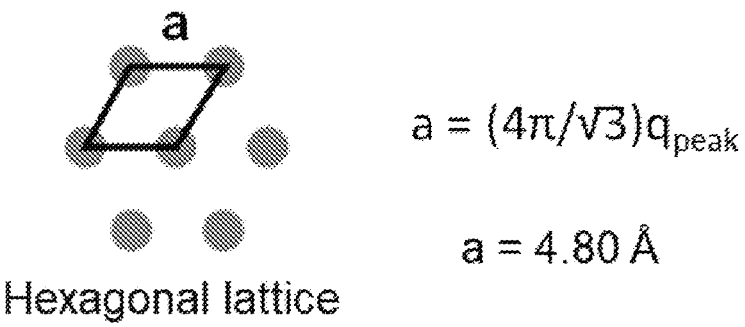
FIG. 30B depicts the lattice geometry and intermolecular distance of molecules within the coating.

FIG. 30A shows a plot of intensity vs. q($A^{-1}$) from the in-plane axis of the x-ray scattering image (corresponding to intermolecular packing) of the coating agent described above. One major peak position was identified at 1.51 $Å^{-1}$. A secondary peak position was identified at 2.61 $Å^{-1}$ (√3*1.51 $Å^{-1}$). The top-down molecular orientation of the bilayer coating was identified as a hexagonal lattice with an "a" dimension (FIG. 30B) OF 4.80 Å.

Example 21: Observation of Film Formation by X-Ray Scattering

Figure 31:
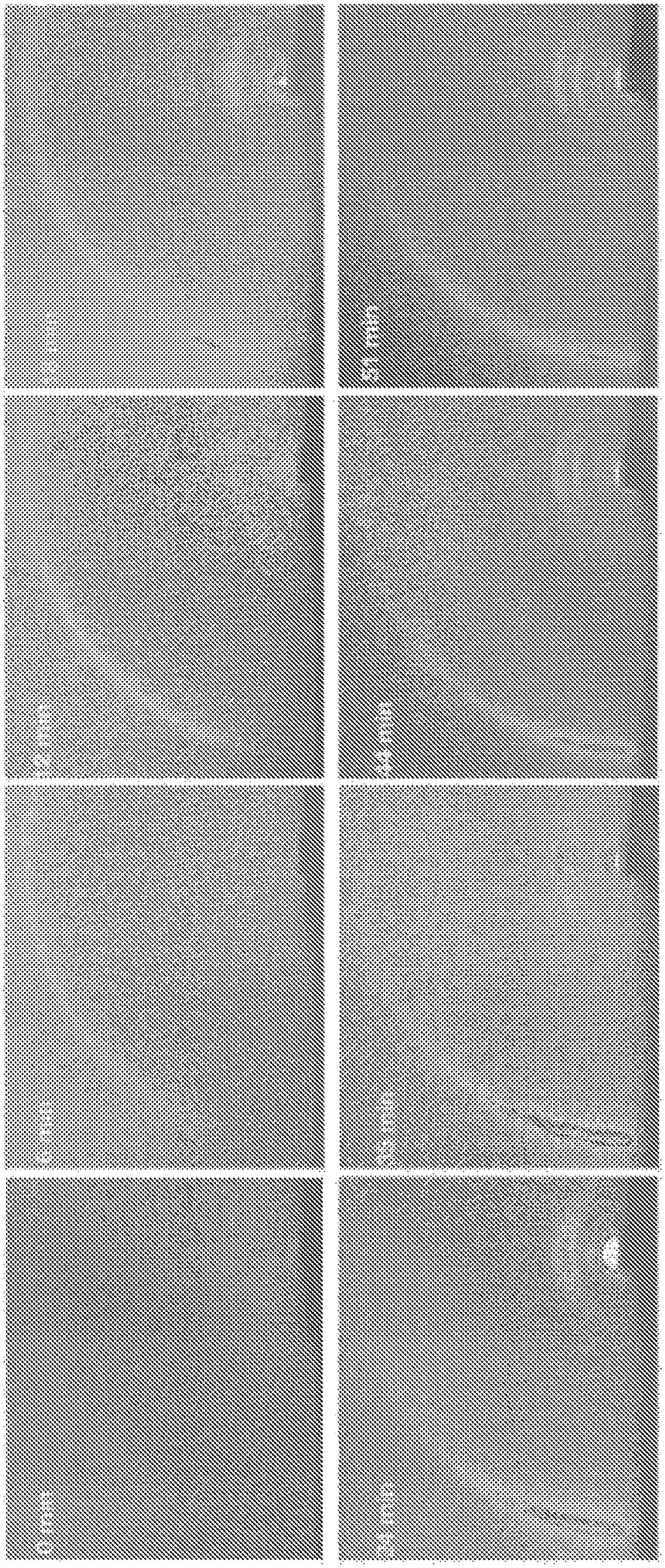
FIG. 31 depicts grazing incidence X-ray scattering images of a coating on a silicon surface obtained at different time intervals after application.

A coating agent comprising 94% monoglyceride (thereof 50% SA-1G/50% PA-1G) and 6% fatty acid salt (thereof 50% SA-Na/50% PA-Na) was applied to the surface of a silicon substrate and allowed to dry at room temperature. Grazing incidence X-ray scattering images of the coating were obtained at the following time intervals after application—0 min, 6 min, 12 min, 18 min, 24 min, 35 min, 44 min, and 51 min (FIG. 31). As the solution is applied (0 mins), there is no ordering of the bilayers on the surface (e.g. no bilayer stacking) as indicated by the large powder ring and a diffuse peak near the beam. As it dries, order is shown in two different directions, indicating bilayer stacking. Specifically, the wide angle diffraction peak changes from a powder ring to in-plane diffraction peak (in-plane molecular ordering), and out-of-plane diffraction peaks appear and change from diffuse to narrow peaks (out-of-plane bilayer ordering).

Example 22: Film Formation on an Avocado Measured by X-Ray Scattering

Figure 32A:
FIG. 32A and FIG. 32B depict grazing incidence X-ray scattering images of an uncoated avocado and a coated avocado, respectively.
Figure 32B:
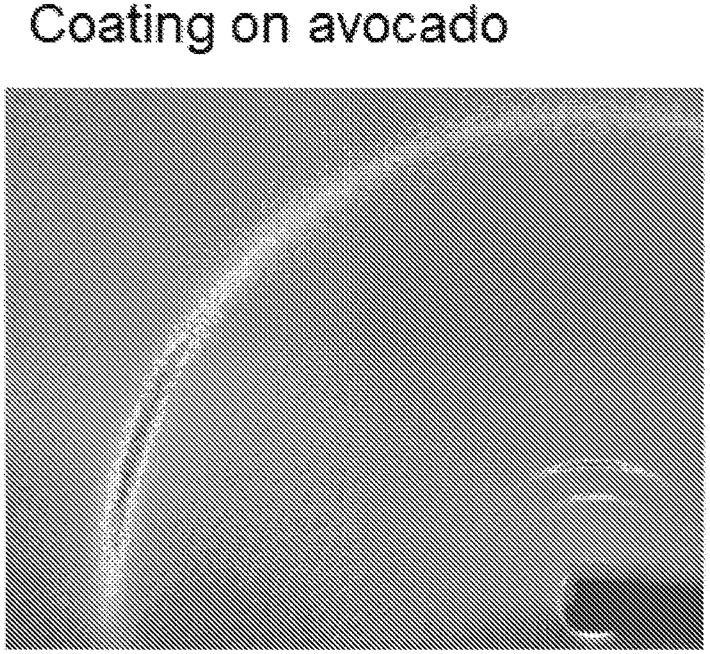

A coating agent comprising 94% monoglyceride (thereof 50% SA-1G/50% PA-1G) and 6% fatty acid salt (thereof 50% SA-Na/50% PA-Na) was applied to the surface of an avocado. X-ray scattering images of the surface of a coated avocado and an uncoated avocado were obtained, as shown in FIG. 32A (uncoated) and FIG. 32B (coated). The image corresponds to the same coating on the silicon substrate, showing the structure of the coat is consistent whether on avocado or silicon.

Figure 33A:
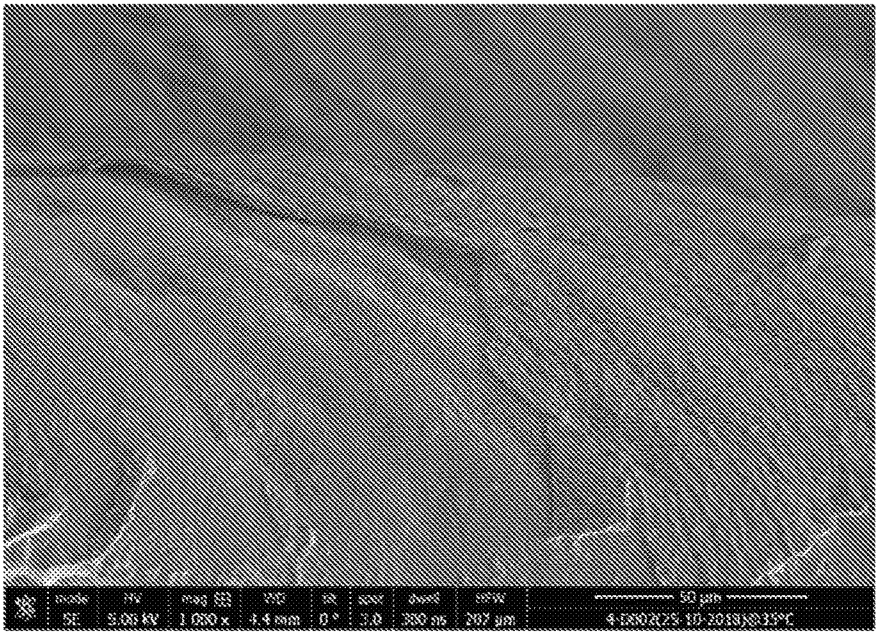
FIG. 33A depicts a scanning electron microscope image of a 94:6 monoglyceride to fatty acid salt coating on an avocado.
Figure 33B:
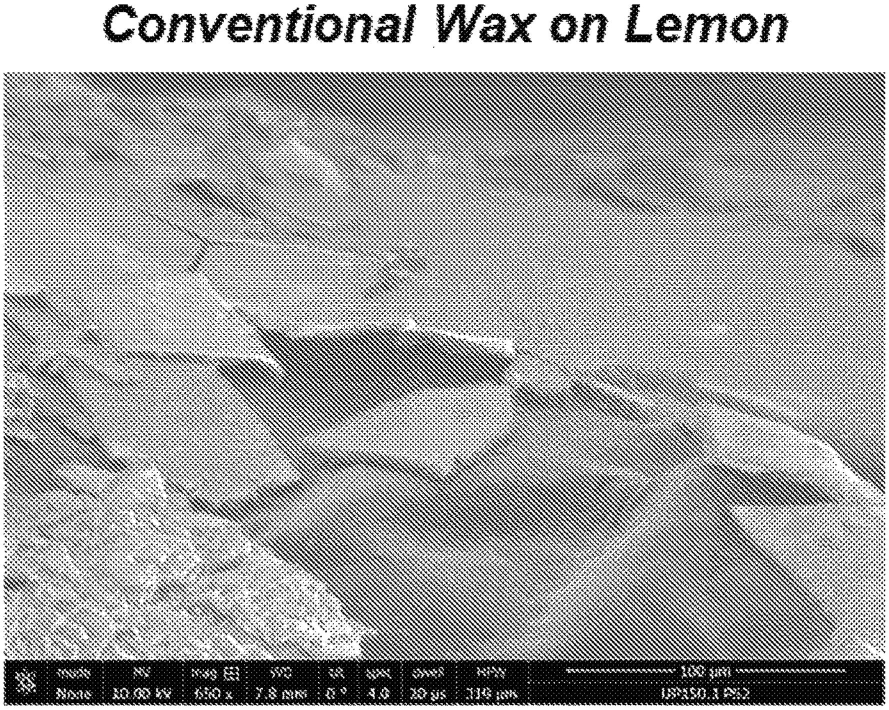
FIG. 33B depicts a scanning electron microscope image of conventional wax on an avocado.
Figure 34A:
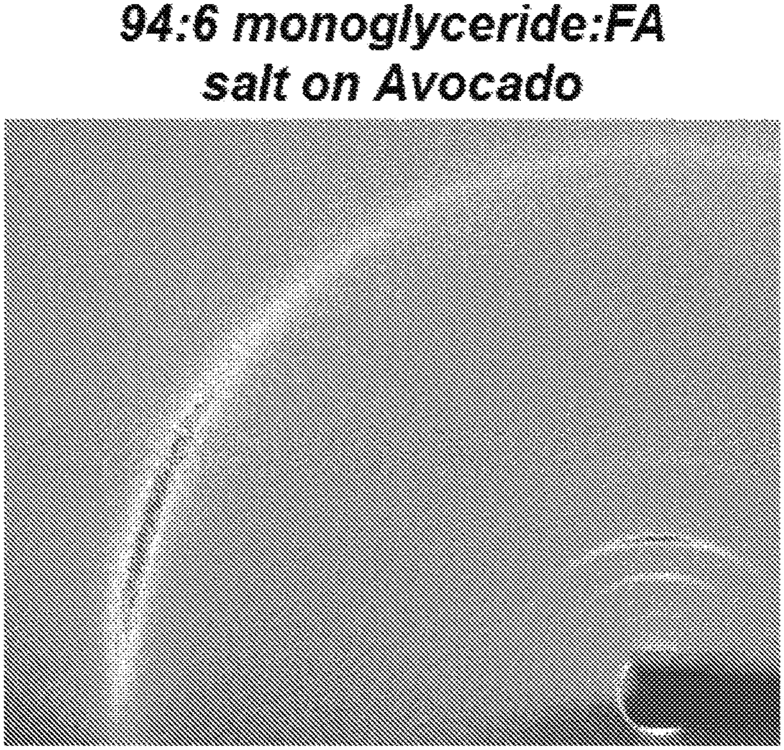
FIG. 34A depicts a grazing incidence X-ray scattering image of a 94:6 monoglyceride to fatty acid salt coating on an avocado.
Figure 34B:
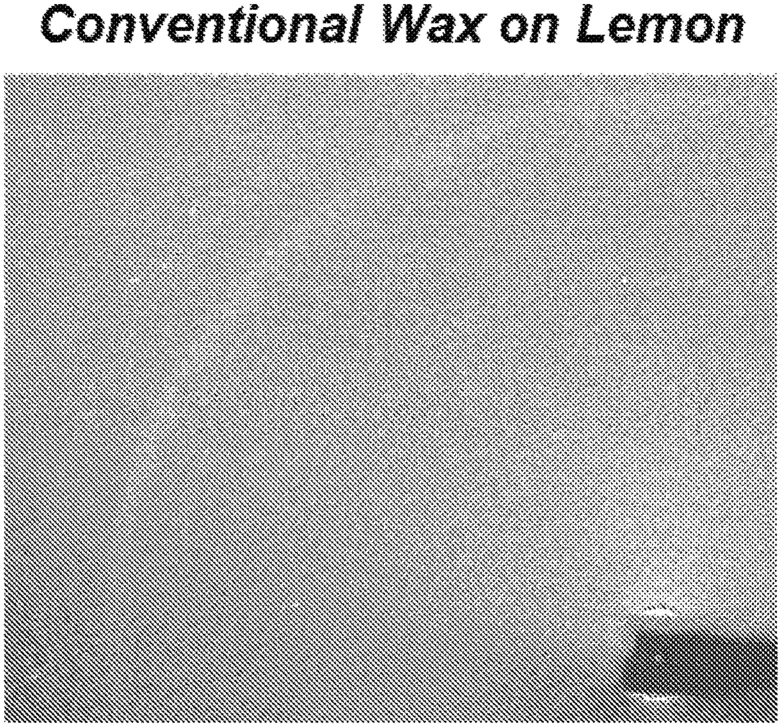
FIG. 34B depicts a grazing incidence X-ray scattering image of a convention wax coating on a lemon.

Example 23: Comparison of Structure of Fatty Acid Coating and Wax Coating on Produce The surface of an avocado coated with i) 94% monoglyceride (thereof 50% SA-1G/50% PA-1G) and 6% fatty acid salt (thereof 50% SA-Na/50% PA-Na) or ii) conventional wax coating was imaged by scanning electron microscopy (FIG. 33A and FIG. 33B) and grazing incidence x-ray scattering (FIGS. 34A and 34B). The monoglyceride-based coating had a thickness of about 1 μm, less than the conventional wax coating thickness of about 5 μm.

Even with a much thinner coating, the monoglyceride-based coating performed better as a gas and watter barrier than the wax barrier. This performance may be due in part to the ordered structure of the lamellar structure on the axis extending orthogonal to the plane of the substrate or produce surface (FIG. 34A). In contrast, the conventional wax coating is unstructured with no order (random crystal orientation (FIG. 34B).

Example 24: Film Thickness vs. Concentration

A coating agent comprising 94% monoglyceride (thereof 50% SA-1G/50% PA-1G) and 6% fatty acid salt (thereof 50% SA-Na/50% PA-Na) was prepared and mixed with water at a concentration of 10 g/L, 20 g/L, 30 g/L, and 40 g/L to form coating compositions of varying concentration. All coatings were formed by brushing the suspension onto the avocados on a brushbed, and drying the coated avocados.

Figure 35A:
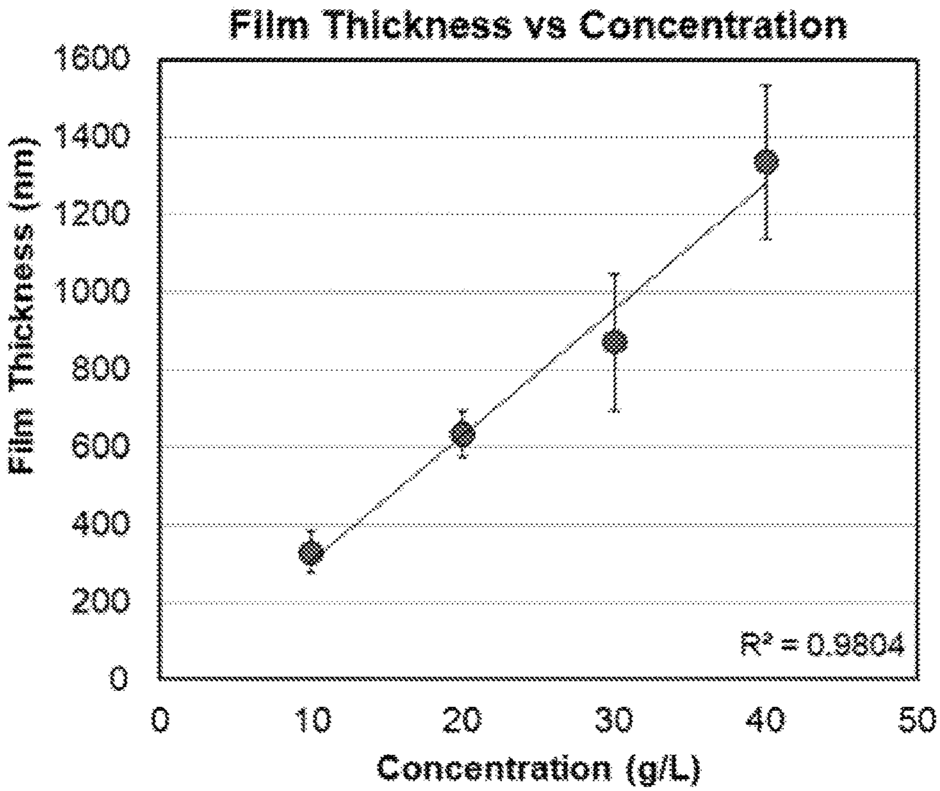
FIG. 35A is a plot of coating thickness vs. concentrations of coating agent used to form the coatings.
Figure 35B:
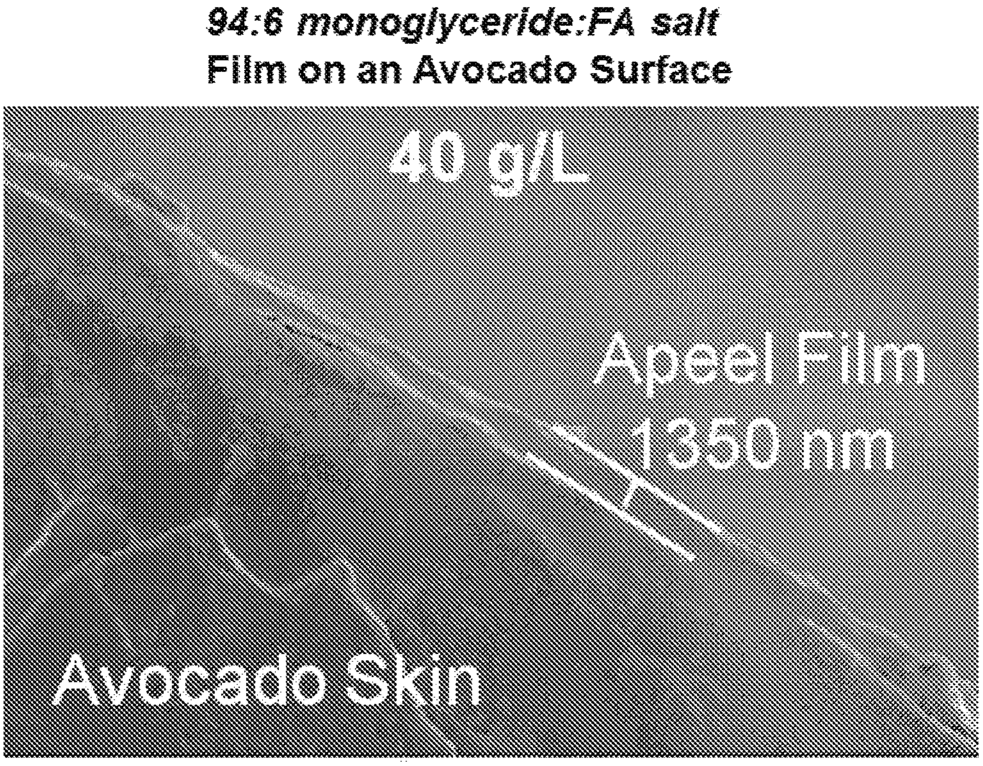
FIG. 35B is a cross-sectional scanning electron microscope (SEM) image of a coating formed on an avocado by a coating composition of 40 g/L.

As shown in FIG. 35A, film thickness increased linearly with the concentration of the coating agent. Thus, a coating film can be tuned to a desired thickness by adjusting the concentration of the coating agent in the solvent. A cross-sectional scanning electron microscope (SEM) image of a film formed on an avocado by a coating composition of 40 g/L, having a thickness of 1350 nm, is shown in FIG. 35B.

Example 25: Film Thickness vs. Mass Loss Rate and Gas Diffusion Rate

As described in Example 23, a coating agent of 94% monoglyceride (thereof 50% SA-1G/50% PA-1G) and 6% fatty acid salt (thereof 50% SA-Na/50% PA-Na) was coated on avocados at concentrations of 10 g/L, 20 g/L, 30 g/L, and 40 g/L. Mass loss and gas diffusion of the coated avocados and a set of uncoated avocados was measured to determine mass loss factor and gas diffusion ratio.

Figure 36A:
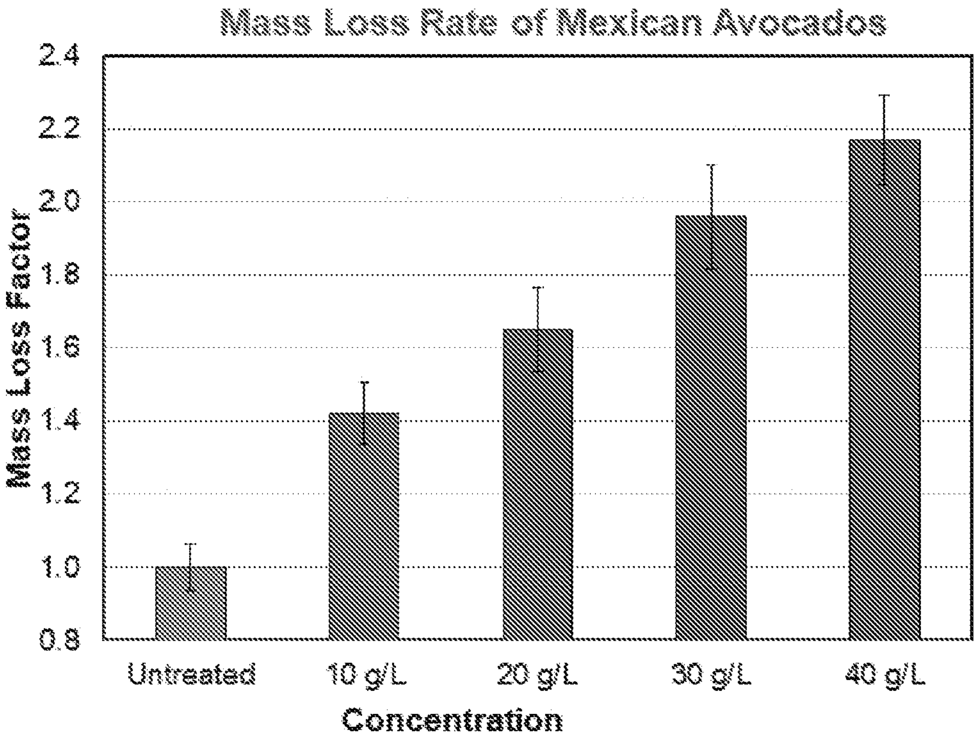
FIG. 36A is a bar graph showing mass loss factor of coatings on Mexican avocados at various concentrations of coating agent.

As shown in FIG. 36A, the mass loss factor of the avocados increased linearly with thickness/coating composition concentration. Therefore, thicker monoglyceride/FA salt film compositions were more effective at preventing mass loss (e.g., water loss).

Figure 58:
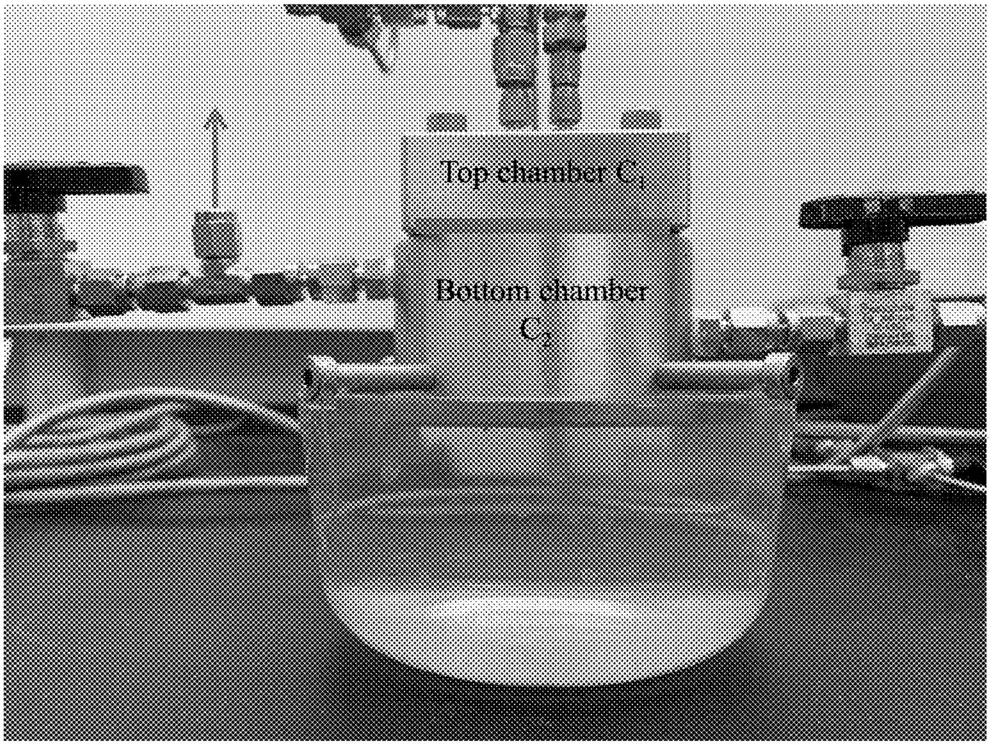
FIG. 58 is a photograph of a gas diffusion cell.

Gas diffusion through the coating was measured for $CO_2$, $C_2H_4$, and $O_2$, and the gas diffusion was compared to the gas diffusion of an uncoated avocado under the same conditions to determine a gas diffusion ratio (R) (R=Diffusion (treated)/Diffusion (untreated). The gas diffusion cell depicted in FIG. 58 was used to measure the diffusion of gas through the coating.

Figure 36B:
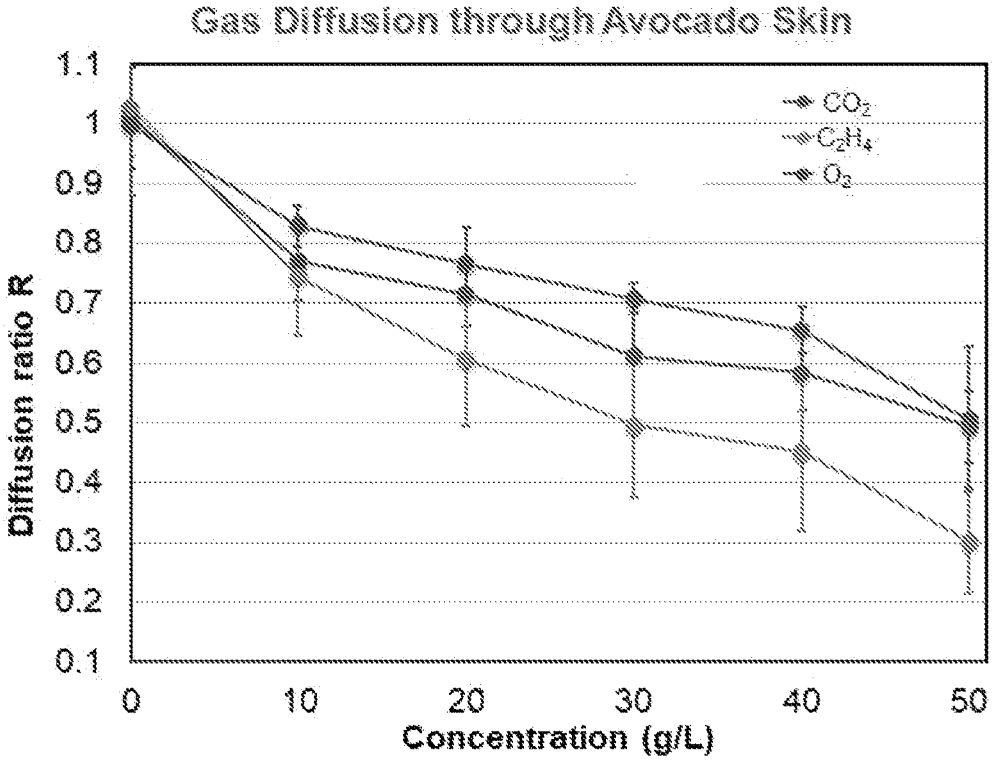
FIG. 36B is a plot of diffusion ratio of carbon dioxide, ethylene, and oxygen through coatings vs. concentration of coating agent used to form the coatings.

The cell was operated by first loading the uncoated avocado skin between the top and bottom chambers (see solid line) and purging the inlet with nitrogen. Then, the top chamber was filled with a gas (e.g., $O_2$, $CO_2$, or $C_2H_4$). After a fixed amount of time, the gas from the bottom chamber was extracted and analyzed. The process was then repeated with an avocado skin covered with a 94/6 coating. As shown in FIG. 36B, the gas diffusion ratio decreased with increasing thickness/coating composition, showing that thicker monoglyceride/FA salt films were more effective as a gas barrier. Also of note is that $C_2H_4$ diffusion reduced more efficiently than $CO_2$, and $CO_2$ more efficiently than $O_2$, potentially due to the size of the molecules ($C_2H_4$ (lowest plot at 40 g/L)>$CO_2$ (middle plot at 40 g/L)>02 (top plot at 40 g/L).

Example 26: Comparison of 94/6 vs. 70/30 Monoglyceride/Fatty Acid Salt Coatings as Gas or Mass Barriers at Different Coating Thickness Two coating agents were prepared: i) a 94/6 coat comprising 94% monoglyceride (thereof 50% SA-1G/50% PA-1G) and 6% fatty acid salt (thereof 50% SA-Na/50% PA-Na), and ii) a 70/30 coat comprising 70% monoglyceride (thereof 50% SA-1G/50% PA-1G) and 30% fatty acid salt (thereof 50% SA-Na/50% PA-Na). Mixtures of 20 g/L, 30 g/L, and 40 g/L coating agent in water were prepared for each coating agent. Each coating mixture was applied to the surface of an avocado. Respiration and mass loss for the coated avocados and uncoated avocados was then measured under identical conditions.

Figure 37A:
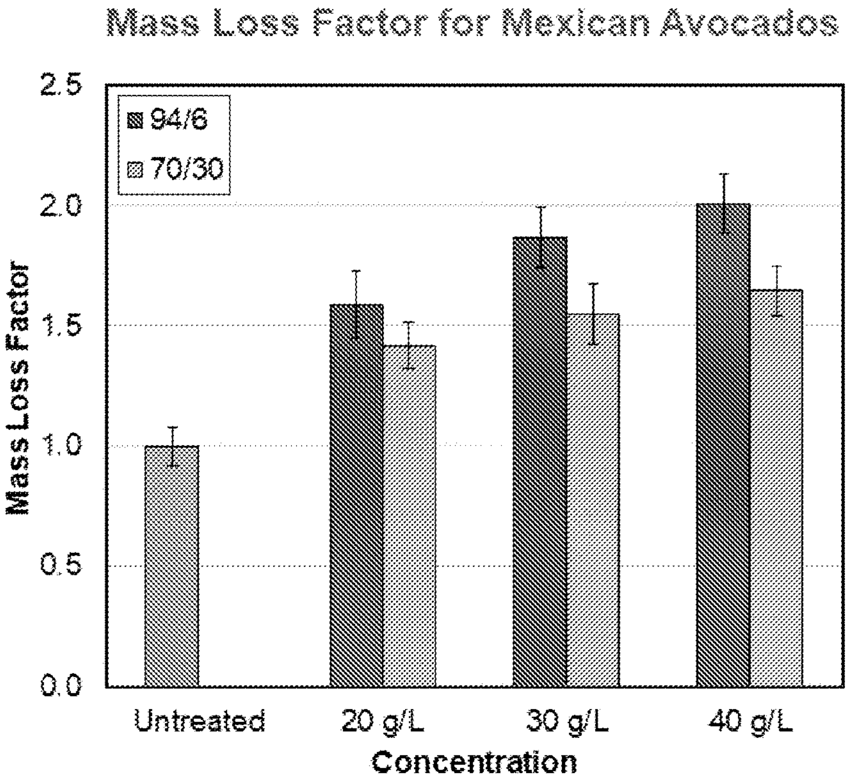
FIG. 37A is a bar graph showing mass loss factor of coatings on Mexican avocados at various concentrations of coating agent for two coating agent compositions.
Figure 37B:
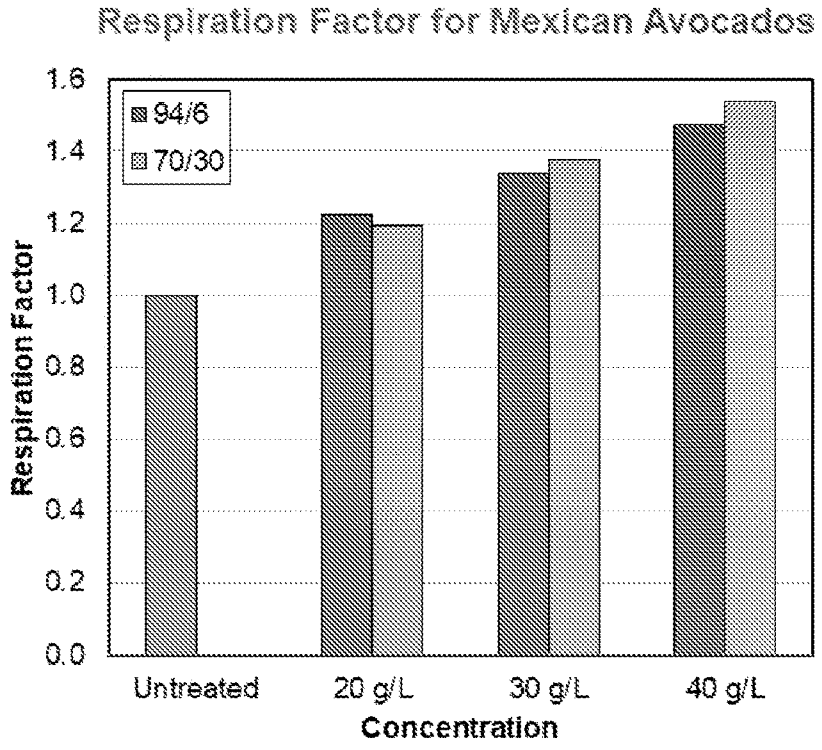
FIG. 37B is a bar graph showing respiration factor of coatings on Mexican avocados at various concentrations of coating agent for two coating agent compositions.

FIG. 37A shows the mass loss factor for avocados coated with varying concentrations of the 94/6 coating or the 70/30 coating. As shown, the mass loss factor for both coatings increased with concentration (thickness), however, the 94/6 coating had a higher mass loss factor (decreased mass loss) at all concentrations. This suggests that the ratio of monoglycerides to fatty acid salts can be adjusted to impact the effectiveness of the coating as a barrier for mass loss.

FIG. 37B shows the respiration factor for avocados coated with varying concentrations of the 94/6 coating or the 70/30 coating. As shown, the respiration factor increased with concentration (thickness), and did not vary significantly between the coatings. This shows the thickness of the film impacted effectiveness as a gas barrier. However, in contrast to mass loss, the relative concentration of fatty acid esters and fatty acid salts did not significantly impact the ability of the film to act as a barrier to gas diffusion. This suggests a mechanism of diffusion that is different for water vs. gas.

Example 27: Hydration Effects and Water Permeability

Two coating agents were prepared: i) a 94/6 coat comprising 94% monoglyceride (thereof 50% SA-1G/50% PA-1G) and 6% fatty acid salt (thereof 50% SA-Na/50% PA-Na), and ii) a 70/30 coat comprising 70% monoglyceride (thereof 50% SA-1G/50% PA-1G) and 30% fatty acid salt (thereof 50% SA-Na/50% PA-Na).

Figure 51:
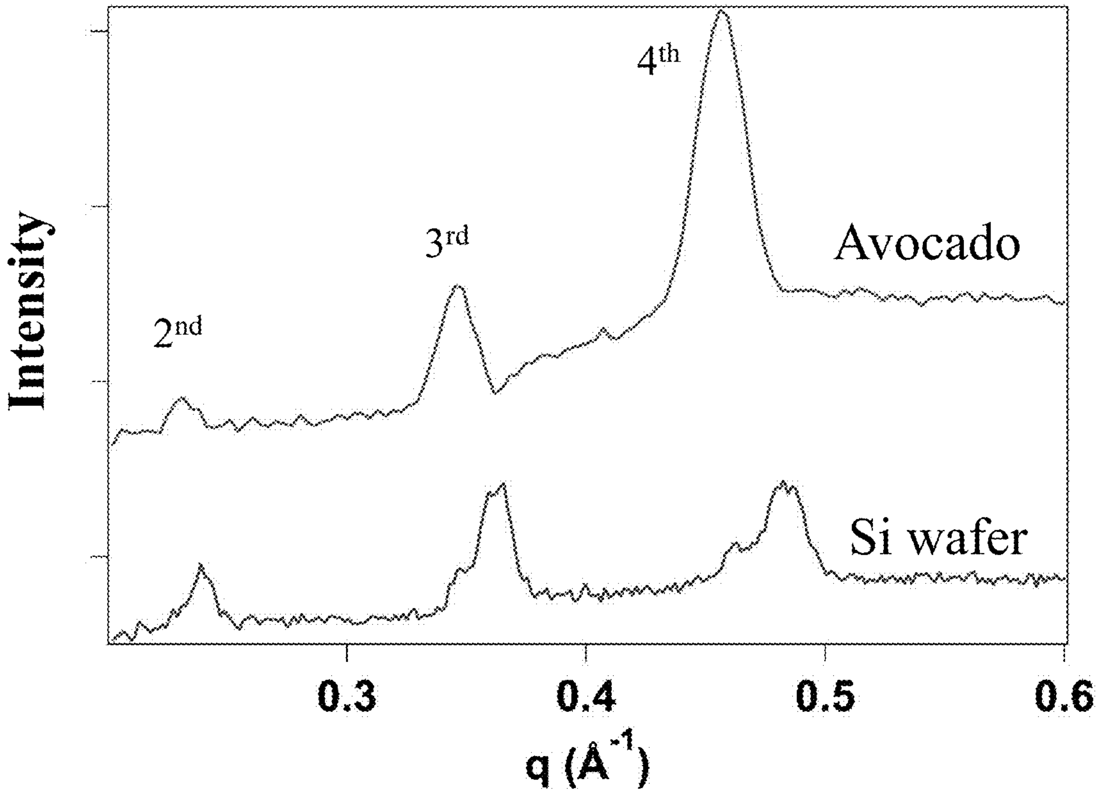
FIG. 51 is an overlay of the out of plane X-ray scattering plots of a coating on avocado and silicon wafer.

The 94/6 coat was applied to avocado and silicon wafer. FIG. 51 is an overlay of X-ray scattering plots of out of plane X-ray scattering of the coating on avocado and silicon wafer. Peak splitting was observed on silicon (corresponding to the SA-1G phase and the PA-1G phase; see rightmost peak), however no peak splitting was observed on avocado. Higher interlayer spacing was also observed on the silicon wafer. Based on these results, no phase separation occurs on avocado peel. Additionally, a larger interlayer spacing was observed with the avocado peel than with the silicon wafer. Without wishing to be bound to theory, it is believed that this larger interlayer spacing is due to the swelling of the coating due to moisture from the avocado peel.

Figure 52:
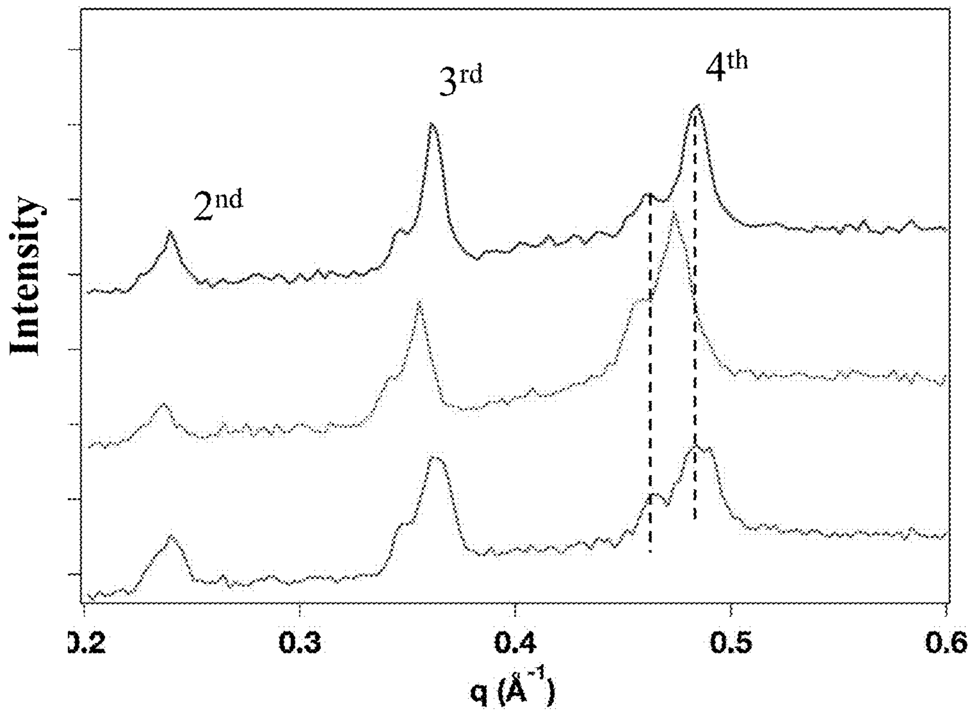
FIG. 52 is an overlay of the out of plane X-ray scattering plots of a coating on a silicon substrate obtained under dry conditions before exposure to humidity (lowest plot), after exposure to humidity for 4 hours (middle plot), and after re-exposing to drying conditions (highest plot).

A silicon wafer coated with a 94/6 coat was exposed to humidity for 4 hours, followed by re-drying to determine bilayer spacing changes due to hydration. X-ray scattering plots (FIG. 52) of the coating were obtained under dry conditions before exposure to humidity (lowest plot), after exposure to humidity for 4 hours (middle plot), and after re-exposing to drying conditions (highest plot). The peaks appearing in the range of about 0.45 to about 0.5 q($A^{-1}$) show that phase separation still occurs between the shorter PA-1G (peaks at about 0.49 q($A^{-1}$); superimposed over rightmost dashed line) and the longer SA-1G (about 0.48 q($A^{-1}$); superimposed over leftmost dashed line). Based on the observed peaks, the initial coating had an interlayer spacing of 5.43 nm for the SA-1G phase, which swelled to 5.52 nm after exposure to humidity for 4 hours, followed by reversion to 5.43 nm after re-drying. The initial coating had a interlayer spacing of 5.19 nm for the PA-1G phase, which swelled to 5.31 nm after exposure to humidity for 4 hours, followed by reversion to 5.19 nm after re-drying. Without wishing to be bound to theory, based on the bond lengths and angles of a water molecule, the interlayer spacing in the hydrated bilayers correspond to one monolayer of water molecules. Therefore, under dry conditions, the interlayer spacing suggests that no water molecules are between the lipid bilayers. However, upon sustained exposure to humidity, a monolayer of water inserts between the bilayers, which is removed upon drying. Therefore, the hydration-induced swelling was reversible.

Figure 53A:
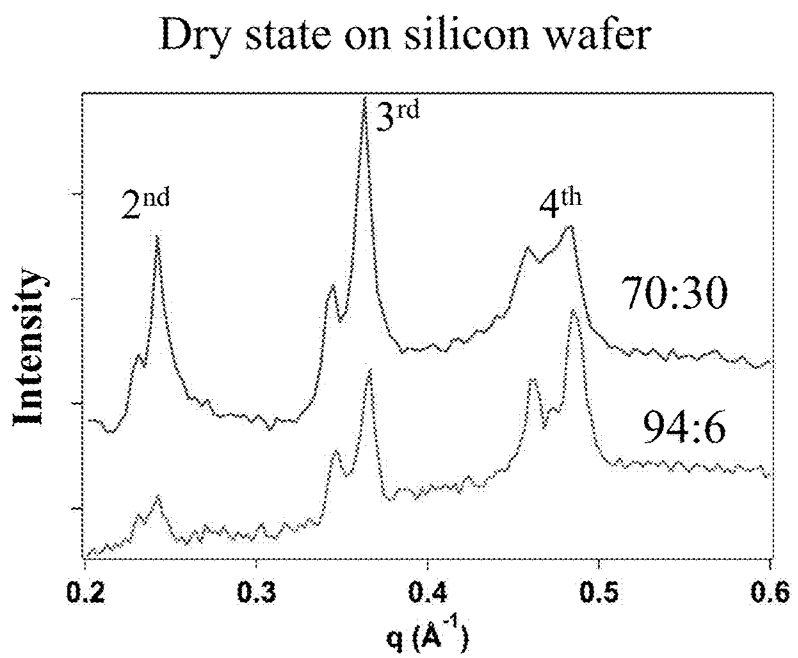
FIG. 53A is an overlay of out of plane X-ray scattering plots of a 94/6 monoglyceride:fatty acid salt coating on a silicon substrate when dry and a 70/30 monoglyceride:fatty acid salt coating on a silicon substrate when dry.
Figure 53B:
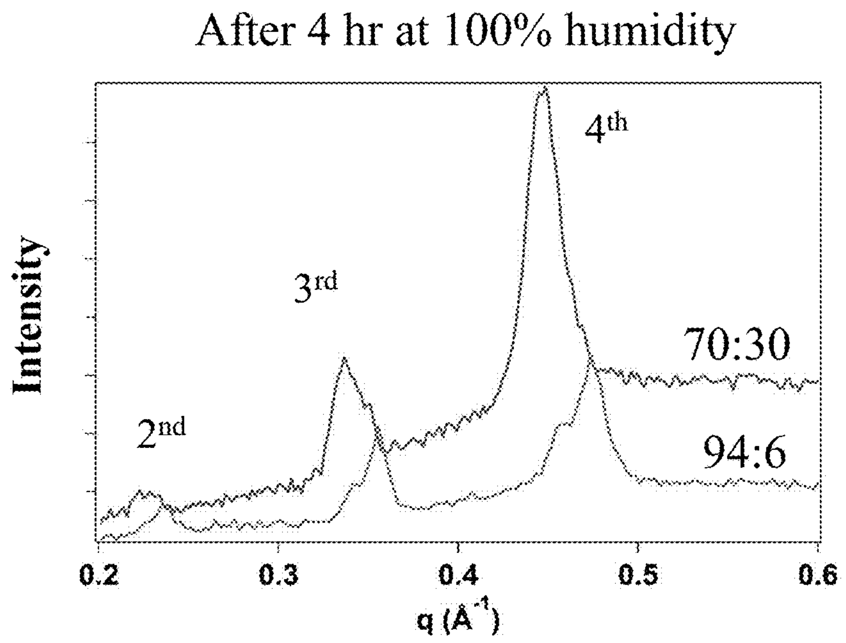
FIG. 53B is an overlay of out of plane X-ray scattering plots of a 94/6 monoglyceride:fatty acid salt coating on a silicon substrate after 4 hours of exposure to humidity and a 70/30 monoglyceride:fatty acid salt coating on a silicon substrate after 4 hours of exposure to humidity.

A comparison between hydration in the 94/6 coating and the 70/30 coating was then performed. FIG. 53A shows out of plane X-ray scattering plots of the two coatings on a silicon wafer when dry, and FIG. 53B shows out of plane X-ray scattering plots of the two coatings on a silicon wafer after exposure to 100% humidity for 4 hours. The observed peaks show that there is no difference in the out-of-plane structure of the two coatings in the dry state. However, after the humidity exposure, a higher interlayer spacing was observed for the 70/30 coating, suggesting that more water intercalates between the lipid bilayers of this coating. Therefore, the 70/30 coating is more permeable to water, owing to the higher percentage of fatty acid salts which have a higher hydrophilicity than the monoglycerides.

The 94/6 coat was then applied to dry avocado peel and fresh avocado peel. The 70/30 coat was applied to fresh avocado peel.

Figure 38A:
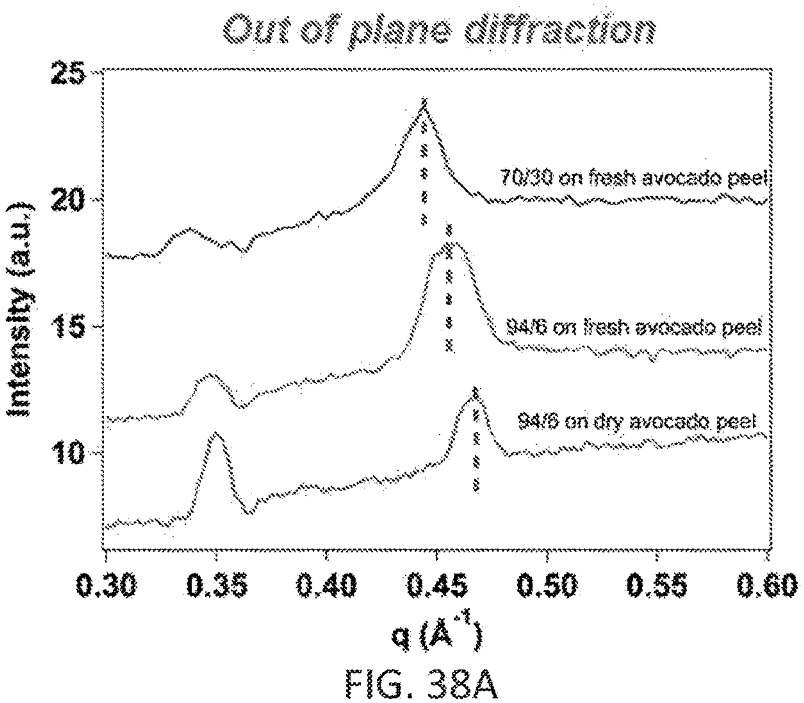
FIG. 38A is an overlay of out-of-plane X-ray scattering plots of a 70:30 monoglyceride:fatty acid salt coating on a fresh avocado peel, a 94:6 monoglyceride:fatty acid salt coating on a fresh avocado peel, and a 94:6 monoglyceride: fatty acid salt coating on a dry avocado peel.
Figure 38B:
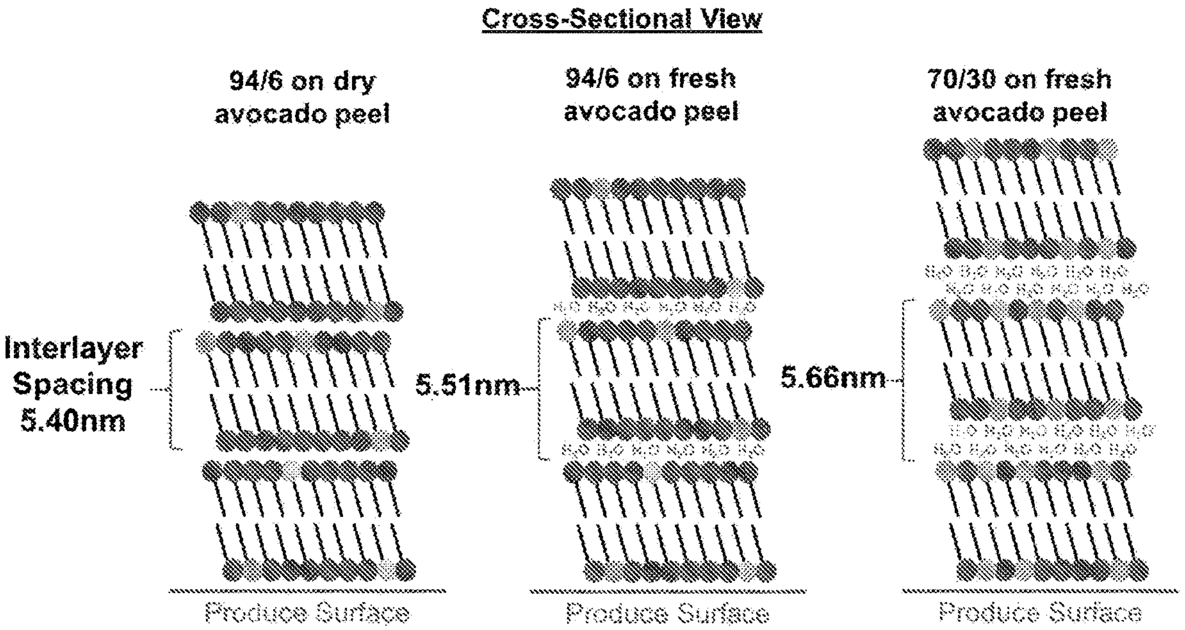
FIG. 38B is an illustration of interlayer spacings of lipid bilayer stacks of different coating compositions on dry and fresh avocado peel.

X-ray scattering images of the coating were obtained to identify out-of-plane diffraction peaks to determine bilayer spacing changes due to hydration (FIG. 38A). Based on the observed peaks, interlayer spacing was determined as 5.4 nm for the 94/6 coat on dry avocado peel, 5.51 nm for the 94/6 coat on fresh avocado peel, and 5.66 nm for the 70/30 coat on the fresh avocado peel. This indicates that no interstitial water layer was observed for the 94/6 coat on the dry avocado peel. In addition, the observed 0.11 nm thickness difference between coating on a dry avocado peel vs. a fresh avocado peel is consistent with 94/6 coating having a single water monolayer between bilayers when hydrated by a fresh avocado peel. The observed 0.26 nm thickness between 70/30 coating on the fresh avocado peel and the 94/6 coating on the dry avocado peel is consistent with the 70/30 coating having a double water monolayer between bilayers when hydrated by a fresh avocado peel (FIG. 38B). Overall, the data indicates the 70/30 coating is more susceptible to hydration and bilayer swelling than the 94/6 coating. This indicates a more polar bilayer (i.e. from the fatty acid salt), is more permeable to water and allows greater incorporation of the polar water molecules.

Figure 39A:
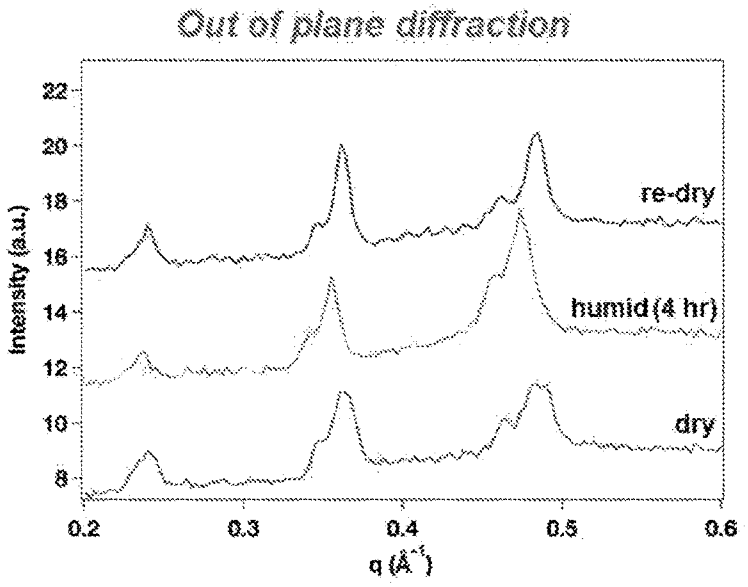
FIG. 39A is an overlay of out-of-plane X-ray scattering plots of the coating under dry conditions before exposure to humidity, after exposure to humidity for 4 hours, and after re-exposing to drying conditions.
Figure 39B:
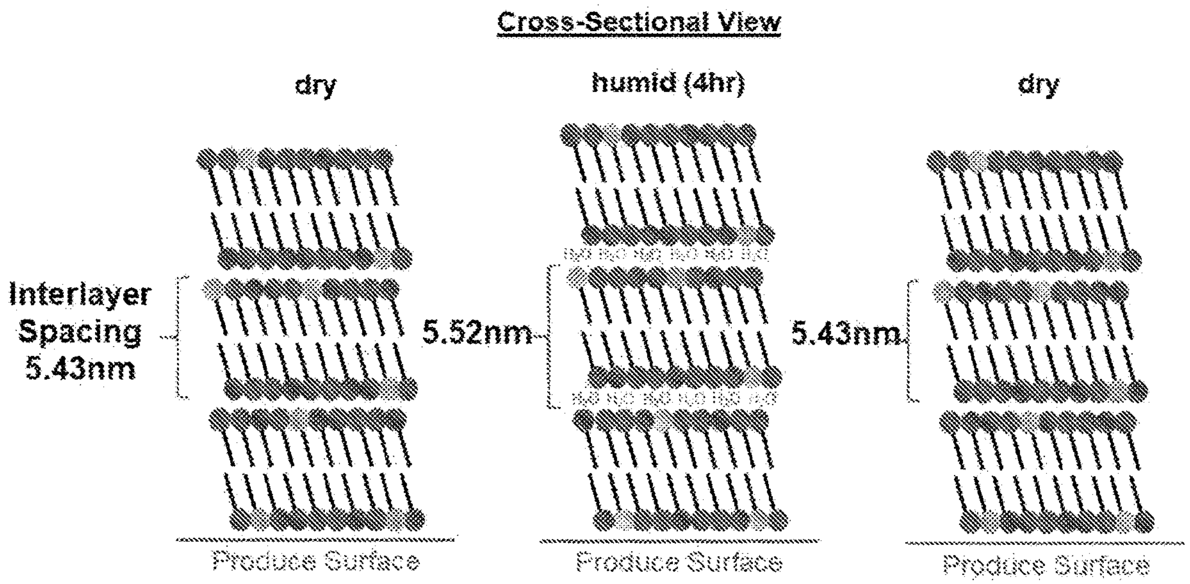
FIG. 39B is an illustration of interlayer spacings of lipid bilayer stacks under dry conditions before exposure to humidity, after exposure to humidity for 4 hours, and after re-exposing to drying conditions.

Avocado coated with a 94/6 coat was also exposed to humidity for 4 hours, followed by re-drying to determine if the interlayer hydration induced swelling is reversible. X-ray scattering images of the coating were obtained under dry conditions before exposure to humidity, after exposure to humidity for 4 hours, and after re-exposing to drying conditions ("re-dry") (FIG. 39A). Based on the observed peaks, the initial coating had a interlayer spacing of 5.43 nm, which swelled to 5.52 nm after exposure to humidity for 4 hours, followed by reversion to 5.43 nm after re-drying (FIG. 39B). Therefore, the hydration-induced swelling of the avocado coating was reversible.

In view of the above results, the water permeability of a coating bilayer can be modulated by adjusting the fatty acid salt concentration (i.e., an increase in fatty acid salt concentration in the coating increases the water-permeability of the coating, and a decrease in the fatty acid salt concentration in the coating decreases the water permeability of the coating.) The thickness of the layer can also be tuned by hydration according to the fatty acid salt concentration of the bilayer.

Figure 54A:
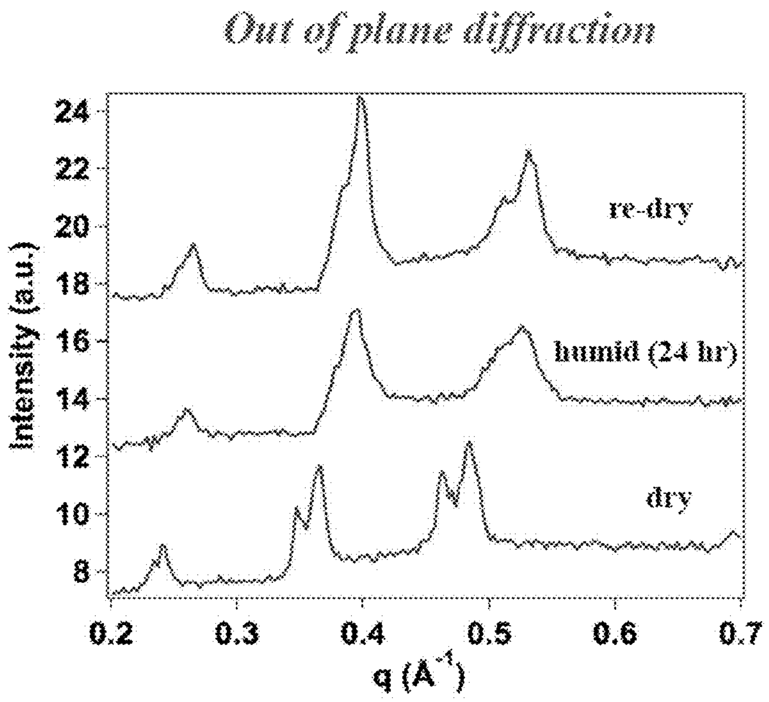
FIG. 54A is an overlay of out of plane X-ray scattering plots of a coating under initial dry conditions, after 24 hour humidity exposure, and after re-drying.
Figure 54B:
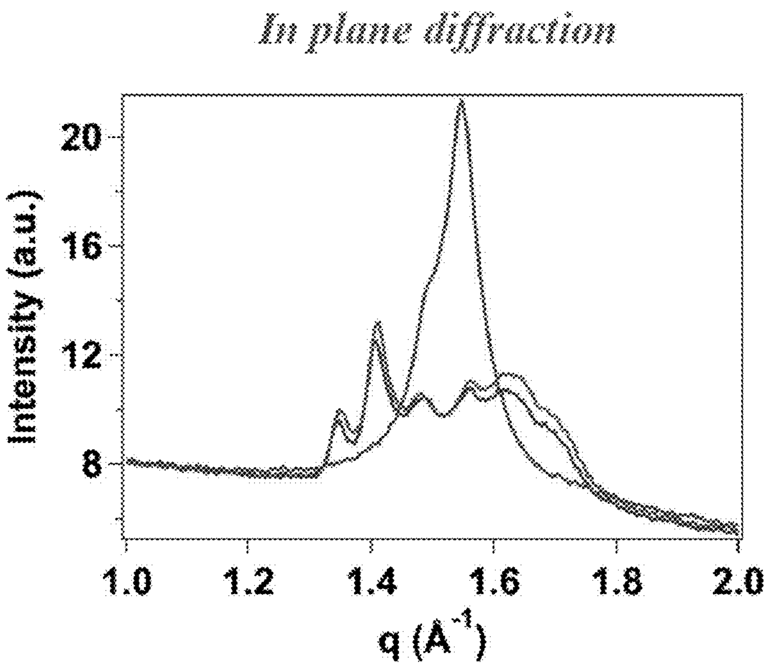
FIG. 54B is an overlay of in plane X-ray scattering plots of a coating under initial dry conditions, after 24 hour humidity exposure, and after re-drying.
Figure 55A:
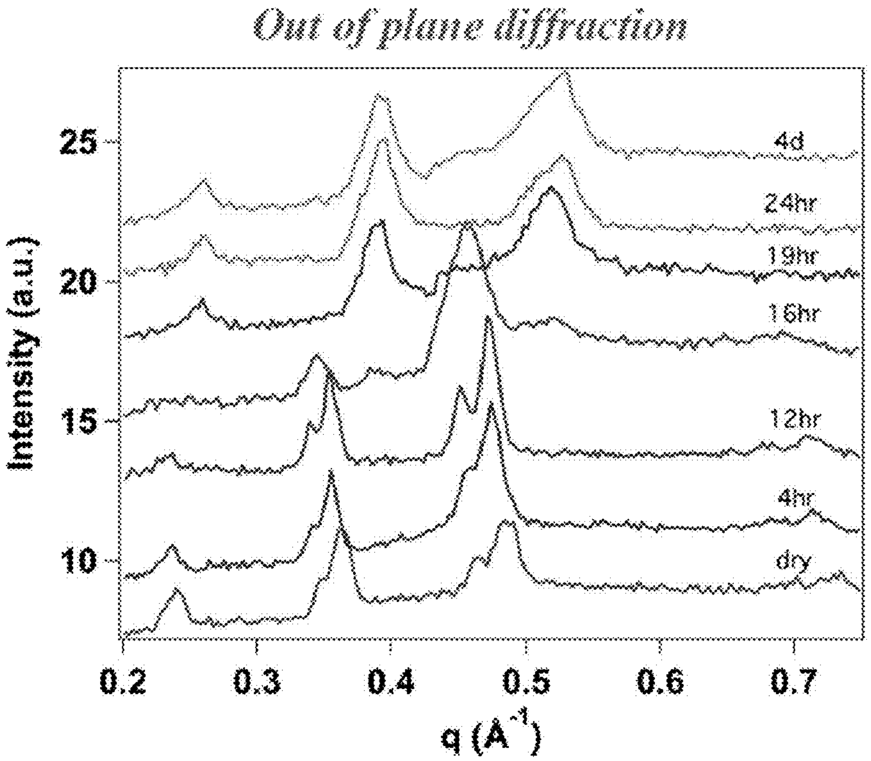
FIG. 55A is an overlay of out of plane X-ray scattering images of a coating under initial dry conditions, then after various time periods of humidity exposure (4 hours, 12 hours, 16 hours, 19 hours, 24 hours, and 4 days).
Figure 55B:
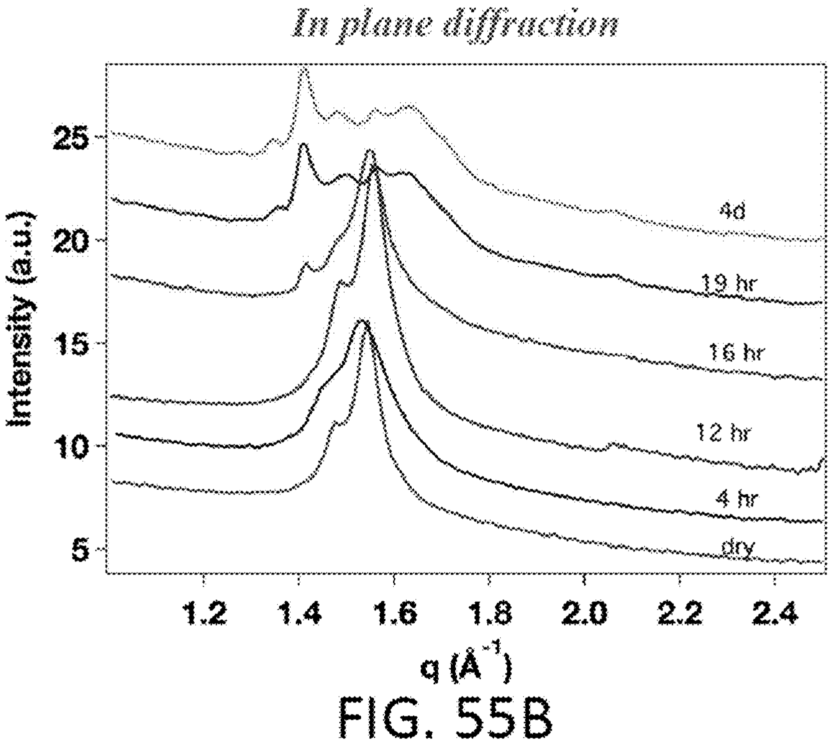
FIG. 55B is an overlay of in plane X-ray scattering images of a coating under initial dry conditions, then after various time periods of humidity exposure (4 hours, 12 hours, 16 hours, 19 hours, and 4 days).

A silicon wafer was then coated with the 94/6 coating in a dry state, exposed to 24 hours of humidity, then re-dried. FIG. 54A is an overlay of out of plane X-ray scattering plots of the coating under the initial dry conditions, after the humidity exposure, and after the re-drying. FIG. 54B is an overlay of in plane X-ray scattering plots of the coating under the initial dry conditions (upper plot at 1.6 q($A^{-1}$)), after the humidity exposure (lower plot at 1.6 q($A^{-1}$)), and after the re-drying (middle plot at 1.6 q($A^{-1}$)). FIG. 55A is an overlay of out of plane X-ray scattering plots of the coating under initial dry conditions, then after various time periods of humidity exposure (4 hours, 12 hours, 16 hours, 19 hours, 24 hours, and 4 days). FIG. 55B is an overlay of in plane X-ray scattering plots of the coating under initial dry conditions, then after various time periods of humidity exposure (4 hours, 12 hours, 16 hours, 19 hours, and 4 days). The observed peaks indicate that the hydration is irreversible after prolonged humidity exposure. Without wishing to be bound to theory, it is believed that humidity can induce an irreversible phase change in the film after prolonged exposure.

Example 28: Effect of Temperature on Monoglyceride-Based Films

Figure 40:
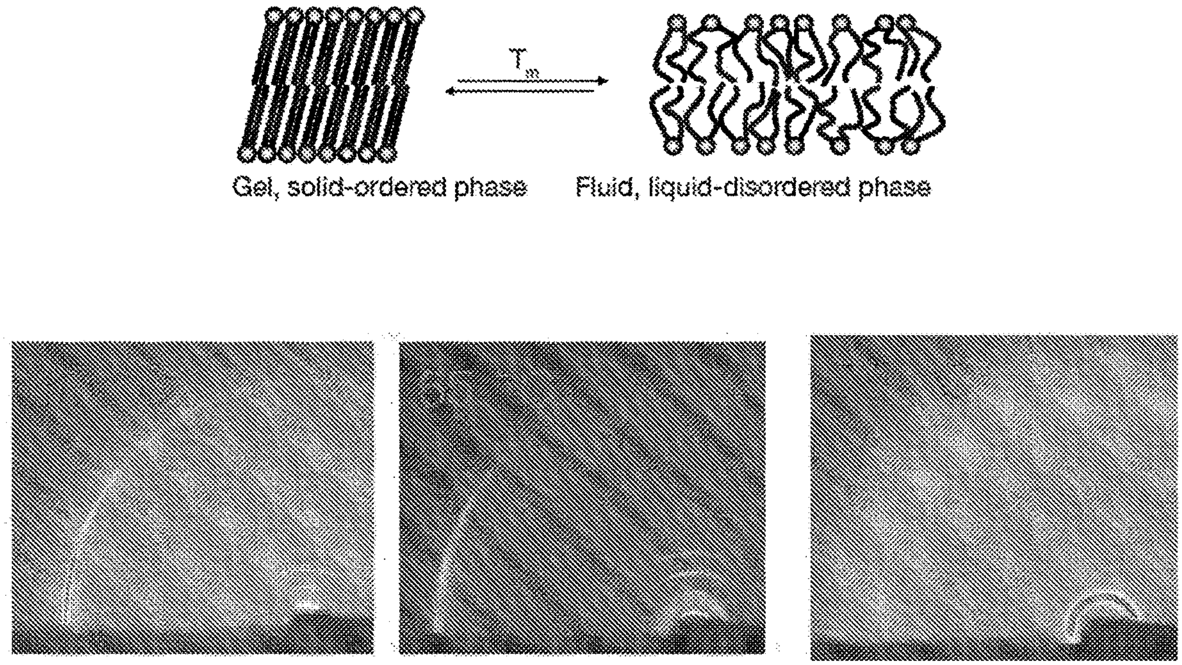
FIG. 40 is an illustration of the phase transition equilibrium of a lipid bilayer between the crystalline and noncrystalline states; and X-ray scattering images of a coating at different temperatures.
Figure 57:
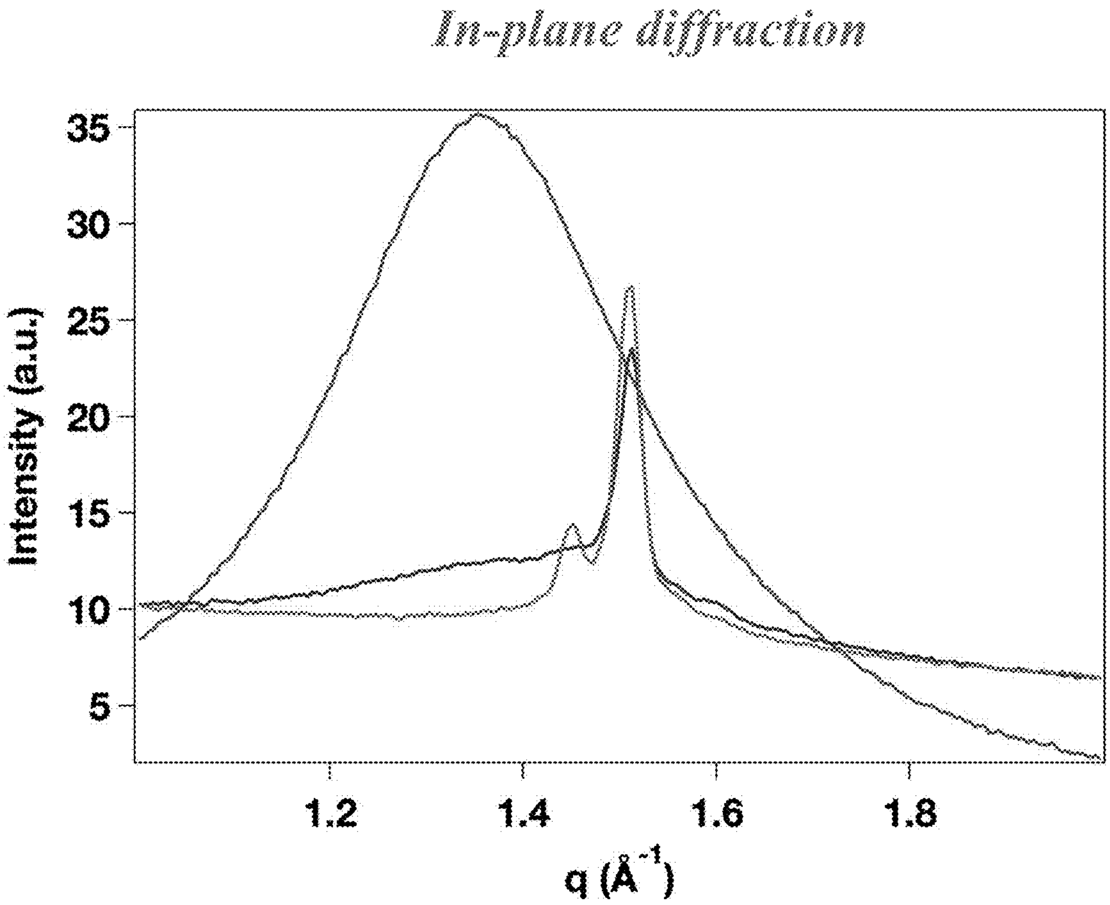
FIG. 57 is an overlay of in plane X-ray scattering plots of a coating at 60° C., 65° C., and 70° C.

A 94/6 coating agent comprising 94% monoglyceride (thereof 50% SA-1G/50% PA-1G) and 6% fatty acid salt (thereof 50% SA-Na/50% PA-Na) was applied to the surface of a silicon substrate and allowed to dry at room temperature. The coating was heated and X-ray scattering images of the surface were obtained at 60° C., 65° C., and 70° C. A crystalline-to-noncrystalline phase transition was observed between 65° C. and 70° C. (FIG. 40). FIG. 57 is an overlay of in plane X-ray scattering plots of the coating at 60° C. (lowest plot at 1.4 q($A^{-1}$)), 65° C. (middle plot at 1.4 q($A^{-1}$)), and 70° C. (uppermost plot at 1.4 q($A^{-1}$)). The film coating melts when above the phase transition temperature.

Figure 41:
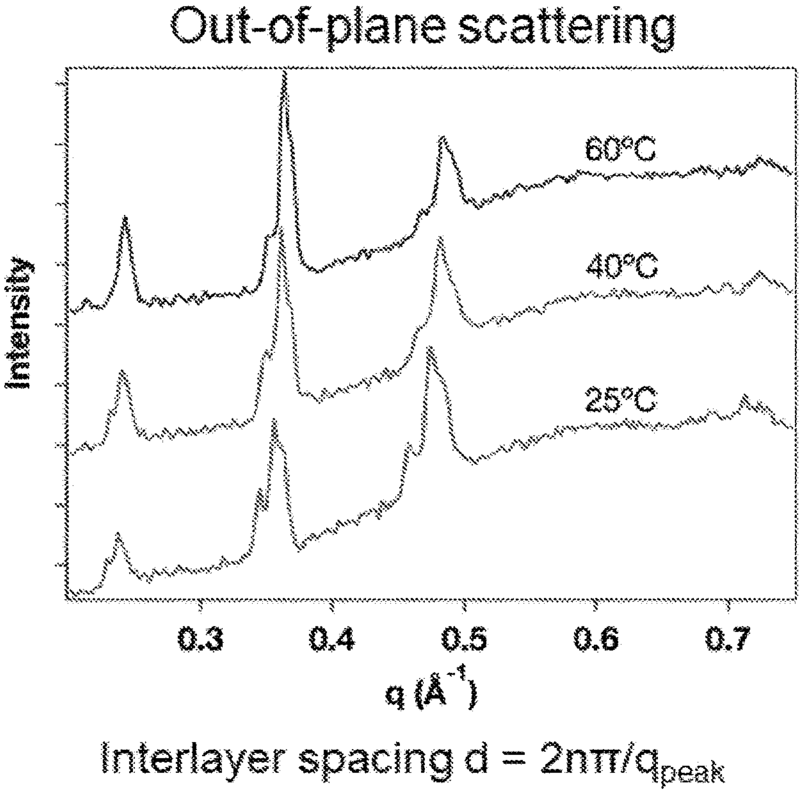
FIG. 41 is an overlay of out-of-plane X-ray scattering plots of a coating on a silicon substrate taken at various temperatures; an illustration of a stack of lipid bilayers; and calculated values of interlayer spacing in lipid bilayer stacks of different monoglycerides on the same substrate.
Figure 41:
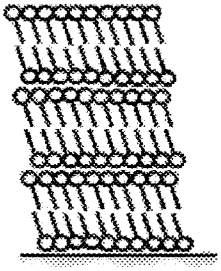

X-ray scattering images were obtained for the coating above at temperatures of 25° C., 40° C., and 60° C. Out-of plane scattering was analyzed to identify intensity peaks, which were used to determine interlayer spacing of the coating at each temperature. As shown in FIG. 41, interlayer spacing remained constant at different temperatures under the phase transition temperature. In-plane scattering was analyzed to identify intensity peaks, which were used to assess the characteristics of the lattice structure within the bilayer. As shown in FIG. 42, minor lattice thermal expansion behavior was observed with increasing temperatures under the phase transition temperature.

Grain size of the coating was then analyzed based on the X-ray scattering images obtained. Grains are identified as domains within which the crystal lattice is continuous and has one orientation. A grain boundary is identified as an interface (or gap) between two adjacent grains, considered as defect in crystal structure (which can act as a pathway for water and gas diffusion). An increase in grain size corresponds to a decrease in the amount of grain boundary.

Figure 43:
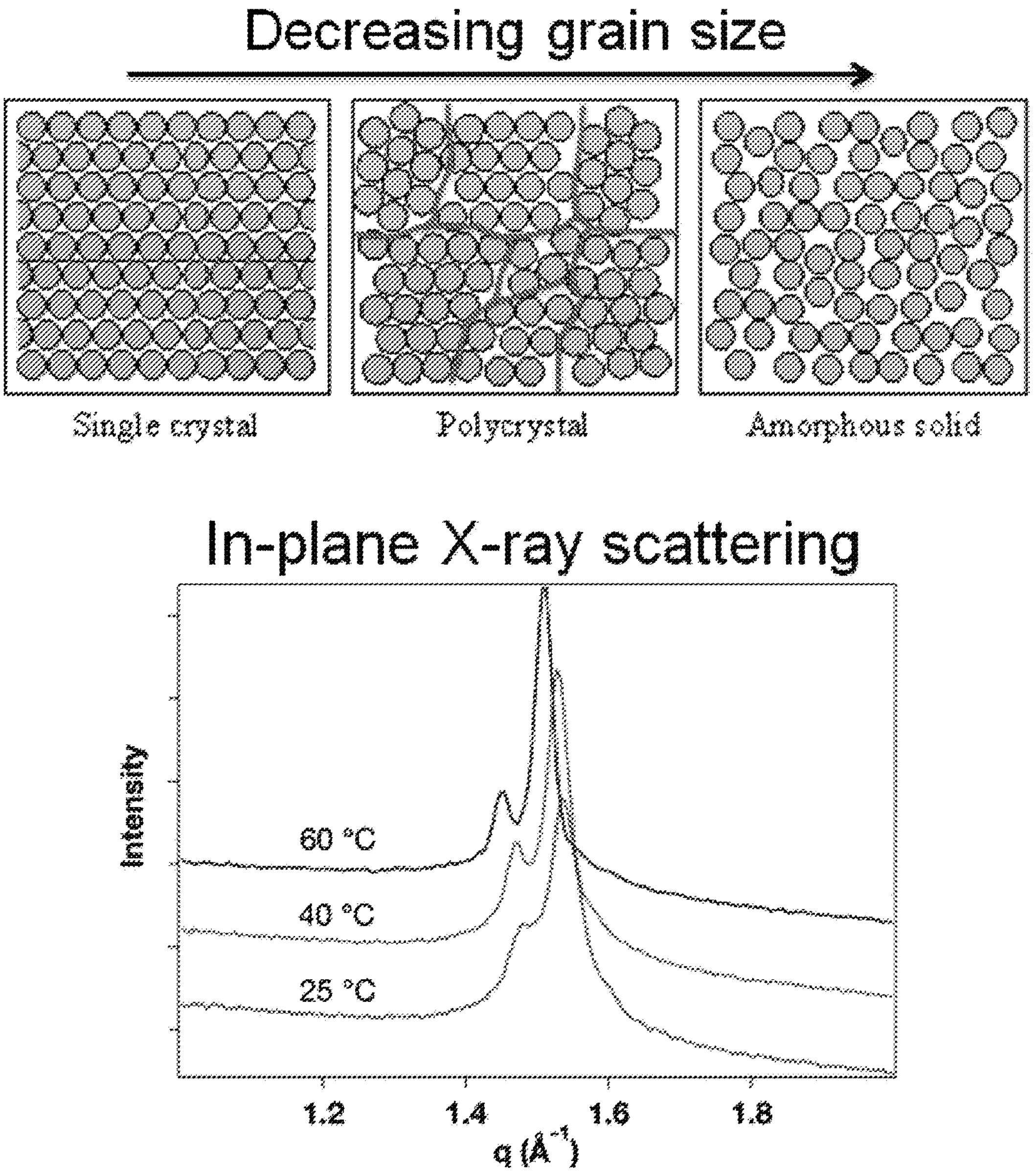
FIG. 43 is an illustration of crystal structure in a coating with decreasing grain size; in plane X-ray scattering plots of a coating taken at 60° C., 40° C., and 25° C.; and a table showing associated peak full width at half maximum and grain size.
Figure 44:
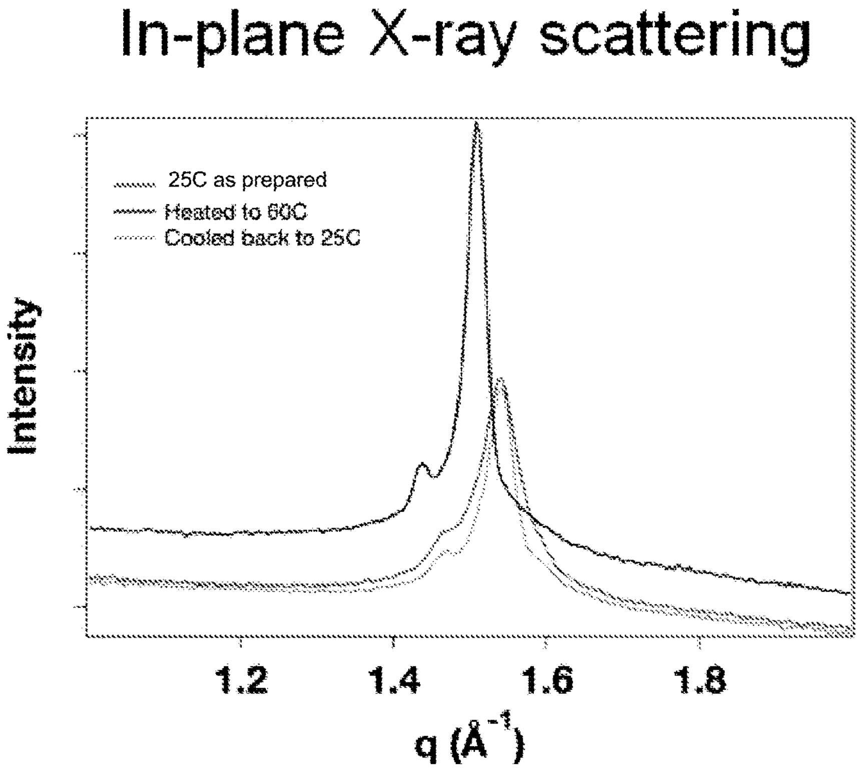
FIG. 44 is an overlay of in plane X-ray scattering plots of a coating taken at 25° C., after heating to 60° C., and after cooling to 25° C.; and a table showing associated peak full width at half maximum and grain size.
Figure 56B:
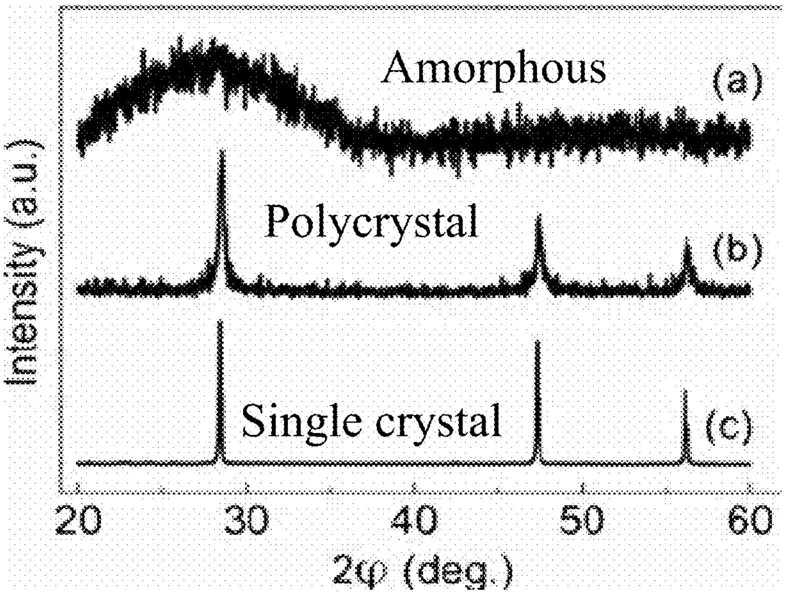
FIG. 56B is an X-ray powder diffractogram of an amorphous material (a), a polycrystal (b), and a single crystal (c).

To illustrate this concept, FIG. 56A shows a scanning electron microscope image of multiple adjacent grains in a polycrystalline material; and FIG. 56B shows an X-ray powder diffractogram of an amorphous material (a), a polycrystal (b), and a single crystal (c). X-Ray scattering imaging of the 94/6 coating was used to determine the crystal grain size by analyzing the peak width, then converting to the grain size using the equation D (grain size) $=2\pi b/\text{FWHM}$ wherein b is about 0.95 for a 2-dimensional crystal. As shown in FIG. 43, grain size within the film coating increases with increasing temperature under the phase transition temperature, as indicated by the decrease in full width half max (FWHM) of the observed peaks. As shown in FIG. 44, after heating followed by cooling of the film coating, the grain size remains larger than the initial grain size at the same temperature. The middle plot at 1.8 q($A^{1}$) corresponds to the coating at the initial temperature of 25° C., the uppermost plot corresponds to the coating after heating to 60° C., and the bottom plot corresponds to the coating after cooling back down to 25° C.

Figure 45:
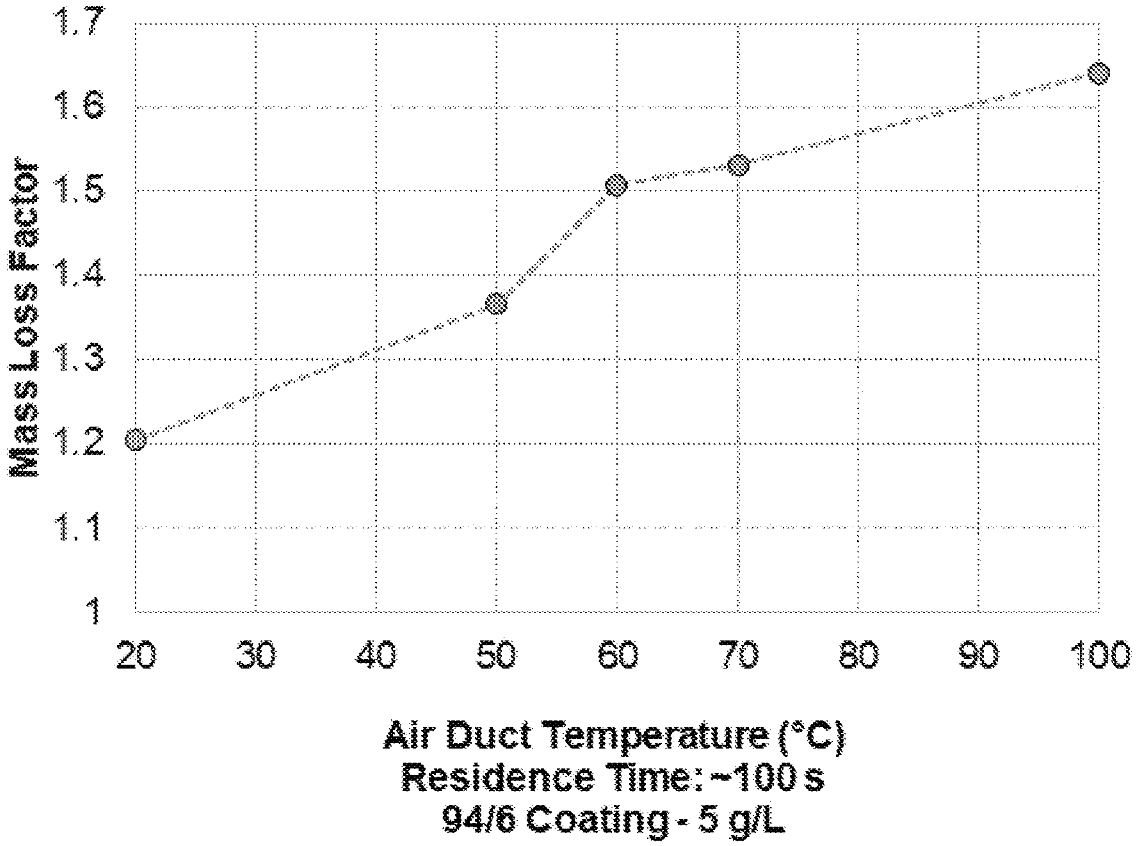
FIG. 45 is a plot of mass loss factor of a coating on a silicon substrate vs. different air duct temperatures.

Film coating applied to the surface of the silicon substrate was exposed to an air duct temperature of 20° C., 50° C., 70° C., or 100° C. for 100 seconds and cooled to room temperature. Mass loss factor was then determined for each coating. As shown in FIG. 45, film coatings exposed to higher temperatures acted as more efficient mass loss barriers. This indicates that the increased grain size retained from heating the film layer improves the function of the coating film as a barrier to mass loss.

Figure 46:
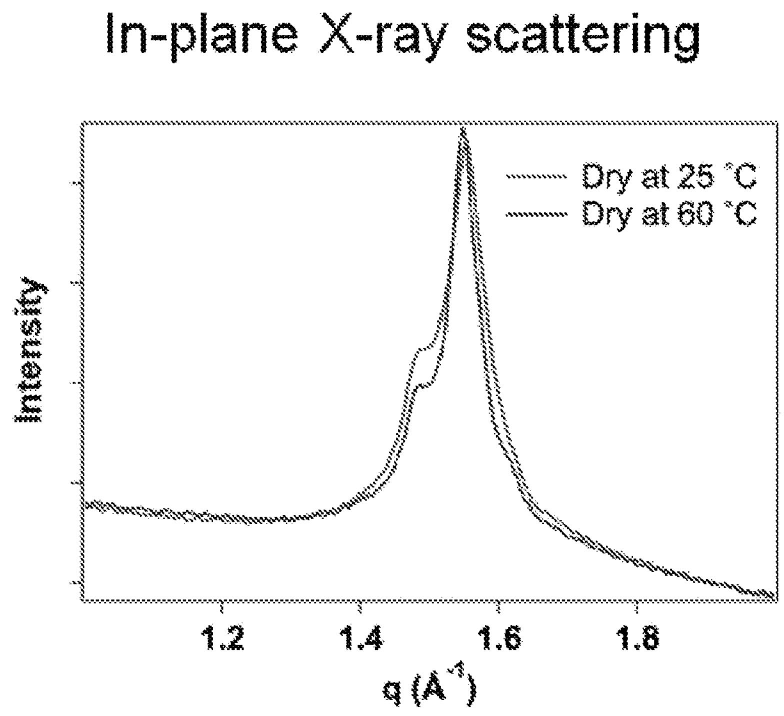
FIG. 46 is an overlay of in plane X-ray scattering plots of a coating dried at 25° C. and a coating dried at 60° C.; and a table showing associated peak full width at half maximum and grain size.

In addition, films dried at different temperatures also have different grain sizes (FIG. 46). The upper plot at 1.45 q($A^{-1}$) is an X-ray scattering image taken for a film dried at 25° C. and the lower plot at 1.45 q($A^{-1}$) is an X-ray scattering image taken for a film dried at 60° C. Higher temperature drying results in a larger grain size, which is observed to increase performance performance of the film as a mass loss barrier.

Figure 47:
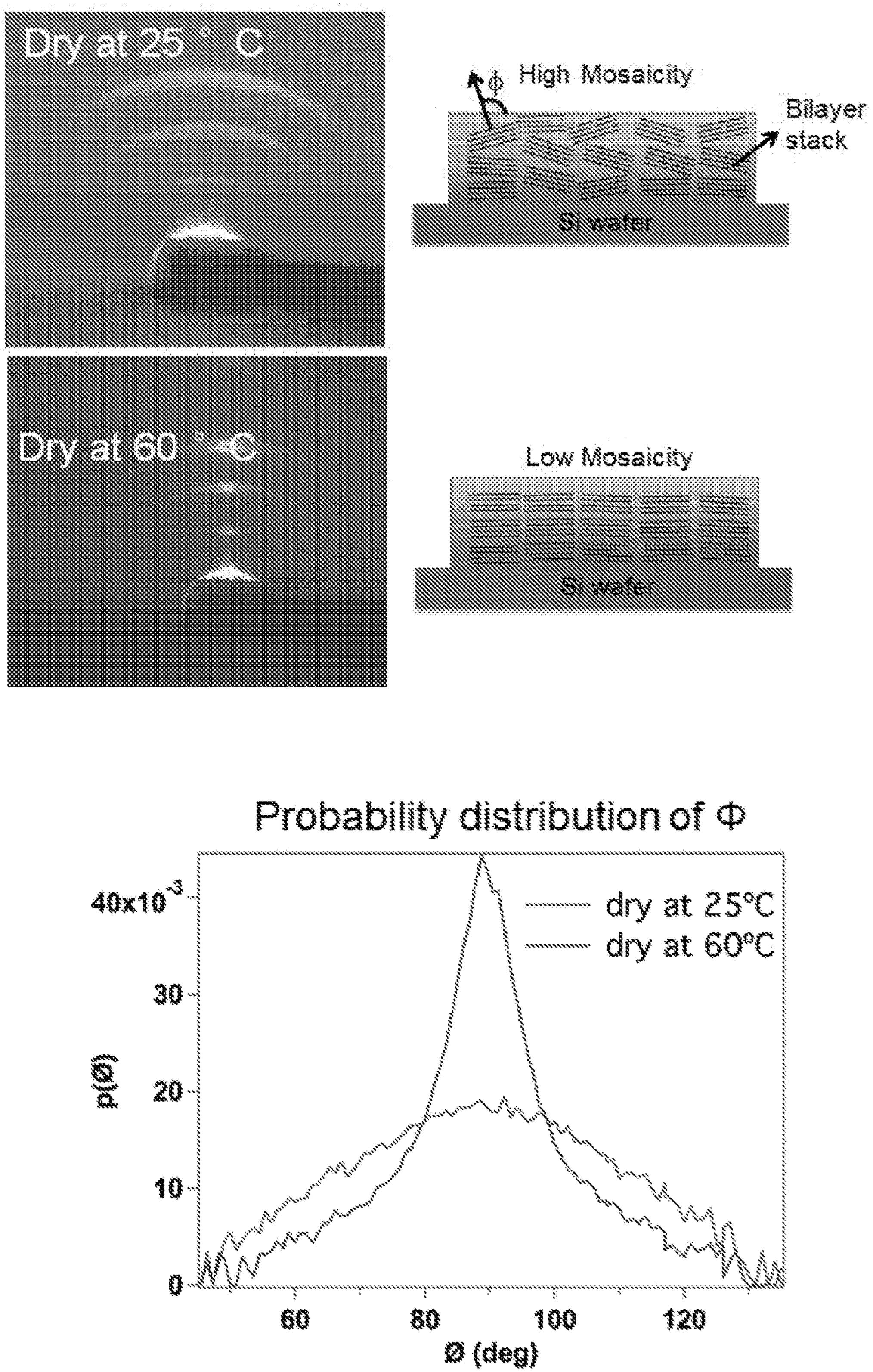
FIG. 47 shows an X-ray scattering images of a coating dried at 25° C. and a coating dried at 60° C. and illustrations of their associated mosaicity; and the probability distribution of theta for each temperature.

Drying temperature can impact the mosaicity (FIG. 47). Mosaicity is a measure of the probabilities of relative orientation of the bilayers relative to the plane of the substrate. Bilayer stacking mosaicity is also a type of crystal defect that creates a pathway for water and gas transport. Lower mosaicity means that more of the bilayers are sitting more parallel to the plane of the substrate. Based on the probability distribution in FIG. 47, drying at 60° C. (upper plot at 90 degrees increases the probability that lamellar structure will be oriented parallel to the substrate plane (i.e. at 90°) as compared to drying at 25° C. (lower plot at 90 degrees). An increase in drying temperature drastically decreases the bilayer stacking mosaicity, and thus leads to increased barrier performance.

Figure 48:
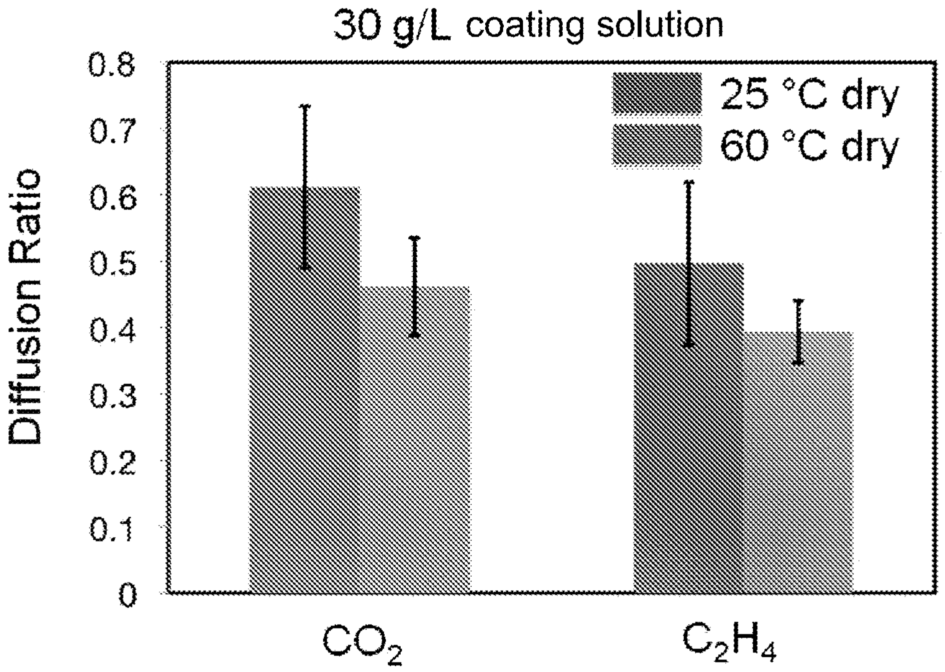
FIG. 48 is a bar graph showing diffusion ratios of carbon dioxide and ethylene through a coating dried at 25° C. and a coating dried at 60° C.

Gas diffusion was then measured in coatings that were dried at 25° C. (FIG. 48, left bar for each gas) and 60° C. (FIG. 48, right bar for each gas). As shown in FIG. 48, drying temperature reduces the gas diffusion ratio, and to a greater degree in the coating dried at 60° C. This is likely an effect of the combination of grain size and mosaicity identified above.

Example 29. Morphology of Different Fatty Acid Ester Chain Lengths on Plastic

Figure 59:
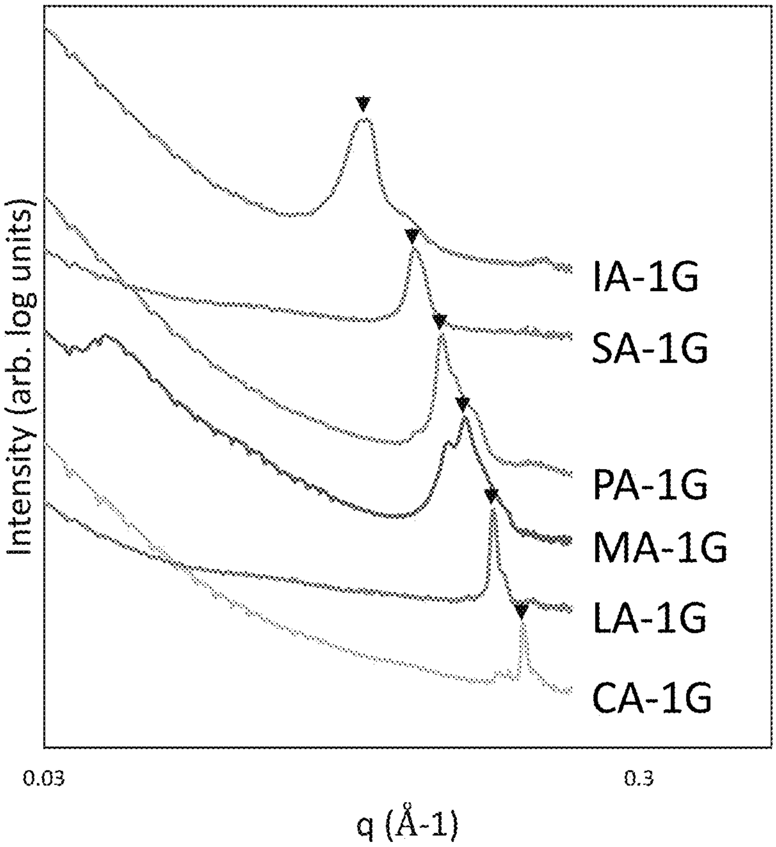
FIG. 59 is an overlay of the out-of plane X-ray scattering plots of six coatings formed from monoglycerides of differing chain length on a plastic surface.

Aqueous dispersions of 95:5 IA-1G and SA-Na, 95:5 SA-1G and SA-Na, 95:5 PA-1G and PA-Na, 95:5 MA-1G and MA-Na, 95:5 LA-1G and LA-Na, and 95:5 CA-1G and CA-Na were each prepared in a Vitamix blender at concentrations of 30 g/L with hot water and mixed for 3 minutes. The dispersions were cast into films on plastic substrates in an oven at 50° C. for 12 h followed by characterization by grazing incidence small angle X-ray scattering (GISAXS). The 1D circularly averaged scattering profiles were plotted. FIG. 59 is an overlay of the X-ray scattering plots of each dispersion, showing that the monoglycerides self-assemble into ordered nanostructures, and that the periodic (i.e., interlayer) spacing of the resultant nanostructures increases with increasing chain-length. Primary peaks used for determination of periodicity are labeled with black arrows. The periodic (i.e., interlayer) spacing of the nanostructures was calculated according to Bragg's Law using the following equation:

$$D=2\pi/q^*$$

Wherein D is the periodic spacing and q* is the primary peak position identified by the black arrows in FIG. 59. The periodic spacing of monoglycerides was as follows: 3.3 nm (CA-1G), 3.7 nm (LA-1G), 4.1 nm (MA-1G), 4.5 nm (PA-1G), 5.0 nm (SA-1G), and 6.0 nm (IA-1G).

Figure 60:
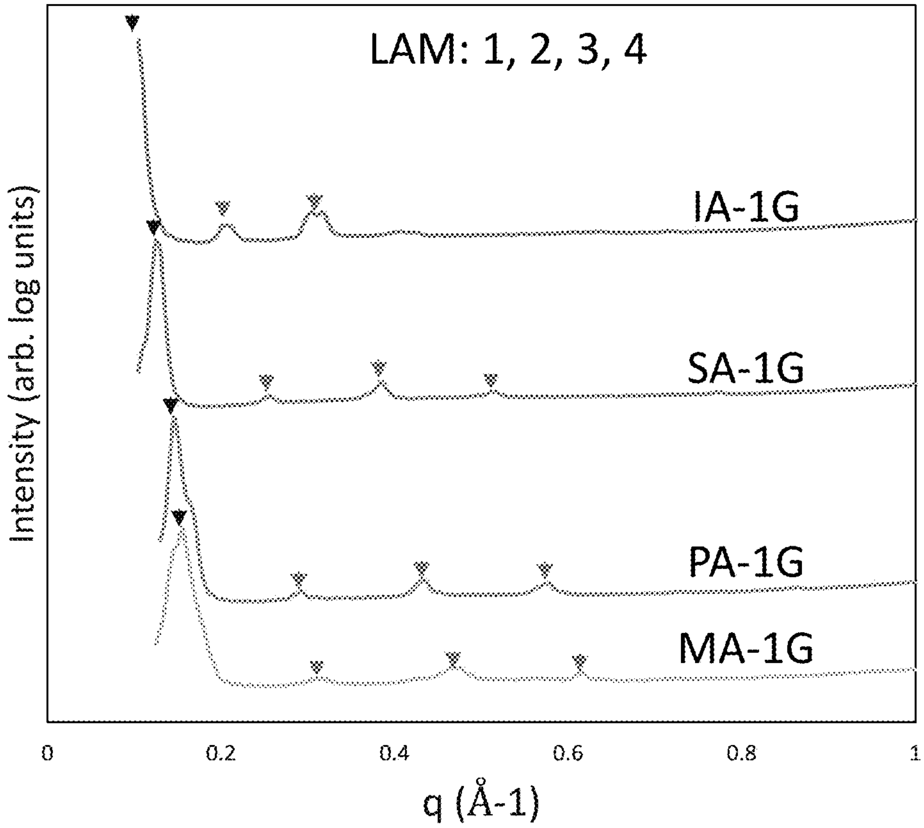
FIG. 60 is an overlay of plots obtained from grazing incidence wide angle X-ray scattering images of coatings formed from IA-1G, SA-1G, PA-1G, and MA-1G dispersions showing primary scattering peaks and diffraction peaks.

The morphologies of the IA-1G, SA-1G, PA-1G, and MA-1G monoglyceride films were determined by obtaining the grazing incidence wide angle X-ray scattering plots, indexing the diffraction peaks to the primary scattering peaks (q*) of the plots, then cross-referencing to known morphologies. FIG. 60 is an overlay of plots obtained from grazing incidence wide angle X-ray scattering images, with the q* primary scattering peaks in each plot appearing first on the x-axis, and the diffraction peaks appearing further down the x-axis. The data shows that dispersions including IA-1G, SA-1G, PA-1G, and MA-1G each self-assemble into alternating bilayers (lamella) determined by diffraction peaks at integer spacing (i.e. q*, 2q*, 3q*, 4q*, and so on).

Figure 61:
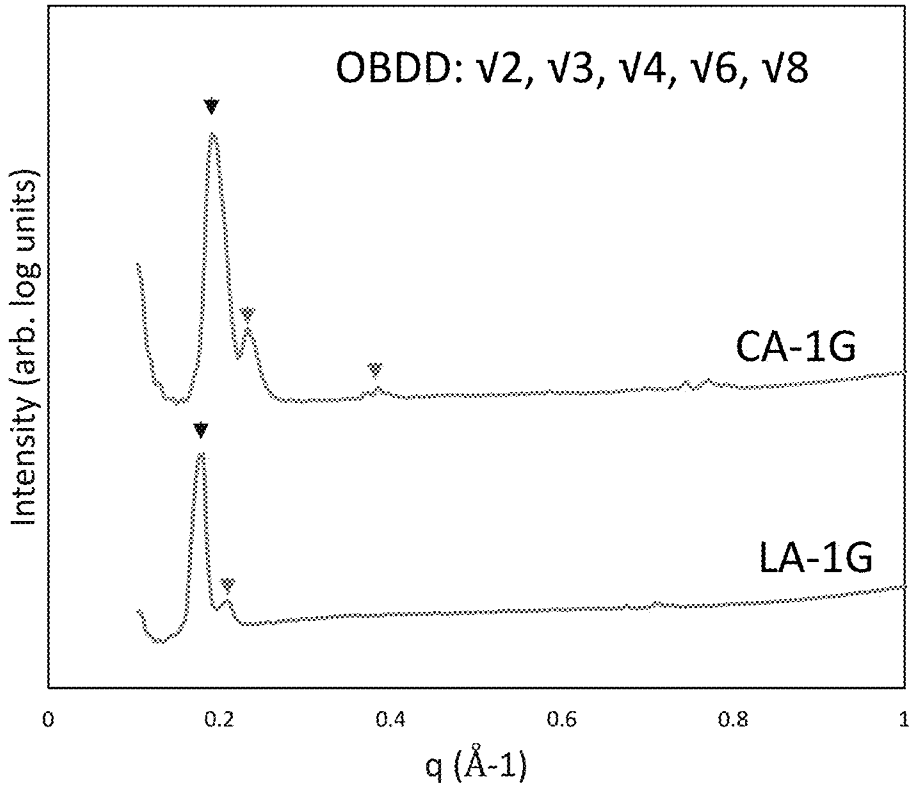
FIG. 61 is an overlay of plots obtained from grazing incidence wide angle X-ray scattering images of coatings formed from LA-1G and CA-1G dispersions showing primary scattering peaks and diffraction peaks.

The morphologies of the LA-1G and CA-1G monoglyceride films were determined by obtaining the grazing incidence wide angle X-ray scattering plots, indexing the diffraction peaks to the primary scattering peaks (q*) of the plots, then cross-referencing to known morphologies. FIG. 61 is an overlay of plots obtained from grazing incidence wide angle X-ray scattering images, with the q* primary scattering peaks in each plot appearing as the first peaks on the x-axis labelled with an arrow, and the diffraction peaks appearing further down the x-axis. The data shows that dispersions including LA-1G and CA-1G each self-assemble into bicontinuous cubic phases as determined by diffraction peaks at $\sqrt{2}q^*$, $\sqrt{3}q^*$, $\sqrt{4}q^*$, $\sqrt{6}q^*$, and so on. Without wishing to be bound to theory, it is believed that the lamellar structure is less permeable than bicontinuous cubic phases due to the fewer pathways for water and gas to penetrate the barrier.

Example 30. Self-Assembly of Cellulose with and Without Coating

Figure 62:
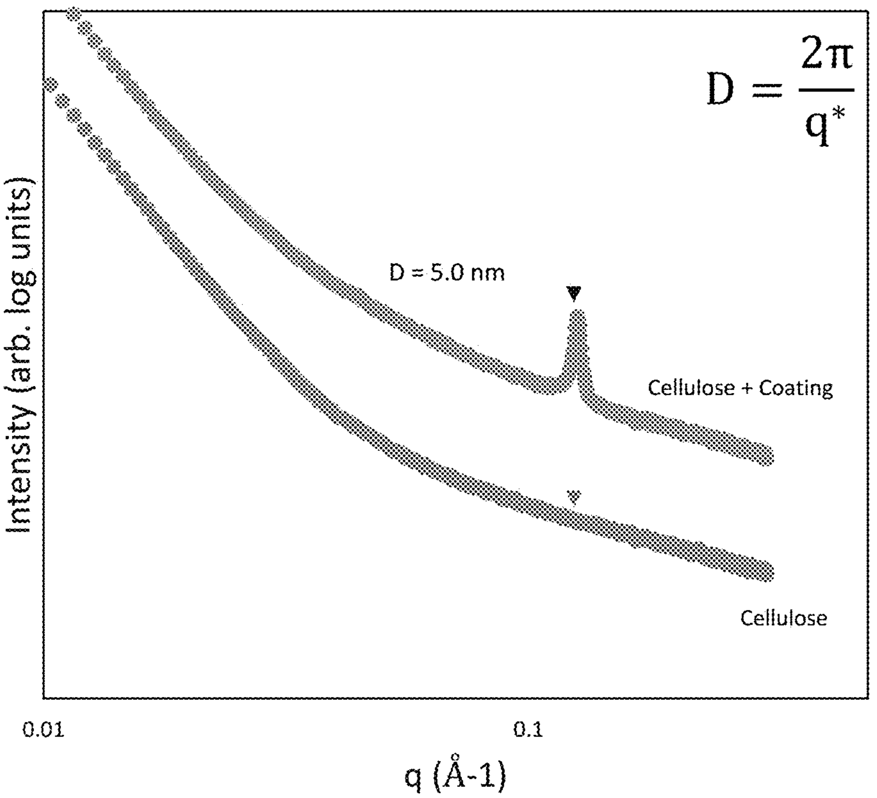
FIG. 62 is an overlay of X-ray scattering plots of cellulose and cellulose including a monoglyceride coating.

A polysaccharide cellulose was coated with a 94:3:3 SA-1G: SA-Na: PA-Na composition and dried at ambient conditions for 24 h, then characterized by grazing incidence small angle X-ray scattering. FIG. 62 is an overlay of X-ray scattering plots of cellulose and cellulose including the aforementioned coating. According to the lower plot, cellulose does not self-assemble into periodic nanostructures, which can be rationalized by it being an unstructured polysaccharide. However, as shown by the upper plot, the coating self-assembles into alternating bilayers on cellulose as evidenced by the presence of a diffraction peak, labeled by the black arrow, with a periodic spacing of 5.0 nm.

While various compositions and methods have been described above, it should be understood that they have been presented by way of example only, and not limitation. Where methods and steps described above indicate certain events occurring in certain order, ordering of steps may be modified, and such modification are in accordance with the variations of the invention. Additionally, certain of the steps may be performed concurrently in a parallel process when possible, as well as performed sequentially as described above. The various implementations have been particularly shown and described, but it will be understood that various changes in form and details may be made. Accordingly, other implementations are within the scope of the following claims.

What is claimed is:

1. A coated agricultural product comprising:

an agricultural product;

a coating on a surface of the agricultural product, wherein the coating has a lamellar structure comprising a plurality of lamellae and a thickness of the coating is less than 20 microns.

2. The coated agricultural product of claim 1, wherein the coating comprises a plurality of grains.

3. The coated agricultural product of claim 1, wherein the coating comprises one or more fatty acids, fatty acid esters, or a combination thereof.

4. The coated agricultural product of claim 1, wherein the coating comprises one or more fatty acid salts.

5. The coated agricultural product of claim 1, wherein an interlayer spacing of the lamellae is in a range from about 2 nm to about 13 nm.

6. The coated agricultural product of claim 1, wherein the interlayer spacing of the lamellae is in a range from about 3 nm to about 10 nm.

7. The coated agricultural product of claim 3, wherein the fatty acids, the fatty acid esters, or the combination thereof are collectively 65% to 99% by weight of the coating.

8. The coated agricultural product of claim 4, wherein the fatty acid salts are collectively 1% to 35% by weight of the coating.

9. The coated agricultural product of claim 2, wherein the plurality of grains has an average grain size in a range of about 6 nm to about 100 nm.

10. The coated agricultural product of claim 2, wherein the plurality of grains has an average grain size in a range of about 9 nm to about 22 nm.

11. The coated agricultural product of claim 1, wherein the thickness of the coating is in a range from about 100 nm to about 20 microns.

12. The coated agricultural product of claim 3, wherein each fatty acid and/or ester thereof is an independently selected compound of Formula IA, wherein Formula IA is:

(Formula IA)

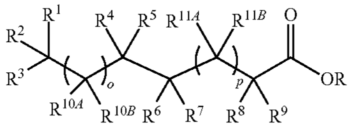

wherein:

R is selected from the group consisting of H and $C_1$-$C_6$ alkyl optionally substituted with one or more of OH and $C_1$-$C_6$ alkoxy;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl; and o is an integer from 0 to 17;

p is an integer from 0 to 17;

wherein the sum of o and p is from 0 to 17.

13. The coated agricultural product of claim 12, wherein the compound of Formula IA is a compound of Formula IA-A-i:

(Formula IA-A-i)

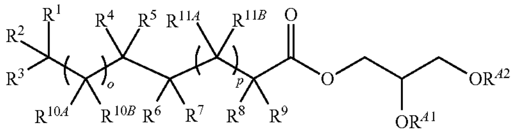

or a salt thereof, wherein:

$R^{A1}$ and $R^{A2}$ are independently selected from H and $C_1$-$C_6$ alkyl;

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{10B}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17; and wherein the sum of o and p is from 0 to 17.

14. The coated agricultural product of claim 4, wherein each fatty acid salt is an independently selected compound of Formula IIA, wherein Formula IIA is:

(Formula IIA)

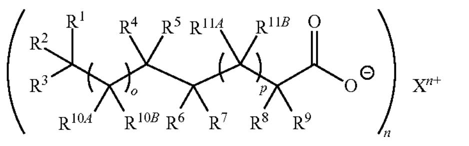

wherein:

$R^1$, $R^2$, $R^3$, $R^4$, $R^5$, $R^6$, $R^7$, $R^8$, and $R^9$ are independently selected from the group consisting of: H, OH, $C_1$-$C_6$ alkyl, $C_2$-$C_6$ alkenyl, and $C_1$-$C_6$ alkoxy;

each occurrence of $R^{10A}$, $R^{10B}$, $R^{11A}$, and $R^{11B}$ is independently selected from the group consisting of: H, OH, $C_1$-$C_6$ alkyl, $C_2$-$C_6$ alkenyl, and $C_1$-$C_6$ alkoxy;

or any two $R^1$, $R^2$, $R^3$, $R^4$, $R^5$, $R^6$, $R^7$, $R^8$, $R^9$, $R^{10A}$, $R^{10B}$, $R^{11A}$, and $R^{11B}$ on adjacent carbon atoms are taken together with the carbon atoms to which they are attached to form a double bond, a 3- to 6-membered ring heterocycle, or a $C_3$-$C_6$ cycloalkyl;

o is an integer from 0 to 17;

p is an integer from 0 to 17;

wherein the sum of o and p is from 0 to 17;

$X^{n+}$ is a cationic moiety having formal charge n; and each occurrence of R' is selected from H and $C_1$-$C_6$ alkyl.

15. A method of reducing the mass loss rate of the coated agricultural product of claim 1, the method comprising:

(i) heating the coated agricultural product from a first temperature to a second temperature; and (ii) cooling the coated agricultural product from the second temperature to a third temperature, wherein the third temperature is less than the second temperature.

16. The method of claim 15, wherein the first temperature is in a range from about 20° C. to about 30° C.

17. The method of claim 15, wherein the second temperature is in a range from about 50° C. to about 65° C.

18. The method of claim 15, wherein the third temperature is in a range from about 20° C. to about 30° C.

19. The method of claim 15, wherein the second temperature is maintained for about 5 minutes to about 60 minutes.

20. The method of claim 15, wherein the grain size after cooling the coated agricultural product from the second temperature to the third temperature is larger than the grain size before heating the coated agricultural product from the first temperature to the second temperature.

21. The method of claim 15, wherein the grain size of the coating before heating the coated agricultural product from the first temperature to the second temperature is in a range from about 8 nm to about 10 nm.

22. The method of claim 15, wherein the grain size of the coating after cooling the coated agricultural product from the second temperature to the third temperature is in a range from about 11 nm to about 17 nm.

* * * * *